US009068794B1

(12) United States Patent
Sammut

(10) Patent No.: US 9,068,794 B1

(45) **Date of Patent: *Jun. 30, 2015**

(54) APPARATUS AND METHOD FOR AIMING POINT CALCULATION

(71) Applicant: HORUS VISION LLC, San Bruno, CA (US)

(72) Inventor: Dennis J. Sammut, Woodside, CA (US)

(73) Assignee: HORUS VISION, LLC;, San Bruno, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/307,126

(22) Filed: Jun. 17, 2014

Related U.S. Application Data

(63) Continuation of application No. 14/156,206, filed on Jan. 15, 2014, which is a continuation of application No. 13/157,139, filed on Jun. 9, 2011, now Pat. No. 8,656,630, which is a continuation of application No. 13/103,801, filed on May 9, 2011, now abandoned, which is a continuation of application No. 11/389,723, filed on Mar. 27, 2006, now Pat. No. 7,937,878, which is a continuation-in-part of application No. 10/706,184, filed on Nov. 12, 2003, now Pat. No. 7,856,750, which is a continuation-in-part of (Continued)

(51) Int. Cl.
*F41G 1/38* (2006.01)
*F41G 3/00* (2006.01)

(52) U.S. Cl.
CPC ... *F41G 3/00* (2013.01); *F41G 1/38* (2013.01)

(58) Field of Classification Search
USPC ............... 42/122, 84; 89/41.14, 41.03, 41.15, 89/41.16, 41.17, 41.19, 200, 204
See application file for complete search history.

(56) References Cited

U.S. PATENT DOCUMENTS

| | | | |
|---|---|---|---|
| 912,050 | A | 2/1909 | Wanee |
| 1,006,699 | A | 10/1911 | Straubel |
| 1,107,163 | A | 8/1914 | Grauheding |
| 1,127,230 | A | 2/1915 | Grauheding |
| 1,190,121 | A | 7/1916 | Critchett |
| 1,406,620 | A | 2/1922 | Dear |
| 1,425,321 | A | 8/1922 | Etherington |
| 1,428,389 | A | 9/1922 | Miller |
| 1,540,772 | A | 6/1925 | Gibbs |
| 1,708,389 | A | 4/1929 | Karnes |
| 1,851,189 | A | 3/1932 | King |
| 2,094,623 | A | 10/1937 | Stokey |
| 2,150,629 | A | 3/1939 | Mossberg |
| 2,154,454 | A | 4/1939 | Joyce |
| 2,171,571 | A | 9/1939 | Karnes |
| 2,413,600 | A | 12/1946 | Bierman |
| 2,420,273 | A | 5/1947 | West |
| 2,450,712 | A | 10/1948 | Brown |

(Continued)

FOREIGN PATENT DOCUMENTS

| | | |
|---|---|---|
| DE | 3401855 | 7/1985 |
| DE | 3834924 | 4/1990 |

(Continued)

OTHER PUBLICATIONS

Reticle-Wikipedia http://en.wikipedia.org/wiki/Reticle (date unknown).*

(Continued)

*Primary Examiner* — Michelle Clement
(74) *Attorney, Agent, or Firm* — Casimir Jones, S.C.

(57) ABSTRACT

The present invention relates to target acquisition and related devices, and more particularly to telescopic gunsights and associated equipment used to achieve shooting accuracy at, for example, close ranges, medium ranges and extreme ranges at stationary and moving targets.

11 Claims, 185 Drawing Sheets

Related U.S. Application Data application No. 10/092,921, filed on Mar. 6, 2002, now Pat. No. 6,681,512, which is a continuation-in-part of application No. 09/519,124, filed on Mar. 6, 2000, now Pat. No. 6,453,595, which is a continuation-in-part of application No. 09/129,729, filed on Aug. 5, 1998, now Pat. No. 6,032,374, which is a continuation-in-part of application No. 08/986,458, filed on Dec. 8, 1997, now Pat. No. 5,920,995, said application No. 10/706,184 is a continuation-in-part of application No. PCT/US02/18490, filed on Jun. 10, 2002, which is a continuation of application No. 09/882,767, filed on Jun. 14, 2001, now Pat. No. 6,516,699, said application No. 13/157,139 is a continuation-in-part of application No. 10/579,119, filed as application No. PCT/US2004/037947 on Nov. 12, 2004, now abandoned.

(56) References Cited

U.S. PATENT DOCUMENTS

| | | | |
|---|---|---|---|
| 2,464,521 | A | 3/1949 | McCall |
| 2,486,940 | A | 11/1949 | Garber et al. |
| 2,615,252 | A | 10/1952 | Wing |
| 2,806,287 | A | 9/1957 | Sullivan |
| 2,807,981 | A | 10/1957 | Barnes |
| 2,823,457 | A | 2/1958 | Mihalyi |
| 2,891,445 | A | 6/1959 | Staubach |
| 2,949,816 | A | 8/1960 | Weaver |
| 2,952,180 | A | 9/1960 | Estes |
| 2,955,512 | A | 10/1960 | Kollmorgen et al. |
| 3,058,391 | A | 10/1962 | Leupold |
| 3,059,338 | A | 10/1962 | Coeytaux |
| 3,161,716 | A | 12/1964 | Burris et al. |
| 3,190,003 | A | 6/1965 | O'Brien |
| 3,229,370 | A | 1/1966 | Plisk et al. |
| 3,297,389 | A | 1/1967 | Gibson |
| 3,313,026 | A | 4/1967 | Akin, Jr. |
| 3,381,380 | A | 5/1968 | Thomas |
| 3,383,987 | A | 5/1968 | MacMillan |
| 3,386,330 | A | 6/1968 | Burris et al. |
| 3,392,450 | A | 7/1968 | Herter et al. |
| 3,410,644 | A | 11/1968 | McLendon |
| 3,431,652 | A | 3/1969 | Leatherwood |
| 3,464,770 | A | 9/1969 | Schmidt |
| 3,470,616 | A | 10/1969 | Thompson |
| 3,475,821 | A | 11/1969 | Huddleston |
| 3,492,733 | A | 2/1970 | Leatherwood |
| 3,506,330 | A | 4/1970 | Allen |
| 3,540,256 | A | 11/1970 | Thompson |
| 3,575,085 | A | 4/1971 | McAdam, Jr. |
| 3,638,321 | A | 2/1972 | Eglin |
| 3,682,552 | A | 8/1972 | Hartman |
| 3,684,376 | A | 8/1972 | Lessard |
| 3,743,818 | A | 7/1973 | Marasco et al. |
| 3,744,133 | A | 7/1973 | Fukushima et al. |
| 3,744,143 | A | 7/1973 | Kilpatrick |
| 3,749,494 | A | 7/1973 | Hodges |
| 3,777,404 | A | 12/1973 | Oreck |
| 3,782,822 | A | 1/1974 | Spence |
| 3,798,796 | A | 3/1974 | Stauff et al. |
| 3,826,012 | A | 7/1974 | Pachmayr |
| 3,876,304 | A | 4/1975 | Novak |
| 3,885,861 | A | 5/1975 | Farnsworth et al. |
| 3,902,251 | A | 9/1975 | Ross |
| 3,948,587 | A | 4/1976 | Rubbert |
| 3,960,453 | A | 6/1976 | Svensson et al. |
| 3,991,500 | A | 11/1976 | Kershner et al. |
| 4,014,482 | A | 3/1977 | Esker et al. |
| 4,102,053 | A | 7/1978 | Colwell |
| 4,172,662 | A | 10/1979 | Vogel |
| 4,200,355 | A | 4/1980 | Williams, Jr. |
| 4,218,834 | A | 8/1980 | Robertsson |
| 4,247,161 | A | 1/1981 | Unertl, Jr. |
| 4,248,496 | A | 2/1981 | Akin, Jr. et al. |
| 4,255,013 | A | 3/1981 | Allen |
| 4,263,719 | A | 4/1981 | Murdoch |
| 4,285,137 | A | 8/1981 | Jennie |
| 4,389,791 | A | 6/1983 | Ackerman |
| 4,395,096 | A | 7/1983 | Gibson |
| 4,403,421 | A | 9/1983 | Shepherd |
| 4,404,890 | A | 9/1983 | McAlpine |
| 4,408,842 | A | 10/1983 | Gibson |
| 4,458,436 | A | 7/1984 | Bohl |
| 4,497,548 | A | 2/1985 | Burris |
| 4,531,052 | A | 7/1985 | Moore |
| 4,561,204 | A | 12/1985 | Binion |
| 4,577,962 | A | 3/1986 | de Guillenschmidt et al. |
| 4,584,776 | A | 4/1986 | Shepherd |
| 4,616,421 | A | 10/1986 | Forsen |
| 4,618,221 | A | 10/1986 | Thomas |
| 4,627,171 | A | 12/1986 | Dudney |
| 4,671,165 | A | 6/1987 | Heidmann et al. |
| 4,695,161 | A | 9/1987 | Reed |
| 4,743,765 | A | 5/1988 | Ekstrand |
| 4,777,352 | A | 10/1988 | Moore |
| 4,787,739 | A | 11/1988 | Gregory |
| 4,833,786 | A | 5/1989 | Shores, Sr. |
| D306,173 | S | 2/1990 | Reese |
| 4,912,853 | A | 4/1990 | McDonnell et al. |
| 4,936,190 | A | 6/1990 | Pilcher, II |
| 4,949,089 | A | 8/1990 | Ruszkowski, Jr. |
| 4,957,357 | A | 9/1990 | Barns et al. |
| 4,965,439 | A | 10/1990 | Moore |
| 4,977,677 | A | 12/1990 | Troescher, Jr. |
| 5,026,158 | A | 6/1991 | Golubic |
| 5,157,839 | A | 10/1992 | Beutler |
| 5,171,933 | A | 12/1992 | Eldering |
| 5,181,323 | A | 1/1993 | Cooper |
| 5,194,908 | A | 3/1993 | Lougheed et al. |
| 5,208,417 | A | 5/1993 | Langer et al. |
| 5,223,560 | A | 6/1993 | Cipolli et al. |
| 5,223,650 | A | 6/1993 | Finn |
| 5,375,072 | A | 12/1994 | Cohen |
| 5,454,168 | A | 10/1995 | Langner |
| 5,469,414 | A | 11/1995 | Okamura |
| 5,491,546 | A | 2/1996 | Wascher et al. |
| 5,577,733 | A | 11/1996 | Downing |
| 5,616,903 | A | 4/1997 | Springer |
| 5,631,654 | A | 5/1997 | Karr |
| 5,657,571 | A | 8/1997 | Peterson |
| 5,672,840 | A | 9/1997 | Sage et al. |
| 5,686,690 | A | 11/1997 | Lougheed et al. |
| 5,771,623 | A | 6/1998 | Pernstich et al. |
| 5,781,505 | A | 7/1998 | Rowland |
| D397,704 | S | 9/1998 | Reese |
| 5,824,942 | A | 10/1998 | Mladjan et al. |
| D403,686 | S | 1/1999 | Reese |
| 5,887,352 | A | 3/1999 | Kim |
| 5,920,995 | A | 7/1999 | Sammut |
| 5,960,576 | A | 10/1999 | Robinson |
| 5,966,859 | A | 10/1999 | Samuels |
| 6,025,908 | A | 2/2000 | Houde-Walter |
| 6,032,374 | A | 3/2000 | Sammut |
| 6,041,508 | A | 3/2000 | David |
| 6,058,921 | A | 5/2000 | Lawrence et al. |
| 6,064,196 | A | 5/2000 | Oberlin et al. |
| 6,174,288 | B1 | 1/2001 | Samuels |
| 6,247,259 | B1 | 6/2001 | Tsadka et al. |
| 6,252,706 | B1 | 6/2001 | Kaladgew |
| 6,269,580 | B1 | 8/2001 | Suzuki |
| 6,269,581 | B1 | 8/2001 | Groh |
| 6,357,158 | B1 | 3/2002 | Smith, III |
| D456,057 | S | 4/2002 | Smith, III |
| 6,445,497 | B1 | 9/2002 | Adda |
| 6,453,595 | B1 | 9/2002 | Sammut |
| 6,516,551 | B2 | 2/2003 | Gaber |
| 6,516,699 | B2 | 2/2003 | Sammut et al. |
| 6,568,092 | B1 | 5/2003 | Brien |
| D475,758 | S | 6/2003 | Ishikawa |
| 6,574,900 | B1 | 6/2003 | Malley |
| 6,591,537 | B2 | 7/2003 | Smith |
| 6,681,512 | B2 | 1/2004 | Sammut |
| 6,729,062 | B2 | 5/2004 | Thomas et al. |

(56) References Cited

U.S. PATENT DOCUMENTS

| | | | |
|---|---|---|---|
| 6,772,550 | B1 | 8/2004 | Leatherwood |
| 6,813,025 | B2 | 11/2004 | Edwards |
| 6,862,832 | B2 | 3/2005 | Barrett |
| 6,871,439 | B1 | 3/2005 | Edwards |
| 6,886,287 | B1 | 5/2005 | Bell et al. |
| D506,520 | S | 6/2005 | Timm et al. |
| D517,153 | S | 3/2006 | Timm et al. |
| D522,030 | S | 5/2006 | Jenkinson |
| D532,477 | S | 11/2006 | Zaderey et al. |
| D536,762 | S | 2/2007 | Timm et al. |
| 7,171,775 | B1 | 2/2007 | Lacorte |
| 7,171,776 | B2 | 2/2007 | Staley, III |
| 7,185,455 | B2 | 3/2007 | Zaderey |
| D542,879 | S | 5/2007 | Zaderey |
| D544,511 | S | 6/2007 | Geurts |
| 7,237,355 | B2 | 7/2007 | Smith, III |
| 7,325,353 | B2 | 2/2008 | Cole et al. |
| D567,896 | S | 4/2008 | Pride et al. |
| 7,584,570 | B2 | 9/2009 | Smith |
| 7,603,804 | B2 | 10/2009 | Zaderey et al. |
| 7,685,760 | B1 | 3/2010 | Neumaster |
| D613,363 | S | 4/2010 | Huber |
| 7,705,975 | B1 | 4/2010 | Farris |
| 7,724,416 | B2 | 5/2010 | Miller |
| 7,748,155 | B2 | 7/2010 | Cole |
| 7,806,331 | B2 | 10/2010 | Windauer et al. |
| 7,832,137 | B2 | 11/2010 | Sammut |
| 7,836,626 | B2 | 11/2010 | Shepherd |
| 7,946,073 | B1 | 5/2011 | Buck |
| 7,958,643 | B1 | 6/2011 | Wu |
| 8,286,384 | B2 | 10/2012 | Zaderey et al. |
| 8,353,454 | B2 | 1/2013 | Sammut et al. |
| 2002/0124452 | A1 | 9/2002 | Sammut |
| 2002/0129535 | A1 | 9/2002 | Osborn, II |
| 2002/0139030 | A1 | 10/2002 | Smith |
| 2004/0016168 | A1 | 1/2004 | Thomas et al. |
| 2004/0020099 | A1 | 2/2004 | Osborn, II |
| 2004/0088898 | A1 | 5/2004 | Barrett |
| 2004/0244262 | A1 | 12/2004 | Paige |
| 2005/0005495 | A1 | 1/2005 | Smith |
| 2005/0229468 | A1 | 10/2005 | Zaderey et al. |
| 2005/0257414 | A1 | 11/2005 | Zaderey et al. |
| 2006/0236586 | A1 | 10/2006 | Zaderey |
| 2006/0260171 | A1 | 11/2006 | Cole et al. |
| 2008/0098640 | A1 | 5/2008 | Sammut et al. |
| 2008/0202011 | A1 | 8/2008 | Shepherd |
| 2009/0199451 | A1 | 8/2009 | Zaderey et al. |
| 2011/0107649 | A1 | 5/2011 | Buck |
| 2013/0033746 | A1 | 2/2013 | Brumfield |
| 2013/0160346 | A1 | 6/2013 | White et al. |

FOREIGN PATENT DOCUMENTS

| | | |
|---|---|---|
| DE | 20008101 | 8/2000 |
| EP | 0147329 | 7/1985 |
| EP | 1443354 | 8/2004 |
| GB | 517390 | 1/1940 |
| GB | 2094950 | 9/1982 |
| GB | 2294133 | 4/1996 |
| JP | 55-036823 | 3/1980 |
| WO | 96/01404 | 1/1996 |
| WO | 97/37193 | 10/1997 |
| WO | 98/40688 | 9/1998 |
| WO | 02/103274 | 12/2002 |

OTHER PUBLICATIONS

Ballplex, Burrisoptics http://www.burrisoptics.com/pdf/BALLPlex.pdf (date unkonwn).*
Frenchu Ballistics; Frenchu, William, Copyright 1988.*
Tradoc Bulletin 3 on the Soviet RPG-7 Antitank Grenade Launcher (Nov. 1976).
Pejsa, Art, "The Quiet Revolution in Precision Rifle Ballistics," The Varmint Hunter Magazine, Issue 50, pp. 78, 96, 105 (Apr. 2004).
Polacek, Don, "Inside Product News—Leupold Illuminated Reticle Scopes," Rifle Sporting Firearms, Issue 186 (Nov. 1999).
Precision Shooting, pp. 71-72 (Jun. 2003).
Press Release: Horus Vision Reticle Aiming System Eliminates Guesswork, The Varmint Hunter Magazine, Issue 44 (Oct. 2002).
Rifle Shooter FN SPR-4, pp. 52-53, Nov./Dec. 2003.
Sammut, Dennis J., "The Long Shot: A First Person Account," Accurate Rifle, vol. 3, No. 10, pp. 53-58 (Nov. 2000)—Drafted May 1, 2000.
TDS Tri-Factor: A Clear Shot; A Clear Kill, by T.D. Smith, Copyright 1992.
The Accurate Rifle, pp. 40-41 (Oct. 2003).
van Zwoll, Wayne, "Its a Wide-Open Field," Guns & Ammo, pp. 62-67 (May 2003).
van Zwoll, Wayne, "Varmint Scopes: High-Power Optics Let You Look Rodents in the Eye," Rifle Shooter, pp. 22-25 (Jul./Aug. 2003).
Davis, American Rifleman, Mar. 1989.
Schatz, The Long Range Rifle System That Never Was, Tactical Shooter, Feb. 2000, pp. 28-33.
Aerodynamic Jump Caused by the Wind, http://bisonballistics.com/system/uploaded_files/9/original/aerodynamic_jump_target.png, Bison Ballistics, printed Dec. 30, 2011.
Chung, Gregory K. W. K., Nagashima, Sam 0., Delacruz, Girlie C., Lee, John J., Wainess, Richard and Baker, Eva L., Review of Rifle Marksmanship Training Research, Cresst Report 783, The National Center for Research on Evaluation, Standards, and Student Testing, Jan. 2011.
Johnson, Richard F., Statistical Measures of Marksmanship, USARIEM Technical Note TN-01/12, U.S. Army Research Institute of Environmental Medicine, Feb. 2001.
Military Handbook: Range Facilities and Miscellaneous Training Facilities Other than Buildings, http://www.everyspec.com, MIL-HDBK-1027/3A, Jan. 31, 1989.
Military Specification: Propellants for Small Arms Ammunition, http://www.everyspec.com, MIL-P-3984J Amendment 3, Jun. 12, 2000.
Military Specification: Rifle, 7.62MM, Sniper w/Day Optical Sight and Carrying Cases, M24, http://www.everyspec.com, MIL-R-71126 (AR), Sep. 24, 1992.
Northwinds Flags, RFC-USBR Windrose, https://sites.google.com/a/wildblue.net/northwind-flags/home/Wind-Rose-2.jpg, printed Dec. 30, 2011.
Performance Specification: Rifle, 7.62MM; Semi-Automatic Sniper System (SASS)-M110, MIL-PRF-32316 (W/ Amendment 1), Oct. 5, 2009.
Rifle Marksmanship M16A1, M16A2/3, M16A4, and M4 Carbine, C 4, FM 3-22.9, Department of the Army, Sep. 13, 2006.
Von Wahlde, Raymond & Metz, Dennis, Sniper Weapon Fire Control Error Budget Analysis, US Army ARL-TR-2065, Aug. 1999—arl.army.mil.
"http://www.aircav.com/cobra/ballistic.html", printed Dec. 30, 2011, discussion of ballistics, interior, exterior, aerial, terminal and dispersion.
"http://www.hnsa.org/doc/firecontrol/partc.htm", printed Dec. 30, 2011, discussion of the projectile in flight-exterior ballistics.
Jonathan M. Weaver, Jr., LTC, USA Ret., Infantry, System Error Budgets, Target Distributions and Hitting Performance Estimates for General-Purpose Rifles and Sniper Rifles of 7.62x51 mm and Larger Calibers, AD-A228 398, TR-461, AMSAA, May 1990.
Kent, R.H. and E.J. McShane, An Elementary Treatment of the Motion of a Spinning Projectile About it's Center of Gravity, Aberdeen Proving Grounds ("APG"), MD, BRL Memorandum Report No. 85, Apr. 1944.
"US Army FM-23-10, Sniper Training, United States Army Infantry School ATSH-INS3,Fort Benning, GA 31905-5596, Aug. 1994."
USMC MCWP 3-15.3 (formerly FMFM 1-3B), Sniping, PCN 143 000118 00, Doctrine Division (C42) US Marine Corps Combat Development Command, 2 Broadway Street Suite 210 Quantico, VA 22134-5021, May 2004.
Defendants' Amended Answer to Complaint and Amended Counterclaims submitted in United States District Court, Northern District of California, San Francisco Division Case No. 3:13-cv-05460-BLF-HRL on May 19, 2014.

(56) References Cited

OTHER PUBLICATIONS

1996 Price List for Premier Reticles.
50 Scope Reticle, SR001, Barrett Firearms Mfg, Inc., Oct. 30, 1986.
Advertisement—2003 New Products Circle 132.
Advertisement—Angle Cosine Indicator—Sniper Tools Design Company, http://www.snipertools.com/article.htm Oct. 14, 2004.
Advertisement—CheyTac Technology Over Tradition Technical White Papers 2001-2003.
Advertisement—Custom Sammut (Patent Pending) Long Range; Custom Ammunition/ Berger Bullets, Ballistic Program, Data & Loading Instructions, Harris Gunworks, Inc.—Precision Shooting, 1997 Newsletter #2.
Advertisement—Eye of the Falcon Horus Vision, a trag User's Manual for Palm-OS (2004).
Advertisement—Eye of the Falcon Horus Vision, PDA Users Manual (2002).
Advertisement—Guns & Weapons for Law Enforcement, Jul. 2003, p. 10.
Advertisement—Guns & Weapons for Law Enforcement, Jul. 2003, p. 36.
Advertisement—Horus Vision Rifle Scope 4x—16x Rifle Scope, Hand-Held ATRAG1P Module, TRAGIS5 Digital Aiming System, Rifle Shooter, FN SPR-4 (Nov./Dec. 2003).
Advertisement—Horus Vision Introduces the All-New Rifle Scope Featuring the Horus Vision Reticle Aiming System Technology (2001).
Advertisement—Law and Order, Oct. 2003, p. 124.
Advertisement—Precision Shooting, Apr. 1999, p. 74.
Advertisement—Precision Shooting, Dec. 1999.
Advertisement—Precision Shooting, Feb. 2000.
Advertisement—Precision Shooting, Jun. 2000, p. 77.
Advertisement—Precision Shooting, Sep. 2000.
Advertisement—Precision Shooting, Apr. 2001.
Advertisement—Precision Shooting, Dec. 2001.
Advertisement—Precision Shooting, May 2002.
Advertisement—Precision Shooting, Aug. 2003.
Advertisement—Precision Shooting, Aug. 2003, p. 97.
Advertisement—Precision Shooting, Feb. 2004.
Advertisement—Sammut Reticle/Schmidt & Bender Custom Optics, Tactical Shooter, vol. 2, No. 5 (Jun. 1999).
Advertisement—Special Weapons p. 98 (2003).
Advertisement—S.W.A.T. Magazine 2003 Archives, May Issue.
Advertisement—Unleash the Power of Your Scope—Horus Vision Introduces the Horus Vision Digital Aiming System Technology (2003).
Advertisement—The Varmint Hunter Magazine, Oct. 2002, Issue 44, p. 152.
BW Optic—Y Tac Reticle—Precision European Optics, dated Aug. 3, 2004.
Cutshaw, Charlie, "DPMS Panther LR .308: Long Range Accurate and Reliable at a Price that Can't Be Beat," Special Weapons, pp. 50-55 (2004).
Cutshaw, Charlies, "The Ed Brown Custom M702 Tactical Rifle," The Accurate Rifle, vol. 6, No. 9, pp. 38-42 (Oct. 2003).
Deutsch Optik Catalog, Summer 1997, one page discussing relative merits of optical v. laser rangefinders.
Fortier, David, "Horus—The Avenger System," S.W.A.T., pp. 24-29 (May 2003).
Gottfredson, Jacob, "Optics—Sammut Custom Reticle: A Sighting System for the Long-Range Specialist," Tactic Shooter, vol. 3, No. 9, pp. 34-39 (Oct. 2000).
Gottfredson, Jacob, "The .338 Edge by Defensive Edge," The Accurate Rifle, vol. 6, No. 9, pp. 38-42 (Oct. 2003). At Least One IDS Cites As: Gottfredson, Jacob, "The .338 Edge by Defensive Edge," The Accurate Rifle, vol. 5, No. 14-21 (Oct. 2003).
Gun World, pp. 15-16 (Jan. 2003).
"Horus Vision Scopes," Rifle Sporting Firearms Journal, pp. 20-24, No. 206, Mar. 2003.
Leupold Ballistic Reticle System: Varmint Hunter's Reticle, Effective Jan. 1, 2004.
New fire-control computers entering Army service—Janes International Defense Review—first posted to http:// idr.janes.com—Aug. 21, 2003.

* cited by examiner

Sights on at <u>500 yards</u>. Sights are 3.00 inches above bore.
Angle of Departure = 0.21 deg. (Firing angle = 0 deg.)

| | | | | | | | | | | |
|---|---|---|---|---|---|---|---|---|---|---|
| Range (yds) | 50 | 100 | 150 | 200 | 250 | 300 | 350 | 400 | 450 | 500 |
| Traj. (in.) | 3.3 | 8.3 | 12.2 | 14.8 | 16.1 | 16.0 | 14.4 | 11.2 | 6.5 | 0.0 |
| Traj. (MOA) | 6.2 | 8.0 | 7.8 | 7.1 | 6.2 | 5.1 | 3.9 | 2.7 | 1.4 | 0.0 |
| Range (yds) | 550 | 600 | 650 | 700 | 750 | 800 | 850 | 900 | 900 | 1000 |
| Traj. (in.) | −8.2 | −18.4 | −30.5 | −44.6 | −61.0 | −79.7 | −101 | −124 | −151 | −180 |
| Traj. (MOA) | −1.4 | −2.9 | −4.5 | −6.1 | −7.8 | −9.5 | −11.3 | −13.2 | −15.1 | −17.2 |
| Range (yds) | 1050 | 1100 | 1150 | 1200 | 1250 | 1300 | 1350 | 1400 | 1450 | 1500 |
| Traj. (in.) | −212 | −247 | −286 | −328 | −374 | −424 | −477 | −535 | −598 | −665 |
| Traj. (MOA) | −19.3 | −21.5 | −23.7 | −26.1 | −28.6 | −31.1 | −33.8 | −36.5 | −39.4 | −42.4 |
| Range (yds) | 1550 | 1600 | 1650 | 1700 | 1750 | 1800 | 1850 | 1900 | 1950 | 2000 |
| Traj. (in.) | −738 | −816 | −899 | −989 | −1085 | −1187 | −1295 | −1411 | −1533 | −1662 |
| Traj. (MOA) | −45.5 | −48.7 | −52.1 | −55.6 | −59.2 | −63.0 | −66.9 | −70.9 | −75.1 | −79.4 |
| Range (yds) | 2050 | 2100 | 2150 | 2200 | 2250 | 2300 | 2350 | 2400 | 2450 | 2500 |
| Traj. (in.) | −1799 | −1942 | −2093 | −2252 | −2418 | −2592 | −2774 | −2965 | −3163 | −3370 |
| Traj. (MOA) | −83.8 | −88.3 | −93.0 | −97.8 | −102.6 | −107.6 | −112.8 | −118.0 | −123.3 | −128.7 |

Hunting Shock 750 Gr AMAX Match .50 BMG
(Calculated using Ingalls' table)

Bullet Weight ................750 grains
Sectional Density .........0.429
Effective Bal. Coeff ......0.750
Cross wind .................10.0 m.p.h.
Atmospheric pressure ..30.00 in.

Bullet Caliber ................0.500
Coefficient of Form ......0.571
Bal. Coeff at STP .........0.750
Altitude ........................0 Ft.
Temperature ...............60.0 F

| Range yards | Velocity f.p.s. | Energy ft–lb. | Momentum lb.–sec. | Mx. Ord. in. | Defl. in. | Drop in. | Lead in/mph | Time sec. |
|---|---|---|---|---|---|---|---|---|
| 0 | 2800 | 13054.6 | 9.3247 | 0.0 | 0.0 | 0.0 | 0.0 | 0.000 |
| 50 | 2736 | 12468.5 | 9.1130 | 0.1 | 0.1 | 0.6 | 1.0 | 0.054 |
| 100 | 2674 | 11903.1 | 8.9040 | 0.6 | 0.4 | 2.3 | 1.9 | 0.110 |
| 150 | 2612 | 11357.7 | 8.6976 | 1.3 | 1.0 | 5.2 | 2.9 | 0.166 |
| 200 | 2551 | 10833.0 | 8.4943 | 2.4 | 1.8 | 9.4 | 4.0 | 0.225 |
| 250 | 2491 | 10329.2 | 8.2945 | 3.9 | 2.8 | 15.0 | 5.0 | 0.284 |
| 300 | 2432 | 9845.5 | 8.0979 | 5.7 | 4.1 | 21.9 | 6.1 | 0.345 |
| 350 | 2374 | 9381.1 | 7.9046 | 8.0 | 5.7 | 30.4 | 7.2 | 0.407 |
| 400 | 2317 | 8935.5 | 7.7146 | 10.7 | 7.5 | 40.3 | 8.3 | 0.471 |
| 450 | 2260 | 8508.0 | 7.5278 | 13.9 | 9.6 | 51.9 | 9.5 | 0.537 |
| 500 | 2205 | 8098.0 | 7.3442 | 17.6 | 12.0 | 65.2 | 10.6 | 0.604 |
| 550 | 2151 | 7705.0 | 7.1637 | 21.8 | 14.7 | 80.2 | 11.8 | 0.673 |
| 600 | 2098 | 7328.3 | 6.9864 | 26.7 | 17.7 | 97.2 | 13.1 | 0.744 |
| 650 | 2046 | 6967.3 | 6.8122 | 32.1 | 21.1 | 116.1 | 14.4 | 0.816 |
| 700 | 1994 | 6621.6 | 6.6410 | 38.2 | 24.7 | 137.1 | 15.7 | 0.890 |
| 750 | 1944 | 6290.6 | 6.4729 | 45.1 | 28.7 | 160.3 | 17.0 | 0.966 |
| 800 | 1894 | 5973.7 | 6.3078 | 52.7 | 33.0 | 185.7 | 18.4 | 1.045 |
| 850 | 1845 | 5670.5 | 6.1456 | 61.2 | 37.7 | 213.6 | 19.8 | 1.125 |
| 900 | 1798 | 5380.5 | 5.9864 | 70.5 | 42.8 | 244.1 | 21.2 | 1.207 |
| 950 | 1751 | 5104.6 | 5.8309 | 80.7 | 48.2 | 277.2 | 22.7 | 1.292 |
| 1000 | 1705 | 4842.8 | 5.6794 | 92.0 | 54.1 | 313.2 | 24.3 | 1.379 |
| 1050 | 1661 | 4594.5 | 5.5319 | 104.4 | 60.3 | 352.2 | 25.8 | 1.468 |

| | | | | | | | | |
|---|---|---|---|---|---|---|---|---|
| 1100 | 1618 | 4358.9 | 5.3882 | 117.9 | 67.0 | 394.3 | 27.4 | 1.559 |
| 1150 | 1576 | 4135.4 | 5.2482 | 132.6 | 74.1 | 439.7 | 29.1 | 1.653 |
| 1200 | 1535 | 3923.3 | 5.1119 | 148.6 | 81.7 | 488.7 | 30.8 | 1.750 |
| 1250 | 1495 | 3722.1 | 4.9791 | 166.1 | 89.7 | 541.3 | 32.5 | 1.849 |
| 1300 | 1456 | 3531.3 | 4.8498 | 185.0 | 98.1 | 597.8 | 34.3 | 1.950 |
| 1350 | 1418 | 3350.2 | 4.7238 | 205.4 | 107.1 | 658.3 | 36.2 | 2.055 |
| 1400 | 1382 | 3178.4 | 4.6011 | 227.6 | 116.5 | 723.2 | 38.0 | 2.162 |
| 1450 | 1346 | 3016.8 | 4.4826 | 251.5 | 126.4 | 792.6 | 40.0 | 2.272 |
| 1500 | 1312 | 2867.1 | 4.3700 | 277.4 | 136.9 | 866.9 | 42.0 | 2.385 |
| 1550 | 1280 | 2728.4 | 4.2629 | 305.4 | 147.8 | 946.3 | 44.0 | 2.500 |
| 1600 | 1249 | 2599.4 | 4.1610 | 335.5 | 159.3 | 1031.1 | 46.1 | 2.619 |
| 1650 | 1220 | 2479.7 | 4.0640 | 367.9 | 171.2 | 1121.4 | 48.2 | 2.741 |
| 1700 | 1193 | 2371.7 | 3.9745 | 402.8 | 183.7 | 1217.7 | 50.4 | 2.865 |
| 1750 | 1169 | 2274.7 | 3.8924 | 440.2 | 196.6 | 1320.3 | 52.7 | 2.992 |
| 1800 | 1146 | 2187.0 | 3.8166 | 480.5 | 210.0 | 1429.2 | 54.9 | 3.122 |
| 1850 | 1125 | 2107.4 | 3.7465 | 523.7 | 223.8 | 1544.7 | 57.3 | 3.254 |
| 1900 | 1105 | 2034.6 | 3.6812 | 569.8 | 238.1 | 1666.9 | 59.6 | 3.388 |
| 1950 | 1087 | 1967.8 | 3.6203 | 618.7 | 252.7 | 1795.9 | 62.0 | 3.525 |
| 2000 | 1070 | 1906.2 | 3.5632 | 670.5 | 267.8 | 1931.9 | 64.5 | 3.664 |
| 2050 | 1054 | 1849.2 | 3.5095 | 725.3 | 283.2 | 2075.0 | 67.0 | 3.805 |
| 2100 | 1039 | 1796.3 | 3.4590 | 783.0 | 299.0 | 2225.5 | 69.5 | 3.949 |
| 2150 | 1024 | 1747.1 | 3.4112 | 843.8 | 315.2 | 2383.3 | 72.1 | 4.094 |
| 2200 | 1011 | 1701.0 | 3.3660 | 907.7 | 331.7 | 2548.7 | 74.7 | 4.242 |
| 2250 | 998 | 1657.9 | 3.3231 | 974.8 | 348.6 | 2721.9 | 77.3 | 4.391 |
| 2300 | 986 | 1617.5 | 3.2822 | 1045.0 | 365.8 | 2902.8 | 79.9 | 4.542 |
| 2350 | 974 | 1579.4 | 3.2433 | 1118.4 | 383.3 | 3091.8 | 82.6 | 4.695 |
| 2400 | 963 | 1543.4 | 3.2062 | 1195.0 | 401.2 | 3289.0 | 85.4 | 4.850 |
| 2450 | 952 | 1508.7 | 3.1699 | 1274.8 | 419.3 | 3494.2 | 88.1 | 5.007 |

FIG. 18A
TRAG165 - GUN DATA
Bore Height
Bullet Weight
Ballistic Coefficient
Sight-In Range
2
3
4
5
6
7
9
0
ENTER
QUIT

H-45M
ILLUMINATION

Reticle can be used in 1st or 2nd plane.

Calibrated in True MOA

Overview

Electronic Target Acquisition Device

A = Objective lens

B = Additional lenses (one or more)

FIG. 43a = Full focal length (long length tube)

FIG. 43b & FIG. 43c = Mirrors or prisms to reduce scope length

SHOWN AT X4 POWER

ILLUMINATION OVERVIEW
SHOWN NOT TO SCALE

H-45a

H-45b

H-45c

H-45d

H-45e

H-45f

52au
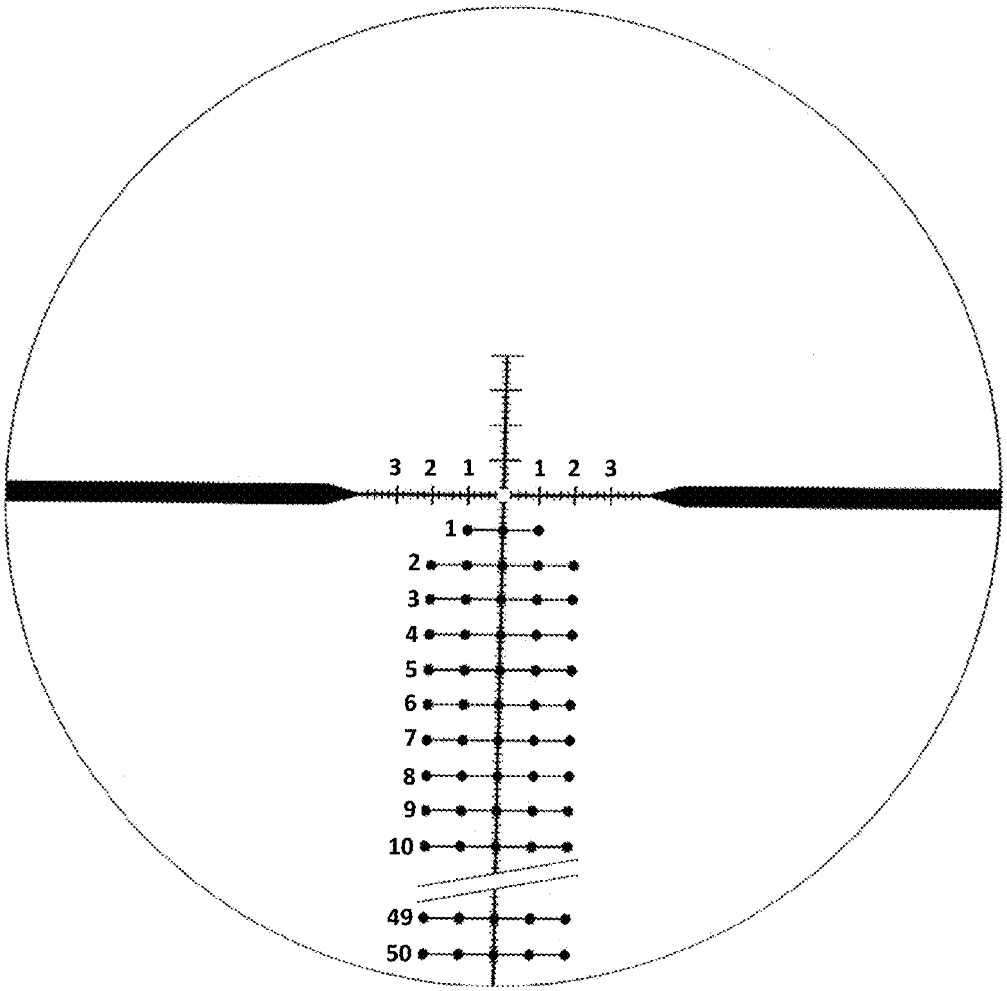

APPARATUS AND METHOD FOR AIMING POINT CALCULATION

RELATED APPLICATIONS

This application is a continuation of co-pending U.S. patent application Ser. No. 11/389,723 filed 27 Mar. 2006, which is a continuation-in-part of U.S. patent application Ser. No. 10/706,184 filed 12 Nov. 2003, now U.S. Pat. No. 7,856, 750, which is a continuation-in-part of U.S. patent application Ser. No. 10/092,921 filed 6 Mar. 2002, now U.S. Pat. No. 6,681,512, which is a continuation-in-part of U.S. patent application Ser. No. 09/519,124 filed 6 Mar. 2000, now U.S. Pat. No. 6,453,595, which is a continuation-in-part of U.S. patent application Ser. No. 09/129,729 filed 5 Aug. 1998, now U.S. Pat. No. 6,032,374, which is a continuation-in-part of U.S. patent application Ser. No. 08/986,458 filed 8 Dec. 1997, now U.S. Pat. No. 5,920,995. application Ser. No. 10/706,184 also claims priority to International Patent Application PCT/US02/18490, filed 10 Jun. 2002, which claims priority to U.S. patent application Ser. No. 09/889,767, filed 14 Jun. 2001, now U.S. Pat. No. 6,516,699, each of which is herein incorporated by reference in their entireties.

FIELD OF THE INVENTION

The present invention relates to target acquisition and related devices, and more particularly to telescopic gunsights and associated equipment used to achieve shooting accuracy at, for example, close ranges, medium ranges and extreme ranges at stationary and moving targets.

BACKGROUND OF THE INVENTION

All shooters, whether they are police officers, soldiers, Olympic shooters, sportswomen and sportsmen, hunters, plinkers or weekend enthusiasts have one common goal: hitting their target accurately and consistently. Accuracy and consistency in shooting depend largely on the skill of the shooter and the construction of the firearm and projectile.

The accuracy of a firearm can be enhanced by the use of precisely-made components, including precisely-made ammunition, firearm components and target acquisition devices. It is well known in shooting that using ammunition in which the propellant weight and type, bullet weight and dimensions, and cartridge dimensions are held within very strict limits, can improve accuracy in shooting.

At very long ranges, in excess of 500 yards, however, the skill of the shooter and the consistency of the ammunition is often not enough to insure that the shooter will hit the target. As range increases, other factors can affect the flight of the bullet and the point of impact down range. One of these factors is "bullet drop". "Bullet drop" is caused by the influence of gravity on the moving bullet, and is characterized by a bullet path which curves toward earth over long ranges. Therefore to hit a target at long range, it is necessary to elevate the barrel of the weapon, and the aiming point, to adjust for bullet drop.

Other factors, such as wind, Magnus effect (i.e., a lateral thrust exerted by wind on a rotating bullet whose axis is perpendicular to the wind direction), projectile design, projectile spin, Coriolis effect, and the idiosyncrasies of the weapon or projectile can change the projectile's path over long range. Such effects are generally referred to as "windage" effects. Therefore, for example, to hit a target at long range, it may be necessary to correct for windage by moving the barrel of the weapon slightly to the left or the right to compensate for windage effects. When shooting East and West the elevation will be effected. Shooting due East, the bullet impact will be high. Shooting due West, the bullet impact will be low. The elevation at extended range might change slightly up or down depending on the spin of the projectile in a right hand or left hand twist barrel. Thus, for example, in order to hit a target at long range, the shooter must see the target, accurately estimate the range to the target, estimate the effect of bullet drop and windage effects on the projectile, and use this information to properly position the barrel of the firearm prior to squeezing the trigger.

In addition, conventional telescopic target acquisition devices are not generally useful at long ranges in excess of 400-800 yards. At close ranges less than 100 yards conventional target acquisition devices generally fall short when extreme accuracy is desired. The cross-hairs of such target acquisition devices are typically located in the center of the field, with the vertical hair providing a central indicator for making a windage adjustment, and the horizontal hair providing a central indicator for making a bullet drop adjustment. Modifications to this basic system have not, thus far, enabled a skilled shooter firing at long ranges to acquire and hit a target quickly and reliably, regardless of the weapon used (assuming always that the firearm is capable of reaching a target at the desired long range).

For example, U.S. Pat. No. 1,190,121 to Critchett, discloses a reticle for use in a rifle scope containing a rangefinder having markings for finding a range with reference to the height of a man. Apparently because of the innate variation in the height of any given individual, from that used to produce the reticle, and the resulting inaccuracy which that would produce at long ranges, Critchett's scope was only useful to 600 yards.

U.S. Pat. No. 3,948,587 to Rubbert discloses a reticle and telescope gunsight system having primary cross-hairs which intersect conventionally at the center of the field, and secondary horizontal cross-hairs spaced apart by different amounts to form a rangefinder and distinct aiming apertures and points, based upon a predetermined, estimated size of a target. Rubbert's preferred embodiment is constructed for use in shooting deer having an 18" chest depth. However, like Critchett, the usefulness of Rubbert for shooting other targets of varying size at long range is doubtful.

U.S. Pat. No. 3,492,733 to Leatherwood discloses a variable power scope having aiming cross-hairs and two upper cross-hairs for bracketing a target of known dimensions at a known distance. The scope is mounted to a gun barrel, and the position of the scope in relation to the gun barrel is adjustable up and down to compensate for bullet drop by covering the target with the bracketing cross-hairs, and rotating an adjustment ring to expand or contract the bracketing cross-hairs to bracket the target. Leatherwood's scope, like the others discussed above, has limited utility at long ranges because it is designed with a specific size target in mind, and would therefore be inaccurate when used with targets of widely varying size, and also because at long range the scope may not be able to move sufficiently in relation to the barrel (i.e., may be obstructed by the gun barrel).

U.S. Pat. No. 4,403,421 to Shepherd discloses a scope having a primary and secondary reticles, the secondary reticle being a polygonal reticle with different indicia on the different faces which can be rotated into position to compensate for bullet drop and determining target range for different sized targets. However, having to rotate a secondary reticle to locate an appropriate target shape in order to determine the range is time consuming and undesirable, since it takes the shooter's attention away from the target.

It should be noted that the range finding inaccuracies inherent in these prior art references may be resolved using a laser rangefinder or highly accurate optical rangefinder. However, since a laser rangefinder emits light, there is always the possibility that the beam from a laser rangefinder could be detected by an individual with special equipment, revealing the position of the shooter, causing a live target to move, or other undesirable consequences for the rifleman using the laser before the shot can be taken. Furthermore, a laser rangefinder includes complex electronics that must be handled with care. Laser rangefinders require a reflective target to achieve consistently accurate range. Finally, a laser rangefinder must be powered with electricity from a source that must be carried by the shooter. The additional weight is a burden, and the possibility exists that power source could fail or become exhausted through use, causing the rangefinder to cease working.

Accordingly, the need exists for a target acquisition device having a reticle which includes, for example, an optical rangefinder which permits a skilled shooter to rapidly and accurately identify the range to any target of known or estimable size, no matter how large or small, to make fast and accurate adjustment for projectile drop and windage, using the shooter's knowledge and experience and without the need to move rings or make adjustments (i.e. through the elevation and windage knobs) to the target acquisition device, thus enabling the shooter to accurately hit targets at any range, depending upon the gun handling skills and eyesight of the shooter, and the maximum range of the selected firearm, and the selected ammunition. The shooter never has to take her or his eye off the target acquisition device from the time the shooter spots the target and determines range, using the proper grid line to accurately engage and hit the target. Reticles of the present invention allow the rifle to be zeroed, for example, at 100 yards, or 100 meters, or more, and yet be able to engage targets very accurately as close as 20 yards.

SUMMARY OF THE INVENTION

The present invention provides reticles that provide means for selecting secondary aiming points that accurately target an intended target at any desired range, including extreme distances. In particular, the reticles of the present invention provide markings or other indications that allow a user, for example, to associate a first aiming point of the reticle with an intended target (e.g., the aiming point created by the cross-section of primary vertical and horizontal cross-hairs), and to identify a second aiming point (e.g., identified by a generated aiming dot, an electronic aiming dot, or an aiming point created by secondary vertical and/or horizontal cross-hairs) that represents a point to insure an accurate shot to hit the target.

In one embodiment, the present invention provides a reticle for use in any target acquisition device, fixed power scope or a variable power telescopic gunsight, image amplification device, or other aiming device. In some embodiments, the reticle comprises a substantially transparent disc, although the present invention is not limited to the use of disc shaped reticles, or to substantially transparent reticles, or to electronically generated reticles. In some embodiments, the reticle has an optical center and an edge for mounting said reticle in a housing (for example, between an objective lens and the ocular lens of a scope), one or more aiming points positioned on said reticle, wherein the aiming points are formed by a primary vertical cross-hair intersecting the optical center of the reticle, a primary horizontal cross-hair intersecting said primary vertical cross-hair to form an upper right sector (e.g., quadrant), an upper left sector, a lower right sector, and a lower left sector, a plurality of secondary horizontal cross-hairs at a predetermined distance along said primary vertical cross-hair, and a plurality of secondary vertical cross-hairs at a predetermined distance along at least some of said secondary horizontal cross-hairs. The crosshairs may be of any length, width and may comprise contiguous lines or may have gaps. In some embodiments, the secondary horizontal and vertical crosshairs comprise intersecting continuous lines so as to form a grid.

In one embodiment, unique markings (for example, numbers) identify at least some of the secondary cross-hairs. In a further embodiment, the primary horizontal cross-hair intersects that primary vertical cross-hair at the optical center of the reticle. In another embodiment, the primary horizontal cross-hair intersects that primary vertical cross-hair below the optical center of the reticle. In a preferred embodiment, the primary horizontal cross-hair intersects that primary vertical cross-hair above the optical center of the reticle. In a yet further embodiment, the plurality of secondary horizontal cross-hairs are evenly spaced at a predetermined distance along the primary vertical cross-hair. In another embodiment, at least some of the secondary horizontal cross-hairs are unevenly spaced at a predetermined distance along the primary vertical cross-hair. In a still further embodiment, the plurality of secondary vertical cross-hairs are evenly spaced at a predeteimined distance along at least some of the secondary horizontal cross-hairs. In another embodiment, at least some of the secondary vertical cross-hairs are unevenly spaced at a predetermined distance along the primary horizontal cross-hair. In yet another embodiment, the reticle additionally includes range-finding markings on the reticle. The range finding markings may be in one of the sectors formed by the primary vertical and horizontal cross-hairs, or may be on the primary vertical or horizontal cross-hairs. In some embodiments, the primary or secondary crosshairs themselves are used as range-finder markings.

In still further embodiments, the reticle is optionally illuminated for day use, for twilight use, for night use, for use in low or absent ambient light, or for use with or without night vision. In yet a further embodiment, illuminated dots at, for example, even or odd Mil Radian spacing are separately illuminated in the shooter's field of vision.

In a preferred embodiment, the reticle of the present invention is constructed from an optically transparent wafer or electronically generated disc having an optical center that coincides with a center of a field of vision when the wafer is mounted in a scope. In one embodiment, a primary vertical cross-hair having a predetermined thickness bisects the disc, intersecting the optical center of the disc, or intersecting at a point offset from the optical center of the disc. In another embodiment, a primary horizontal cross-hair having a predetermined thickness intersects the primary vertical cross-hair, most preferably above the optical center of the disc, to form an upper right sector (for example, quadrant), an upper left sector, a lower right sector, and a lower left sector. A plurality of secondary horizontal cross-hairs having predetermined thickness are spaced along the primary vertical cross-hair. In a particularly preferred embodiment, at least some of these secondary horizontal cross-hairs are identified with a unique identifier, to aid the shooter in calibrating the horizontal cross-hairs by range, and in locating the appropriate horizontal cross-hair to use in selecting an aiming point. A plurality of secondary vertical cross-hairs having predetermined thickness are spaced along at least some of said secondary horizontal cross-hairs to aid in making accurate windage adjustments. In a further embodiment a separate range-finding means is positioned on the reticle to aid the shooter in determining the range to target. In a still further embodiment employing military reticles, the shooter uses the distance subtended by the vertical or horizontal lines to calculate the range to the target.

The reticles of the present invention may be made of any suitable material. The reticles may have any suitable markings that permit use as described above and elsewhere herein. The markings may be generated by any means, including, but not limited to, engravings, etchings, projections, digital or analog imaging, raised surfaces (for example, made of any desired material), etc. The reticles may be used in any type of device where there is use for secondary or multiple aiming points. The reticles may be used in conjunction with one or more additional components that facilitate or expand use (for example, ballistic calculators, devices that measure exterior factors, meteorological instruments, azimuth indicators, compasses, chronographs, distance ranging devices, etc.).

In one embodiment, the present invention provides an improved target acquisition device using the reticle of the present invention. In some embodiments, the target acquisition device has one or more of a housing, a means for mounting the housing in a fixed, predetermined position relative to a gun barrel, an objective lens mounted in one end of the housing, and an ocular lens mounted in the opposite end of the housing. In some embodiments, the target acquisition device is a fixed power telescopic gunsight, or a variable power telescopic gunsight. When optics are mounted in the housing to permit the power to be varied along a predetermined range, the reticle is most preferably mounted between the objective lens and the variable power optics, although all configurations are contemplated by the present invention. The reticle may be configured in a target acquisition device in any desired focal plane (e.g., first focal plane, second focal plane, or a combination of both), or incorporated into a fixed power telescopic gunsight. In a further embodiment, the reticles of the present invention are incorporated for use in, for example, electronic target acquisition and aiming devices.

While the reticles of the present invention find particular use in long-range target acquisition devices they can be used with equal effectiveness at close and medium ranges. In one embodiment, the reticle of the present invention is adapted for use in a mid-range telescopic gunsight, or close range telescopic gunsight, or other device. A mid-range reticle, similar to the long-range reticle described above, is constructed in accordance with this invention. Since the mid-range reticle requires less lower field area, in some embodiments, the primary horizontal cross-hair can be conventionally positioned at the optical center of the reticle. The mid-range reticle can then be calibrated and used in the same manner as a long-range reticle.

In an additional embodiment, the reticle is provided with a circumscribing ring visible through the target acquisition device, to aid in centering the eye relative to the target acquisition device. This ring helps reduce shooting inaccuracy caused by the misalignment of the shooter's line of sight through the target acquisition device. The ring assures a repeatable check weld to the firearm that is beneficial to repeatable shooting. By providing a visual means to align the reticle within the target acquisition device, the shooter is able to produce more accurate and more repeatable results.

In one embodiment, the reticle is provided with an aiming dot. The aiming dot may be located at the optical center of the reticle for rapid acquisition of a target at extreme, medium and close range, and for aiding the shooter in centering her or his eye relative to the field of view. In a further embodiment, the aiming dot is projected on the reticle, for example, electronically from the ballistic calculator of the present invention, or for example, optically from a mirror, a split image, holographic image, or by other means such as an electronic grid plate. In a still further embodiment the projected aiming dot is a virtual aiming dot indicating correct barrel position to the shooter in the absence of a line of sight to the target.

In yet another embodiment, a portion of the primary vertical cross-hair or the primary horizontal cross-hair, or both, is provided with rangefinder markings to eliminate the need for a separate rangefinder means in one of the sectors formed by the intersection of the primary vertical and horizontal cross-hairs.

In one embodiment, the reticle markings are assigned range and distance values, for example, automatically by using a computing device containing a ballistics calculator program which receives information regarding external field conditions (for example, date, time, temperature, relative humidity, target image resolution, barometric pressure, wind speed, wind direction, hemisphere, latitude, longitude, altitude), firearm information (for example, rate and direction of barrel twist, internal barrel diameter, internal barrel caliber, and barrel length), projectile information (for example, projectile weight, projectile diameter, projectile caliber, projectile cross-sectional density, one or more projectile ballistic coefficients (as used herein, "ballistic coefficient" is as exemplified by William Davis, *American Rifleman*, March, 1989, incorporated herein by reference), projectile configuration, propellant type, propellant amount, propellant potential force, primer, and muzzle velocity of the cartridge), target acquisition device and reticle information (for example, type of reticle, power of magnification, first, second or fixed plane of function, distance between the target acquisition device and the barrel, the positional relation between the target acquisition device and the barrel, the range at which the telescopic gunsight was zeroed using a specific firearm and cartridge), information regarding the shooter (for example, the shooter's visual acuity, visual idiosyncrasies, heart rate and rhythm, respiratory rate, blood oxygen saturation, muscle activity, brain wave activity, and number and positional coordinates of spotters assisting the shooter), and the relation between the shooter and target (for example, the distance between the shooter and target, the speed and direction of movement of the target relative to the shooter, or shooter relative to the target (e.g., where the shooter is in a moving vehicle), and direction from true North), and the angle of the rifle barrel with respect to a line drawn perpendicularly to the force of gravity).

In one embodiment, the output of a ballistics program is selected to produce a targeting range data card for providing aiming point information for a specific target at a known range, or multiple targets at known or estimable ranges. In a further embodiment, the target acquisition device and reticle is a conventional telescopic gunsight and reticle in which the scope is adjusted to hit a target at range by rotating horizontal and vertical adjustment knobs a calculated number of "clicks". In a further embodiment, the telescopic gunsights and reticles include all varying designs of telescopic gunsights and reticles apparent to one skilled in the art, for example, telescopic gunsights manufactured and marketed by Leupold, Schmidt-Bender, Swarovski, Bums, Bushnell, Zeiss, Nikon, Kahles Optik, Nightforce, and reticles, for example the T. D. Smith reticle, Burris reticle, and Cabela's reticle. In a preferred embodiment, the telescopic gunsight contains a reticle of the present invention in which the specific aiming point for the target is identified by reference to the calibrated secondary horizontal and vertical cross-hairs. In some preferred embodiments, the calculator comprises means for unit conversion for any desired measurement.

In some embodiments, one or more components of the invention (for example, the ballistics calculator, target acquisition device, device for measuring external information) is contained in, or coated in, a material that shields the device from exterior interfering or damaging signals or forces (e.g., electromagnetic shielding, radiation shielding, shielding from concussive forces, etc.). In another embodiment of the present invention, the ballistics calculator system includes a remotely controlled safety switch with ergonomic indicator to the shooter of switch status.

In one embodiment, the reticle of the present invention comprises a plurality of primary cross-hairs separated by predetermined distances, a plurality of secondary cross-hairs at predetermined distances along said plurality of primary cross-hairs, and a plurality of lead markings indicating rate of movement of the target along at least one said cross-hair. In one embodiment, the plurality of primary-cross-hairs comprises vertical cross-hairs. In another embodiment, the plurality of primary cross-hairs comprises horizontal cross-hairs. In yet another embodiment, the plurality of primary cross-hairs comprises both vertical and horizontal cross-hairs. In a further embodiment, the plurality of secondary cross-hairs comprises vertical cross-hairs. In still further embodiment, the plurality of secondary cross-hairs comprises horizontal cross-hairs. In a preferred embodiment, the plurality of secondary cross-hairs comprises both vertical and horizontal cross-hairs. In a particularly preferred embodiment, the plurality of secondary cross-hairs comprises at least three secondary cross-hairs.

In one embodiment, lead markings are placed along at least one of the primary cross-hairs. In another embodiment, the lead markings are along at least one of the secondary cross-hairs. In yet another embodiment, the lead markings are along at least one primary cross-hair, and at least one secondary cross-hair. In a preferred embodiment, the plurality of lead markings comprises at least three lead markings. In a particularly preferred embodiment, the lead markings are secondary cross-hairs.

In one embodiment, at least one cross-hair is a line. In another embodiment, the line is an uninterrupted line. In an additional embodiment, the line is a straight line. In yet another embodiment, the straight line is an uninterrupted straight line. In a further embodiment, the line is a predetermined thickness. In a still further embodiment, the predetermined thickness is a single thickness along the cross-hair. In some embodiments, the primary cross-hairs are evenly spaced. In other embodiments, the secondary cross-hairs are evenly spaced. In further embodiments, the lead markings are evenly spaced.

In one embodiment, the reticle of the present invention further comprises a substantially transparent disc having an optical center and an edge for mounting said disc, and a ring positioned optically between said optical center and said edge, said ring spaced from said edge and circumscribing said optical center and one or more aiming points, whereby said ring can be visually centered in a field of view for aligning a line of sight through the target acquisition device.

In one embodiment, the reticle comprises rangefinder markings. In another embodiment, the reticle comprises markings for identification of one or more of the cross-hairs. In an additional embodiment, the reticle comprises markings for identification of one or more of the lead markings. In still another embodiment, the reticle comprises an aiming dot.

In one embodiment, the reticle is configured for use in day light illumination. In some embodiments the reticle is configured for use in low light illumination.

In one embodiment, the present invention provides a target acquisition device using the reticle of the present invention. In some embodiments, the target acquisition device has one or more of a housing, a means for mounting the housing in a fixed, predetermined position relative to a gun barrel, an objective lens mounted in one end of the housing, and an ocular lens mounted in the opposite end of the housing. In other embodiments, the target acquisition device is a fixed power telescopic gunsight. In still other embodiments, the target acquisition device is a variable power telescopic gunsight. When optics are mounted in the housing to permit the power to be varied along a predetermined range, the reticle is most preferably mounted between the objective lens and the variable power optics, although all configurations are contemplated by the present invention. The reticle may be configured in a target acquisition device in any desired focal plane (for example, the first focal plane, the second focal plane, or a combination of both), or incorporated into a fixed power telescopic gunsight. In a further embodiment, the reticles of the present invention are incorporated for use in, for example, electronic target acquisition and aiming devices.

In one embodiment, the present invention comprises a method for shooting a target comprising a target acquisition device, comprising a housing, a means for mounting said housing in a fixed, predetermined position relative to a firearm, an objective lens mounted in one end of said housing, an ocular lens mounted in the opposite end of said housing; a reticle comprising a plurality of primary cross-hairs separated by predetermined distances, a plurality of secondary cross-hairs at predetermined distances along said plurality of primary cross-hairs, and a plurality of lead markings indicating rate of movement of the target along at least one said cross-hair; selecting an aiming point on said target acquisition device that accounts for the relation of the shooter to the target; and using said aiming point to aim said firearm so as to hit said target.

In one embodiment, the present invention comprises a method for shooting a target comprising a target acquisition device comprising a housing, a means for mounting the housing in a fixed, predetermined position relative to a firearm, an objective lens mounted in one end of said housing, and an ocular lens mounted in the opposite end of said housing; a reticle comprising a plurality of primary cross-hairs separated by predetermined distances, a plurality of secondary cross-hairs at predetermined distances along said plurality of primary cross-hairs, and a plurality of lead markings indicating rate of movement of the target along at least one said cross-hair; a ballistics calculator system for computing targeting information to hit a target comprising a processor comprising a ballistics computer program embodied in a computer-readable medium for analyzing information needed to accurately aim a firearm at a target using a target acquisition device with a reticle, with the program using information regarding one or more of external conditions, the firearm being used, the projectile being used, the target acquisition device and reticle being used, the shooter, the relation of the shooter wherein said target can be greater than 1000 yards from the shooter, and the ballistics drag model and retardation coefficient being used, and selecting an aiming point on the target acquisition device that accounts for the relation of the shooter to the target, and using the targeting information displayed by the ballistics calculator system to aim the firearm so as to hit the target. In a preferred embodiment, the target is hit by holding the aiming point on the target. In a further embodiment the ballistics calculator system projects a reticle specific for information regarding one or more of the firearm being used, the projectile being used, and the target acquisition device being used.

Other embodiments will be evident from a consideration of the drawings taken together with the detailed description of the invention.

BRIEF DESCRIPTION OF THE DRAWINGS

A better understanding of the invention and its advantages will be apparent from the detailed description taken in conjunction with the accompanying drawings in which:

FIG. 5 is an example of 500 yard zero ballistic table created for a .50 Cal. Bolt Action Model M-93 Rifle having a 30 inch barrel built firing a .50 Cal Browning Machine Gun cartridge;

FIG. 8*a* is a first portion of an illustrative table providing data for determining an appropriate windage adjustment for the example;

FIG. 8*b* is a second portion of an illustrative table providing data for determining an appropriate windage adjustment for the example;

FIG. 38*a* shows an image of the reticle as viewed through the telescopic gunsight at high power; FIGS. 38*c-n* provide magnified views of subregions of the image in FIG. 38*a*.

FIGS. 51*b-u* provide magnified views of subregions of the reticle. FIG. 51*a* provides a coordinate map overlaying an outline circle of the reticle showing where each of the subregions of FIGS. 51*b-u* correspond to the reticle outline circle. FIG. 51*a* is shown in scale. FIGS. 51*a-u* are in scale as represented in the coordinate map of FIG. 51*a*.

FIG. 51*v* provides a coordinate map overlaying an outline circle of the reticle showing where each of the subregions of FIGS. 51*w-ap* correspond to the reticle outline circle. FIG. 51*v* is shown in scale. FIGS. 51*w-ap* are in scale as represented in the coordinate map of FIG. 51*v.*

FIGS. 51*aq-au* are a front view of reticle markings of the present invention, showing the markings as viewed through a zoom telescopic gunsight at high power. FIGS. 51*ar-au* provide magnified views of subregions of the reticle markings. FIG. 51*aq* provides a coordinate map outlining where each of the subregions of FIGS. 51*ar-au* correspond to the whole of the reticle markings. FIG. 51*aq* is shown in scale. FIGS. 51*ar-au* are in scale as represented in the coordinate map of FIG. 51*aq*.

FIGS. 52*a-m* are a front view of a reticle of the present invention, showing the markings as viewed through a zoom telescopic gunsight at high power, with lead markers along a primary horizontal cross-hair suitable for use, for example, in tactical, military, and police applications.

FIGS. 52*b-m* provide magnified views of subregions of the reticle. FIG. 52*a* provides a coordinate map overlaying an outline circle of the reticle showing where each of the subregions of FIGS. 52*b-m* correspond to the reticle outline circle. FIG. 52*a* is shown in scale. FIGS. 52*b-m* vary in scale as represented in the coordinate map of FIG. 52*a*.

FIGS. 52*o-x* provide magnified views of subregions of the reticle. FIG. 52*n* provides a coordinate map overlaying an outline circle of the reticle showing where each of the subregions of FIGS. 52*o-x* correspond to the reticle outline circle. FIG. 52*n* is shown in scale. FIGS. 52*o*-52*x* vary in scale as represented in the coordinate map of FIG. 52*n*.

FIG. 52*y* provides a coordinate map overlaying an outline circle of the reticle showing where each of the subregions of FIGS. 52*z-ai* correspond to the reticle outline circle. FIG. 52*y* is shown in scale. FIGS. 52*z-ai* vary in scale as represented in the coordinate map of FIG. 52*y*.

FIGS. 52*aj-at* are a front view of a reticle of the present invention, showing the markings as viewed through a zoom telescopic gunsight at high power, with lead markers along a primary horizontal cross-hair suitable for use, for example, in tactical, military, and police applications.

FIGS. 52*ak-at* provide magnified views of subregions of the reticle. FIG. 52*aj* provides a coordinate map overlaying an outline circle of the reticle showing where each of the subregions of FIGS. 52*ak-at* correspond to the reticle outline circle. FIG. 52*aj* is shown in scale. FIGS. 52*ak-at* vary in scale as represented in the coordinate map of FIG. 52*aj*.

FIG. 52*au* is a front view of a reticle of the present invention, showing the markings as viewed through a zoom telescopic gunsight at high power, with lead markers along a primary horizontal cross-hair suitable for use, for example, in tactical, military, and police applications.

DETAILED DESCRIPTION OF THE INVENTION

Figure 1:
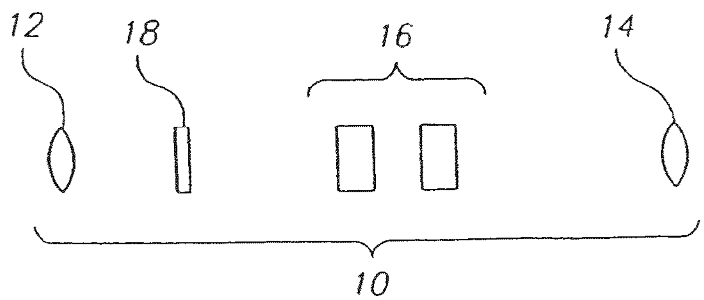
FIG. 1 is a diagram showing the optical components of a telescopic gunsight of the present invention.
Figure 3:
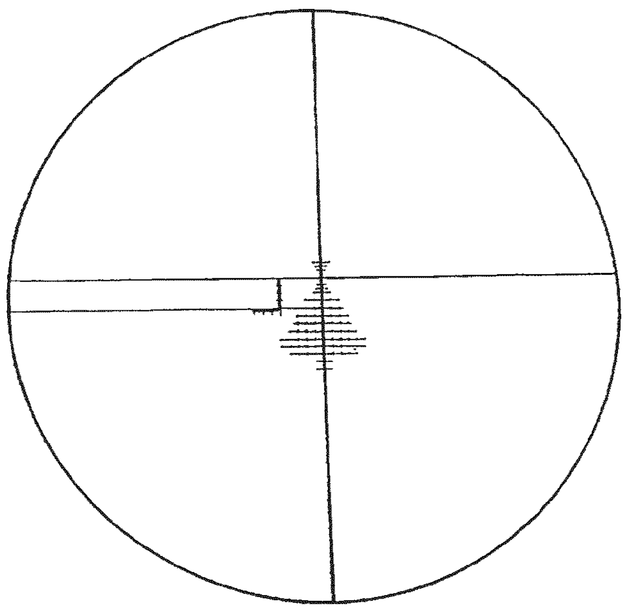
FIG. 3 is a front view of a reticle of the present invention, showing the markings as viewed through a zoom telescopic gunsight at low power.

The present invention relates to target acquisition and related devices, and more particularly to telescopic gunsights and associated equipment used to achieve shooting accuracy at, for example, close ranges, medium ranges and extreme ranges at stationary and moving targets. Certain preferred and illustrative embodiments of the invention are described below. The present invention is not limited to these embodiments.

As used herein, the term "firearm" refers to any device that propels an object or projectile, for example, in a controllable flat fire, line of sight, or line of departure, for example, handguns, pistols, rifles, shotgun slug guns, muzzle loader rifles, single shot rifles, semi-automatic rifles and fully automatic rifles of any caliber direction through any media. As used herein, the term "firearm" also refers to a remote, servo-controlled firearm wherein the firearm has auto-sensing of both position and directional barrel orientation. The shooter is able to position the firearm in one location, and move to a second location for target image acquisition and aiming. As used herein, the term "firearm" also refers to chain guns, belt-feed guns, machine guns, and Gattling guns. As used herein, the term firearm also refers to high elevation, and over-the-horizon, projectile propulsion devices, for example, artillery, mortars, canons, tank canons or rail guns of any caliber.

As used herein, the term "internal barrel caliber" refers to the diameter measured across the lands inside the bore, or the diameter of the projectile. As used herein, the term "internal barrel diameter" refers to a straight line passing through the center of a circle, sphere, etc. from one side to the other and the length of the line used in ballistics to describe the bore of the barrel.

As used herein, the term "cartridge" refers, for example, to a projectile comprising a primer, explosive propellant, a casing and a bullet, or, for example, to a hybrid projectile lacking a casing, or, for example, to a muzzle-loaded projectile, compressed gas or air-powered projectile, or magnetic attraction or repulsion projectile, 30 etc. In one embodiment of the present invention, the projectile travels at subsonic speed. In a further embodiment of the present invention, the projectile travels at supersonic speed. In a preferred embodiment of the present invention, the shooter is able to shift between subsonic and supersonic projectiles without recalibration of the scope, with reference to range cards specific to the subsonic or supersonic projectile.

As used herein, the term "target acquisition device" refers to an apparatus used by the shooter to select, identify or monitor a target. The target acquisition device may rely on visual observation of the target, or, for example, on infrared (IR), ultraviolet (UV), radar, thermal, microwave, or magnetic imaging, radiation including X-ray, gamma ray, isotope and particle radiation, night vision, vibrational receptors including ultra-sound, sound pulse, sonar, seismic vibrations, magnetic resonance, gravitational receptors, broadcast frequencies including radio wave, television and cellular receptors, or other image of the target. The image of the target presented to the shooter by the target acquisition device may be unaltered, or it may be enhanced, for example, by magnification, amplification, subtraction, superimposition, filtration, stabilization, template matching, or other means finding use in the present invention. In some embodiments, the target image presented to the shooter by the target acquisition device is compared to a database of images stored, for example, on a medium that is readable by the ballistics calculator system of the present invention. In this fashion, the ballistics calculator system performs a match or no-match analysis of the target or targets. The target selected, identified or monitored by the target acquisition device may be within the line of sight of the shooter, or tangential to the sight of the shooter, or the shooter's line of sight may be obstructed while the target acquisition device presents a focused image of the target to the shooter. The image of the target acquired by the target acquisition device may be, for example, analog or digital, and shared, stored, archived, or transmitted within a network of one or more shooters and spotters by, for example, video, physical cable or wire, IR, radio wave, cellular connections, laser pulse, optical, 802.11b or other wireless transmission using, for example, protocols such as html, SML, SOAP, X.25, SNA, etc., Bluetooth™, Serial, USB or other suitable image distribution method.

Figure 42:
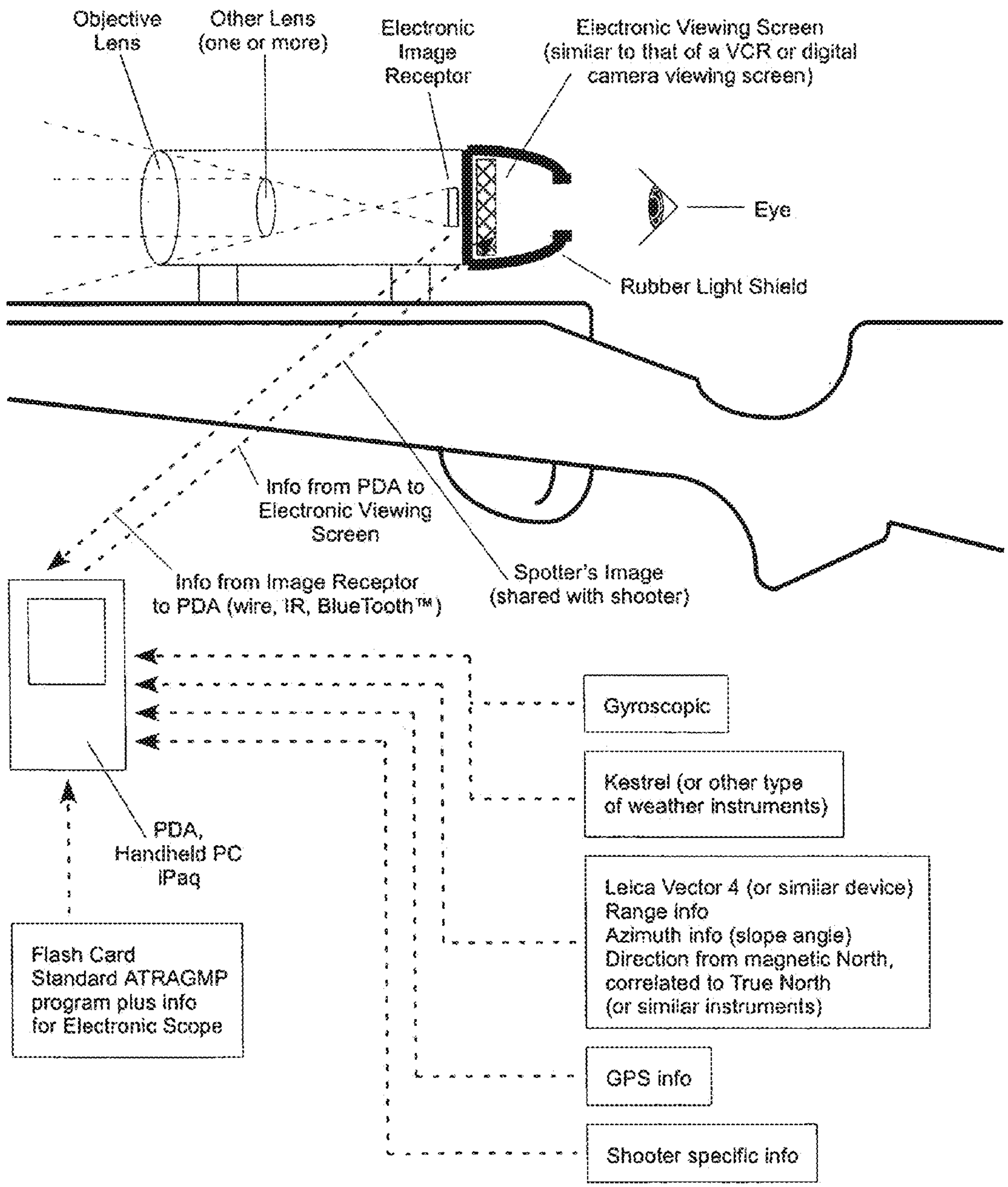
FIG. 42 illustrates an example of the inputs and outputs integrated into a Ballistics Calculating System of the present invention.
Figures 43A, 43B, 43C:
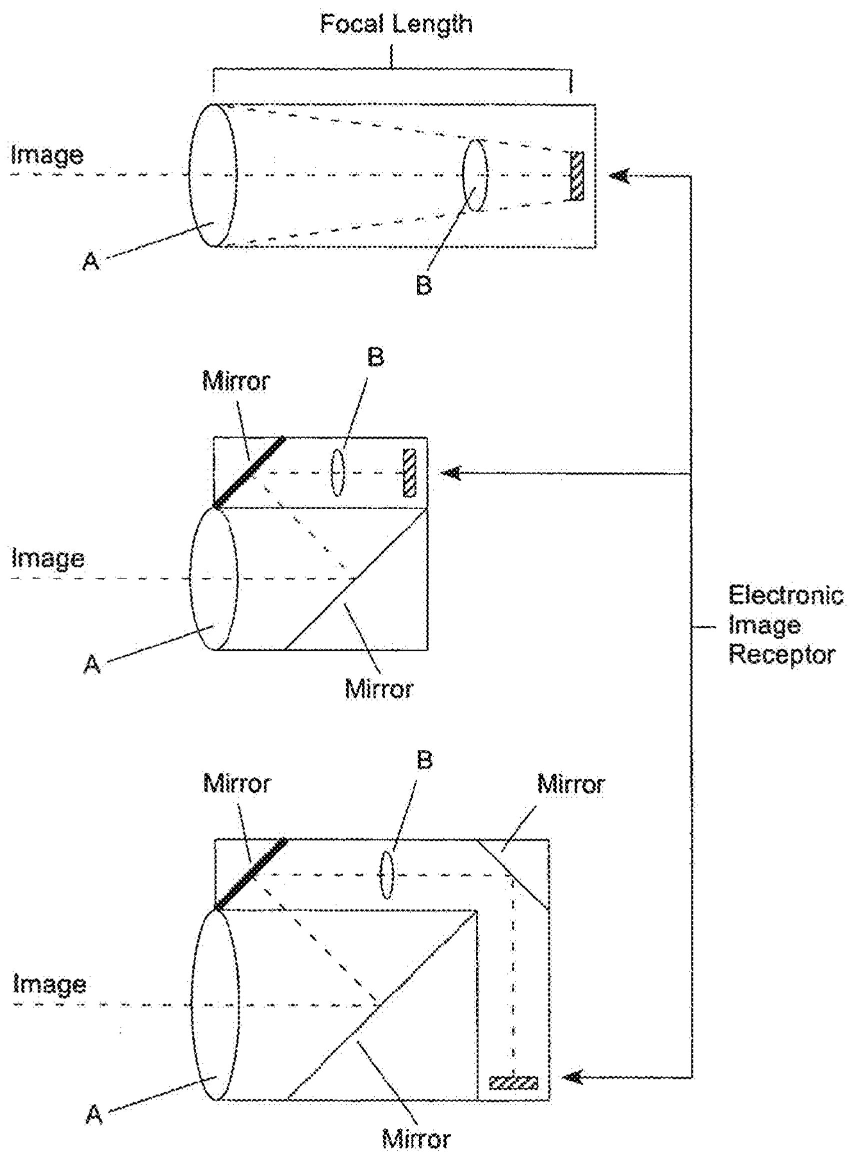
FIG. 43*a* is an example of the electronic target acquisition device of the present invention using an objective lens and one or more additional lenses with a long, full focal length tube.
FIG. 43*b* is an example of the electronic target acquisition device of the present invention using an objective lens and one or more additional lenses with one or more mirrors or one or more prisms to reduce the tube length.
FIG. 43*c* is an example of the electronic target acquisition device of the present invention using an objective lens and one or more additional lenses with one or more mirrors or one or more prisms to reduce the tube length.

As used herein, the term "ballistics calculator system" as exemplified in FIG. 42 refers to a targeting system that may be, for example, analog or digital, which provides the shooter a solution for the trajectory of a projectile.

Figure 4:
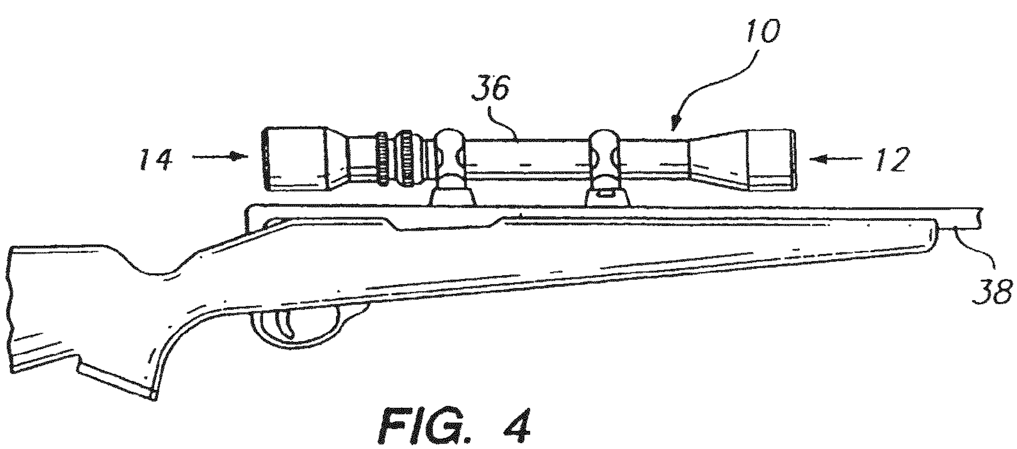
FIG. 4 is a partial side view of an example of a firearm showing a telescopic gunsight mounted on the barrel.

As exemplified in FIGS. 1 and 4, a target acquisition telescopic gunsight 10 (also referred to herein as a "scope") includes a housing 36 which can be mounted in fixed relationship with a gun barrel 38. Housing 36 is preferably constructed from steel or aluminum, but can be constructed from virtually any durable, substantially rigid material that is useful for constructing optical equipment. Mounted in housing 36 at one end is an objective lens or lens assembly 12. Mounted in housing 38 at the opposite end is an ocular lens or lens assembly 14.

As used herein, the term "lens" refers to an object by means of which light rays, thermal, sonar, infrared, ultraviolet, microwave or radiation of other wavelength is focused or otherwise projected to form an image. It is well known in the art to make lenses from either a single piece of glass or other optical material (such as transparent plastic) which has been conventionally ground and polished to focus light, or from two or more pieces of such material mounted together, for example, with optically transparent adhesive and the like to focus light. Accordingly, the term "lens" as used herein is intended to cover a lens constructed from a single piece of optical glass or other material, or multiple pieces of optical glass or other material (for example, an achromatic lens), or from more than one piece mounted together to focus light, or from other material capable of focusing light. Any lens technology now known or later developed finds use with the present invention. For example, any lens based on digital, hydrostatic, ionic, electronic, magnetic energy fields, component, composite, plasma, adoptive lens, or other related technologies may be used. Additionally, moveable or adjustable lenses may be used. As will be understood by one having skill in the art, when the scope 10 is mounted to, for example, a gun, rifle or weapon 38, the objective lens (that is, the lens furthest from the shooter's eye) 12 faces the target, and the ocular lens (that is, the lens closest to the shooter's eye) 14 faces the shooter's eye.

Other optical components that may be included in housing 36 include variable power optical components 16 for a variable power scope. Such components 16 typically include magnifiers and erectors. Such a variable power scope permits the user to select a desired power within a predetermined range of powers. For example, with a 3-12×50 scope, the user can select a lower power (e.g., 3×50) or a high power (e.g., 12×50) or any power along the continuous spectrum in between.

Figure 35:
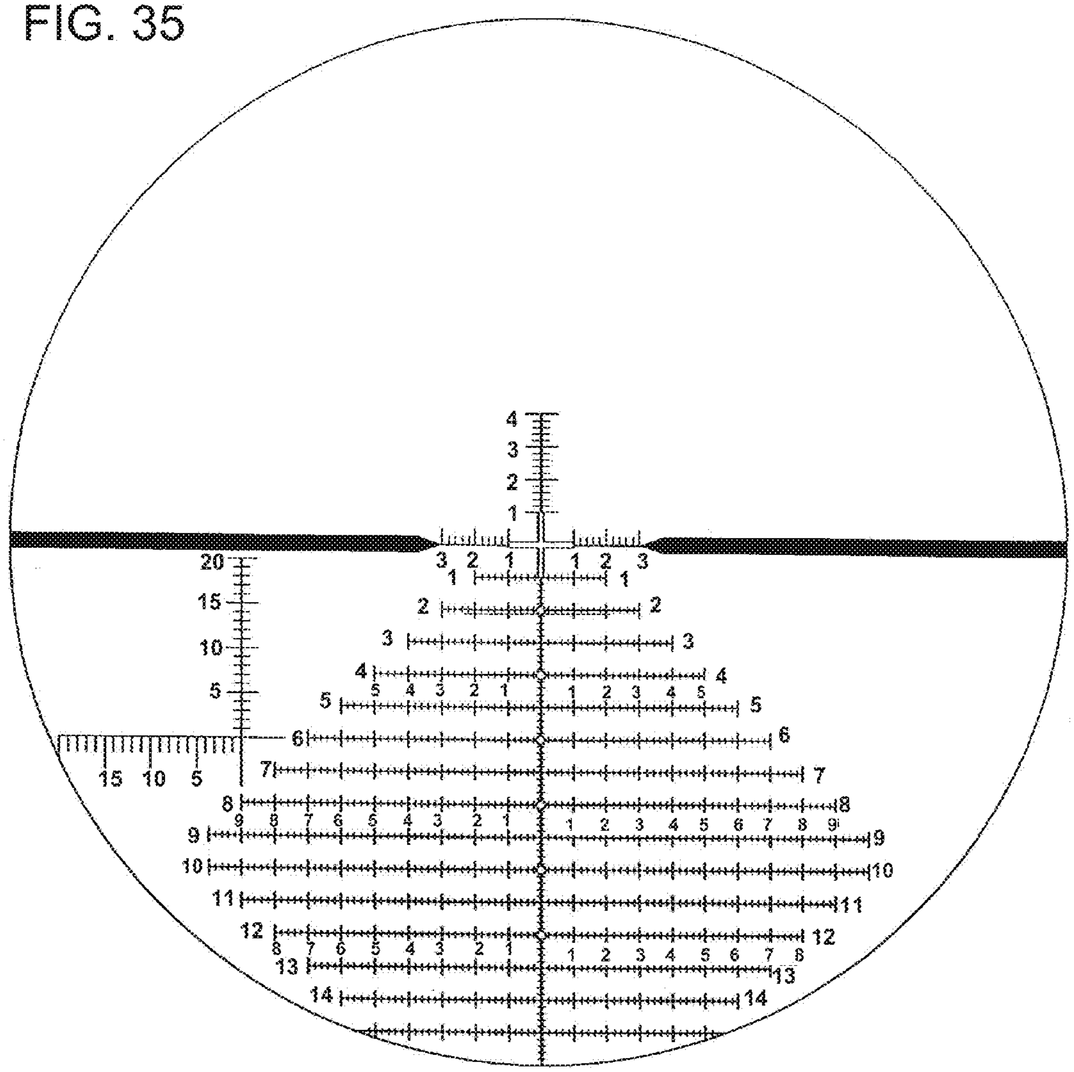
FIG. 35 is a front view of a two-part illuminated reticle of the present invention, showing the markings as viewed through a zoom telescopic gunsight at high power suitable for use, for example, in mid-range, general purpose applications.
Figure 35A:
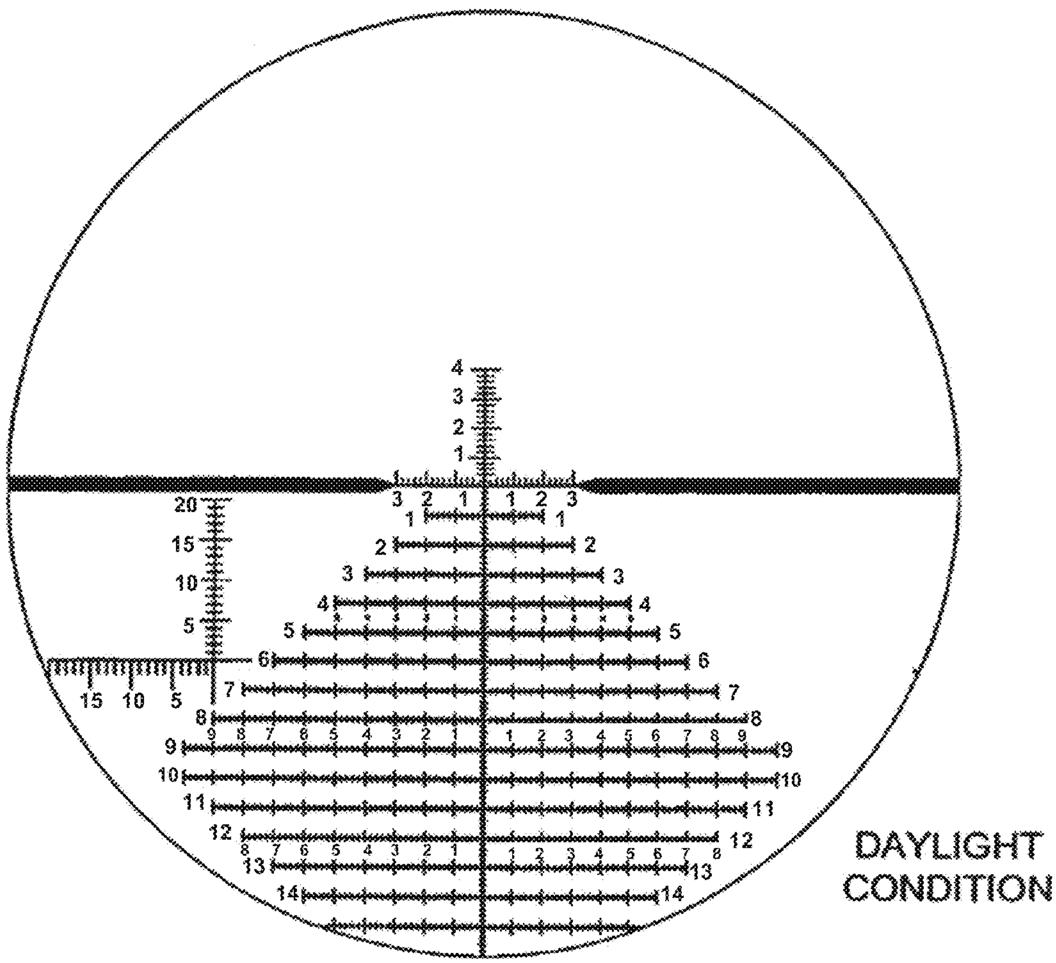
FIG. 35*a* is a front view of a two-part illuminated reticle of the present invention, showing the markings as viewed through a zoom telescopic gunsight at high power under daylight conditions.
Figure 35B:
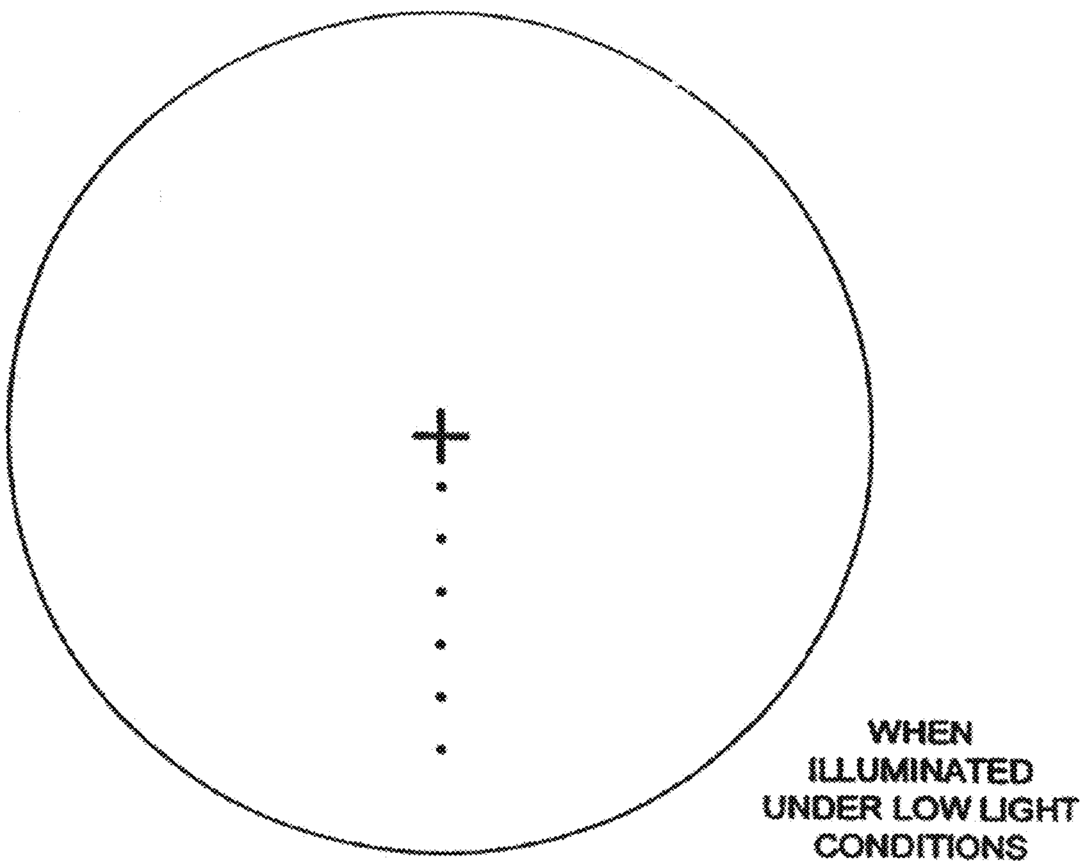
FIG. 35*b* is a front view of a two-part illuminated reticle of the present invention, showing the markings as viewed through a zoom telescopic gunsight at high power when illuminated under low light conditions.
Figure 36:
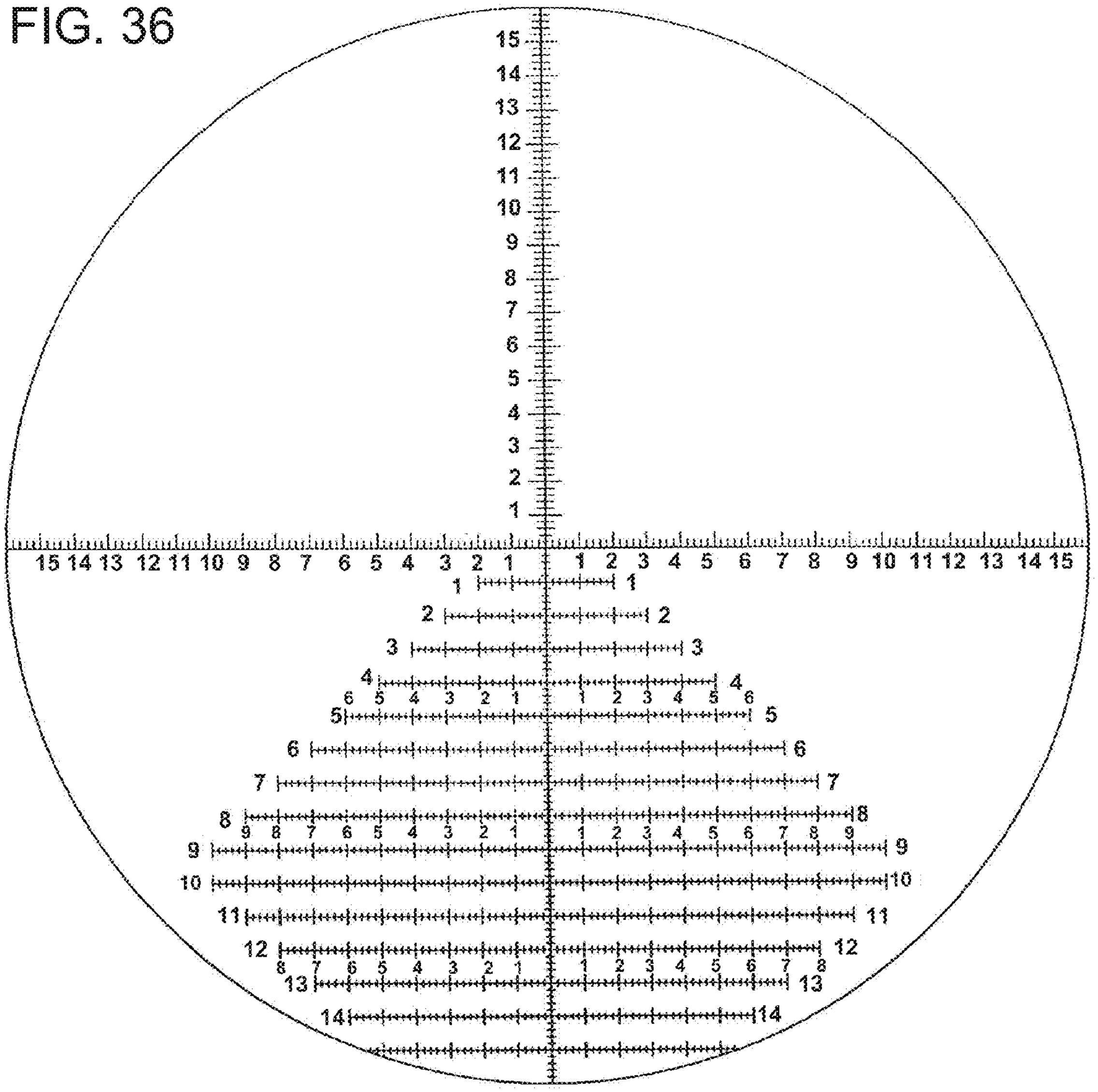
FIG. 36 is a front view of a reticle of the present invention, showing the markings as viewed through a zoom telescopic gunsight at high power, with the primary horizontal cross-hair intersecting the primary vertical cross-hair at optical center suitable for use, for example, in tactical, military, and police applications.
Figure 37:
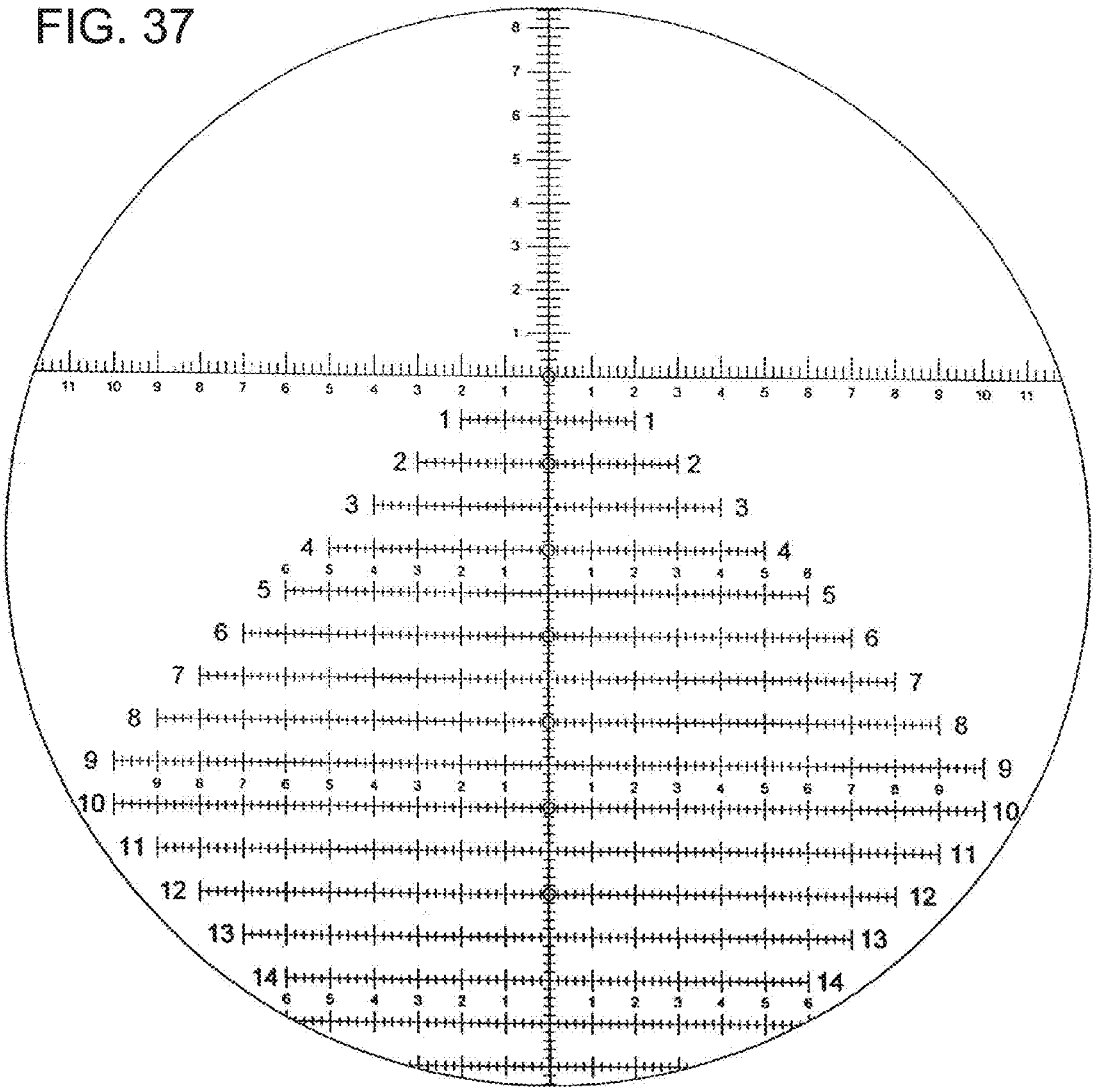
FIG. 37 is a front view of a reticle of the present invention, showing the markings as viewed through a zoom telescopic gunsight at high power and with the primary horizontal cross-hair intersecting the primary vertical cross-hair above optical center; suitable for use, for example, in tactical, military, and police applications.
Figure 38A:
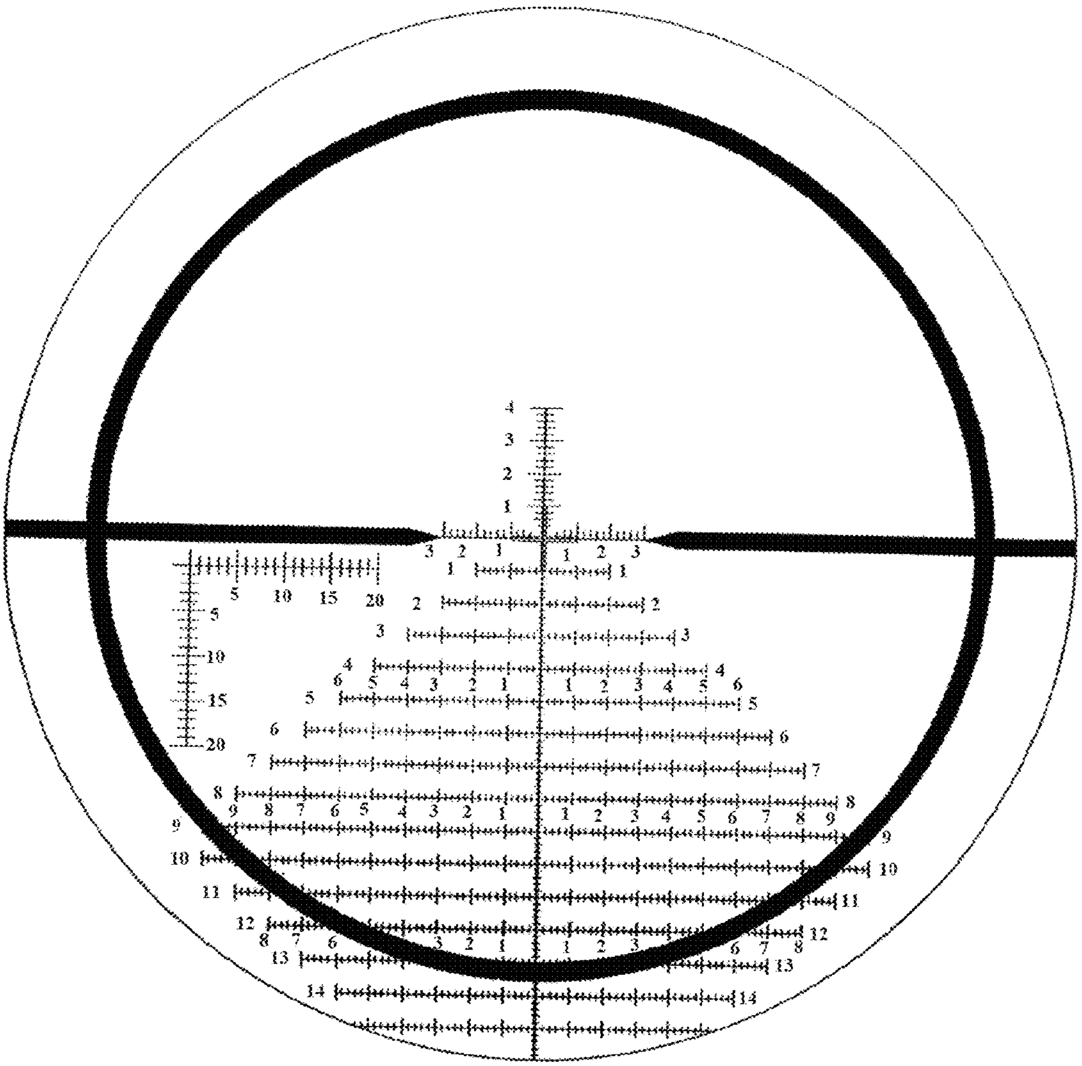
FIGS. 38*a-n* provide a front view of a reticle of the present invention, showing the markings as viewed through a zoom telescopic gunsight at high power with a rangefinder, and with the primary horizontal cross-hair intersecting the primary vertical cross-hair at optical center, with a bold ghost ring suitable for use at close to mid range.
Figure 38B:
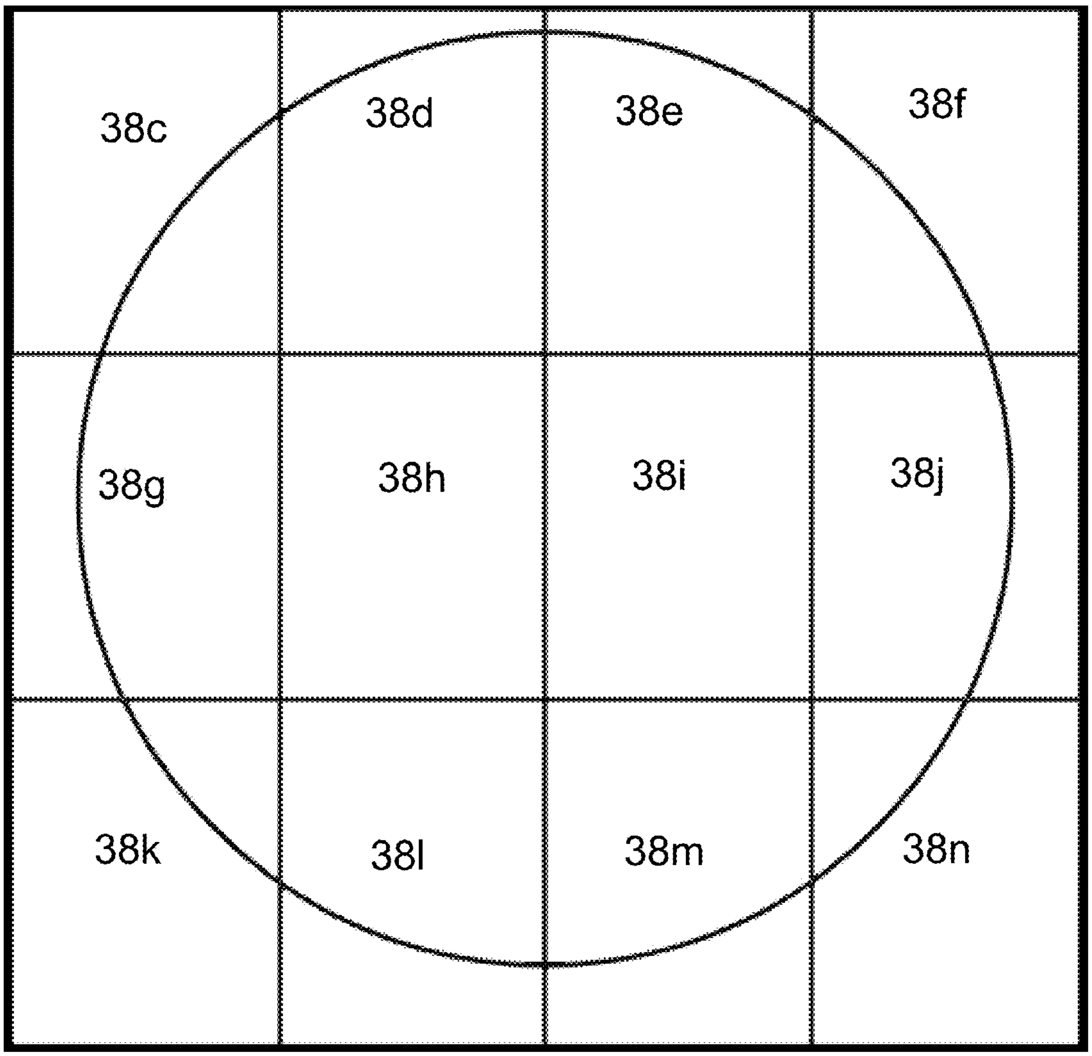
FIG. 38*b* provides a coordinate map showing where each of the subregions of FIGS. 38*c-n* correspond to the reticle image of FIG. 38*a*.
Figure 38C:
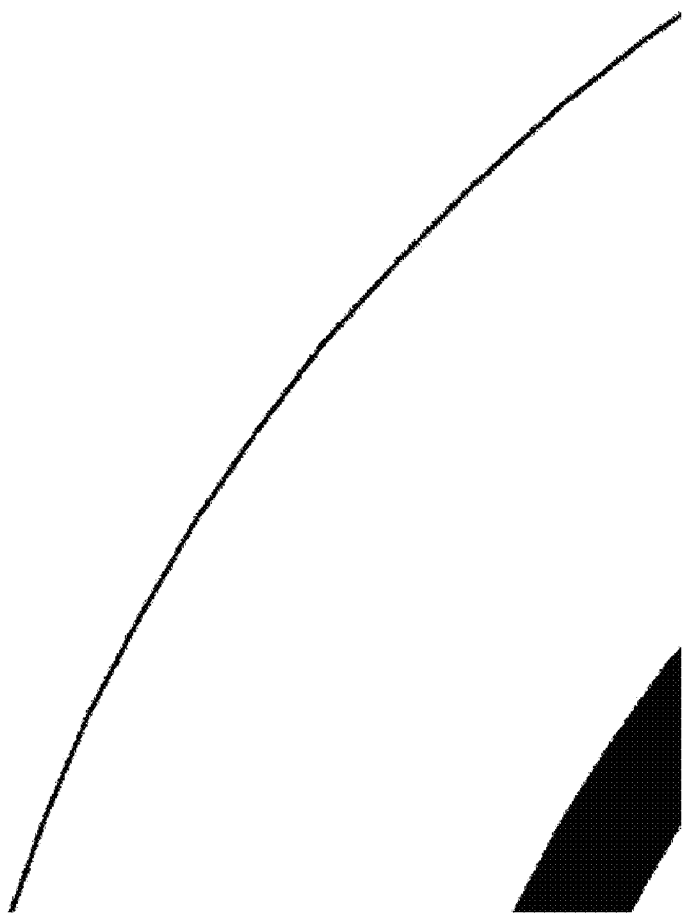
Figure 38D:
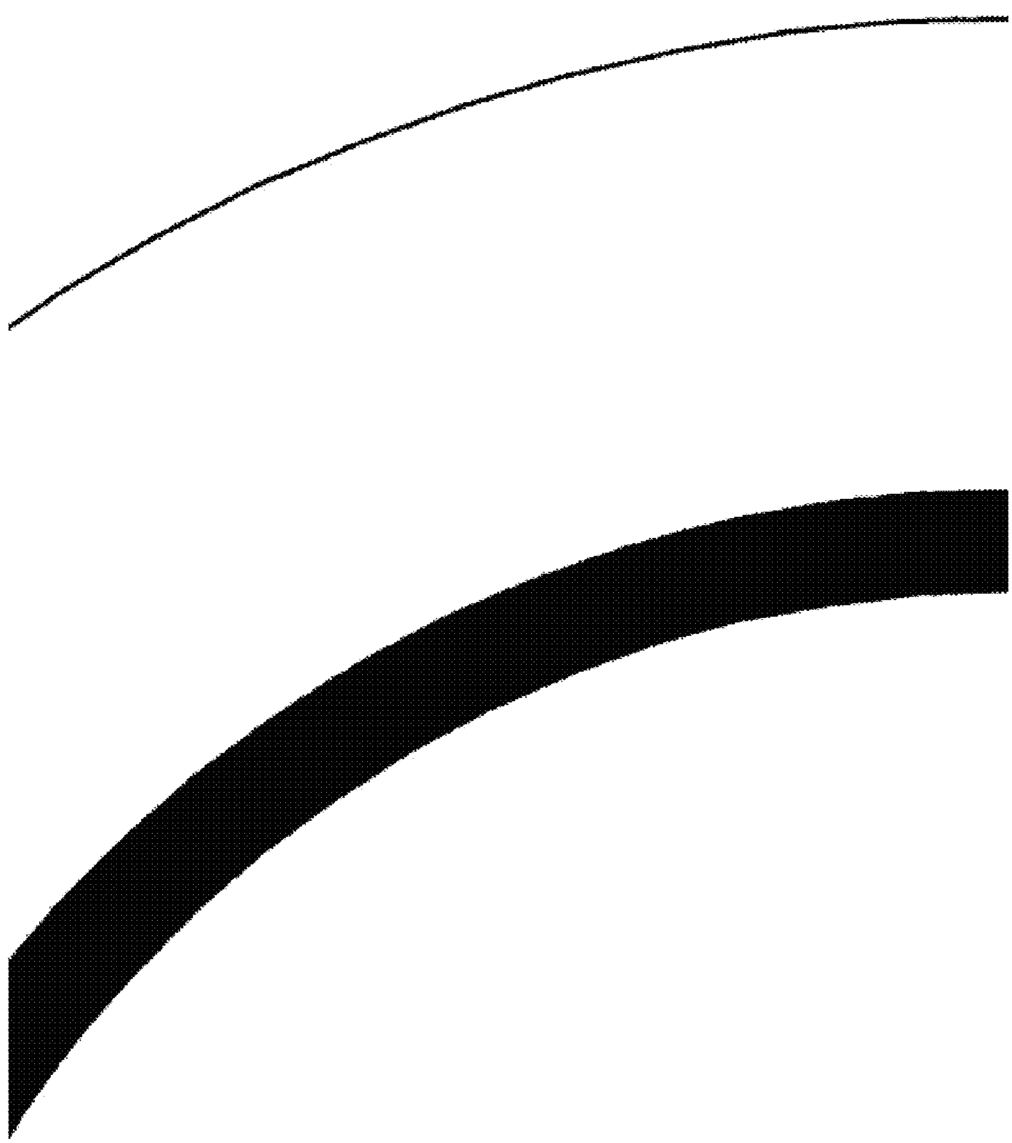
Figure 38E:
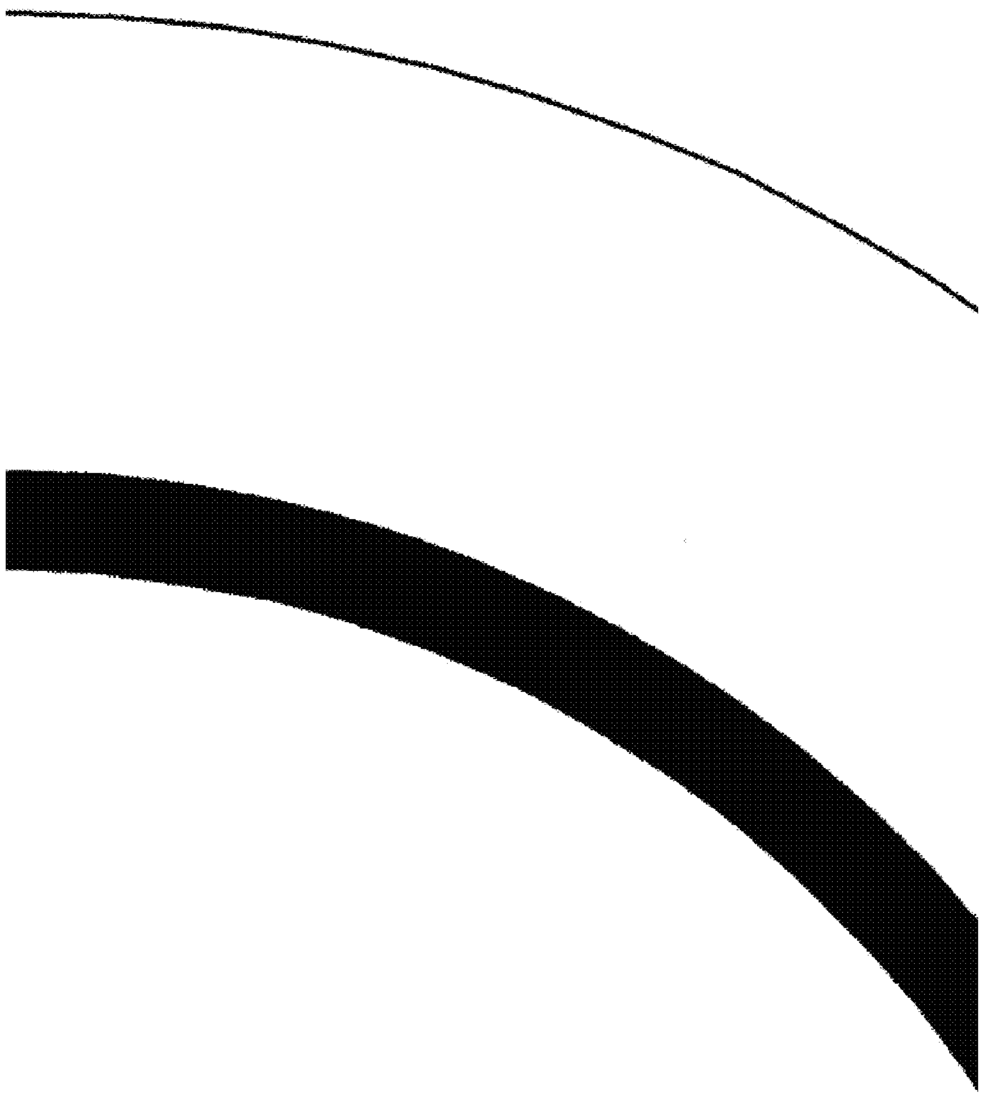
Figure 38F:
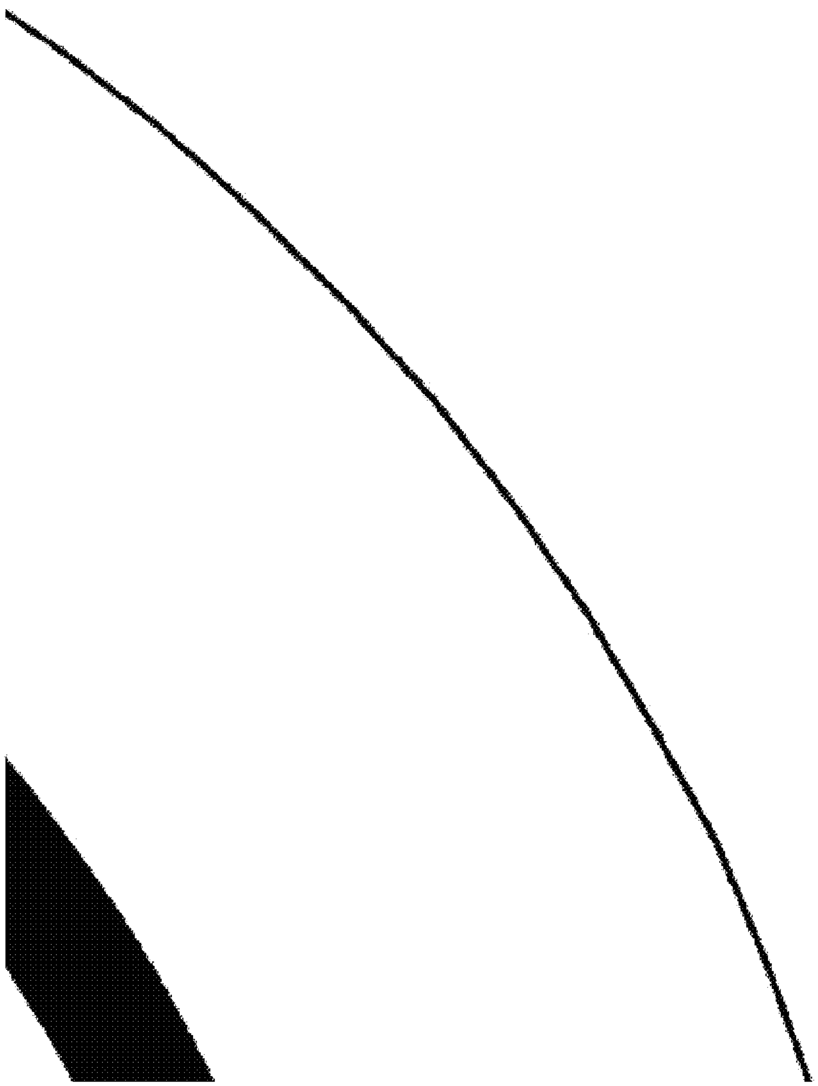
Figure 38G:
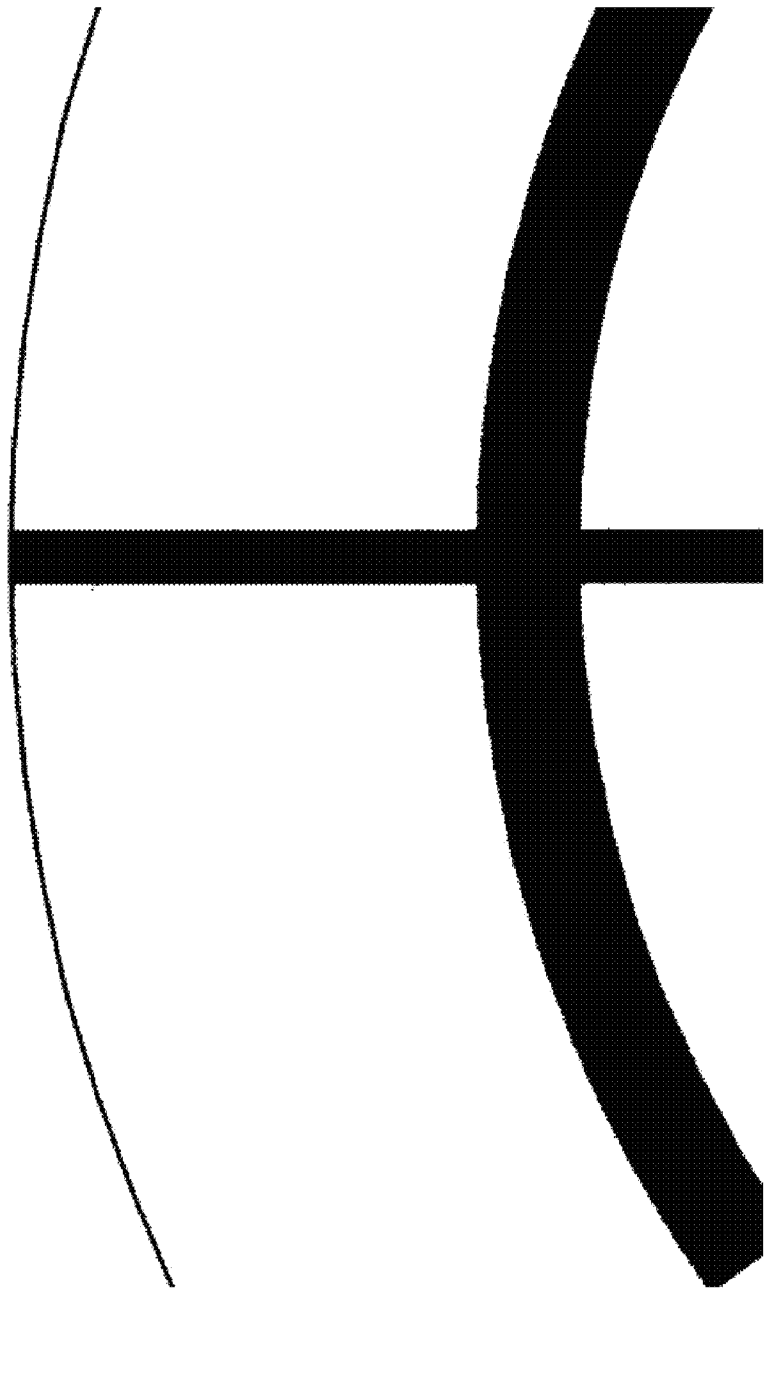
Figure 38H:
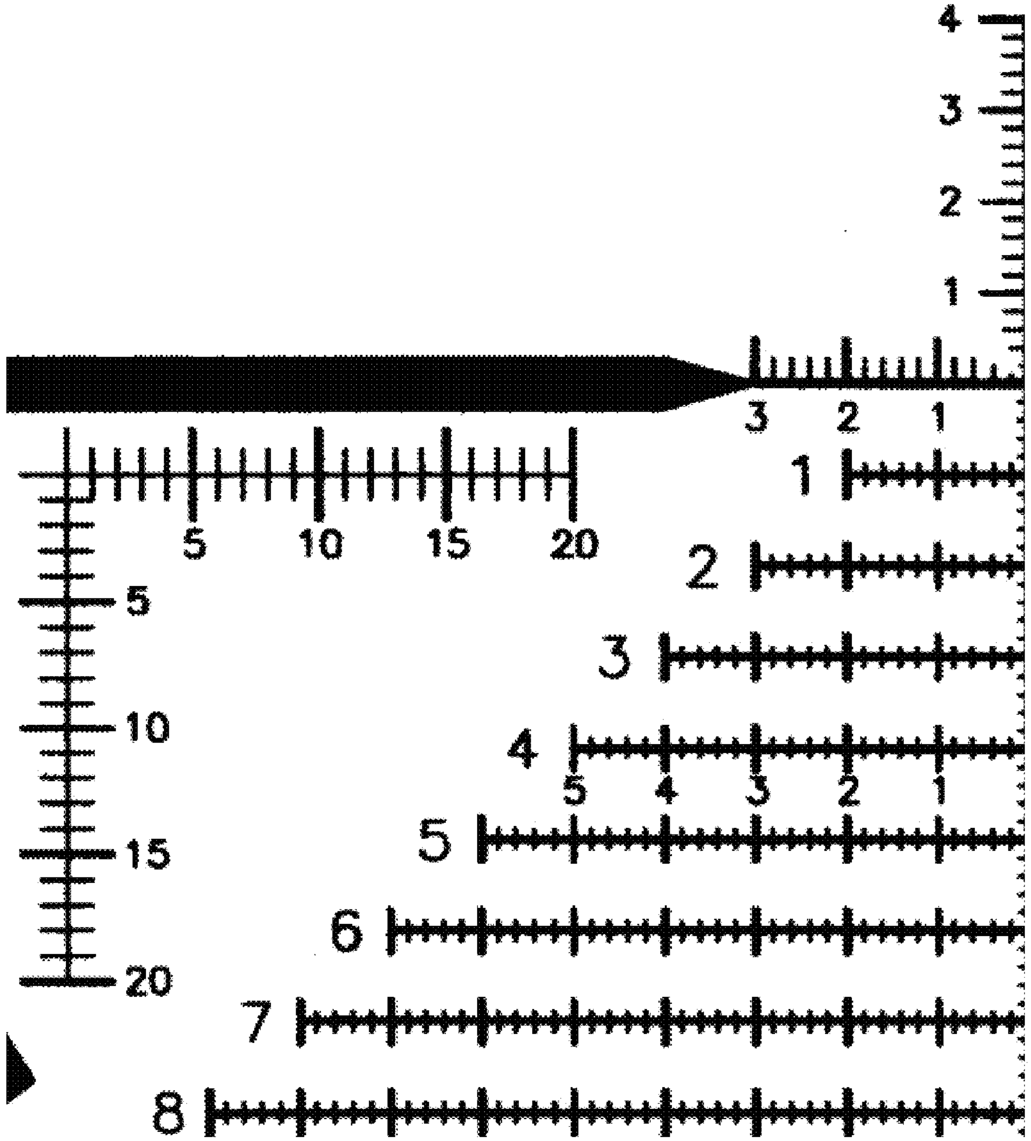
Figure 38I:
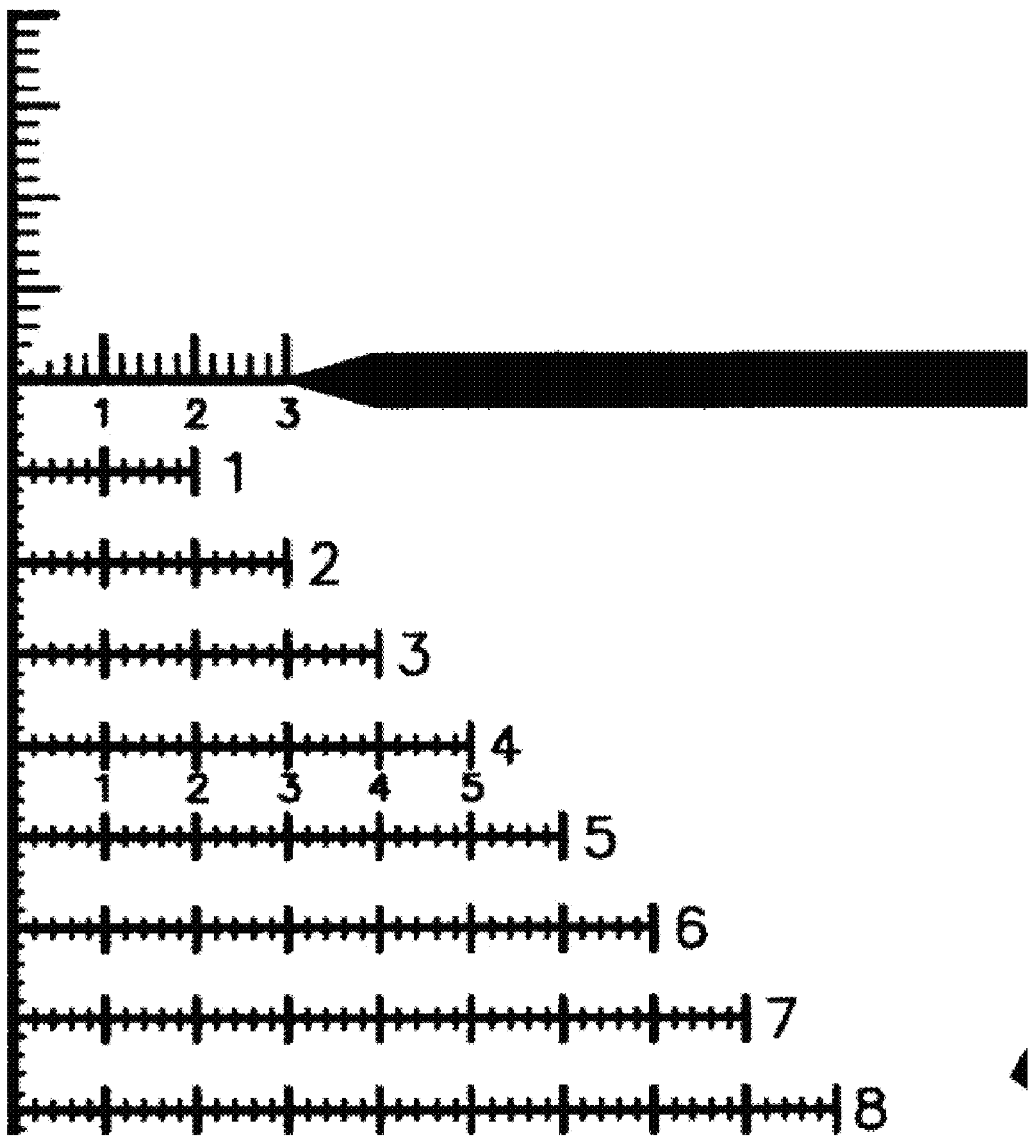
Figure 38J:
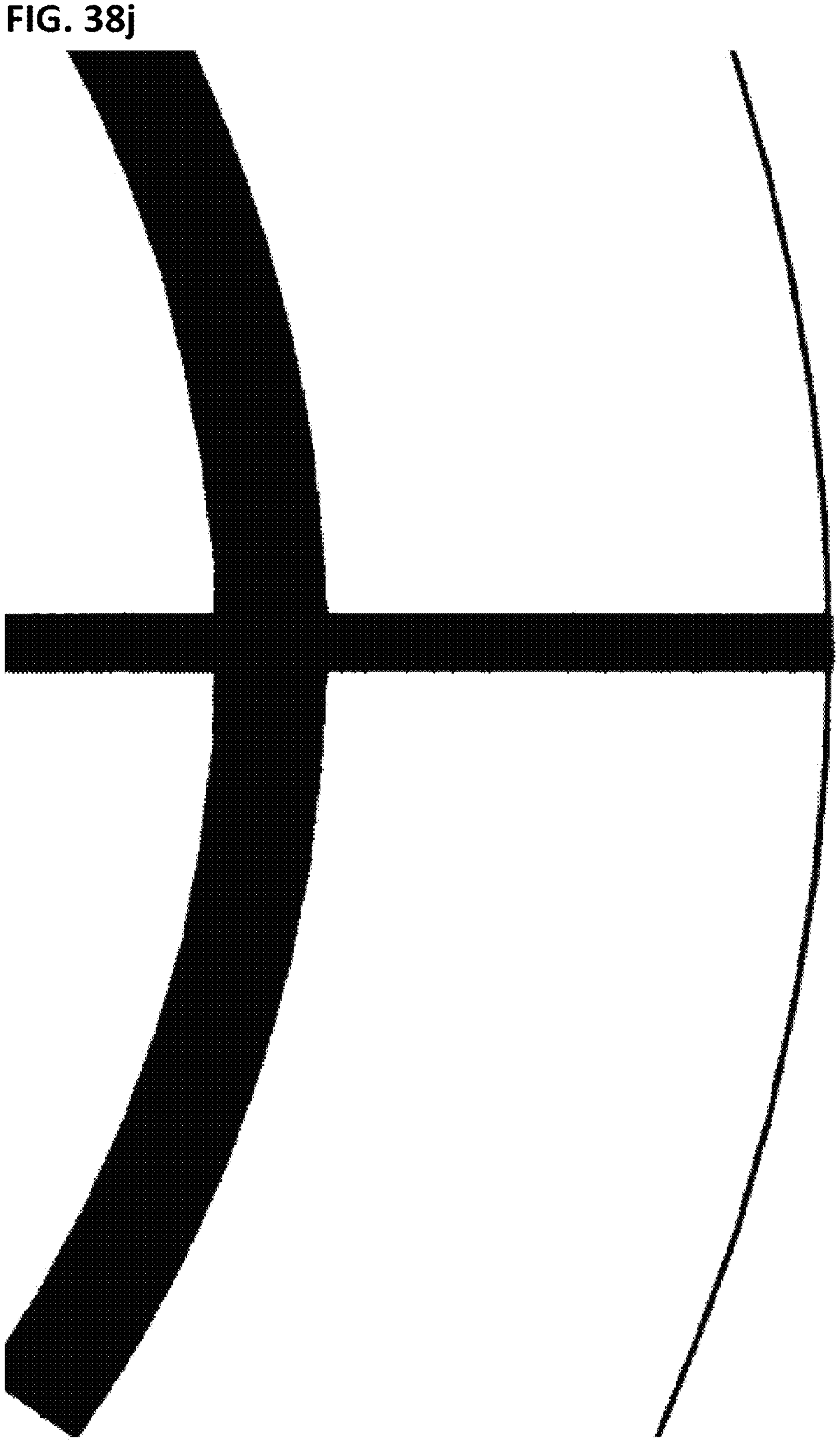
Figure 38K:
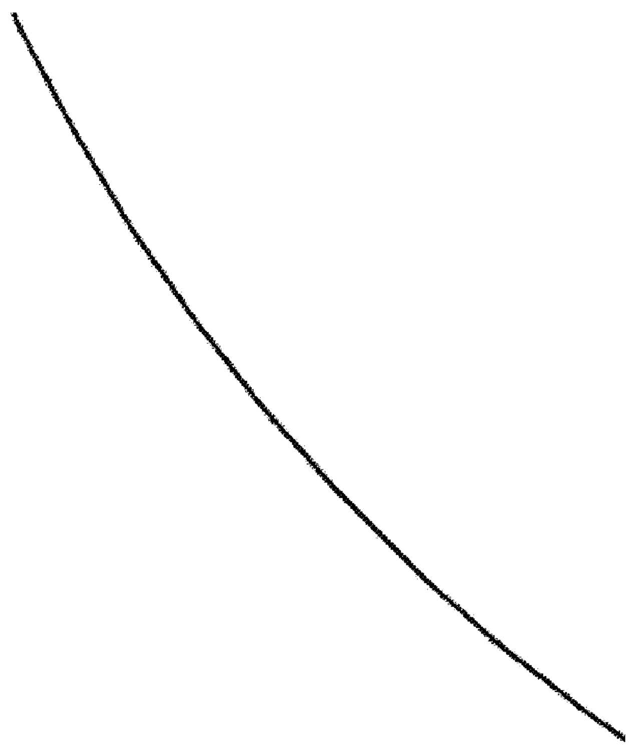
Figure 38I:
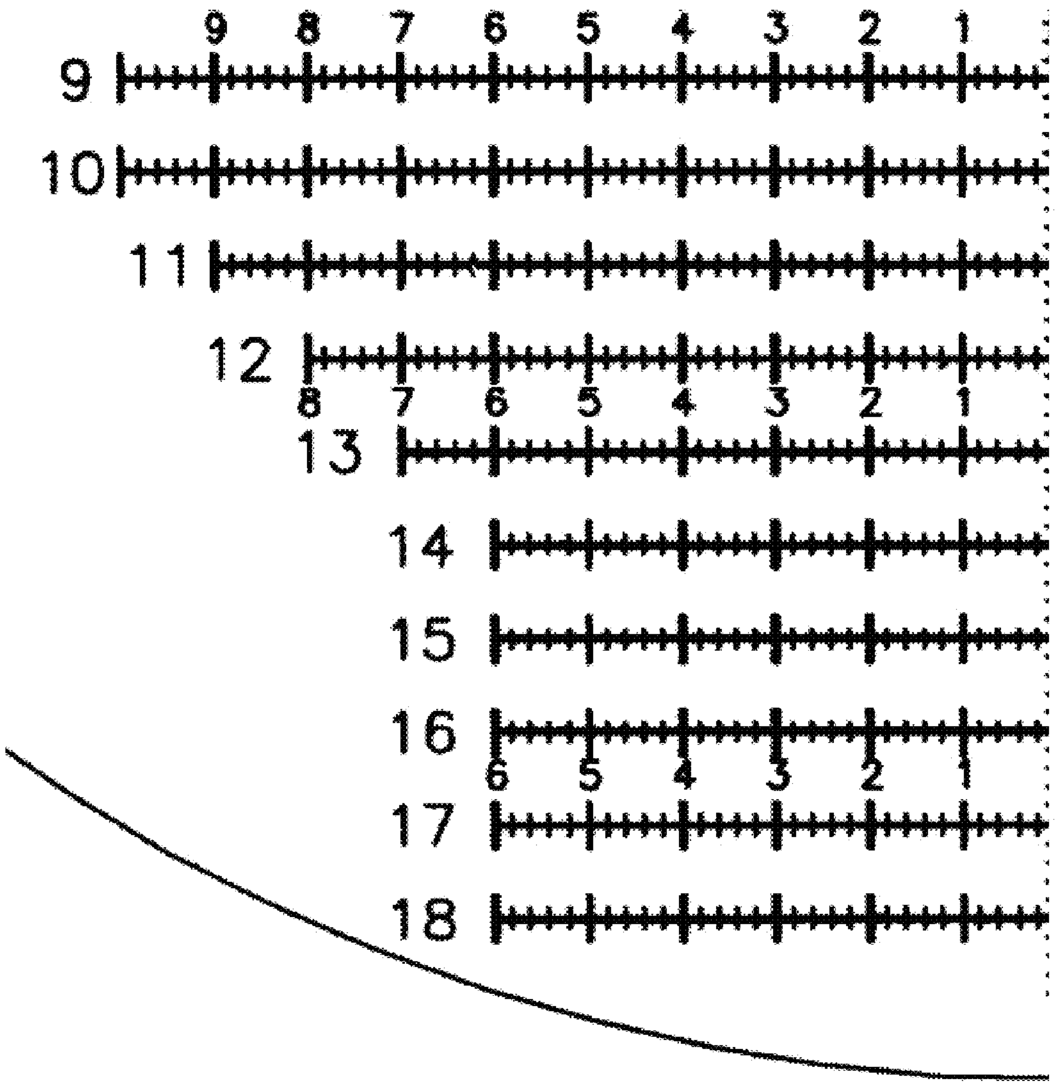
Figure 38M:
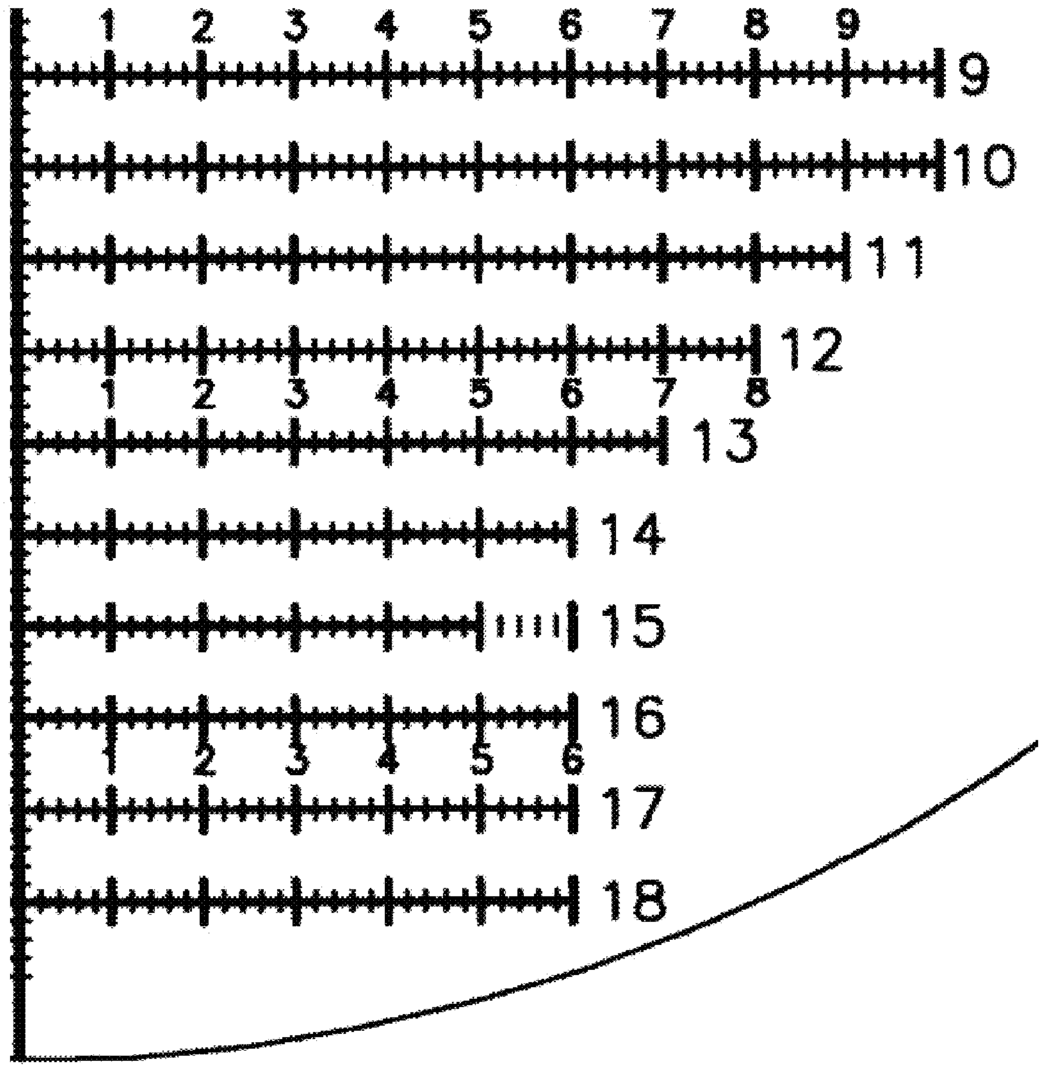
Figure 38N:
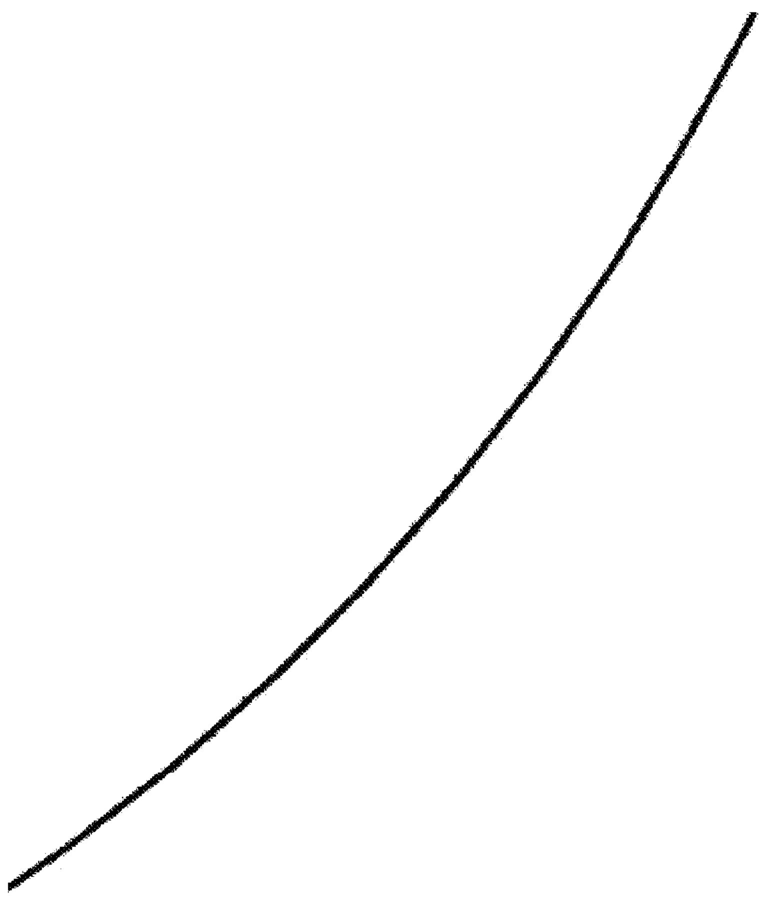
Figure 38O:
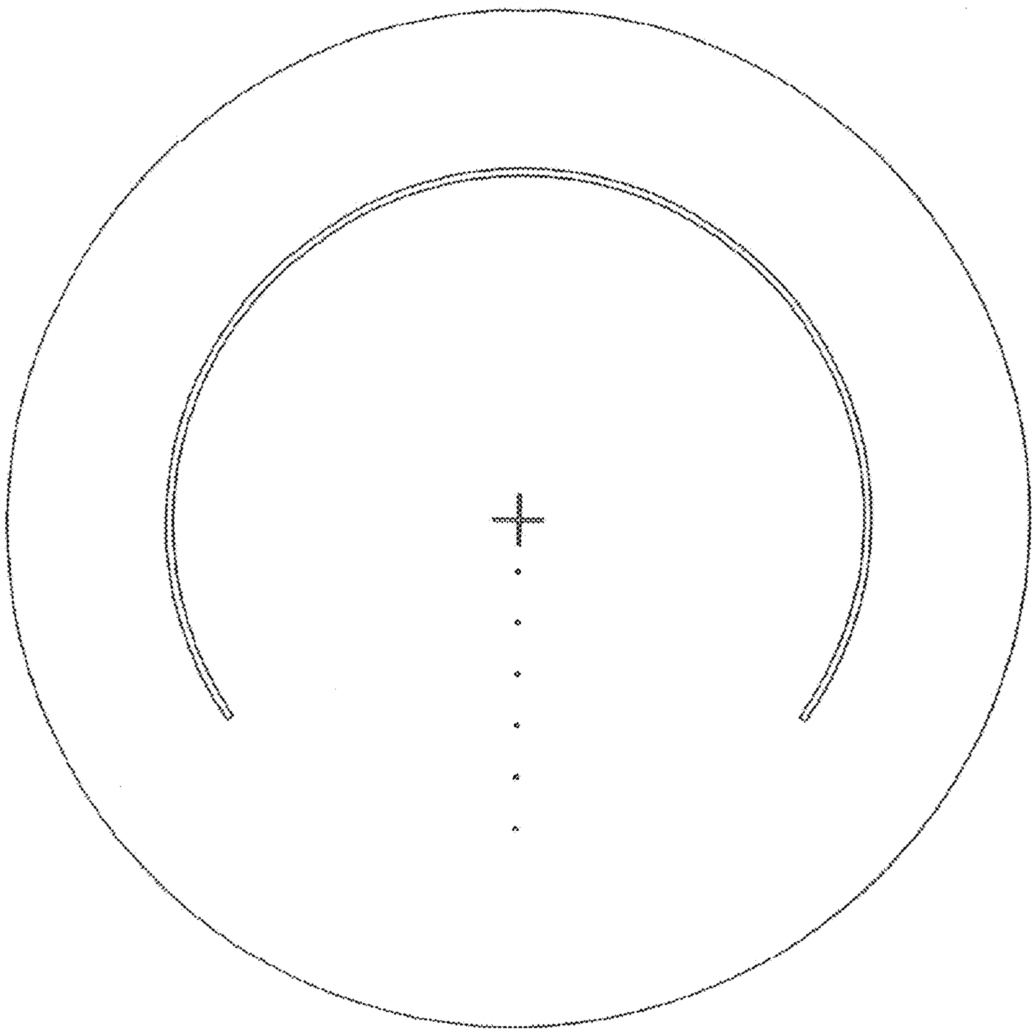
FIG. 38*o* is a front view of the reticle of FIGS. 38*b-n*, showing the markings as viewed through an illuminated zoom telescopic gunsight at high power with the primary horizontal cross-hair intersecting the primary vertical cross-hair at optical center, with a bold ghost ring suitable for use at close to mid-range.
Figures 39A, 39B, 39C, 39D:
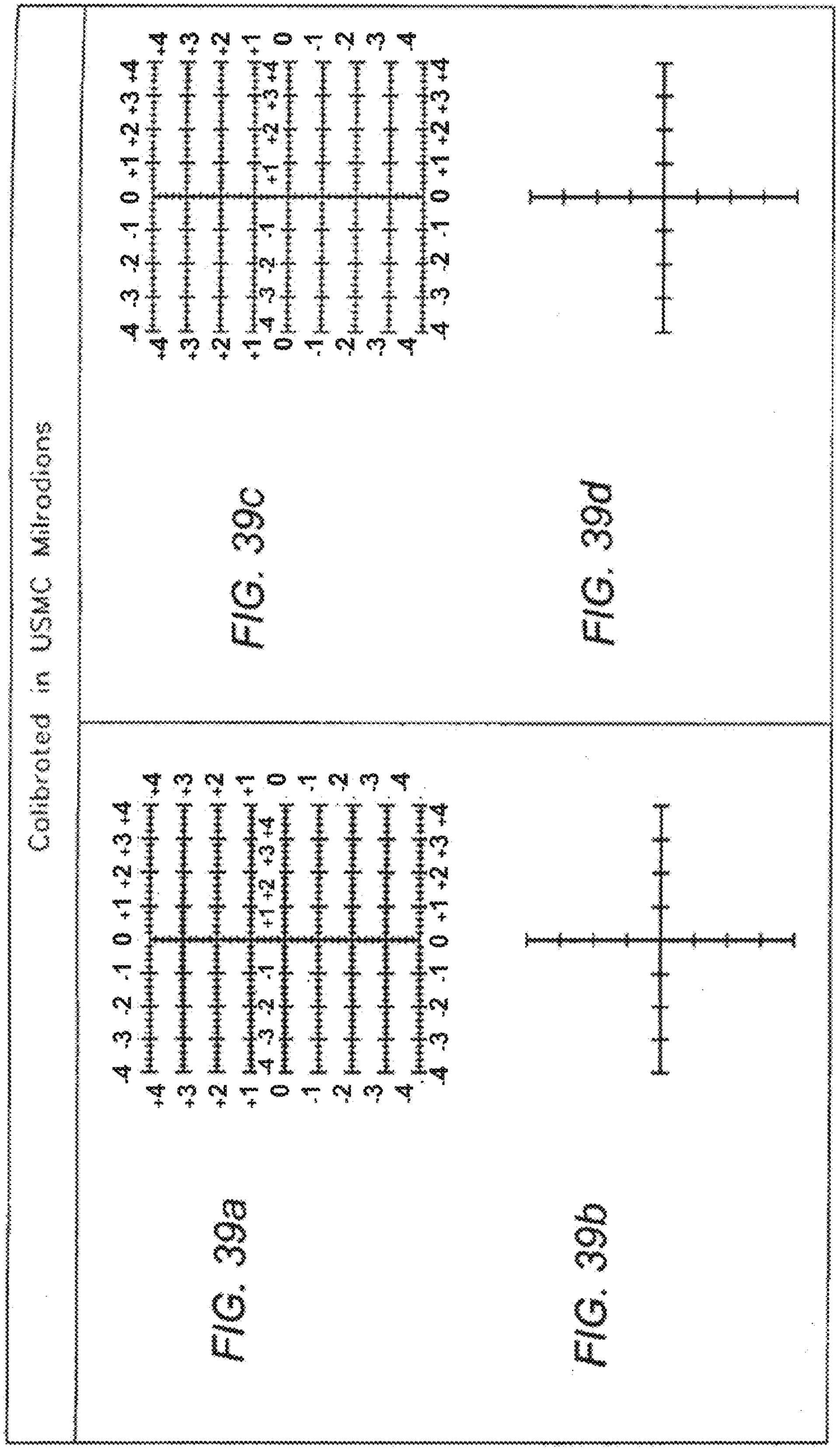
FIG. 39*a* is a front view of a reticle of the present invention, showing the markings as viewed through an electronic reticle at high power calibrated in USMC Mil Radians, with the main cross-hairs subtending 0.2 inches, the small hack marks subtending 0.1 inches and all other markings subtending 0.14 inches at 100 yards.
FIG. 39*b* is a front view of a reticle of FIG. 39*a*, showing the markings as viewed through an electronic reticle at high power illuminated for use under low light conditions.
FIG. 39*c* is a front view of a reticle of the present invention, showing the markings as viewed through an electronic reticle at high power calibrated in USMC Mil Radians, with the main cross-hairs subtending 0.1 inches, the small hack marks subtending 0.05 inches and all other markings subtending 0.07 inches at 100 yards.
FIG. 39*d* is a front view of a reticle of FIG. 39*c*, showing the markings as viewed through an electronic reticle at high power illuminated for use under low light conditions.
Figure 39E:
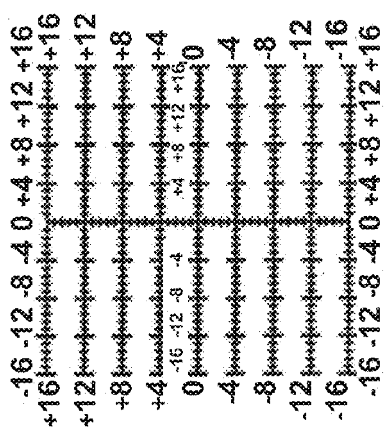
FIG. 39*e* is a front view of a reticle of the present invention, showing the markings as viewed through an electronic reticle at high power calibrated in True Minute of Angle, with the main cross-hairs subtending 0.2 inches, the small hack marks subtending 0.1 inches and all other markings subtending 0.14 inches at 95.5 yards.
Figure 39F:
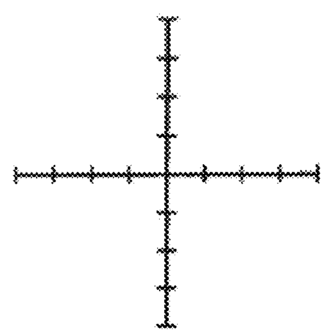
FIG. 39*f* is a front view of a reticle of FIG. 39*e*, showing the markings as viewed through an electronic reticle at high power illuminated for use under low light conditions.
Figure 39G:
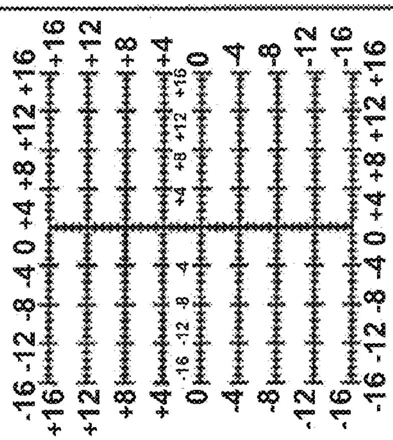
FIG. 39*g* is a front view of a reticle of the present invention, showing the markings as viewed through an electronic reticle at high power calibrated in True Minute of Angle, with the main cross-hairs subtending 0.1 inches, the small hack marks subtending 0.05 inches and all other markings subtending 0.07 inches at 95.5 yards.
Figure 39H:
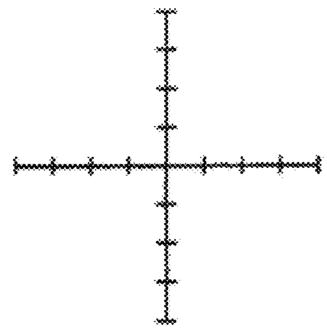
FIG. 39*h* is a front view of a reticle of FIG. 39*g*, showing the markings as viewed through an electronic reticle at high power illuminated for use under low light conditions.
Figure 40:
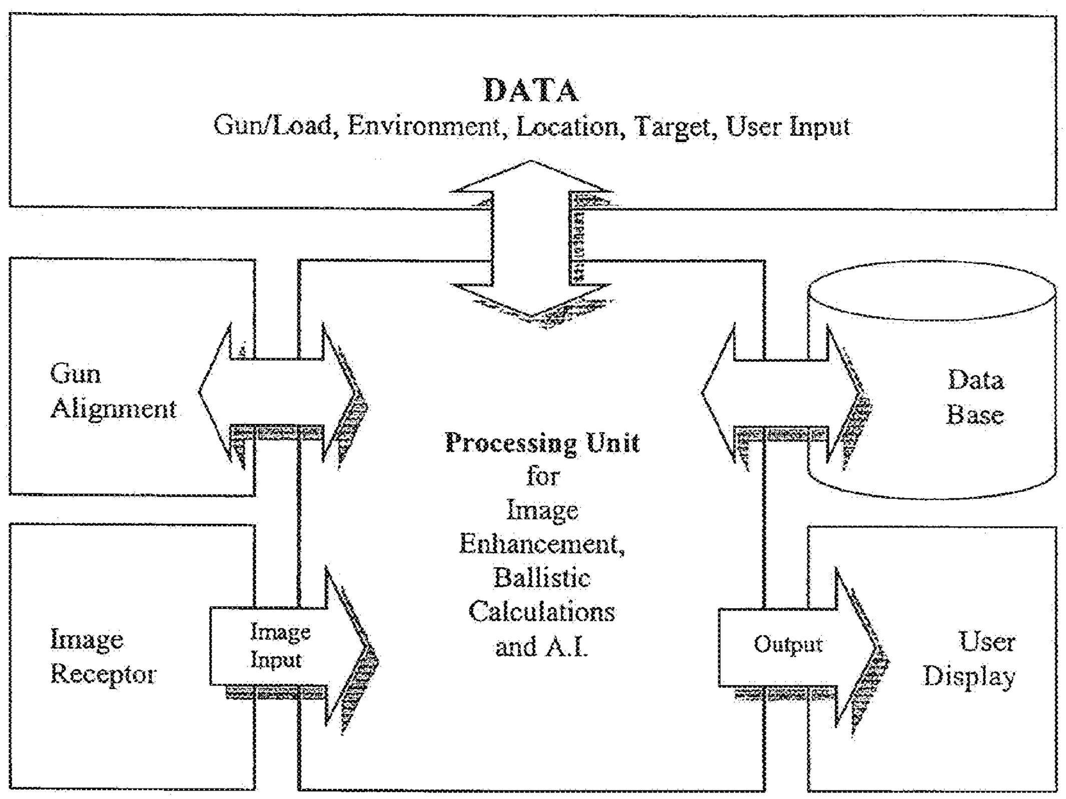
FIG. 40 is a block diagram of an example of the ballistics calculator system of the present invention.
Figure 41A:
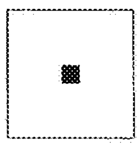
FIG. 41*a* illustrates a representative target for use of the reticle of the present invention for a second shot correction of a missed first shot.
Figure 41B:
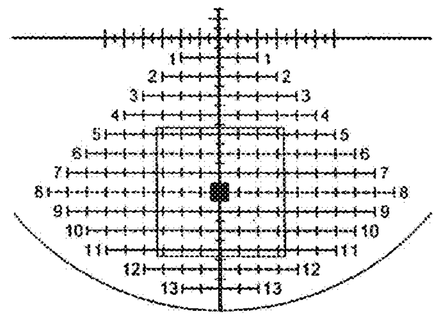
FIG. 41*b* illustrates a range call for using line #8 for drop compensation. For the first shot the target is placed on line #8 and the shot taken.
Figure 41C:
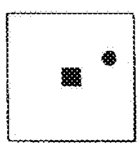
FIG. 41*c* illustrates that the shot taken in FIG. 41*b* misses the bullseye with an impact high and to the right of the target.
Figure 41D:
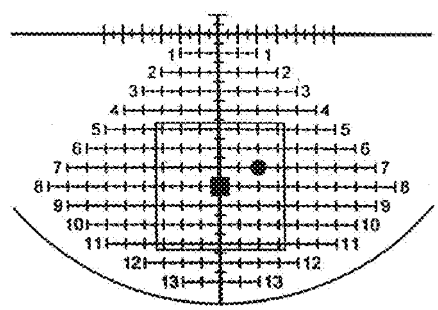
FIG. 41*d* illustrates that when the reticle of the target acquisition device is aligned so that the bullseye and original aiming point are aligned (at the central cross-hair of line #8), the actual bullet impact is at line #7, 2 hackmarks to the right.
Figure 41E:
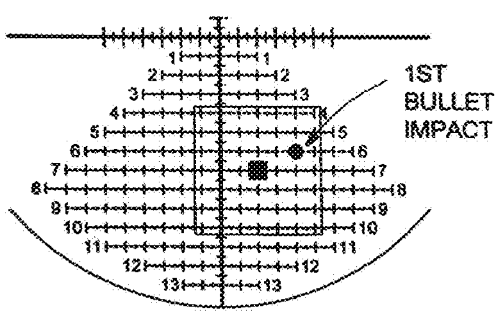
FIG. 41*e* illustrates that line #7 2 hackmarks to the right is used for the main targeting cross-hair aligned with the bullseye for the second shot.
Figure 41F:
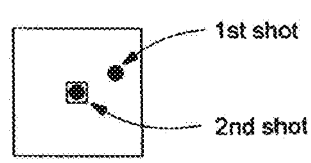
FIG. 41*f* illustrates that the second shot not impacts the bullseye using the impact point of the first shot on the reticle as the aiming point for the second shot.

Finally, a reticle assists the shooter in hitting the target. The reticle is typically (but not necessarily) constructed using optical material, such as optical glass or plastic, or similar transparent material, and takes the form of a disc or wafer with substantially parallel sides. The reticle may, for example, be constructed from wire, spider web, nano-wires, an etching, or may be analog or digitally printed, or may be projected (for example, on a surface) by, for example, a mirror, video, holographic projection, or other suitable means on one or more wafers of material. In one embodiment as exemplified in FIG. 35, illuminated reticles are etched, with the etching filled in with a reflective material, for example, titanium oxide, that illuminates when a light or diode powered by, for example, a battery, chemical or photovoltaic source, is rheostatically switched on compensating for increasing (+) or decreasing (−) light intensity. In a further embodiment, the illuminated reticle is composed of two or more wafers, each with a different image, for example, one image for daylight viewing (that is, a primary reticle), and one image for night viewing (that is, a secondary reticle). In a still further embodiment, if the shooter finds it undesirable to illuminate an entire reticle, since it might compromise optical night vision, the secondary reticle illuminates a reduced number of dots or lines. In yet another embodiment, the illuminated primary and secondary reticles are provided in any color. In a preferred embodiment, the illuminated reticle of the shooter's aiming device is identical to one or more spotter target acquisition devices such that the spotting device independently illuminates one or both of the reticles.

In a particularly preferred embodiment, the illuminated reticles of the present invention are used in, for example, low light or no light environments using rheostat-equipped, stereoscopic adaptive binoculars. With one eye, the shooter looks through a target acquisition device equipped with an aiming reticle of the present invention. With the opposite eye, the shooter observes the target using a night vision device, for example, the PVS 14 device. When the reticle and night vision device of the binocular are rheostatically illuminated, and the binocular images are properly aligned, the reticle of the target acquisition device is superimposed within the shooter's field of vision upon the shooter's image of the target, such that accurate shot placement can be made at any range in low light or no light surroundings.

In one embodiment as exemplified in FIGS. 39*a-f*, the reticle of the present invention is electronically projected on a viewing screen comprising the shooter's image of the target. As used herein, the term "image" refers to data representation of a physical object or space. In another embodiment, an electronic image receptor receives an image from lenses made of, for example, plastic, glass or other clear material. In a further embodiment, the electronic image receptor is permanently affixed to the target acquisition device. In a preferred embodiment, two or more electronic image receptors are simultaneously or sequentially available to the shooter for acquisition of different spectral images including, for example, IR, thermal, visible light, ultra-violet light (UV), radiation including X-ray, gamma ray, isotope and particle radiation, microwave, night vision, radar, vibrational receptors including ultra-sound, sound pulse, sonar, seismic vibrations, magnetic resonance, gravitational receptors, broadcast frequencies including radio wave, television and cellular receptors, etc. In an additional embodiment, the electronic image receptor is a replaceable component of the target acquisition device.

In some embodiments, the reticle of the present invention is a thick or thin line-weight reticle of the present invention, for example, FIGS. 2, 3, 9-15, 22-38, or standard electronic reticle (FIGS. 39*a-h*) of the present invention. In another embodiment, the reticle of the ballistics calculator system of the present invention is a conventional reticle, for example, a standard duplex or universal Mil-Dot reticle.

In one embodiment, the electronic image is projected from the shooter's target image acquisition device to the ballistics calculator processing unit of the present invention by, for example, physical cable, IR, Bluetooth™, radio wave, cellular connections, laser pulse, optical, 802.11b or other wireless transmission using, for example, protocols such as html, SML, SOAP, X.25, SNA, etc., and may be encrypted for security. The processing unit may be any sort of computer, for example, ready-built or custom-built, running an operating system. In preferred embodiments, manual data is input to the processing unit through voice recognition, touch screen, keyboard, buttons, knobs, mouse, pointer, joystick, or analog or digital devices. In a further embodiment, the reticle of the present invention is electronically projected on a viewing screen comprising one or more spotter's image of the target. In a still further embodiment, the electronic image of the spotter's target image acquisition device is projected to the ballistics calculator by, for example, cable, IR, Bluetooth™, or other wireless transmission. In a particularly preferred embodiment, viewing screens of the ballistics calculator system comprising, for example, aiming dots, ghost rings and targeting data are projected on one or more shooter's and one or more spotter's viewing screens. In some embodiments the visual display includes LCD, CRT, holographic images, direct corneal projection, large screen monitors, heads up display, and ocular brain stimulus. In other embodiments, the display is mounted, for example, on the scope, in portable head gear, on glasses, goggles, eye wear, mounted on the firearm, or in a portable display standing apart from the firearm.

In some embodiments, the shooter is able to use the processing unit of the ballistics calculator system to electronically select the color of the reticle or image, and, through electronic enhancement of the target image, for example, to defeat mirage, to increase or decrease the brightness and contrast of the reticle, to increase or decrease the brightness and contrast resolution of the target image, to stabilize the image, to match the image with an electronic library of stored images, to electronically amplify the target image through pixel replication or any other form of interpolation, to sharpen edge detection of the image, and to filter specific spectral elements of the image. In other embodiments, image types can be combined by the processing unit of the ballistic calculating system of the present invention to assist in resolving images, for example, performing digital combinations of visible spectrum with thermal imaging, overlapping ultraviolet images with X-ray images, or combining images from an IR scope with night optics. The processing unit of the present invention gathers all data on, for example, target size, angles and locations of spotters and shooters, and constructs an accurate position of the target in relation to the shooter. In a further embodiment, the ballistics calculator displays the electronic image observed by the shooter's or spotter's target image acquisition devices.

In some embodiments, the target acquisition device and processing unit of the ballistics calculating system of the present invention are provided in separate housings. In other embodiments, the electronic target image acquisition device and processing unit of the ballistics calculator system of the present invention are provided in a single housing. In a further embodiment, the housing is mounted on the firearm. In other embodiments, the housing is mounted, for example, on the side, back, top, or bottom of the target image acquisition device. In another embodiment, the housing is shielded, for example, from shock, water and humidity, radio frequency, magnetic, and radioactive interference. In a preferred embodiment, after the firearm is discharged the targeting grid of the electronic target image acquisition device and ballistics calculator system is adjusted so that the point of impact is matched to the targeting grid, thereby establishing a rapid zero aiming point. In yet another embodiment, firearm and telescopic aiming device are zeroed electronically.

In one embodiment, the target acquisition device is not mounted on a firearm. An advantage of not having the target acquisition device image receptor be mounted on the scope or firearm is that much larger, more powerful and more sensitive imaging components can be deployed, making it easier to acquire better images without burdening the shooter with additional bulk and weight. In addition, a stand-apart image receptor is not exposed to recoil from the firearm. In the stand-apart ballistics calculating system shooters, spotters and other interested parties view the target via a target image acquisition device, for example, a thermal imaging device, that projects an image on a video monitor or glasses, goggles, an eye-piece, a contact lens, a headset, or on the retina of the viewer. In some embodiments, the image receptor is in a spotting scope beside the firearm. In another embodiment, the image receptor is mounted on a nearby firearm. In a preferred embodiment, the image receptor is at a separate location, or remote site. In a particularly preferred embodiment, the image receptor is in an airborne vehicle, drone, or satellite. In a further embodiment, the image is available as previously stored information. In another embodiment, the one or more shooters use multiple or composite image receptors.

Once a target is identified in the target image acquisition device, the reticle of the present invention is superimposed over the target using the ballistics calculator system of the present invention, for example the ATRAG program (Horus Vision, LLC). In a further embodiment, a green laser is fired at the target with a red laser showing the exact aiming point to affect the shot. The shooter using, for example, a standard riflescope target acquisition device with the aiming reticle of the present invention uses the green laser as a reference to the actual location of the target, and fires at the red dot projected by the red laser. In a preferred embodiment the shooter's target acquisition device is equipped with night vision. In another embodiment, a sighting laser is attached to the night vision thermal imaging device. Upon locating a target, a laser beam is fired at the target. In a preferred embodiment the electronic target acquisition device of the present invention is automatically calibrated, and its zero aiming point is matched with the night vision device which stands apart from the firearm. In yet further embodiment, the ballistics calculator system of the present invention comprising the thermal imaging device, laser, PDA or handheld PC, are linked to a holographic projector to generate a holographically projected targeting grid in front of the firearm. In a preferred embodiment, the exact aiming point on the projected holographic grid is also projected. In another embodiment, the image acquired by the stand-apart image acquisition device is transmitted to other parties by, for example, wire, fiberoptic cable, IR, Bluetooth™, or radio frequency.

In another embodiment of the present invention, images including, for example, faces, objects, compound layouts, landscapes or any item that can be stored into a data base, are compared against the database, identified, and the object's identity is displayed alongside the image. In yet another embodiment, the processing unit of the present invention contains a database of common objects as seen from many perspectives. For example, a truck can be seen from the top, side, back, either side, from the front or in a combined image. Using object recognition, the computer of the ballistics calculating system recognizes a selected object, the aspect of its point of view, and is able do calculate its approximate physical size, thereby providing an accurate range for the object. In still another embodiment, all of the functions of the processing unit are performed without user intervention through the use of expert system rules, or Artificial Intelligence means.

Output of the ballistics calculating system of the present invention may be communicated anywhere between any two or more components. In one embodiment, target image information is shared between the shooter, a remote station, and central command facility. In this fashion joint decisions may be realized or deferred. In another embodiment, output of the ballistics calculating system is stored, on, for example, VCR, DVD, hard disk, tape, FOBS or other portable storage device, analog or digital media. In a preferred embodiment, target image aiming representations are overlaid including, for example, simple cross-hairs, Mil-Dot cross-hairs, the reticles of the present invention, geometric symbols, bullseyes, cursors, etc. In one embodiment, target image aiming representations are used for direct aiming, that is the shooter looks directly through the aiming device at the target, and compensates for corrections to the flight path by adjustments between the aiming device and the firearm. In a preferred embodiment, the firearm is indirectly aimed at a projected virtual dot in visual space instead of the target itself. Using the display image projected by the processing unit of the ballistics calculating system the virtual dot is placed where the cross-hair should center, rather than on the target. By aligning the firearm to the projected virtual dot, the bullet will follow a flight path that will take it accurately to the intended target. In another embodiment, the projected dot on the screen represents the virtual indirect aiming point that, with a cross-hair or other symbol, is used to align the firearm with the virtual point. As a consequence, with use of the ballistics calculating system of the present invention the shooter does not require direct sight of the target to accurately aim the firearm.

In one embodiment of the present invention, the reticle is projected on glasses, goggles, an eye-piece, a contact lens, a headset, or on the retina of the shooter. In another embodiment, the reticle is superimposed on any suitable image of the target, for example an optical image, a thermal image, an ultrasonic image, a sonar image, a radar image, a night vision image, a magnetic image, an infrared image, an enhanced image of any kind, or a holographic projected electronic image. In still further embodiment, the reticle is superimposed on the intended target and the aiming point is illuminated by a laser. Where the markings on a reticle are generated or moveable, in some embodiments, the markings may be modified to account for changes in the environment and/or desired function. For example, the position, size, spacing of crosshairs, etc. may be automatically or manually adjusted to improve function.

In one embodiment, information regarding external conditions entered into the ballistics calculator system of the present invention includes data specific to the media through which the projectile travels including, for example, gaseous media (for example, air or other gas), fluid media (for example, fresh water, salt water or other fluid), solid media (for example, soil, stone or other solid), or a vacuous media (for example, near space within the solar system, or deep space beyond the solar system). In some embodiments, the data includes, for example, temperature, density, viscosity, ionization, specific gravity, elemental and molecular composition, hardness, ambient radiation, gravitational field, and the like of the media.

In a fixed power scope, in preferred embodiments, the reticle is mounted anywhere between the ocular lens 14 and the objective lens 12 of FIG. 1. In a variable power scope, the reticle is most preferably mounted between the objective lens 12 and the optical components 16. In this position, the apparent size of the reticle when viewed through the ocular lens will vary with the power; for example, compare FIG. 2 (high power) with FIG. 3 (low power). The reticle of the present invention may be mounted in a variable power target acquisition device, for example a variable power telescopic gunsight such as those manufactured by Schmidt & Bender GmbH & Co. KG of Biebertal, Germany, or U.S. Optics because of their excellent optics. The variable power scope may magnify over any suitable range and objective lens diameter, for example a 3-12×50, a 4-16×50, a 1.8-10×40, 3.2-17×44, 4-22×58 telescopic gunsight, etc.

When the reticle is mounted between the objective lens and the variable power optical components 16, the selected aiming point (as described in more detail below) on the reticle of the present invention does not vary as the shooter zooms the scope in and out to find the most desirable power for a particular shot. The reticle of the present invention is thus in the first focal plane so that the reticle markings scales are proportional to the image when viewed through the scope. Thus, a unit of measure is consistent no matter the magnification. In one embodiment, since magnification is proportional on a linear scale through the power range, when the reticle is in the second plane (that is, the markings stay the same size visually against a growing or shrinking image when the power changes (i.e. because the relationship is linear)), and when the power to which the scope is set is known, the scale value against the image at a known distance when seen through the scope is calculated. In a further embodiment, a "click" stop at fixed intervals on the power ring assists the user's ability to set the power at a known stop. In a preferred embodiment, these calculations are performed by the ballistics calculator of the present invention.

For example, taking as input:

1. the power ($P_z$) that the reticle pattern is "true" (i.e. 10×)
2. the value worth (Vz) of the reticle pattern marks when "true" (i.e 1 Mil, or 10 cm at 100 meters)
3. the distance for the zero value ($D_z$) (100 meters)
4. the current power ($P_c$) setting (let's say 14)
5. the current distance ($D_t$) of the object being viewed (let's say 600 yards) Expressed as:

$$(V_z)\times(D_t/D_z)\times(P_z/P_c)=\text{current drop}$$

or, for example $$(10\text{ cm})\times(600\text{ m}/100\text{ m})\times(10/14)=42.86\text{ cm drop}$$

The same calculation can be applied to range finding as well.

Figure 2:
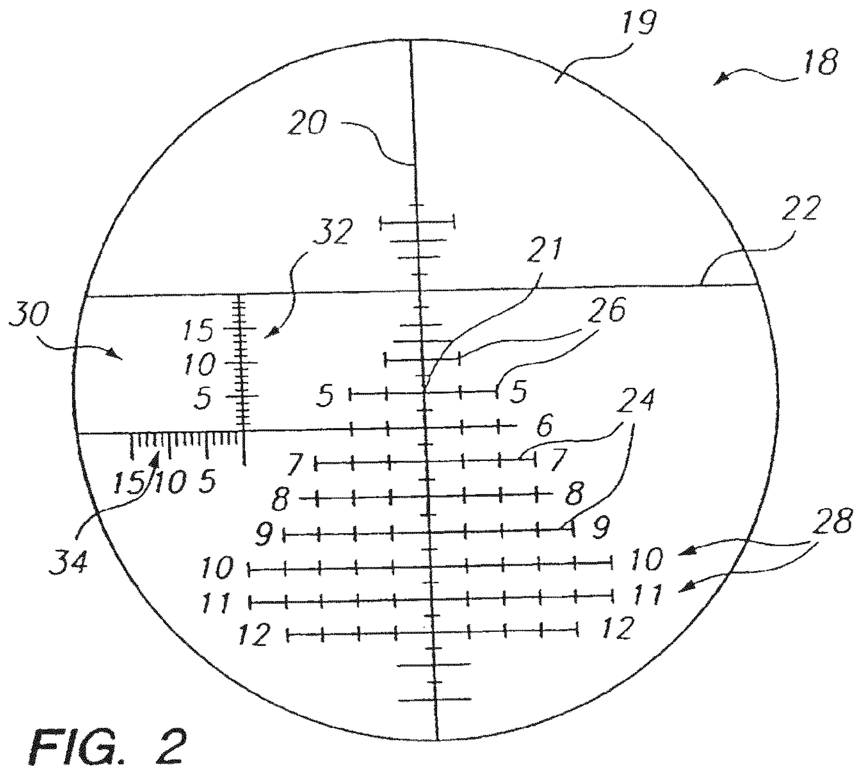
FIG. 2 is a front view of a reticle of the present invention, showing the markings as viewed through a zoom telescopic gunsight at high power, the spacing of the markings based upon a "shooter's minute of angle" or inch of angle" (IOA™) scale.
Figure 9:
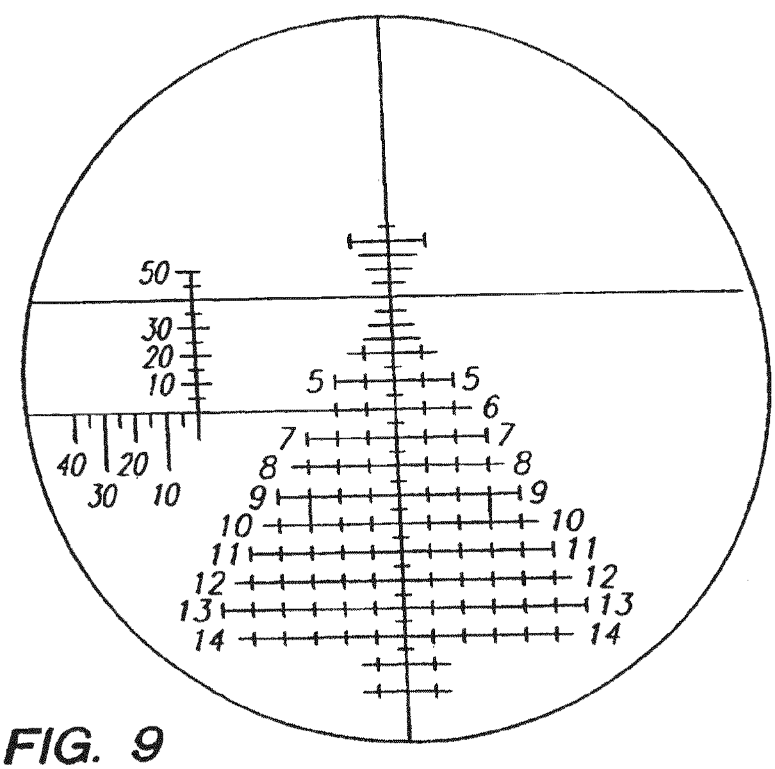
FIG. 9 is an example of a reticle of the present invention based upon a "centimeter of angle" (COA™) scale.

As shown in FIG. 2, a preferred reticle 18 of the present invention is formed from a substantially flat disc or wafer 19 formed from substantially transparent optical glass or other material suitable for manufacturing optical lenses. Disc 19 has two, substantially parallel, sides. A primary vertical cross-hair 20 is provided on one side of said disc 19 using conventional methods such as, for example, etching, printing, engraved by machine or burned by laser, or applying hairs or wires of known diameter. Etching is preferred. Primary vertical cross-hair 20 preferably bisects the disc 19 and intersects the optical center 21 of reticle 18. A primary horizontal cross-hair 22 is also provided, and most preferably intersects the primary vertical cross-hair at a position well above the optical center 21. Positioning the primary horizontal cross-hair in this way provides the necessary additional field of view necessary to shoot accurately at long ranges without reducing the magnifying power of the scope. Thus, the primary vertical cross-hair and the primary horizontal cross-hair form four sectors: an upper right sector (e.g., quadrant), an upper left sector, a lower left sector, and a lower right sector, when viewed through a scope properly mounted to a gun barrel as shown in FIG. 4.

A plurality of secondary horizontal cross-hairs 24 are provided along the primary vertical cross-hair 20, preferably both above and below the primary horizontal cross-hair 22 to aid in range adjustments and for locating an appropriate aiming point on the reticle with respect to the distance to the target. In one embodiment, the secondary, horizontal cross-hairs are evenly spaced. Some of these secondary, horizontal cross-hairs are provided with unique symbols 28 which are useful in quickly locating a particular horizontal cross-hair. Symbols 28 can be numbers, as shown in FIG. 2, letters or other symbols. Symbols 28 are used for identification purposes only. In one embodiment the at least some of the secondary, horizontal cross-hairs are evenly spaced. In a further embodiment, at least some of the secondary horizontal cross-hairs are unevenly spaced.

A plurality of secondary vertical cross-hairs or hash-marks 26 are provided on at least some of the secondary horizontal cross-hairs 24, to aid the shooter in making adjustments for windage and for locating an appropriate aiming point on the reticle with respect to both windage and range. In one embodiment the at least some of the secondary, vertical cross-hairs are evenly spaced. In a further embodiment, the at least some of the secondary, vertical cross-hairs are unevenly spaced.

Also provided on the reticle is a means for determining range. As shown in FIG. 2, the rangefinder 30 can be provided in one of the sectors formed by the primary vertical and horizontal cross-hairs, and can include a vertical arm 32 and an intersecting horizontal arm 34. Vertical arm 32 is provided with a plurality of evenly-spaced horizontal cross-hairs which intersect vertical arm 32; horizontal arm 34 is provided with a plurality of evenly-spaced, preferably downwardly extending cross-hairs. At least some of the range finding cross-hairs are marked to correspond to a scale useful for determining range.

The spacing between the range-finding cross-hairs can be based upon a non-conventional scale, which can be referred to as the "inches of angle" (IOA™) scale. An "inch of angle" is defined as the angle made (or the distance on the reticle) which covers, or subtends, exactly one inch at 100 yards—which is referred to as a "shooter's minute of angle" (SMOA™). On the reticle shown in FIG. 2, an inch of angle is the distance between any two adjacent rangefinder cross-hairs. That is, the space between any two adjacent rangefinder cross-hairs will cover or exactly contain a one-inch target at 100 yards. A similar scale for metric shooters, which is called a "centimeters of angle" (COA™) scale, can also be used, with a centimeter of angle being the distance on the reticle that covers exactly one centimeter at 100 meters. Conventional scales, such as the "minute of angle" scale (true minute/angle) or Mil Radian scale (6,283 Mils/circle, 6,400 Mils/circle, or any other Mils/circle system), can also be used, although they are less intuitive to use and make the accurate estimation of long ranges more difficult.

In one embodiment, the spacings between secondary cross-hairs on the primary vertical and horizontal cross-hairs are also determined with reference to the scale used for the rangefinder. In a further embodiment, the spacings between secondary cross-hairs on the primary vertical and horizontal cross-hairs are independent with reference to the scale used for the rangefinder. In a preferred embodiment, the spacings between secondary cross-hairs on the primary vertical and horizontal cross-hairs are in USMC Mils, and the rangefinder is in IOA™. For the reticle as shown in FIG. 2, it can be seen by reference to the rangefinder that the spacing between the secondary horizontal cross-hairs labeled 5 and 6 is 5 inches of angle. A shorter secondary horizontal cross-hair (or hash-mark) appears between horizontal cross-hairs 5 and 6, at a position 2.5 inches of angle from either secondary horizontal cross-hair 5 or 6. The secondary vertical cross-hairs 26, as shown in FIG. 2, are spaced apart by 5 inches of angle.

The thicknesses of the lines are also preferably determined with reference to the range-finding scale used. Line thickness may vary with intended use with a variety of thicknesses selected in accord with use. For example, in long-range varmint scopes line thickness may subtend only 0.1" at 100 yards. In the preferred embodiment shown in FIG. 2, the preferred thickness of the primary vertical cross-hair 20 and primary horizontal cross-hair 22 is 0.5 inches of angle and the preferred thickness of the secondary horizontal and vertical cross-hairs are 0.25 inches of angle. The rangefinder arms 32, 34 and the marked (5, 10, 15) rangefinder cross-hairs are preferably 0.25 inches of angle thick, and the intermediate range-finding cross-hairs are preferably 0.1 inches of angle thick. Line thicknesses may vary between reticles. In one embodiment, a single reticle may have a variety of line thicknesses.

Figure 13:
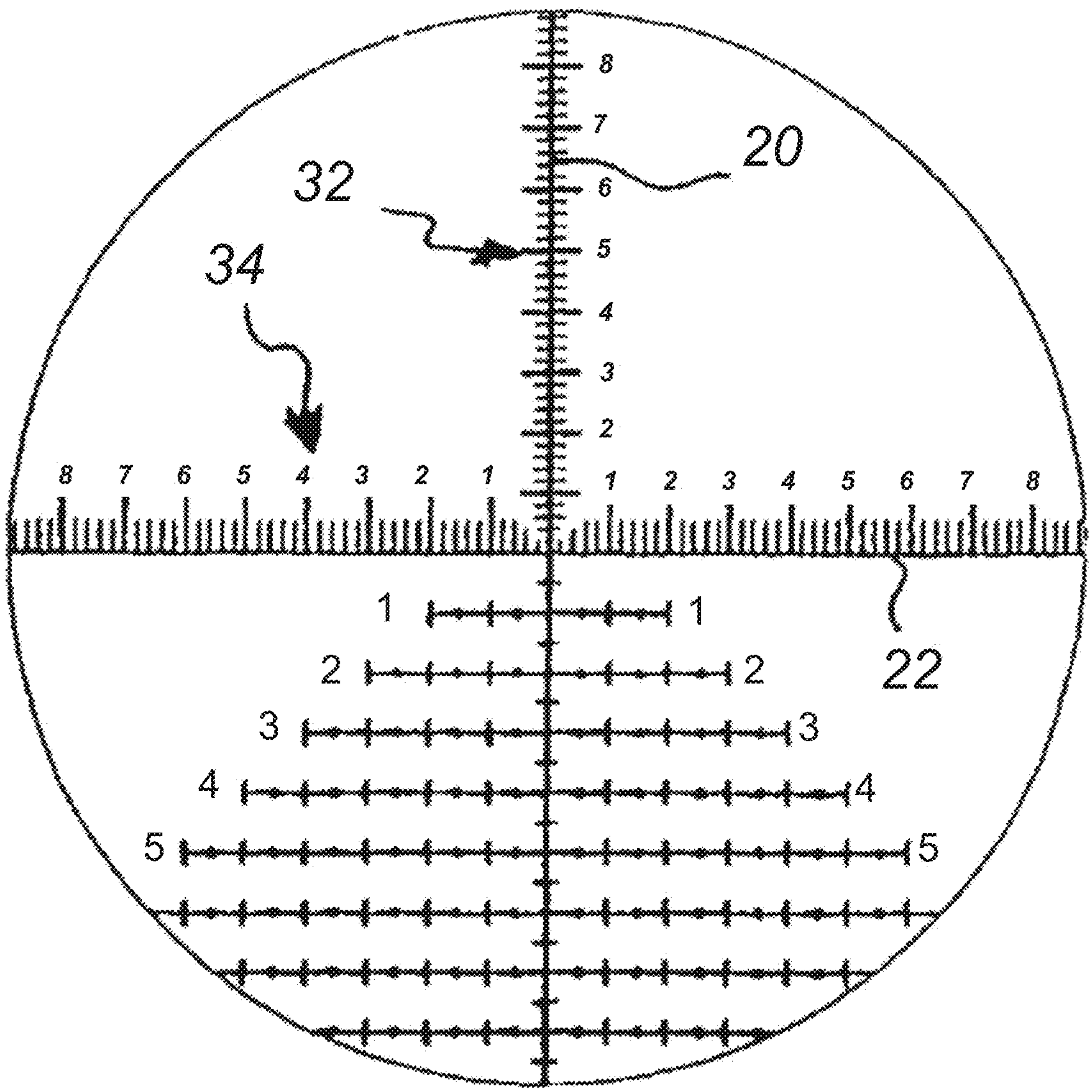
FIG. 13 is a front view of a reticle of the present invention in which the upper portion of the primary vertical cross-hair and the primary horizontal cross-hair have been provided with rangefinder markings of a United States Marine Corps Mil Radians scale, (where a circle equals 6,283 Mils/circle); or it may be calibrated in United States Army Mil scale (6,400 Mils/circle), or other Mil scale (e.g. 6000 mil/circle, 9000 mil/circle), or European, Russian, or other variations of the Mil scale.
Figure 14:
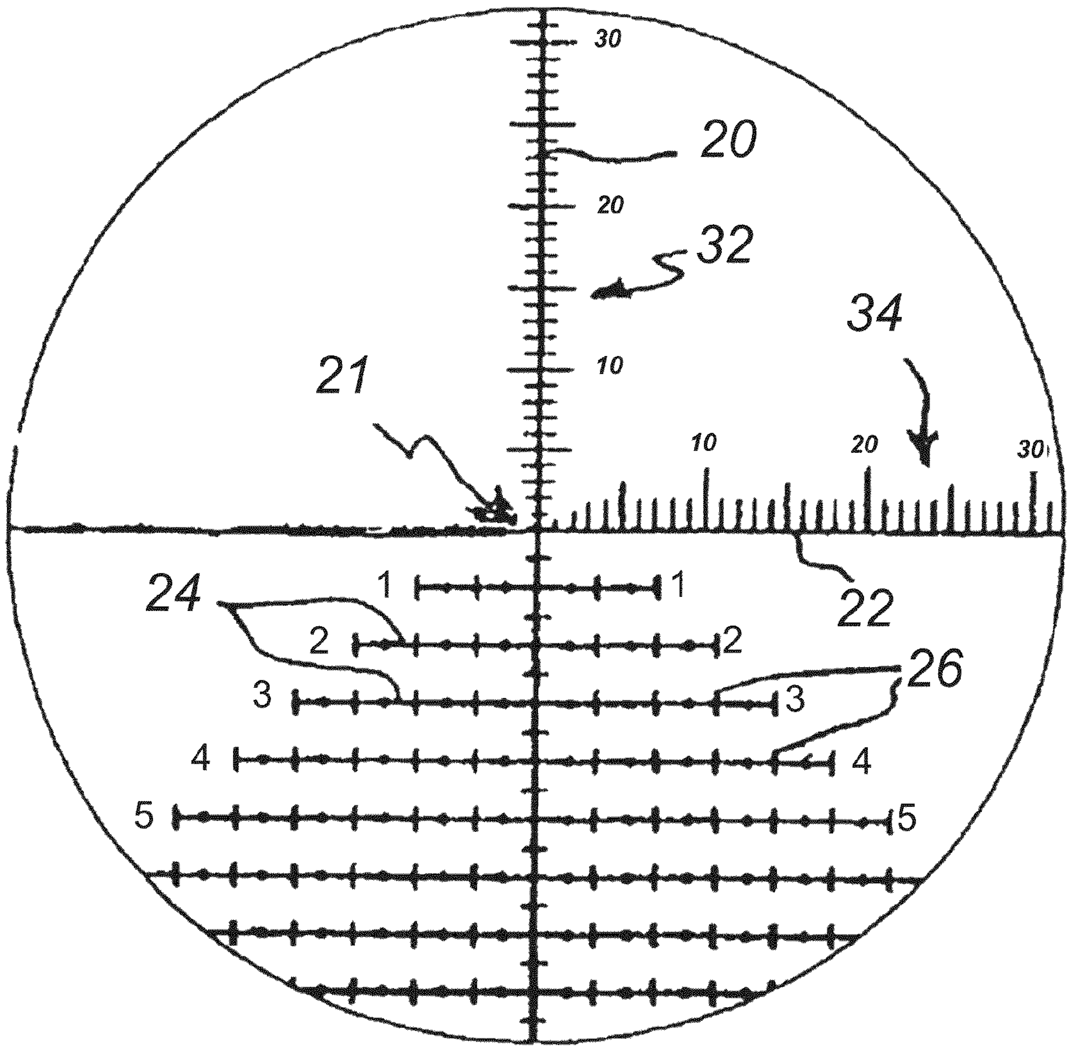
FIG. 14 is a front view of a reticle of the present invention in which the upper portion of the primary vertical cross-hair and the primary horizontal cross-hair have been provided with rangefinder markings of an "inches of angle" (IOA™) scale.
Figure 15:
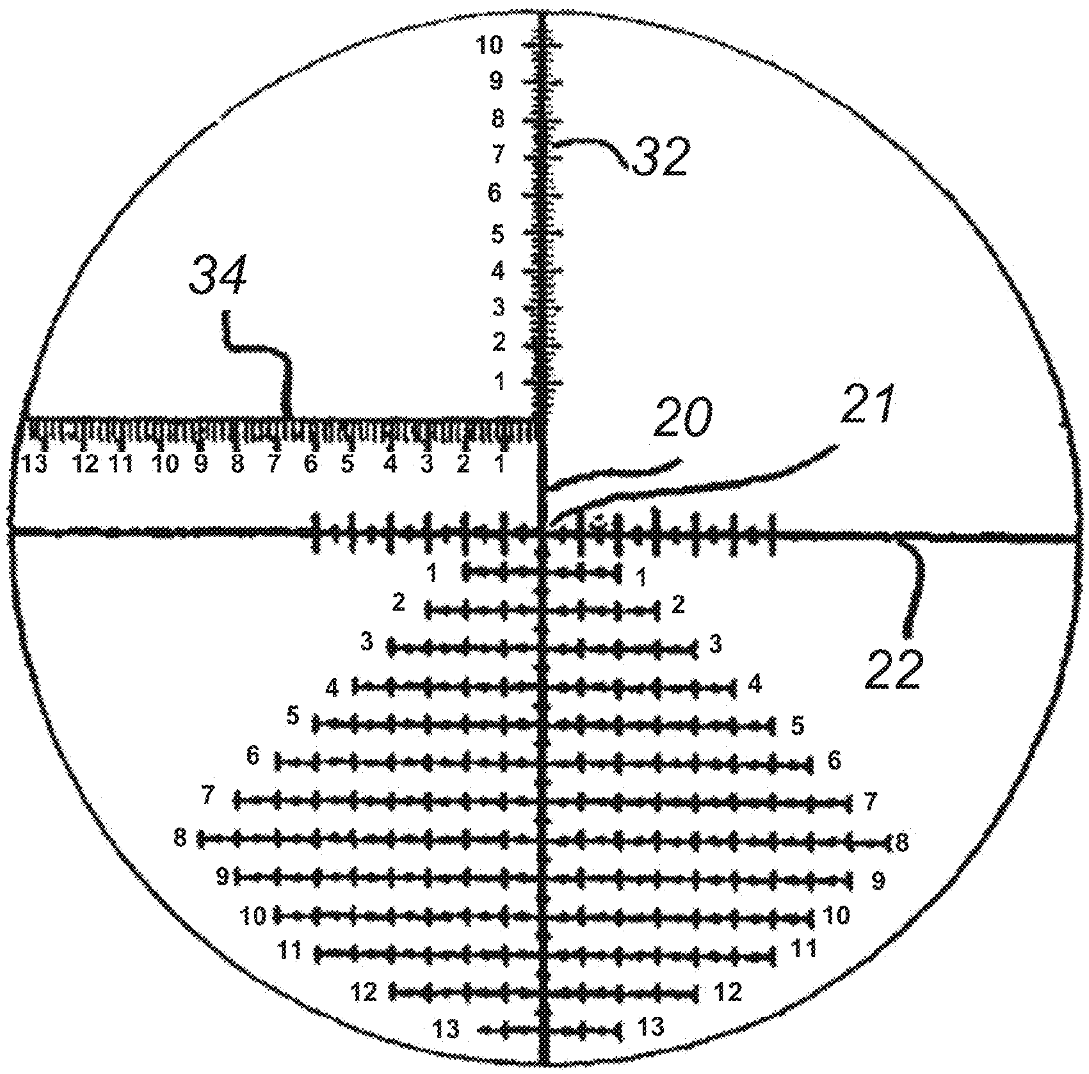
FIG. 15 is a front view of a reticle of the present invention in which a horizontal rangefinder bar intersects the primary vertical cross-hair at a position above the intersection with the primary horizontal cross-hair, and primary vertical cross-hair and horizontal rangefinder bar have been provided with rangefinder markings of any desirable scale.

As shown in FIGS. 13-15, the rangefinder can be positioned at any convenient site in the reticle. It is possible to use the primary vertical cross-hair 20 and/or primary horizontal cross-hair 22 as the rangefinder, obviating the need for additional lines in any sector formed by the intersecting primary vertical and horizontal cross-hairs. This is preferred because it provides a less cluttered, and therefore less distracting, field of view.

As shown in FIG. 13, the upper portion of the primary vertical cross-hair 20 can be provided with rangefinder markings of any scale to form a rangefinder vertical arm 32. Likewise, substantially the entire primary horizontal cross-hair 22 can be provided with rangefinder markings of any scale to form a rangefinder horizontal arm 34. Typical scales include the "inches of angle" or "centimeters of angle" scale introduced by the parent and grandparent applications from which this application claims priority, as well as conventional scales such as USMC Mil Radian scale, US Army Mil Radian scale, or minute of angle scales can also be used.

As shown in FIG. 14, the rangefinder horizontal arm 34 can be superimposed over only a portion of the primary horizontal cross-hair 22. Although FIG. 14 illustrates an example where the rangefinder horizontal arm 34 is located to the right of the intersection 21 between the primary vertical cross-hair 20 and the primary horizontal cross-hair 22, one skilled in the art will realize that the rangefinder horizontal arm 34 could just as easily be located to the left of intersection 21. The scale on the rangefinder markings can, if desired, be drawn to a different scale from that provided for the line thickness and spacing between the secondary vertical cross-hairs 26 and secondary horizontal cross-hairs 24. For example, an experienced shooter may be provided the rangefinder markings in an inches of angle scale to speed up the process of determining the range to target, and then have the spacing between the secondary horizontal cross-hairs 24 and secondary vertical cross-hairs 26 provided in a more conventional (and hence more familiar) scale that the experienced shooter can use to calibrate and shoot the weapon, such as, for example, a USMC Mil Radian scale.

In one embodiment, only one arm of the rangefinder is superimposed on either the primary vertical cross-hair 20, or the primary horizontal cross-hair 22. As shown in FIG. 15, the rangefinder vertical arm 32 can be superimposed over the primary vertical cross-hair 32 with a rangefinder horizontal arm 34 extending into an upper quadrant and intersecting the primary vertical cross-hair 20 at a position above intersection 21. Although FIG. 15 shows the rangefinder horizontal arm 34 extending into the upper left quadrant, it could just as easily be positioned in the upper right quadrant. Likewise, the rangefinder horizontal arm 34 could be superimposed over the primary horizontal cross-hair 22 and a rangefinder vertical arm 32 could intersect the primary horizontal cross-hair 22 at a position to the left or to the right of intersection 21 and extend upwards into the left or right sectors.

To use a target acquisition device and reticle of the present invention, it is preferred that the shooter becomes familiar with the characteristics of the firearm, projectile and ammunition to be used. The target acquisition device and reticle can be calibrated to work with almost any type of firearm, for example, handguns, pistols, rifles, shotgun slug guns, muzzleloader rifles, single shot rifles, semi-automatic rifles and fully automatic rifles of any caliber, air rifles, air pistols, chain guns, belt-feed guns, machine guns, and Gattling guns, to high elevation or over the horizon projectile devices, artillery, mortars, or canons or rail guns of any caliber. The target acquisition device and reticle can be calibrated to work with any type of ammunition, for example, a projectile comprising a primer, powder, a casing and a bullet, a hybrid projectile lacking a casing, a muzzle-loaded projectile, gas or air-powered projectile, or magnetic projectile.

Calibration of the Target Acquisition Device and Reticle

To calibrate the target acquisition device and reticle, in some preferred embodiments, the shooter first determines the ballistics based upon the characteristics of the weapon and ammunition to be used. Calibration for range and distance to target can follow many methods. For example, manual methods of calibration require no computer, involve trial and error by the shooter, and provide back up when higher technology-based methods fail or are not available. Computer-based calibration of the target acquisition device and reticle may be performed, for example, on desktop, laptop, and handheld personal computing systems.

The target acquisition devices and reticles of the present invention may also be calibrated using second shot methods without the shooter taking his or her eye off the target, or the rifle from the shoulder. For example, if the shooter misses on the first shot due to misjudgment of windage effect, range-to-target or other factors, the shooter may use the reticle's marked grid lines for second-shot correction to fire a quick second shot, putting the bullet on target without calculations, and without adjustment of the target acquisition device's windage or elevation knobs. Using this method, on taking the second shot the shooter repeats the first shot exactly with reference to shooting position, sight picture, and trigger control. The only difference will be the point of targeting on the reticle. After the first shot, the shooter must remember the elevation marker line employed for the first shot, the site held on the target for the first shot, and the point where the first bullet impacted in relation to the target on the first shot. Looking through the scope, the shooter then puts the cross-hairs on the original aiming point, and notes where the bullet impacted in reference to the grid. That point of impact on the grid becomes the new targeting point for a quick and accurate second shot.

For example, as shown in FIGS. 41*a-f*, suppose the shooter is aiming at a long-range target, using dead center of Line 8 on the reticle of the present invention for drop compensation. After firing, and missing the bullseye, the shooter notes where the bullet impacted on the target. Looking through the scope, the shooter then puts the dead center of Line 8 on the target. Without moving off the target, the shooter notes on the grid where the bullet struck. Suppose, for example, the bullet struck on Line 7, and 2 hackmarks to the right of center. Line 7, 2 hackmarks to the right then becomes the new aiming point (cross-hair) for the second shot. Placing the target on Line 7-2 hackmarks to the right, the shooter squeezes the trigger and hits the aiming point.

After a range table is generated for a set of conditions, and a shot is taken based on the solution at a given distance at, for example, 5 horizontal marks down and 2 vertical marks to the right at 800 yards, but the shot misses two more marks down and one more mark right, instead of back tracking to find which input parameter may be in error, the shooter rapidly inputs this additional adjustment into the ballistics calculator, and the calculator will make the appropriate corrections across the entire range table based on the input.

Manual Calibration of the Target Acquisition Device and Reticle

For example, suppose the weapon to be used is a .50 caliber Bolt Action Rifle, Model M-93 with a 30 inch barrel built by Harris Gunworks in Phoenix, Ariz. The cartridge selected is 0.50 Cal Browning Machine Gun cartridge, each of which is constructed from a brass case (made by Winchester), primer (CCI #35); powder (218 grains ACC #8700 by Accurate Arms Powder), and bullet (750 grain AMAX Match bullet by Homady, ballistic coefficient .750). Any conventional computer based ballistics program can then be used to determine bullet drop for this weapon/ammunition combination, such as, for example, the program written by W.R. Frenchu entitled "Ballistic V.4.0" which was copyrighted 1988 and is based upon Ingalls' table, or "Ballistic Explorer for Windows," sold by Oehler Research of Austin, Tex., and range values for secondary horizontal cross-hairs and cross-wind offset values for secondary vertical cross-hairs calculated manually.

The first step requires the user to zero the selected weapon by firing at a target of known size at a known distance from the muzzle of the gun. For example, if the user decides to zero the weapon at 500 yards, a target of known size is placed exactly 500 yards away (preferably using a measuring device, such as a steel tape, to be certain the distance is accurate), and typically 3-5 shots are fired at the target using the intersection of the primary horizontal and primary vertical cross-hairs as the aiming point. If a 5 inch (or smaller) group in the center of the target is produced, the rifle is zeroed. If the group is significantly larger, there may be a problem with the rifle, the ammunition, or existing weather conditions. If the group is correctly sized, but above, below, to the right or to the left of center of the bullseye, the windage and elevation knobs of the target acquisition device are adjusted and the process repeated until the group is centered as desired using the intersection of the primary horizontal and primary vertical cross-hairs as the aiming point. Once the target acquisition device and firearm has been zeroed, there will be no further need to change the windage and elevation knobs of the target acquisition device, since a user can simply select the correct aiming point for the range to a target by using the reticle markings.

Next, the shooter "calibrates" or assigns values to the cross-hair markings on the reticle. See, e.g., FIG. 5, which provides a table with a zero at 500 yards. Other tables can be calculated with zero values at other ranges. 500 yards has been selected here solely for the purposes of illustration. To assist the shooter in understanding how to manually "calibrate" the reticle, a worksheet, such as that illustrated in FIG. 6 can be used.

Next, the shooter can select the size of the bullseye (or target area) to be hit using a reticle of the present invention. For example, a selected bullseye could be 6 inches in diameter, 10 inches in diameter, 12 inches, 36 inches, 48 inches etc. A hit anywhere in the bullseye counts as a direct hit. For the purposes of this example, a 12 inch bullseye from a range of point blank to 1000 yards and a 36 inch bullseye from 1100 yards to 1650 yards were used.

When the shooter sees the reticle through the eyepiece, the secondary horizontal cross-hairs can be seen. In this example, the cross-hairs are evenly spaced 2.5 inches of angle apart. Thus, the spacing between the primary horizontal cross-hair 22 shown in FIG. 2, and the first secondary horizontal cross-hair below the primary horizontal cross-hair 22 is 2.5 inches of angle. The spacing between the primary horizontal cross-hair 22 and the secondary horizontal cross-hair labeled "5" is 15 inches of angle. This means that adjacent cross-hairs would span a 2.5 inch target at 100 yards. The space between the primary horizontal cross-hair and the secondary horizontal cross-hair labeled "5" would cover a 15 inch target at 100 yards. At 200 yards, adjacent cross-hairs will span a target of 5 inches, and the space between the primary horizontal cross-hair and the secondary cross-hair labeled "5" would cover a 30 inch target. At 600 yards, adjacent cross-hairs will span a target of 15 inches, the space between the primary horizontal cross-hair and the secondary horizontal cross-hair labeled "5" would cover a 90 inch target, and so on. As can be seen, there is a linear relationship between the inches of angle scale and the range to the target in yards.

Figure 6:
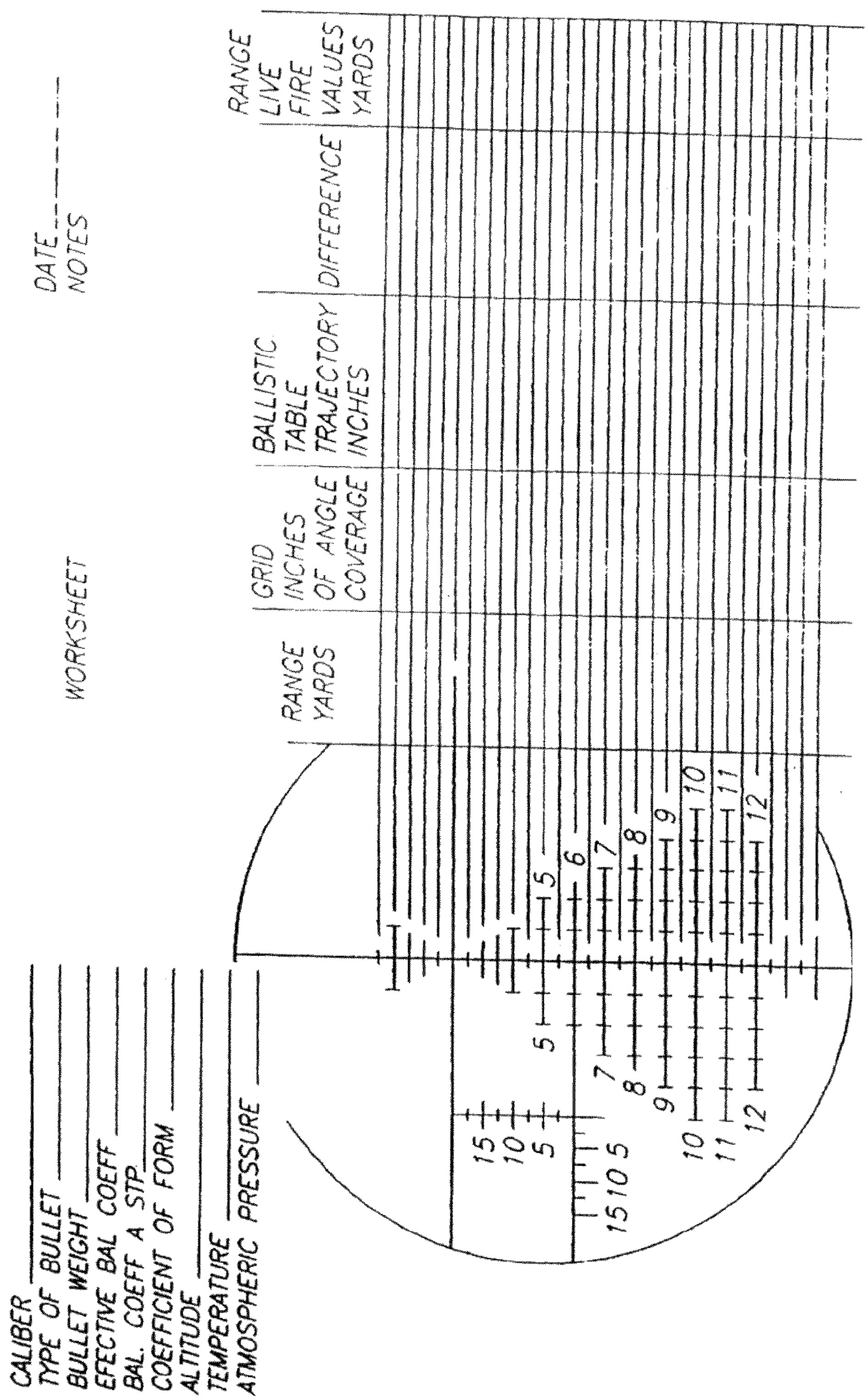
FIG. 6 is an example of a worksheet that can be used to calibrate the markings on a reticle in some embodiments of the present invention.

Using a table such as that shown in FIG. 5, and a worksheet, such as that shown in FIG. 6, the shooter can "calibrate" a target acquisition device of the present invention for the particular firearm and ammunition selected. For this example, a 500 yard zero table was selected for purposes of illustration. Therefore, the shooter marks the primary horizontal cross-hair 22 on the worksheet with the number 500 (e.g., if the target were exactly 500 yards down range, the shooter would select an aiming point along the primary horizontal cross-hair 22 to hit the target). The range value of the first secondary horizontal cross-hair below the primary horizontal cross-hair can then be calculated. Estimating a value of between 600 and 700 yards, the shooter can determine the closest value by calculating the inches of angle at 600 and 700 yards (which corresponds to bullet drop)

$$\frac{2.5 \text{ inches of angle}}{100 \text{ yards}} \times 600 \text{ yards} = 15.10 \text{ inches of angle}$$

$$\frac{2.5 \text{ inches of angle}}{100 \text{ yards}} \times 700 \text{ yards} = 17.50 \text{ inches of angle}$$

These calculated values are matched with the values shown in the selected Ingalls table (in this example, the 500 yard zero table shown in FIG. 5). The 600 yard range on the table shows a trajectory of 18.4 inches. The 700 yard range on the table shows a trajectory of -44.6 inches. Since the calculated bullet drop at the first secondary horizontal marker is 15.1 inches, and this most closely correlates with the trajectory shown in the Ingalls table for 600 yards (−18.4 inches), the first secondary horizontal cross-hair below the primary horizontal cross-hair is marked on the worksheet as 600 yards. Although the actual bullet impact should be 3.3 inches below the dead center of the 12 inch diameter bulls eye (18.4−15.1=3.3), this is close enough since a hit is considered to be anything within the 12 inch bulls eye.

Figure 7:
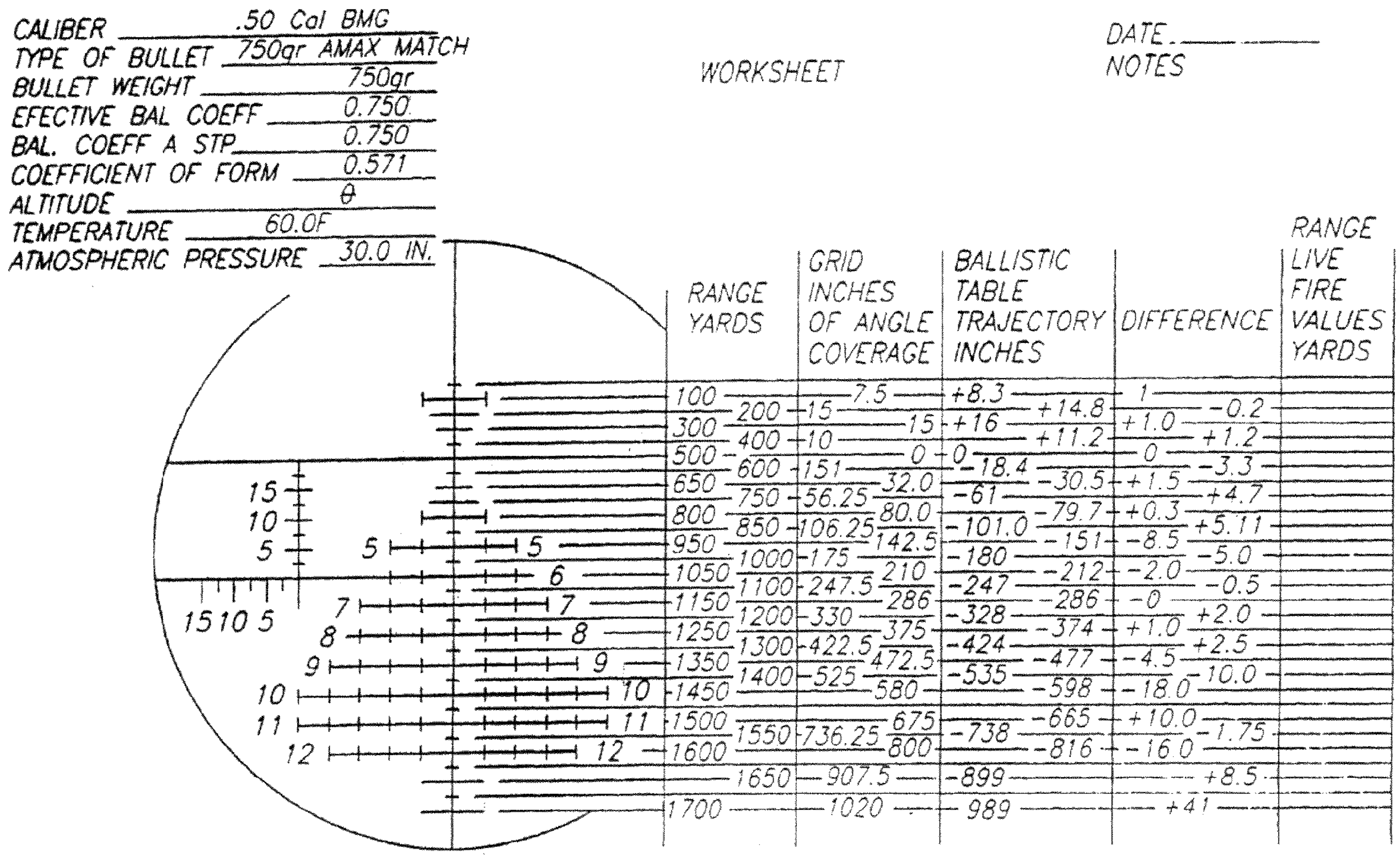
FIG. 7 is a completed worksheet based upon the table shown in FIG. 5.

The shooter can then repeat this process to calibrate the reticle for every secondary horizontal cross-hair below the primary horizontal cross-hair. The results in this example, shown in FIG. 7, can be used to shoot at any target within a range up to 1700 yards. Longer ranges can also be calibrated using a zero table for a longer range (e.g., anything from a 600 yard zero table to a 2500 yard zero table). Once the worksheet is completed, it can be cut out and taped, for example, to the stock of the shooter's firearm or carried by the shooter for easy reference.

Alternatively, the shooter can locate the secondary horizontal cross-hair to use for an aiming point for a specific range. For example, using the same 500 yard zero chart found in FIG. 5, if the shooter wishes to hit a target at 1100 yards, she estimates two or three secondary horizontal cross-hairs which should bracket the correct secondary horizontal cross-hair to use as an aiming point. The shooter guesses the correct cross-hair is between the cross-hair identified as 6 and the cross-hair identified as 8. She then performs the same calculation: Cross-hair #6:

$$\frac{20 \text{ inches of angle}}{100 \text{ yards}} \times 1100 \text{ yards} = 220 \text{ inches of angle}$$

Cross-hair #7:

$$\frac{25 \text{ inches of angle}}{100 \text{ yards}} \times 1100 \text{ yards} = 275 \text{ inches of angle}$$

Cross-hair #8:

$$\frac{30 \text{ inches of angle}}{100 \text{ yards}} \times 1100 \text{ yards} = 330 \text{ inches of angle}$$

Looking at the 500 yard table, the bullet drop at 1100 yards is 247 inches. This looks fairly close to mid-way between. To double check this estimate, the shooter can run the calculation for the unlabeled secondary horizontal cross-hair between cross-hair 6 and cross-hair 7, which is located 22.5 inches of angle below the primary horizontal cross-hair:

$$\frac{22.5 \text{ inches of angle}}{100 \text{ yards}} \times 1100 \text{ yards} = 247.5 \text{ inches of angle}$$

This value most closely approximates the trajectory according to the 500 yard zero Ingalls table used for this example, and, if used should correspond to a point exactly 0.5 inches off dead center.

Once the target acquisition device has been calibrated for the weapon and ammunition specified, the shooter can test the calculated values against actual performance at a range. The values generated using computer projections, ballistic tables and calculations are only a guide; however, they should be quite close to actual performance. It is preferred that the final range value assigned to each secondary horizontal cross-hair should be based on an actual line firing test of the selected weapon and ammunition at various ranges. A minimum of three shots should be used for the final confirmation of the estimated values.

Computer Calibration of the Target Acquisition Device and Reticle

In comparison to manual calibration of the target acquisition device and reticle, it is easier, and therefore preferable to use a ballistics calculator programs of the present invention, for example the "TRAG1S program" family, the "ATRAG program" family, and other TRAG programs which are available from Horus Vision, LLC, 659 Huntington Ave, San Bruno, Calif. 94066, to calculate accurate values for the cross-hairs and all secondary lines of the reticle of the present invention or, for example, to identify a single firing solutions for a given target, using a personal computer, monitor and printer, firearm and cartridge, scope and reticle, and peripheral devices (for example, laser rangefinders, weather monitoring devices, global positioning systems, etc.), the combination of which is hereinafter refer to as a "ballistics calculator system." This program is a modified version of the Ballistics program written by William C. Davis of Tioga Engineering which has been adapted to directly calculate values for a reticle of the present invention, in addition to values for conventional reticles, and to run on any computational device, including Windows-based PC's or personal digital assistant ("PDA"). The program is preferably loaded into internal memory accessible by the device, such as, for example, by installing it on a hard drive. In one embodiment, the program is provided on a floppy disc, CD, DVD, ROM chip, or other similar device or medium that is accessible by the controller. In a further embodiment, for PDA type devices, the program is installed on internal memory, or stored on a plug-in device or medium (such as an insertable ROM chip or memory stick).

As used herein, the terms "computer memory" and "computer memory device" refer to any storage media readable by a computer processor. Examples of computer memory include, but are not limited to, RAM, ROM, computer chips, digital video disc (DVDs), compact discs (CDs), hard disk drives (HDD), and magnetic tape.

As used herein, the term "computer-readable medium" refers to any device or system for storing and providing information (e.g., data and instructions) to a computer processor. Examples of computer readable media include, but are not limited to, DVDs, CDs, hard disk drives, memory chip, magnetic tape and servers for streaming media over networks.

As used herein, the terms "processor" and "central processing unit" or "CPU" are used interchangeably and refer to a device that is able to read a program from a computer memory (e.g., ROM or other computer memory) and perform a set of steps according to the program.

Figure 16A:
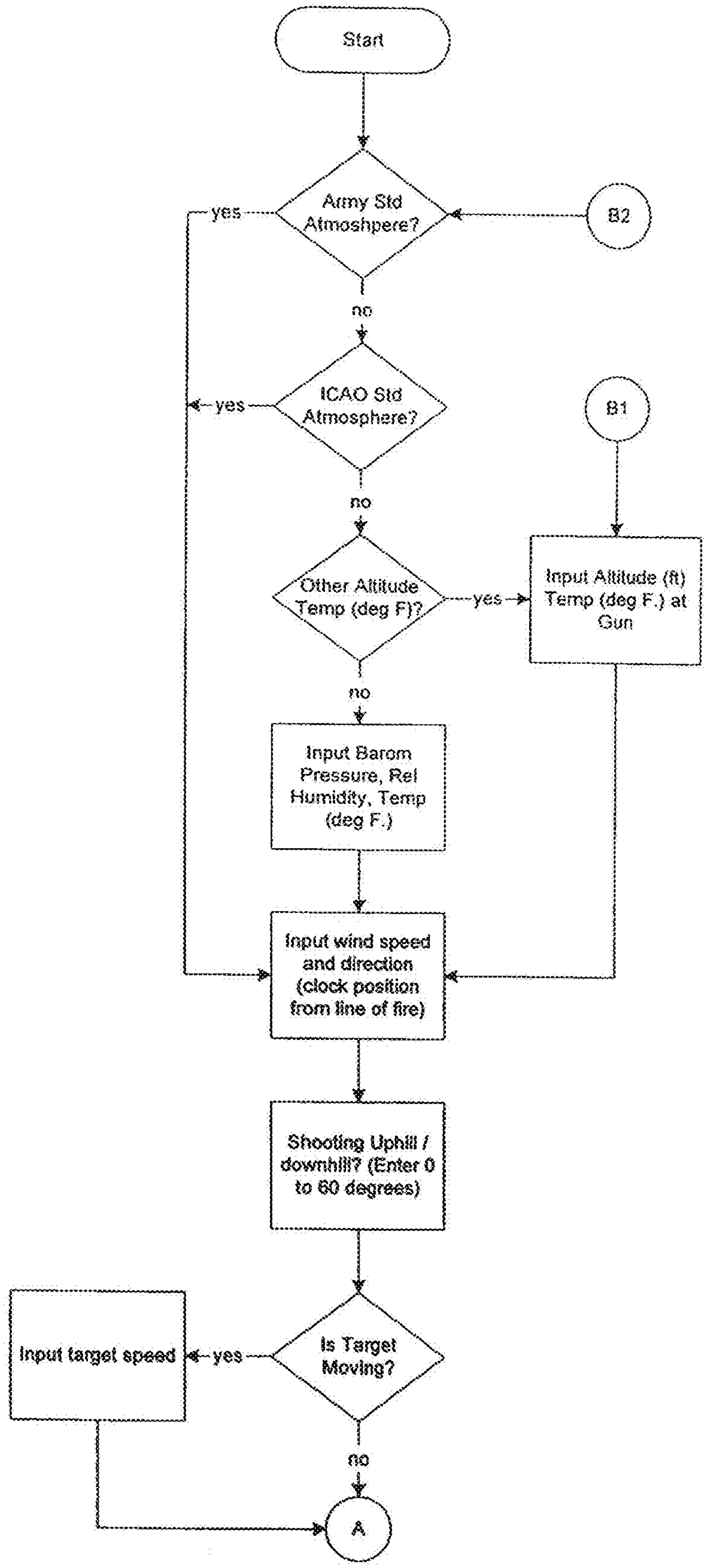
FIG. 16*a* is a flow chart illustrating the data inputs relating to external conditions at the range required by the TRAG1S5 Ballistics Computer Program.
Figure 16B:
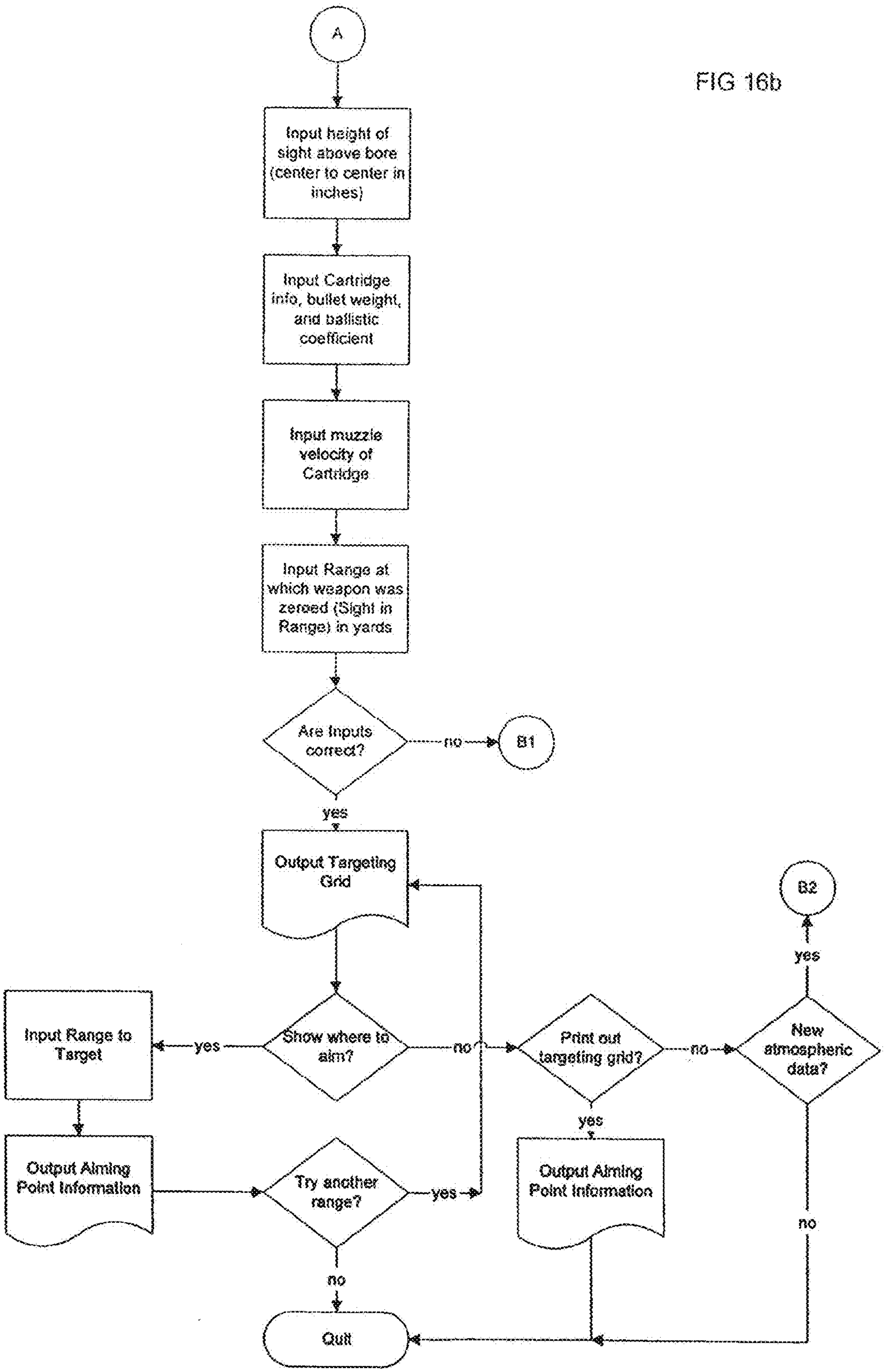
FIG. 16*b* is a flow chart illustrating the data inputs relating to weapon and ammunition required by, and outputs produced by, the TRAG1S5 Ballistics Computer Program.

In one embodiment, the process begins, as explained in detail above, by zeroing the weapon. In a further embodiment, the shooter may begin at any point in the program, or allow the program to determine the zero point. Once the weapon has been zeroed at a known range, the program is started. FIGS. 16*a* and 16*b* illustrate the data which is input, and the targeting information which is output, and which enables the calibration of the cross-hairs of a reticle of the present invention.

Information Regarding External Conditions

For the PC-based version of this Program, as shown in FIG. 16*a*, information regarding external factors are requested by the system and input by the user in response to each query as it appears on the monitor screen. In one embodiment, data is entered into the system using any conventional input device linked to the system, such as a keyboard, mouse, touch-screen and the like. In a further embodiment, a voice recognition system using a microphone and appropriate software for converting the spoken words to data is used to input data. In yet a further embodiment, cabled or wireless means from other measuring devices and sources is used to input data, for example Bluetooth™. In a preferred embodiment, instruments for data input, for example the Kestrel handheld device or similar handheld, laptop or desktop device, handheld global positioning system (GPS) or similar device, Leica Vector 0.4 rangefinder or similar device, and the like, are integrated with the computing device in such a way as to allow input data items to be made available to the ballistic program. In some embodiments, a direct connection is made between the external instruments and the calculator. In some embodiments, the information is passed via transmission, that is, partially or totally wireless (e.g., radio, satellite, etc.) or IR beaming. In some embodiments, the calculator is an integrated into the external device. The calculator and or any of the other associated devices may be provided in any form, including, but not limited to, computer, handheld device, traditional calculator, wristwatch, gun, visor, phone, video monitor, etc.

The first screen in this embodiment requests the user to select from four possibilities for atmospheric conditions: (1) "Army Standard Metro" sea-level atmosphere (temperature=59 degrees Fahrenheit, atmospheric pressure=29.53 inches of mercury, and relative humidity=78 percent); (2) "ICAO Standard" sea-level atmosphere (temperature=59 degrees Fahrenheit, atmospheric pressure=29.92 inches of mercury and relative humidity=zero); (3) actual altitude and temperature at the shooting site (if known); or (4) actual barometric pressure, relative humidity, and temperature at the shooting site (if known). The program is modifiable to request additional information, and to expand or contract the options. The most accurate information which can be provided by the shooter is the actual barometric pressure, relative humidity and temperature at the shooting site. Altitude and temperature at the shooting site are used by the program to estimate a barometric pressure and relative humidity, and may be more accurate than either of the two standard conditions choices.

The system next requests the user to input information regarding wind-speed in miles per hour, meters per second, kilometers per hour, or knots per hour. Once this information has been input, the system requests the user to input wind direction (the clock position from the line of fire). Thus, if the wind is perpendicular to the line of fire and traveling from the shooter's right to the shooter's left, the wind direction would be "3" for the 3 o'clock position. If traveling in the opposite direction, the wind direction would be "9" for the 9 o'clock position. In a further embodiment, wind direction data is input by a system based on a 360 degree circle, with the number of degrees increasing in a clockwise direction around the shooter. For example, if the wind is perpendicular to the line of fire and traveling from the shooter's right to the shooter's left, the wind direction would be 90 degrees. Wind speed and direction is used by the system to calculate the appropriate adjustment to the aiming point at any effective range (that is, the number of vertical cross-hairs from the primary vertical cross-hair the aiming point will be offset into to wind so that the bullet will hit the target when it travels downrange).

Information Regarding the Firearm Being Used:

The next query requests information for one or more of the rate and direction of barrel twist (that is, right or left), barrel length, internal barrel diameter, system vibrational analysis, and internal barrel caliber. Spin drift is a force exerted on a spinning body traveling through the air due to uneven air pressure at the surface of the object due to its spinning. This effect causes a baseball to curve when a pitcher imparts a spin to the baseball as he hurls it toward a batter. To compensate for spin drift, the targeting program of the present invention can be modified to pose queries regarding the rifle twist characteristics, that is, the direction of twist in revolutions per unit barrel length, and the diameter of the bullet. In one embodiment, the firearm trigger is electronic and integrated with the ballistics calculator system.

Information Regarding the Cartridge Being Used

The next query requests textual information for identifying the type of projectile to be used. This information is not used in the calculations, but is printed out on the targeting grid so that the targeting grid for one projectile can be distinguished from subsequent targeting grids produced for other types of projectile. This information may be imported directly from a stored the gun list.

The next query, for example, requests the weight of the projectile in grains. This information is typically found on the box in which the ammunition or projectiles are packaged, or it can be found in ballistics manuals, by checking the projectile manufacturer's product literature, or by the shooter physically weighing the projectile.

The program can be modified to accept any other unit of weight as well, and information, such as the weight of the projectile for standard cartridges can alternatively be stored in memory and automatically retrieved by the program when the user selects a standard, defined cartridge.

The next query requests the ballistic coefficient of the projectiles. In some embodiments, a query requests information regarding the projectile's form factor, cross-sectional area, cross-sectional density, and angle of departure. In a further embodiment, the program can be modified to accept 2 or more ballistic coefficients for the same projectile. The Ballistic Coefficient (BC) can be entered as a value provided by the projectile manufacturer, for example this information is typically found on the box in which the ammunition or projectiles are packaged. Or the BC may be available from directly from the manufacturer or with reference to a manual. In one embodiment, the ballistics calculator system may access this information through a bar code imprinted on the ammunition box, or directly on the ammunition. However, this value may not always be available. In this circumstance, the BC can, for example, be determined by shooting the projectiles in known conditions and entering the observed impact of the bullet in relation to the point of aim. By taking the distance the gun is "zeroed" at, and measuring the "drop" of impact when shooting at another known distance, the values can be recalculated through algebra to derive the BC for the round used. The "drop" can, for example, be measured either by measuring the distance on the target directly with a ruler, or by observing and measuring through a reticle with known uniform hash marks. In a further embodiment, the information is stored in memory and automatically retrieved by the program when the user selects a standard, defined cartridge.

The next query requests the muzzle velocity of the projectile. Muzzle velocity (MV) is a function of the projectile's characteristics (for example, projectile weight, shape, composition, construction, design, etc.), the kind, quality and amount propellant used in the cartridge case, and the primer. Muzzle velocity is also a function of the barrel length of the firearm, such that the longer the barrel length, the greater the muzzle velocity. MV can, for example, be entered as a value provided by the projectile manufacturer typically found on the box in which the ammunition is packaged, or in the manufacturer's catalog, or for custom cartridges, standard cartridges, or to confirm the provided value, MV can, for example, be determined or checked experimentally using conventional equipment for measuring muzzle velocity.

The ballistic calculator of the present invention compensates for changing MV in relation to ambient air temperature by allowing entry of corresponding temperature/MV pairs into a numeric table. Using this data table, the ballistic calculator system is able to interpret the closest MV for the currently measured air temperature. Current air temperatures between any two pairs are interpolated proportionally between the corresponding MVs. Air temperatures outside of the lowest and highest temperature entries in the table are interpolated by extending the value slope of the last two end-points of the table. In a further embodiment, the information is stored in memory and automatically retrieved by the program when the user selects a standard, defined cartridge.

Information Regarding the Target Acquisition Device and Reticle being Used

As shown in FIG. 16*b*, once the external factors have all been entered, the system queries the user to enter information regarding the target acquisition device and reticle used. The first query requests the user to input the height of the target acquisition device above the bore of the gun. This is typically the distance between the optical center of the target acquisition device and the center of the gun barrel. The program can, for example, be modified to accept inputs in inches, centimeters, or any other conventional unit of measure. In one embodiment, the user inputs the type of target acquisition device and reticle, power of magnification, and plane of function. The final query requests the user to enter the range in yards, meters or other measure of distance at which the target acquisition device was zeroed for use with a specific firearm and projectile (i.e., the range at which the target acquisition device was "sighted" at zero for a specific firearm and cartridge). In one embodiment of the present invention, the target acquisition device of the present invention, and target acquisition devices used by spotters assisting the shooters are, for example, gyroscopically or electronically stabilized, collectively or independently, for image quality.

Information Regarding the Shooter

In one embodiment, the ballistics calculator system queries the user to input the shooter's eyesight acuity and idiosyncrasies, heart rate and rhythm, respiratory rate, blood oxygen saturation, muscle activity (as measured by the electromyogram), and brain wave activity (as measured by the electroencephalogram), or other physiologic variable. Input of this information may be automatic by continuous transducers affixed to the surface area of the shooter and integrated with the ballistics calculator by wire or in a wireless format. In this fashion, the ballistics calculator system indicates to the shooter the time to shoot with optimal accuracy taking into account, for example, movement artifact from ventilation, cardiac performance, or tremor from excitement or fatigue. In one embodiment, movement artifact of the shooter is corrected by the ballistics calculator system using stabilization of the target acquisition device. In a preferred embodiment, the ballistics calculator system of the present invention uses an indirect or, for example, electronic, trigger, wherein the shot is not taken immediately after the shooter pulls the trigger, or otherwise indicates readiness to take the shot, but firing is delayed until the system, using Artificial Intelligence, integrates information regarding the shooter and other target alignment information to optimize the probability of success in striking the target.

In a further embodiment, the ballistics calculator system queries the user for the number and positional coordinates of third person spotters (i.e., other than the shooter and a target). In an additional embodiment, the ballistics calculator system automatically queries other units to determine the number, location and type of third person spotters and devices. In another embodiment, one or more spotters assisting one or more shooters use target acquisition devices with reticles of the present invention, with the spotter's target acquisition device not attached to the shooter's firearm. The spotting target acquisition device can, for example, be used in conjunction with the target acquisition device on the firearm, or it can, for example, be used independently. In one embodiment, the shooter and spotters use identical target acquisition device reticles. The target acquisition devices and reticles used by shooters and spotters may be fixed or variable power. In a preferred embodiment, the spotting information and aiming points are projected on reticles shared by the shooter and spotters. In yet another embodiment, multiple shooters and spotters share optical or electronically linked target acquisition devices and reticles.

Information Regarding the Relation of the Shooter and the Target

In one embodiment, the ballistics calculator system queries the user for information regarding the range or distance from the shooter to the target. For example, the shooter may enter a distance estimated by reference to a rangefinder on the reticle of the present invention. In a further embodiment, the distance from the shooter to the target is provided by a peripheral device, for example, a laser rangefinder. In another embodiment, the distance from the shooter to the target is provided by spotters assisting the shooter by the use of a topographic map, or by triangulation.

Figure 20:
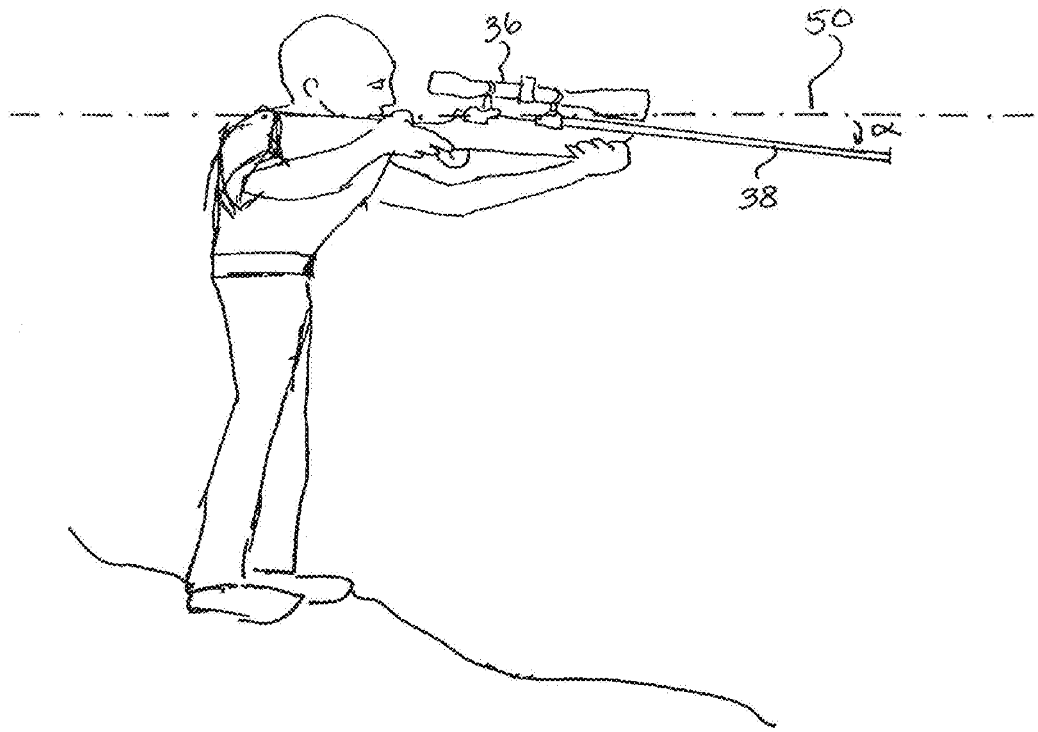
FIG. 20 illustrates the uphill/downhill angle produced when a rifle barrel is used to shoot at targets located above or below the shooter.
Figure 21:
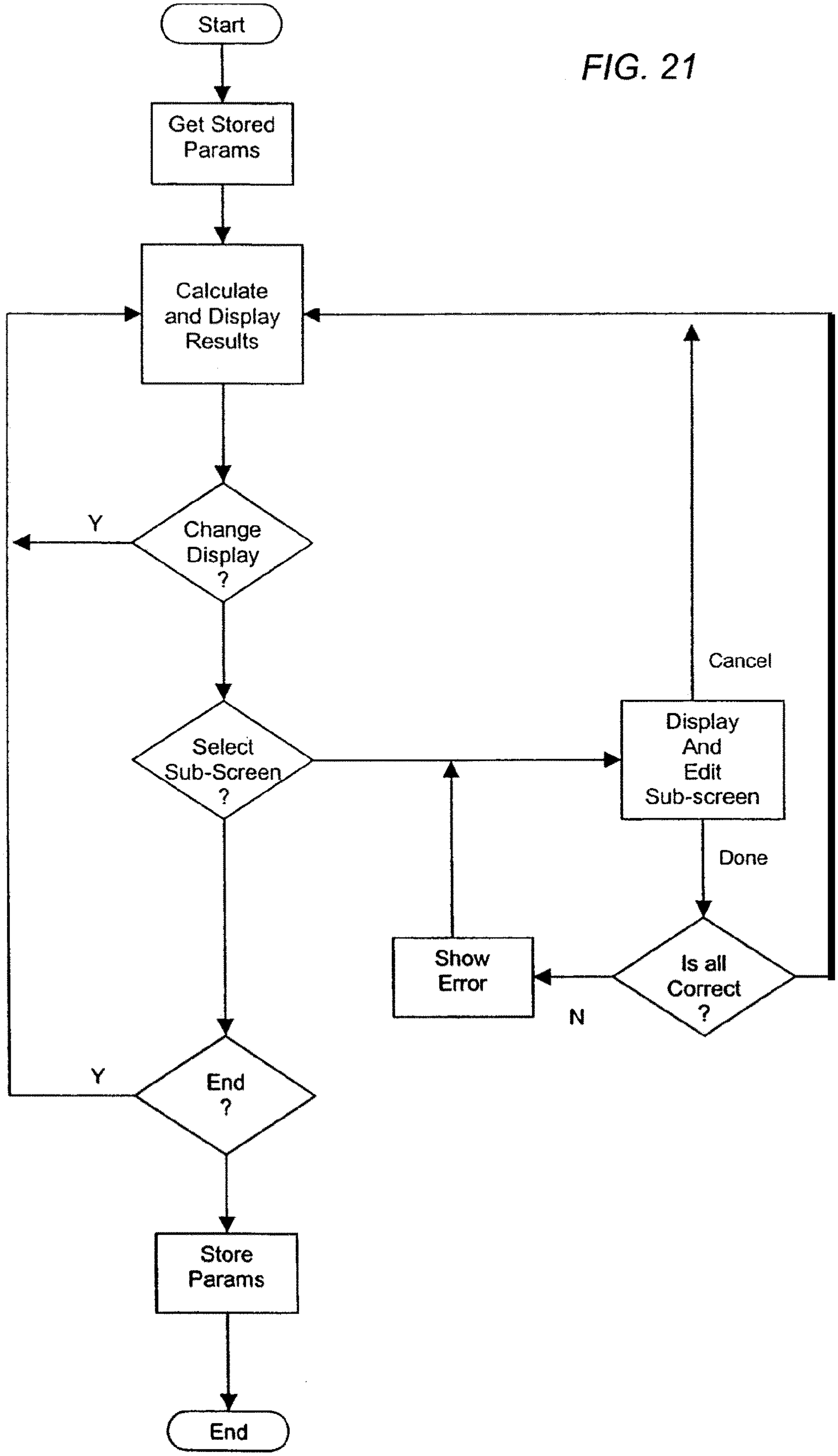
FIG. 21 is a flow chart illustrating the data inputs to the Ballistics Computer Program.
Figure 22:
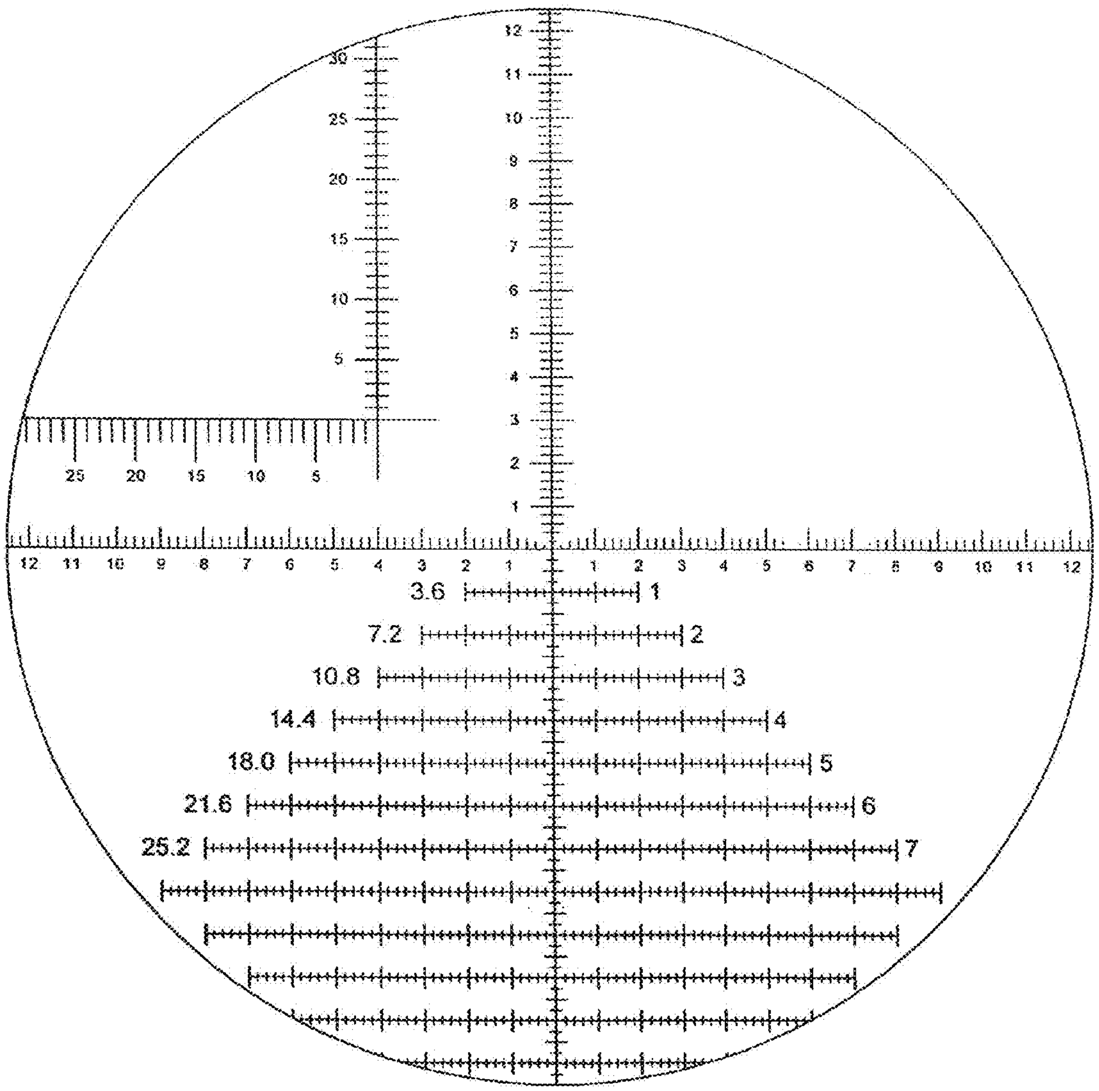
FIG. 22 is a front view of a reticle of the present invention, showing the markings as viewed through a zoom telescopic gunsight at high power suitable for use, for example, in varmint and target shooting.
Figure 23:
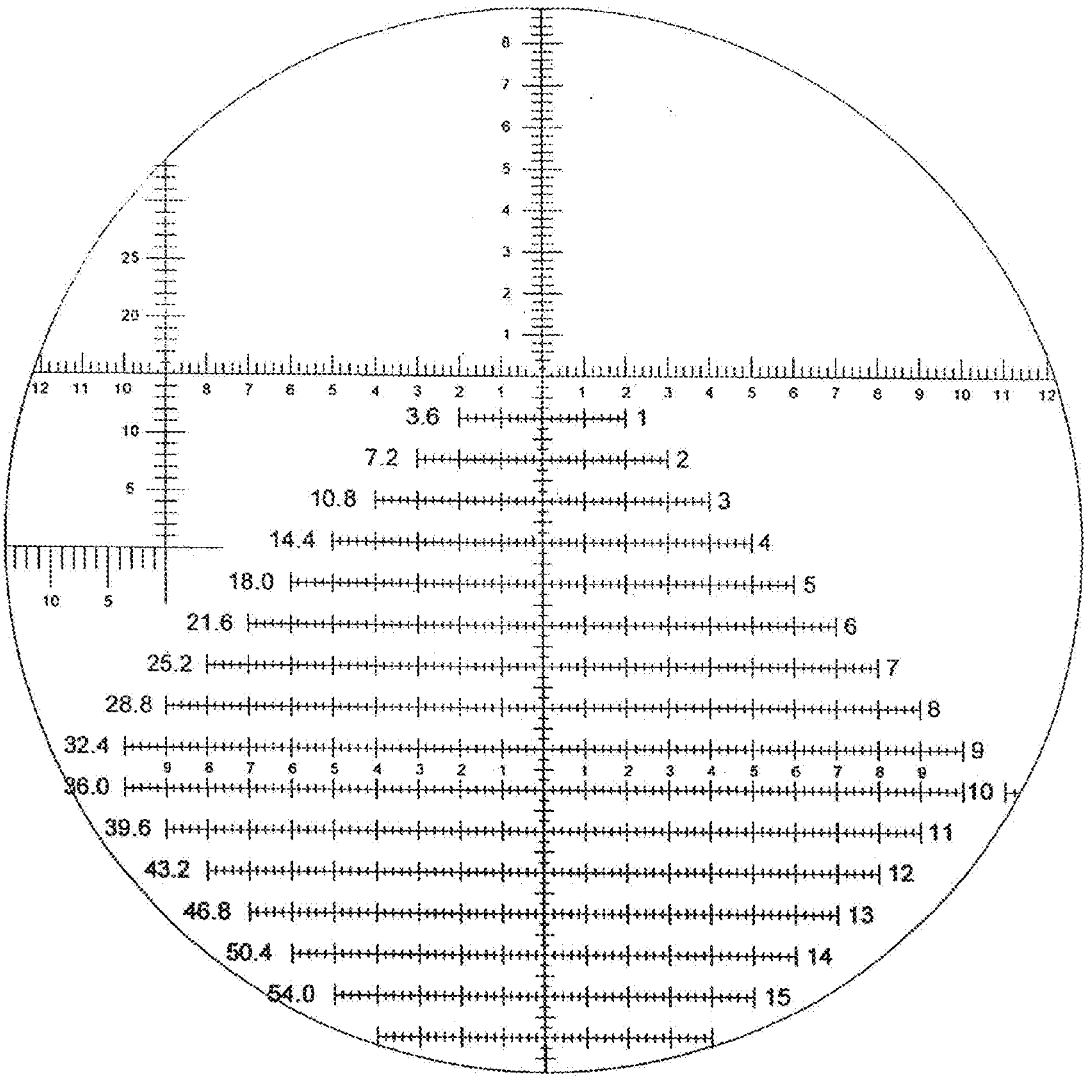
FIG. 23 is a front view of a reticle of the present invention, showing the markings as viewed through a zoom telescopic gunsight at high power suitable for use, for example, in varmint and target shooting.
Figure 24:
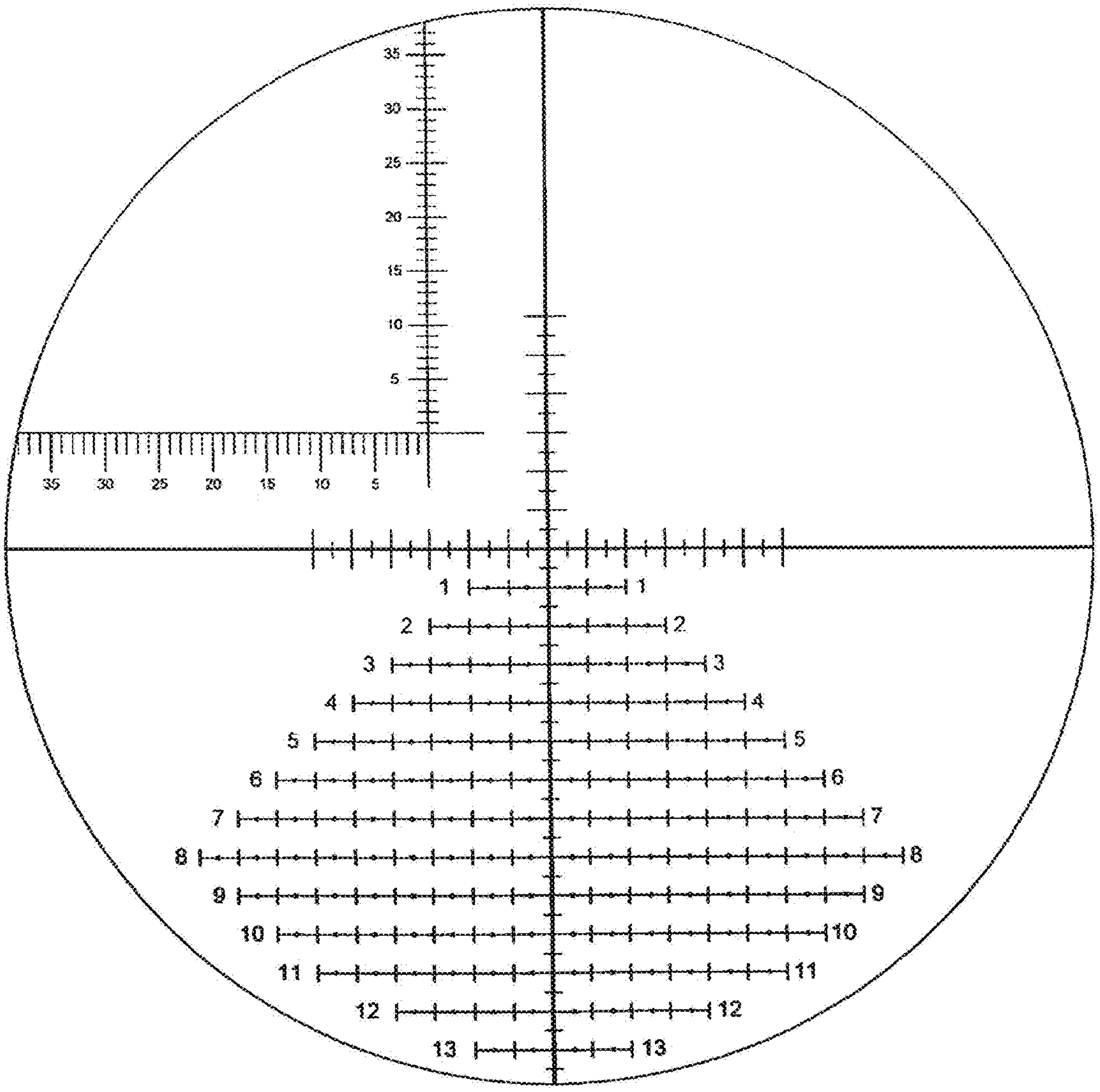
FIG. 24 is a front view of a reticle of the present invention, showing the markings as viewed through a zoom telescopic gunsight at high power suitable for use, for example, in general hunting, military, and police applications.
Figure 25:
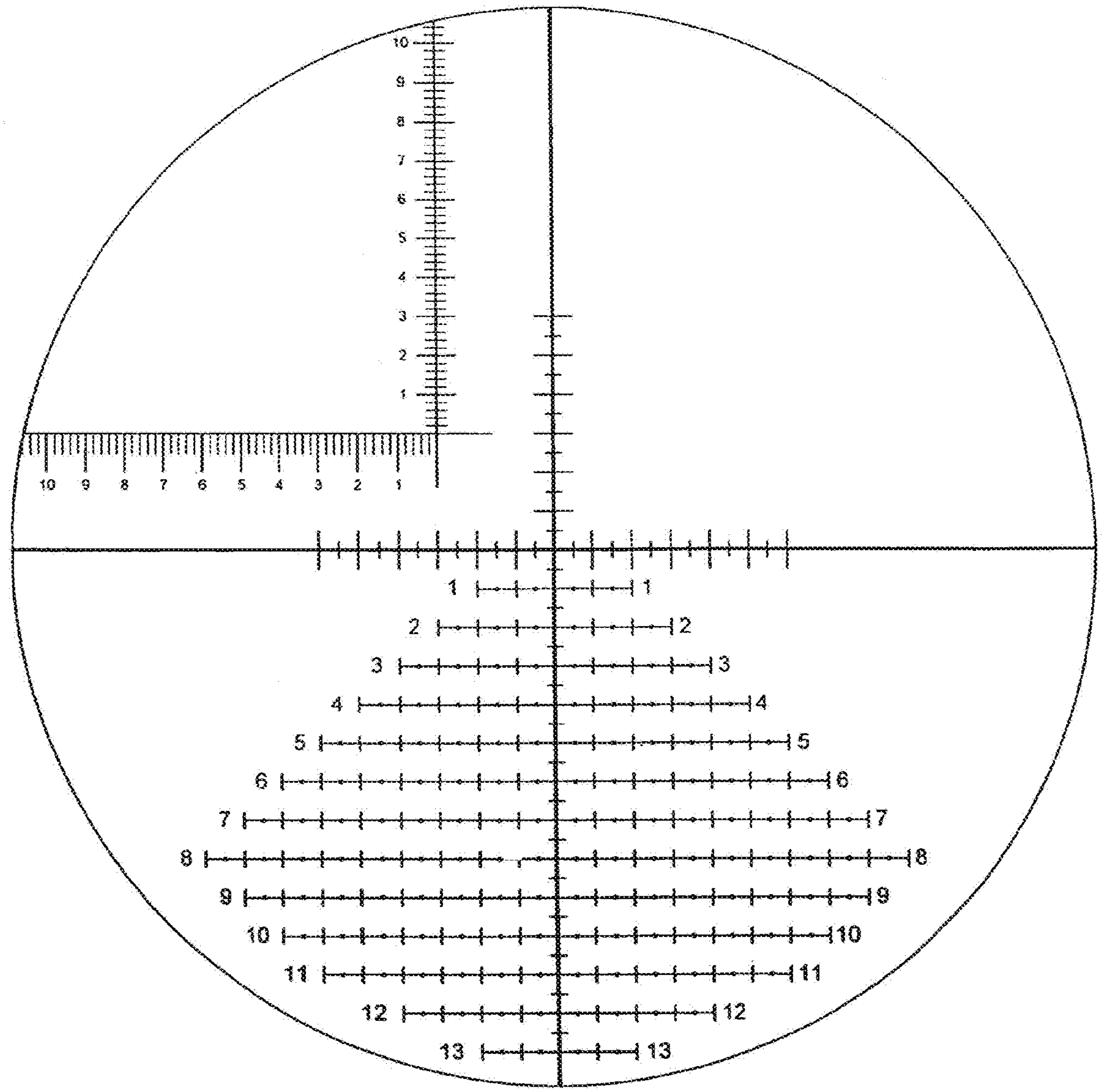
FIG. 25 is a front view of a reticle of the present invention, showing the markings as viewed through a zoom telescopic gunsight at high power suitable for use, for example, in general hunting, military, and police applications.
Figure 26:
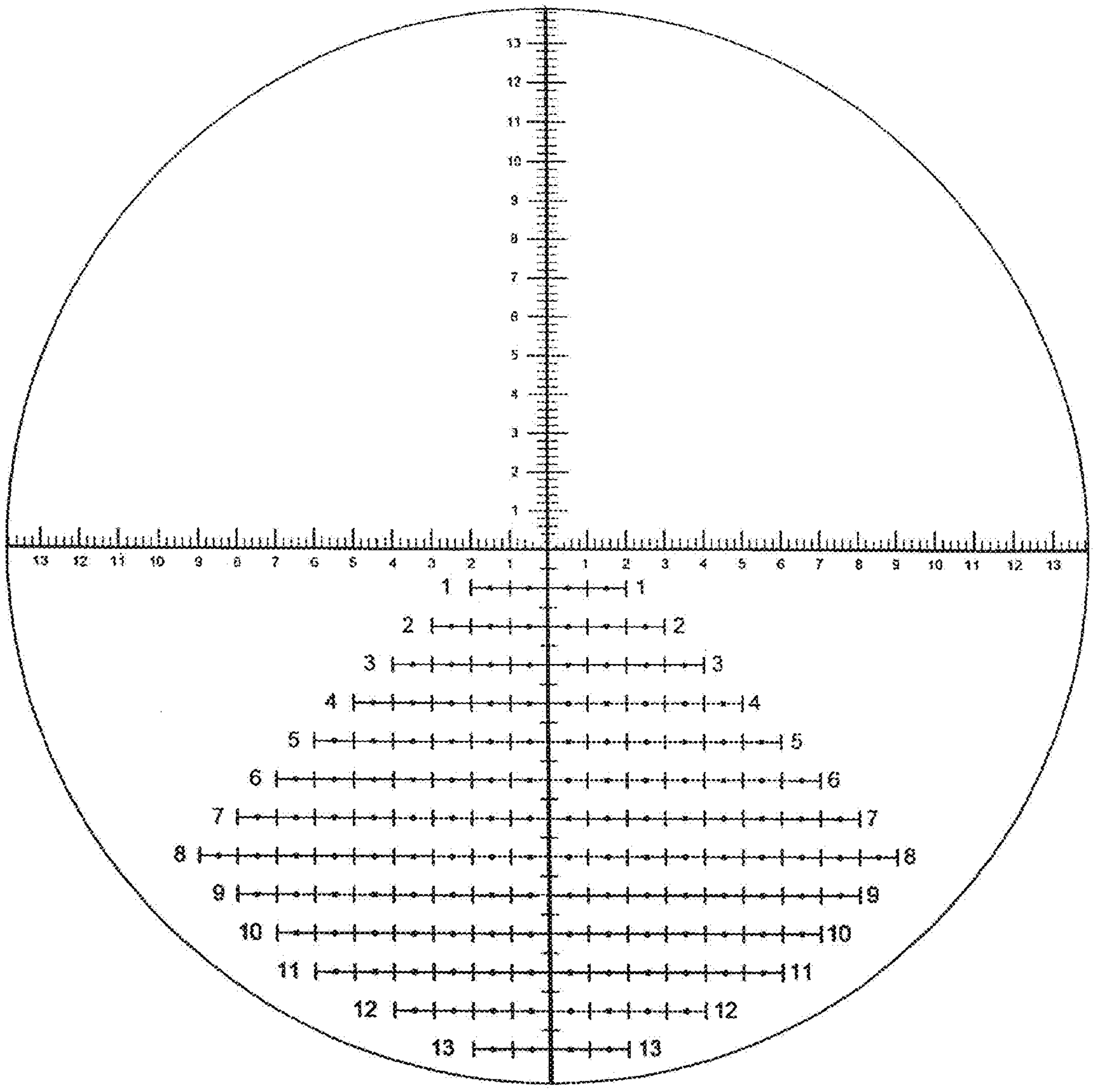
FIG. 26 is a front view of a reticle of the present invention, showing the markings as viewed through a zoom telescopic gunsight at high power suitable for use, for example, in general hunting, military, and police applications.
Figure 27:
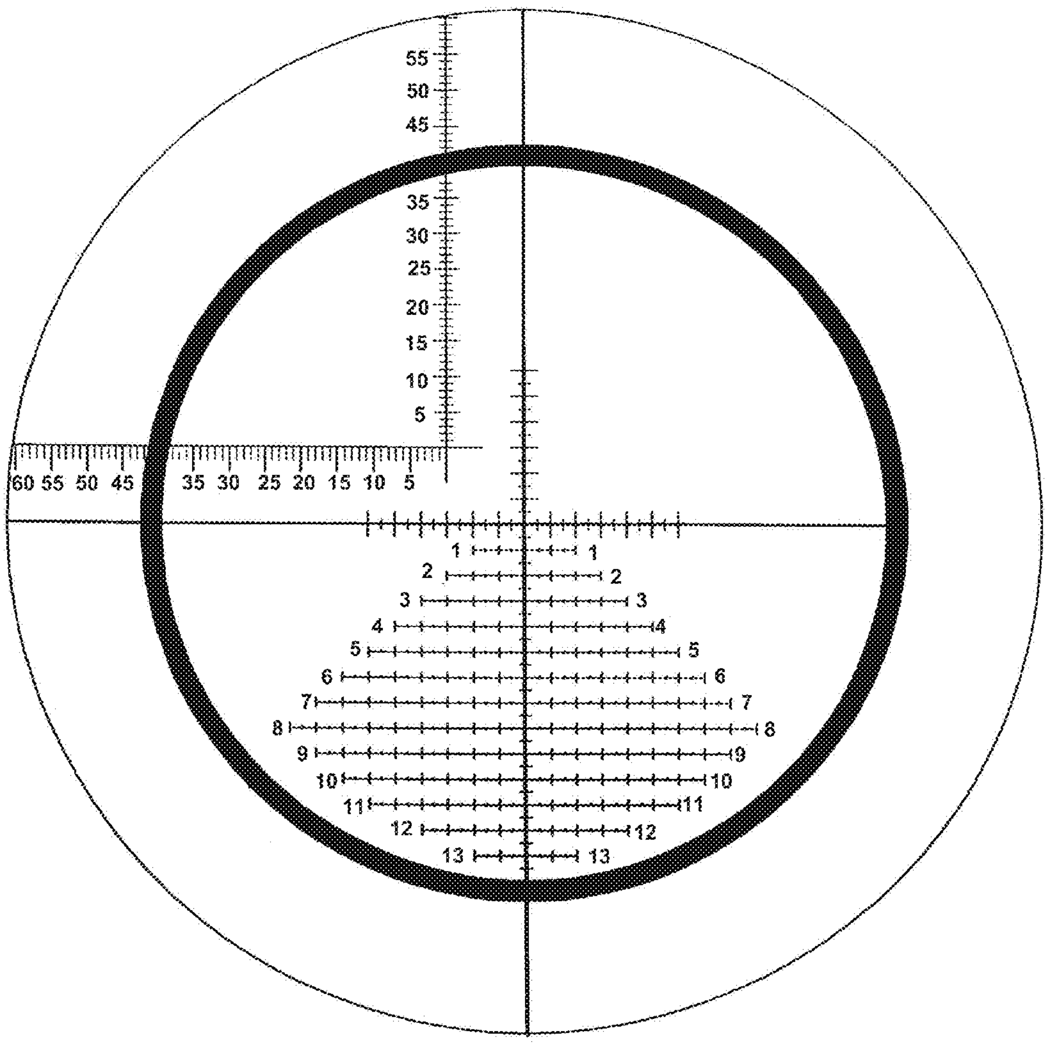
FIG. 27 is a front view of a reticle of the present invention, showing the markings as viewed through a zoom telescopic gunsight at high power with a ghost ring and rangefinder.
Figure 28:
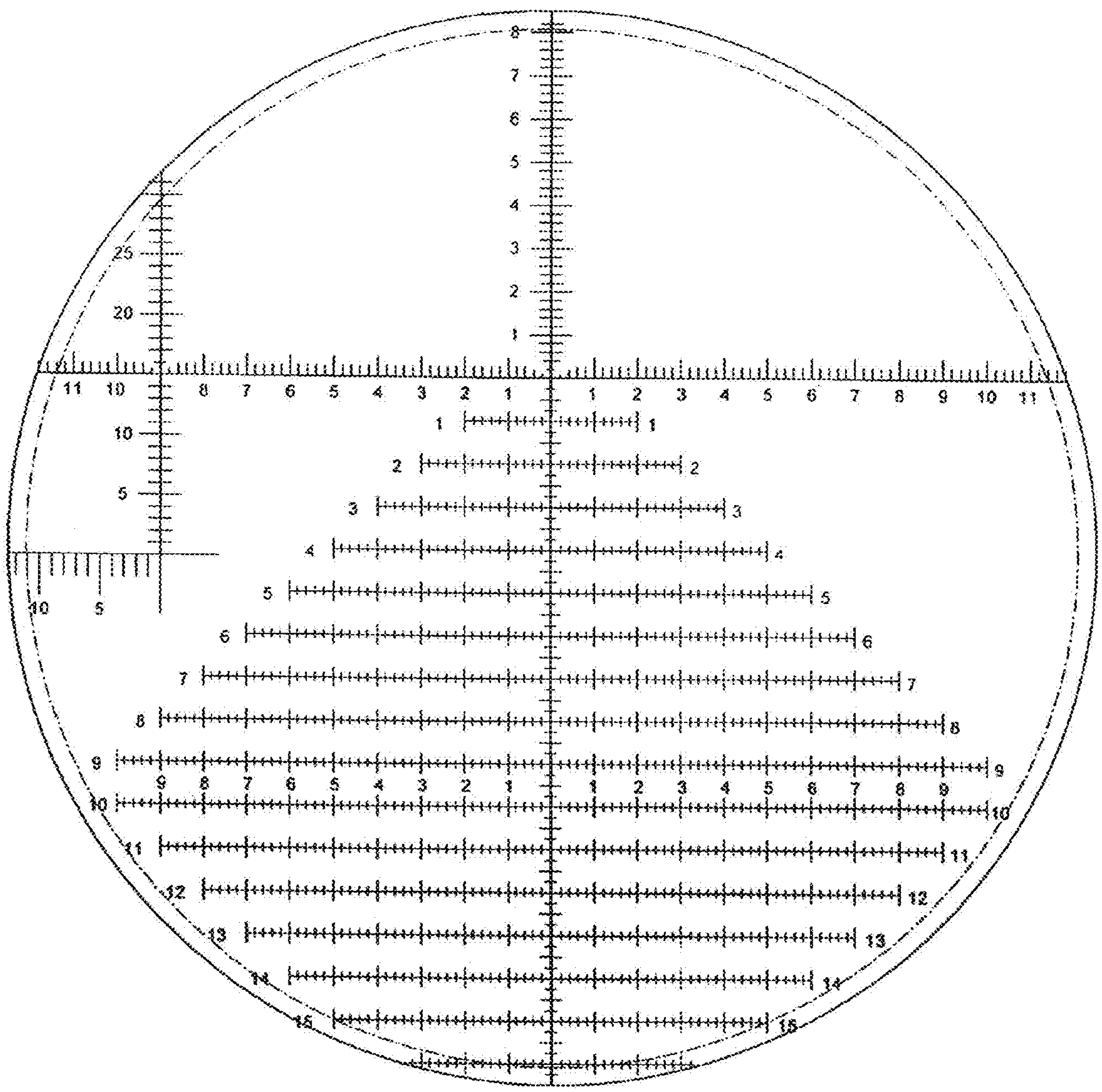
FIG. 28 is a front view of a reticle of the present invention, showing the markings as viewed through a zoom telescopic gunsight at high power with one or more primary horizontal cross-hairs vertically offset above optical center.
Figure 29:
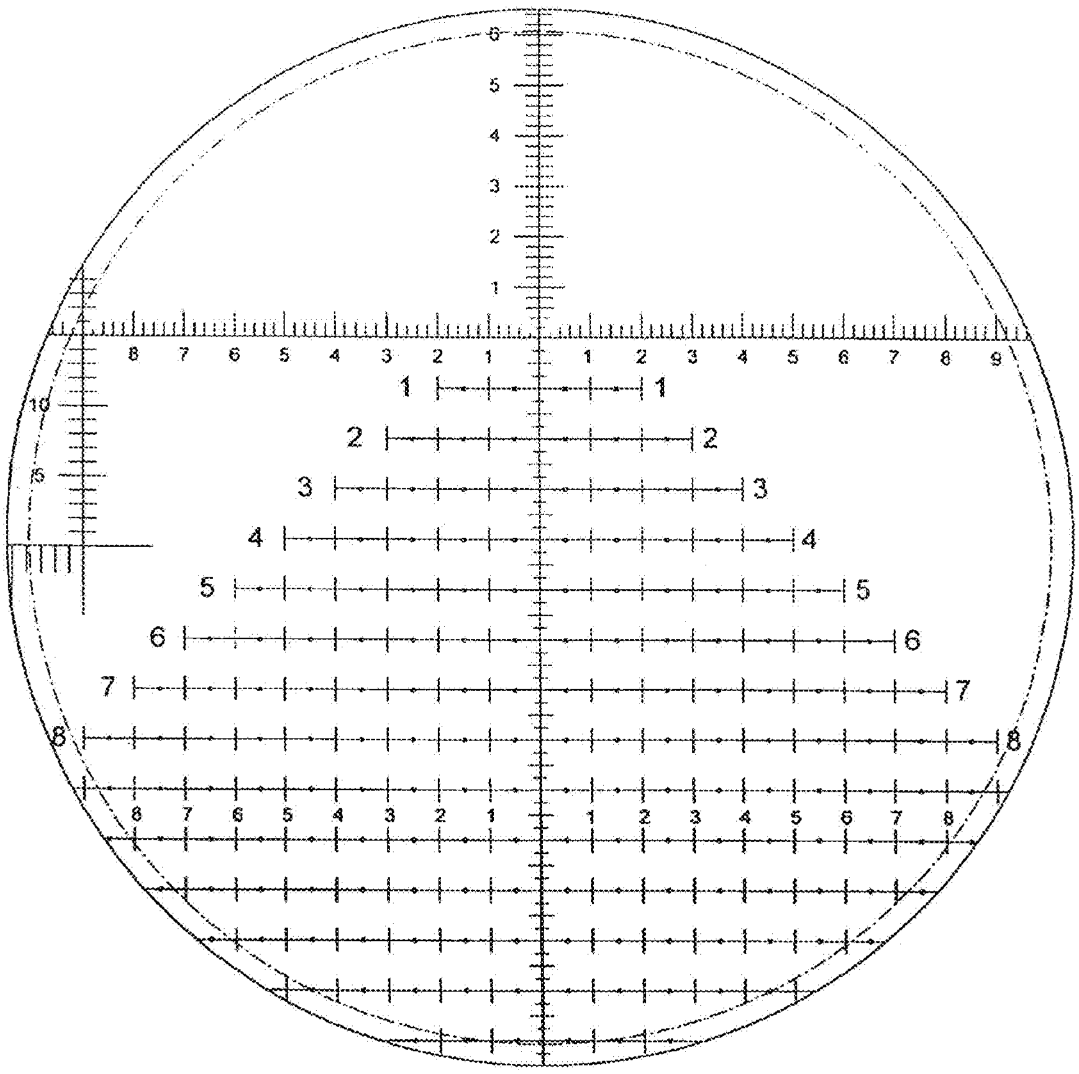
FIG. 29 is a front view of a reticle of the present invention, showing the markings as viewed through a zoom telescopic gunsight at high power with one or more primary horizontal cross-hairs vertically offset above optical center.
Figure 30:
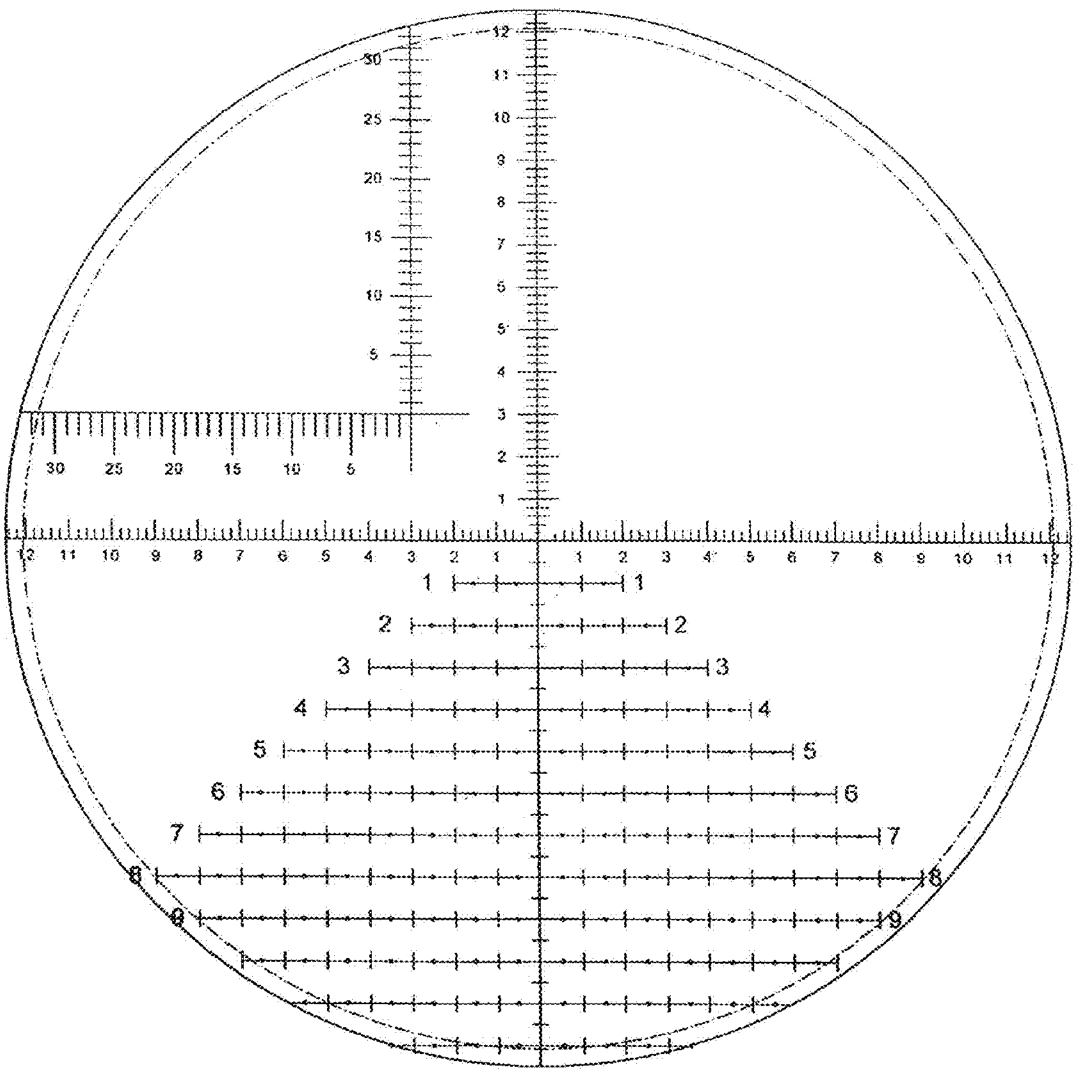
FIG. 30 is a front view of a reticle of the present invention, showing the markings as viewed through a zoom telescopic gunsight at high power with a rangefinder, and with the primary horizontal cross-hair intersecting the primary vertical cross-hair at optical center.
Figure 31:
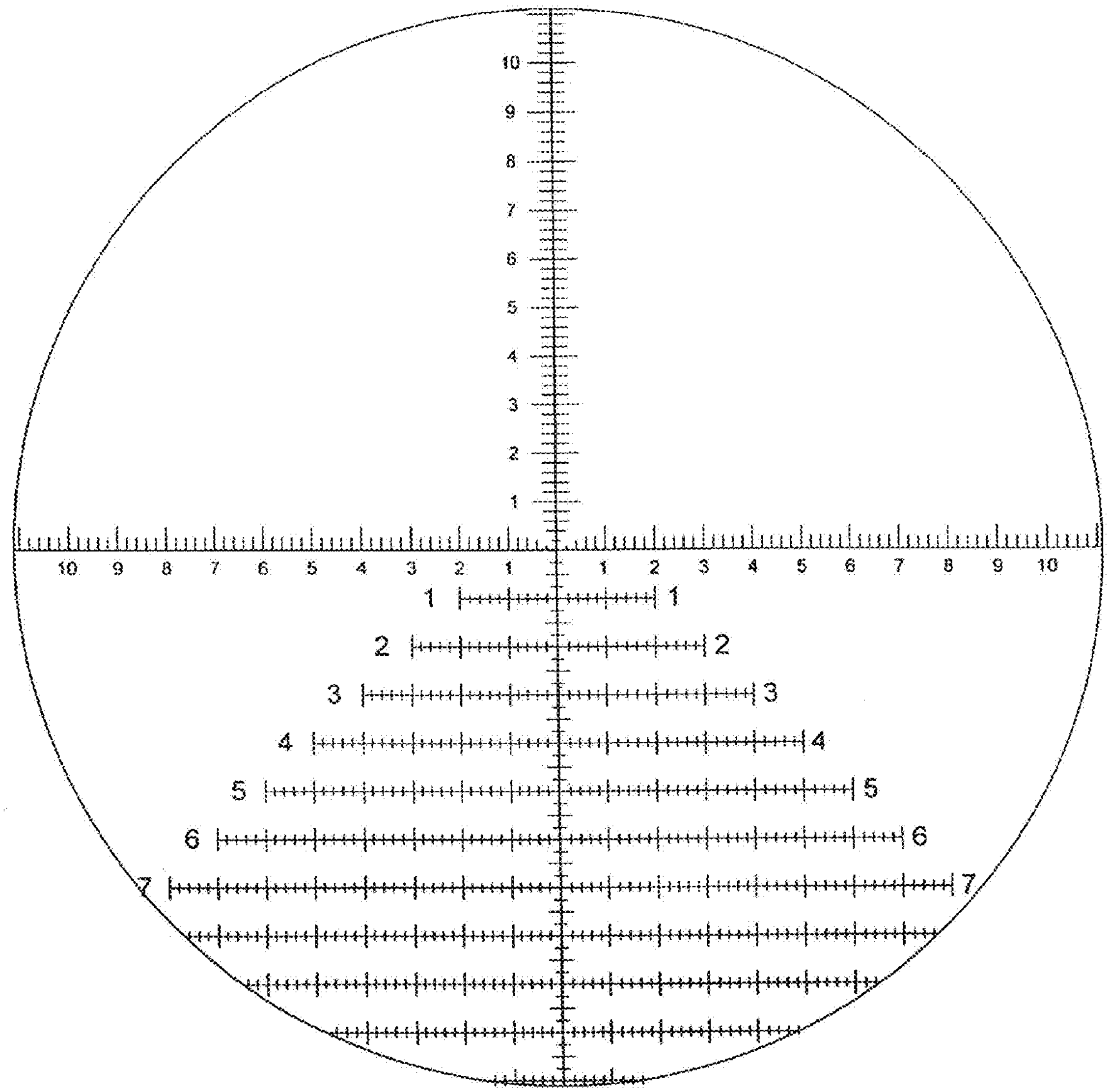
FIG. 31 is a front view of a reticle of the present invention, showing the markings as viewed through a zoom telescopic gunsight at high power with primary horizontal cross-hair intersecting the primary vertical cross-hair at optical center.
Figure 32:
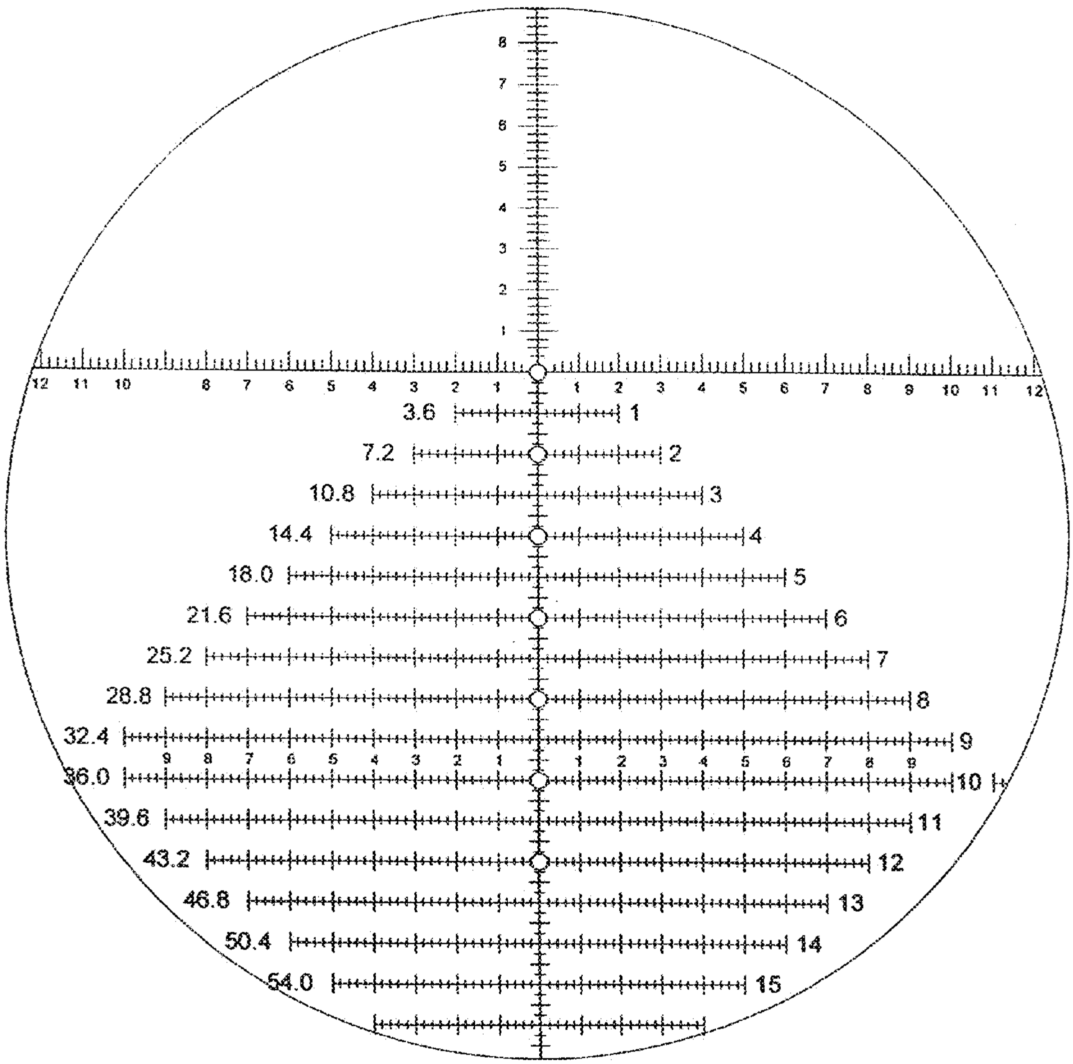
FIG. 32 is a front view of a reticle of the present invention, showing the markings as viewed through a zoom telescopic gunsight at high power.
Figure 33:
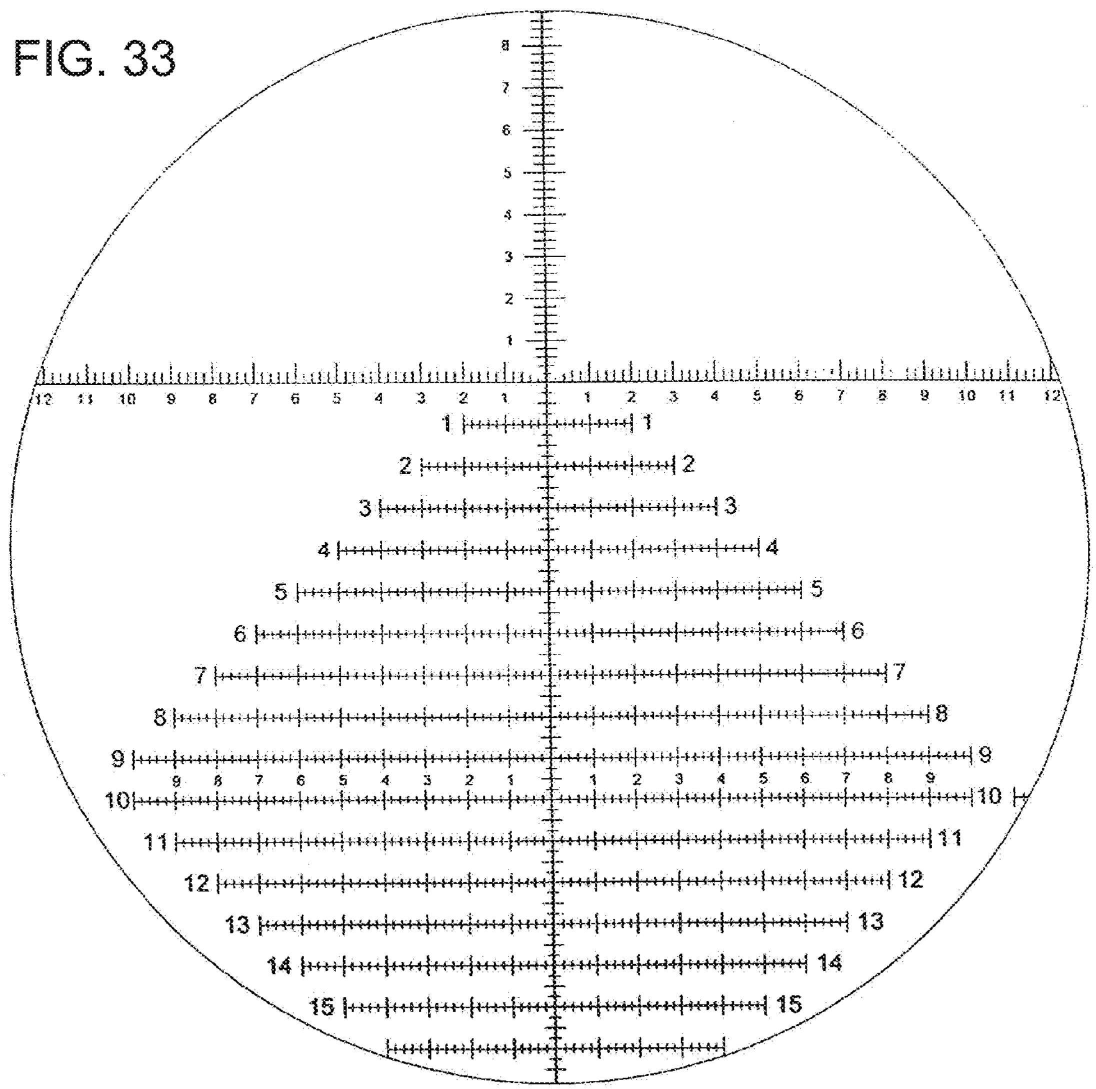
FIG. 33 is a front view of a reticle of the present invention, showing the markings as viewed through a zoom telescopic gunsight at high power suitable for use, for example, in tactical, military, and police applications.
Figure 34:
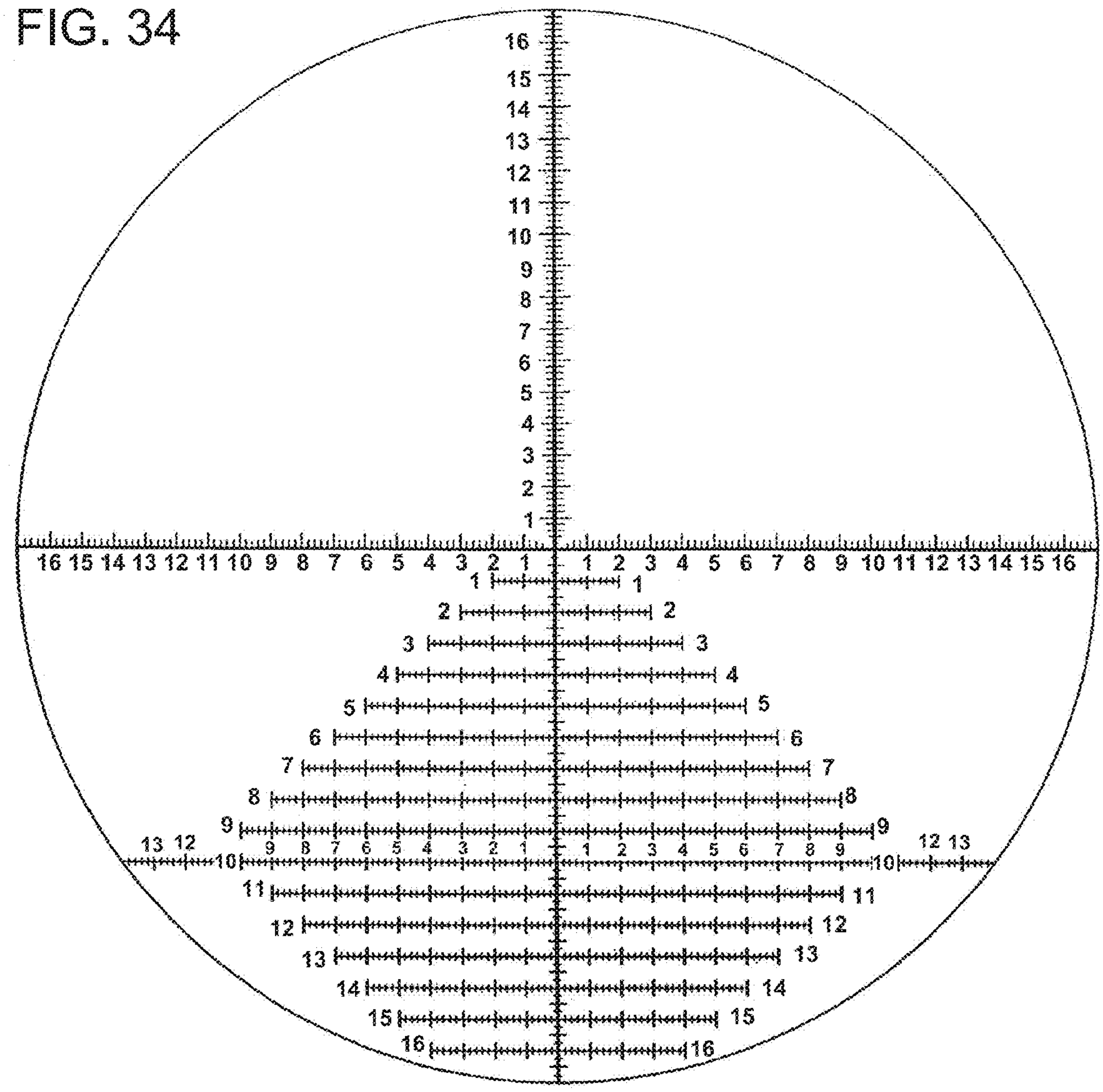
FIG. 34 is a front view of a reticle of the present invention, showing the markings as viewed through a zoom telescopic gunsight at high power suitable for use, for example, in tactical, military, and police applications.

The next query asks the user to input any slope information, that is, the angle from 0 to 90 degrees up or down between the shooter and target, that is, the vertical angle when the shooter is shooting uphill or downhill. This information is used to adjust the downrange aiming point based on the projectile's flight through space from the point of firing to target. As can be appreciated, the distance to a target at a sloped angle is somewhat longer than the horizontal distance to a target the same distance from the shooter at the same level at the same level, and typically requires the shooter to raise or lower the barrel of the firearm relative to an axis perpendicular to the force of gravity. As shown in FIG. 20, a shooter aiming downhill lowers the barrel 38 relative to the perpendicular axis 50 forming an angle $\alpha$, which is the "downhill" angle. As will be understood, when the shooter raises the barrel 38 above the perpendicular axis 50 (for example, when shooting at a target located above the shooter), the angle formed between the perpendicular axis 50 and the barrel 38 will be an "uphill" angle. The "uphill" or "downhill" angle can, for example, be measured using a clinometer, a simple protractor, a Leica Vector 4 or similar device which provides the up or down angle to the target in degrees, or it can, for example, be estimated by a skilled shooter.

For very long range shooting (e.g., from 1000 to 3000 yards or more), it may be desirable to modify the targeting program to compensate for Coriolis effect and spin drift. The Coriolis effect is caused by the rotation of the earth. The Coriolis effect is an inertial force described by the 19th-century French engineer-mathematician Gustave-Gaspard Coriolis in 1835. Coriolis showed that, if the ordinary Newtonian laws of motion of bodies are to be used in a rotating frame of reference, an inertial force—acting to the right of the direction of body motion for counterclockwise rotation of the reference frame or to the left for clockwise rotation—must be included in the equations of motion. The effect of the Coriolis force is an apparent deflection of the path of an object that moves within a rotating coordinate system. The object does not actually deviate from its path, but it appears to do so because of the motion of the coordinate system. While the effect of the earth's movement while a bullet is in flight is negligible for short and medium range shots, for longer range shots the Coriolis effect may cause the shooter to miss. To compensate for Coriolis Effect, the targeting program of the present invention ca, for example, be modified to additionally pose queries regarding the hemisphere in which the shooter is located (Northern or Southern), the latitude of the firearm, the longitude of the firearm, or the direction of fire in degrees clockwise from true North. The latitude of the gun and hemisphere can, for example, be determined manually using a topographic map of the area in which the shooter is located, or automatically using a GPS device. With these inputs, and the range to target, the offset required by the Coriolis effect is factored in by the ballistics program when determining the aiming point for hitting the target.

Finally, the system queries the user to indicate whether the target is moving or not relative to the shooter, or whether the shooter is moving. If the target is moving, the system asks the user to indicate the target's direction of travel, and then to estimate the speed of the target. This information is used to calculate a lead adjustment in the aiming point so that the user can hold the correct aiming point on the moving target so as to discharge the bullet towards the place where the target will be when the bullet arrives (assuming the target does not unexpectedly change direction or speed). For example, the speed of a moving target can be estimated, or the speed of a moving target can be calculated using the ballistics calculator system, and entered into the ballistic calculator by a skilled shooter. Or the speed can, for example, be estimated by taking inputs of known range of observed object, number of uniform hash marks within a reticle, the estimated linear worth of each individual hash mark at the distance of the observed object, and the number of seconds the observed object takes to transverse the number of hack marks, and using algebra to derive an approximate speed of the observed object expressed in distance traveled over time.

In some embodiments, the user's movement is measured or input into the calculator. Such information can be tracked, for example, by a GPS or related device. Likewise, where the user is in a vehicle (car, helicopter, plane, etc.), information about the speed, direction, acceleration, deceleration, position, etc. of the vehicle may be entered or directly input from the vehicle to the calculator.

Computer Calculation of Targeting Grid for Cross-Hairs

Once the inputs are complete, the program computes solutions which, for example, are in the form of an electronic range card which provides a calibration for the horizontal cross-hairs of a reticle of the present invention for range, and provides the necessary off-set information for cross-wind and/or target movement. The range of a target may be derived from knowing the approximate size of the target, and measuring it with known uniform hash marks within a reticle. Geometry can, for example, be mentally calculated by an experienced shooter and entered into the ballistic calculator, or the values may be entered into the ballistic calculator itself and an estimated range will be automatically computed. In one embodiment, this computation compensates for viewing the target at an angle as the size of an observed object when viewed from an angle is skewed as opposed to viewing the same object directly. In some embodiments, a pattern recognition program is used to determine the identity of the target and directly input size or distance information into the calculator. In other embodiments, size and distance information of the target is determined by a pattern recognition program used to look up a common object size table. In alternative embodiments, the nature of the target (e.g., type of animal) is selected from a menu and the calculator determines distance by estimating the size of the target based on a database of average sizes for the selected target and image information obtained from the target acquisition device (e.g., boundaries of the target and device settings).

In one embodiment, the targeting grid is displayed conventionally on a computer display screen. In a further embodiment the targeting grid is transmitted to other devices. In a still further embodiment, the targeting grid is printed out and taken by the shooter to the range.

Figure 17A:
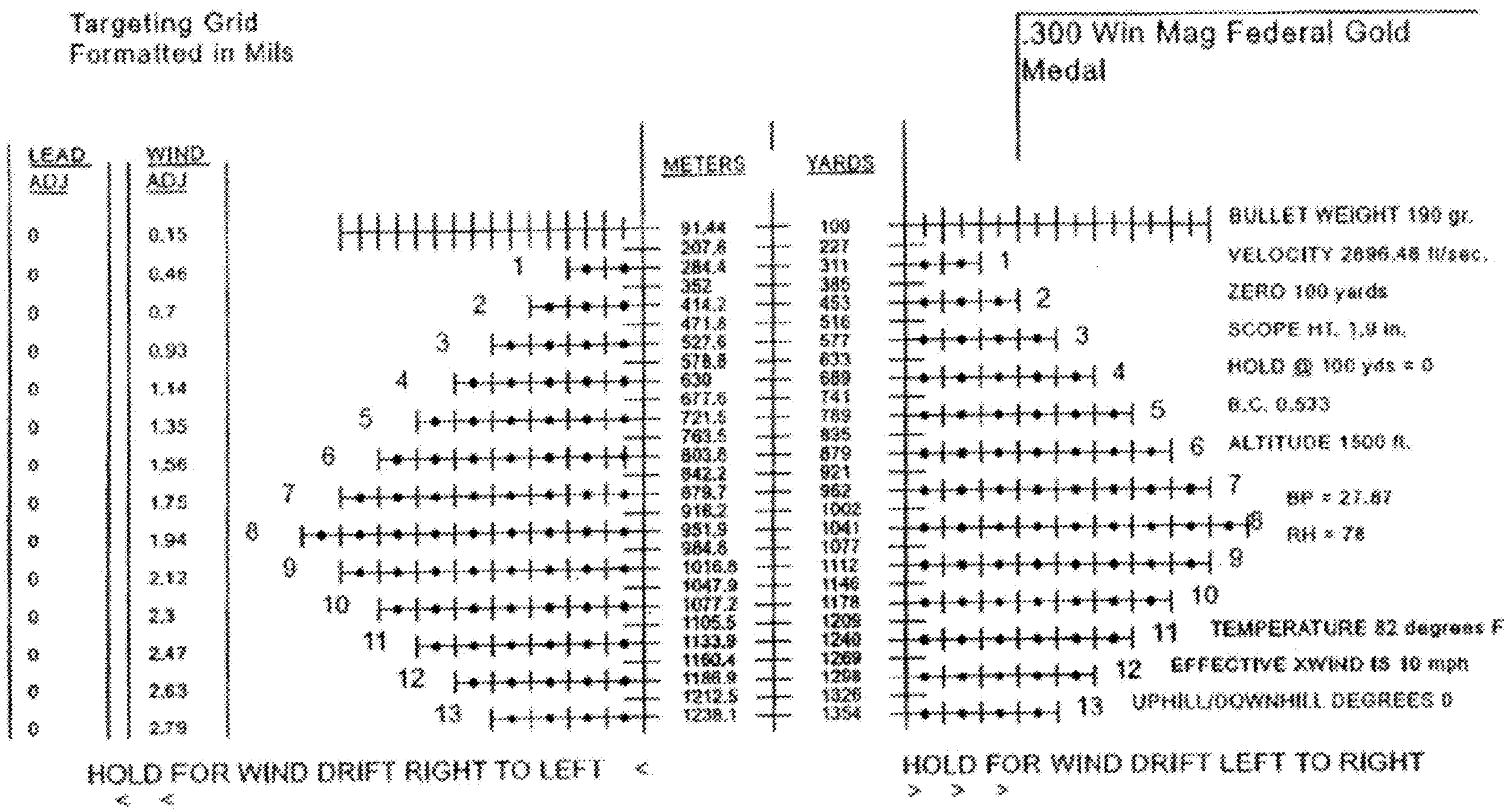
FIG. 17*a* is a targeting grid generated by a personal computer running the TRAG1S5 Ballistics Program for calibrating the range of the secondary horizontal cross-hairs of a reticle of the present invention for stationary targets on a flat range and for calculating cross-wind horizontal offset information for each secondary horizontal cross-hair.

For example, the targeting grid shown in FIG. 17*a* was produced in response to the following inputs:

Altitude=1500 (ft above sea level)
Temperature=82 (degrees F.)
Windspeed=10 (mph)
Wind Direction=3 (o'clock)
Slope=0 degrees (a horizontal shot wherein the shooter an target are at the same level)
Target Moving=no
Height of sight above bore=1.9 (inches, center-to-center)
Cartridge information=0.300 Win Mag Federal Gold Medal
Bullet Weight=190 (grains)
Ballistic Coefficient=0.533
Muzzle velocity=2960 (feet per second)
Sight-in range=100 (yards)

As can be seen from FIG. 17*a*, the range for each horizontal cross-hair from the primary horizontal cross-hair is identified, as is the amount of horizontal adjustment to be made at each horizontal cross-hair to compensate for cross-wind at that range, to the left or the right (as appropriate) from the primary vertical cross-hair.

Figure 17B:
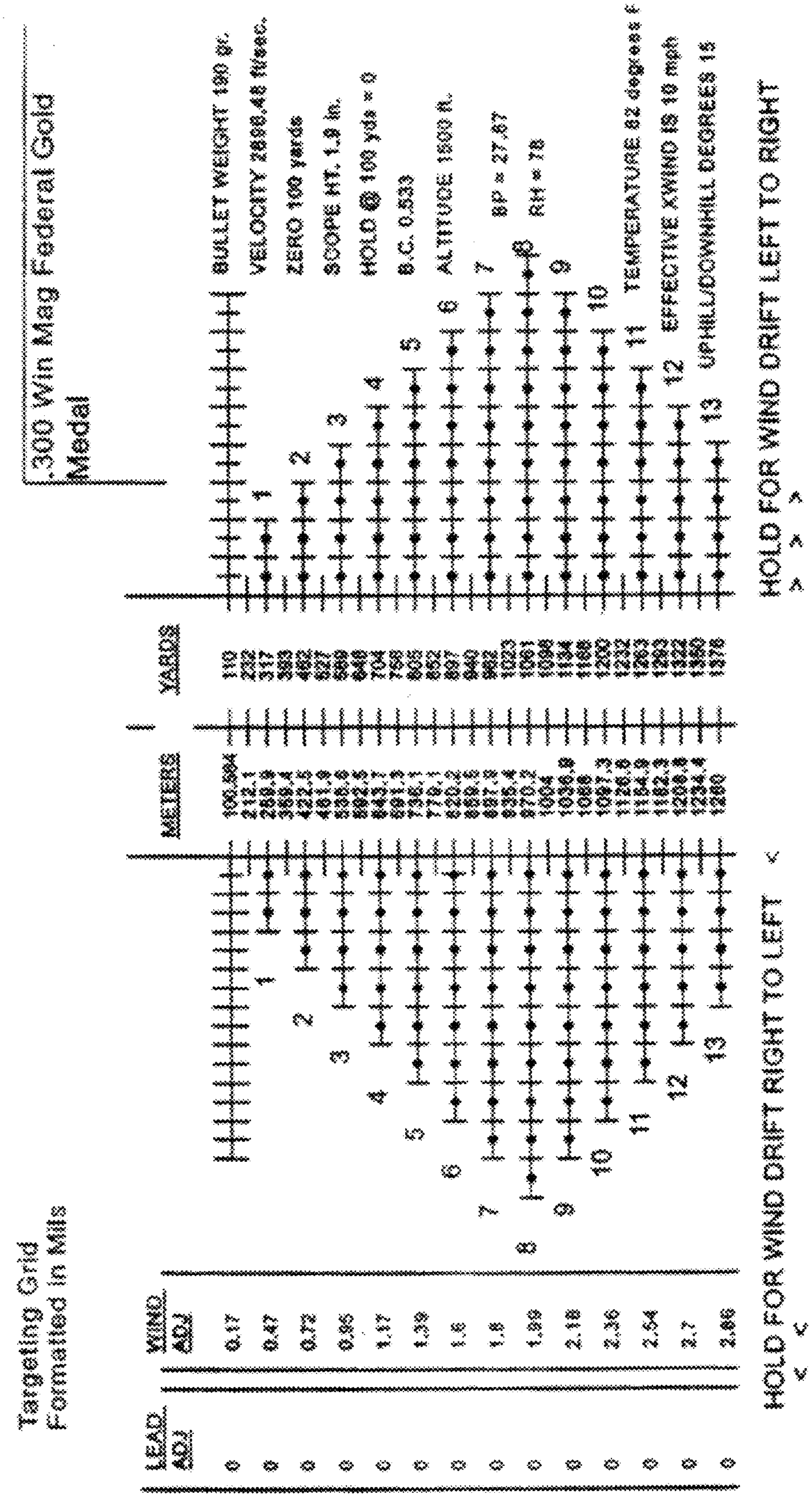
FIG. 17*b* is a targeting grid generated by a personal computer running the TRAG1S5 Ballistics Program for calibrating the range of the secondary horizontal cross-hairs for a reticle of the present invention for stationary targets on a sloped range and for calculating cross-wind horizontal offset information for each secondary horizontal cross-hair.

A more complex situation is illustrated by FIG. 17*b*, which is the same example as shown in FIG. 17*a* except that now information regarding the slope of the area over which the bullet will travel has been input (15 degrees). As can be seen, the program has adjusted the range values for each horizontal cross-hair to compensate for the bullet's travel at a sloped angle (the hypotenuse of a triangle) as opposed to level sighted flight (the base of a triangle). Thus, horizontal cross-hair 5 of FIG. 17*a* has been assigned a range of 789 yards for a flat shot, while horizontal cross-hair 5 of FIG. 17*b* (15 degree slope) has been assigned a range of 805 yards.

Figure 17C:
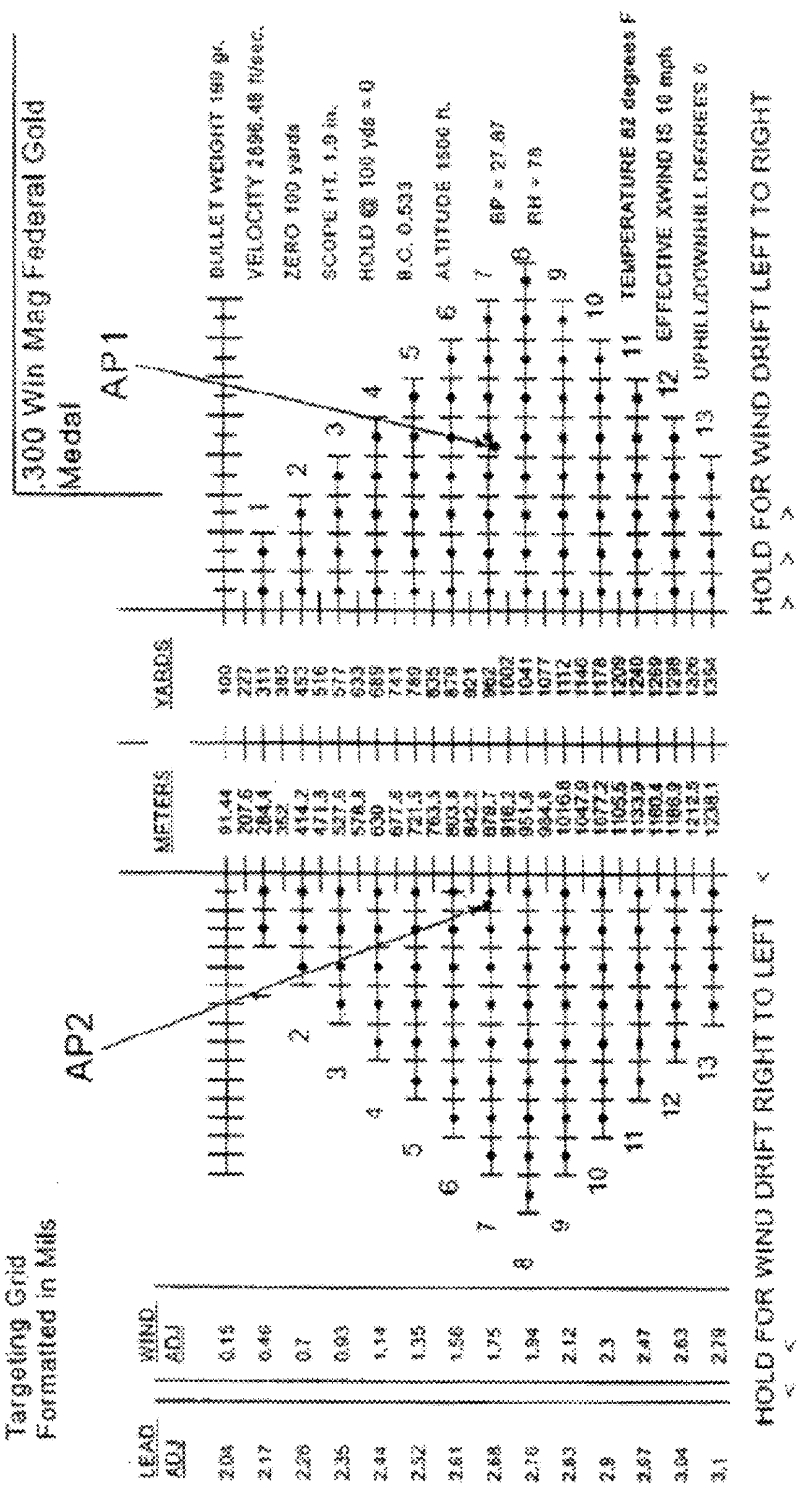
FIG. 17*c* is a targeting grid generated by a personal computer running the TRAG1S5 Ballistics Program for calibrating the range of the secondary horizontal cross-hairs for a reticle of the present invention on a flat range and for calculating lead information for a moving target and cross-wind offset information for each secondary horizontal cross-hair.

FIG. 17*c* illustrates an example in which all inputs are the same as shown for FIG. 17*a*, except information regarding a moving target has been input. In this example, the target is moving an estimated 4 miles per hour. The lead adjustment has been calculated by the program for each horizontal cross-hair, and is shown in tabular form in the far left column of FIG. 17*c*. The final adjustment is determined by the user by adding the wind adjustment to the lead adjustment if the wind and target are moving in opposite directions (i.e., the target is moving into the wind), or by subtracting the wind from the lead adjustment if the wind and target are moving in the same direction (i.e., target moving with the wind). Thus, for example, if the target is spotted at a range of 962 yards, and the wind is traveling from right to left and the target is traveling from left to right, the wind adjustment is added to the lead adjustment, to obtain the aiming point identified as "AP1". If the wind and target are moving together (i.e., wind and target both moving from right to left), the wind adjustment is subtracted from to the lead adjustment to obtain the aiming point identified as "AP2".

Figure 19A:
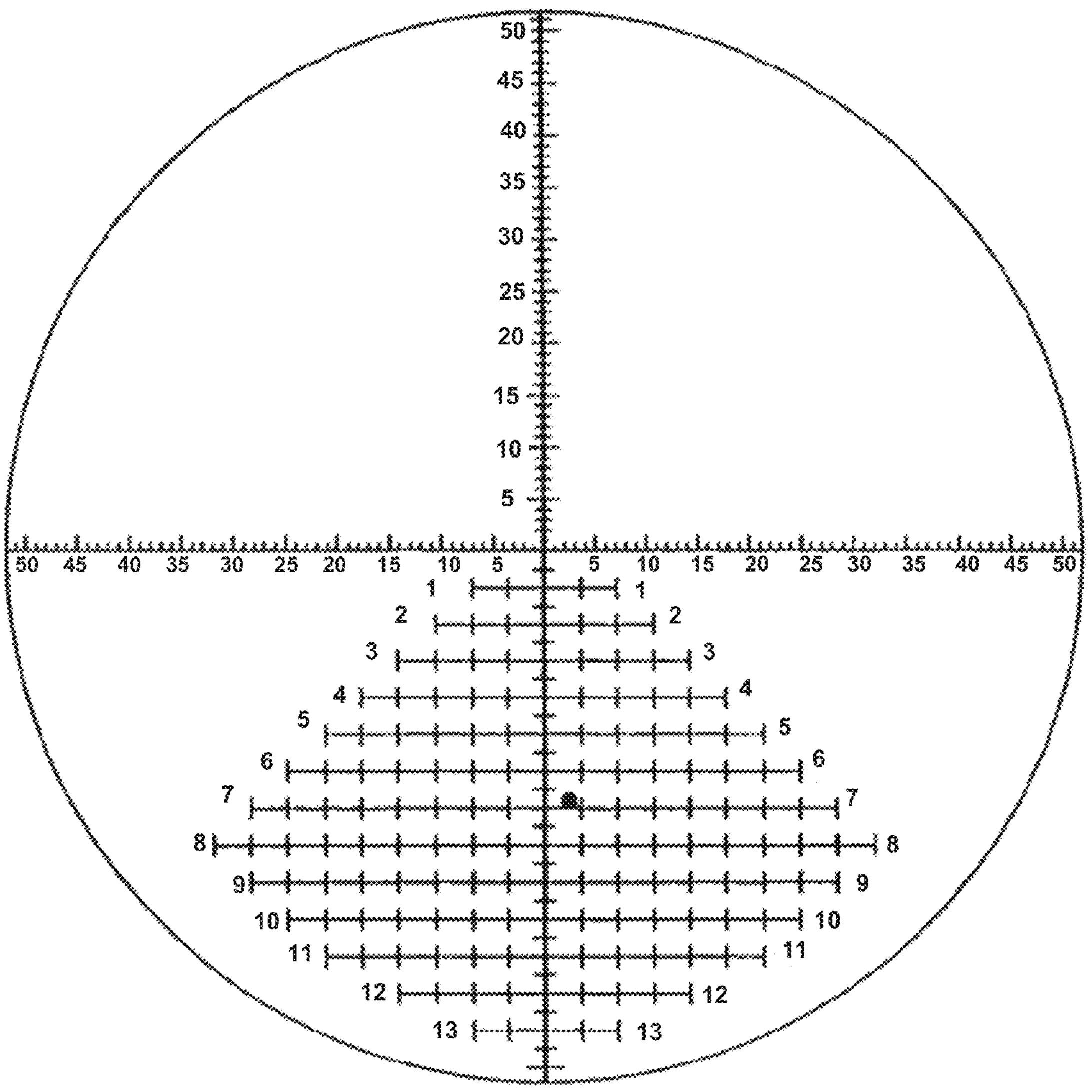
FIGS. 19*a-c* illustrate changes in the aiming point produced by different conditions of target speed and direction relative to wind speed and direction.
Figure 19B:
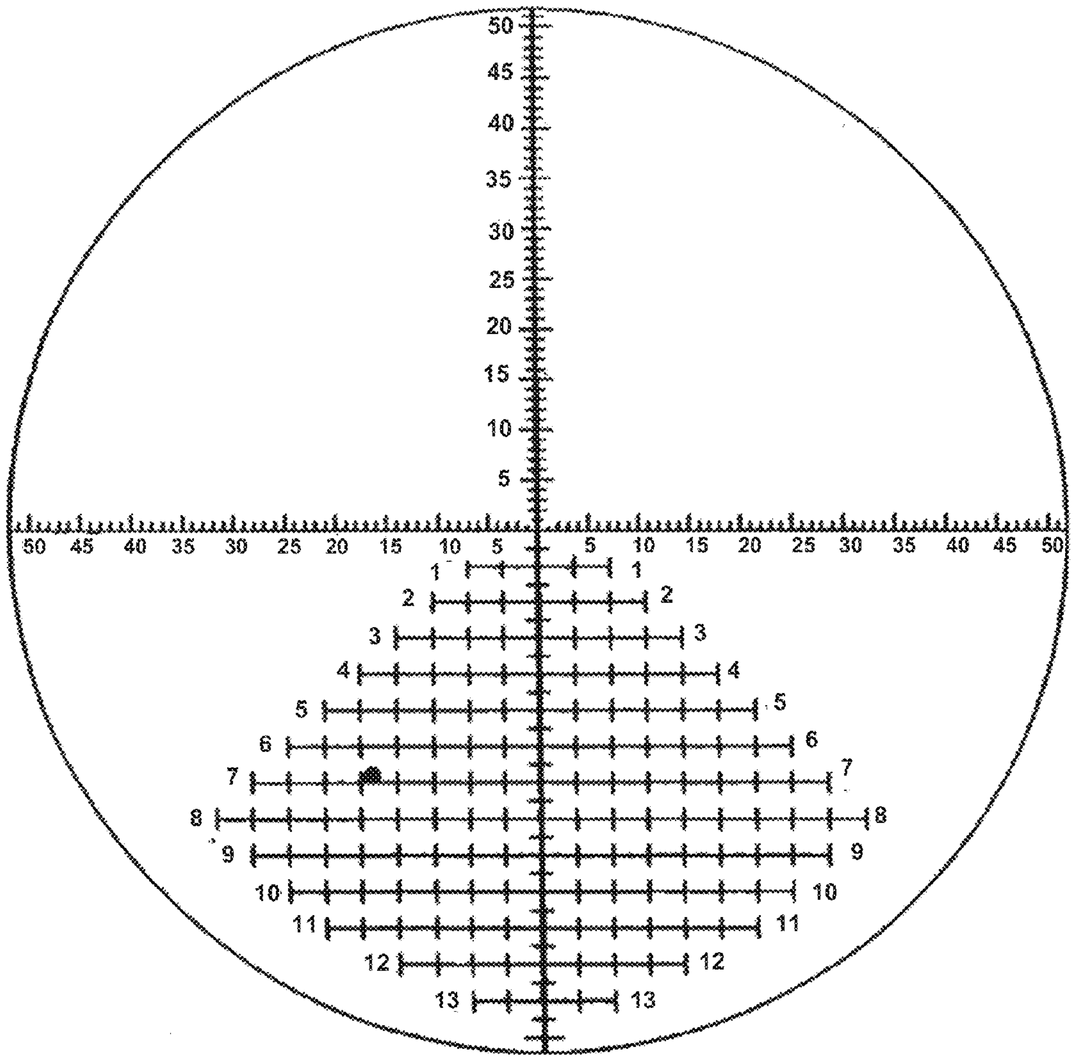
Figure 19C:
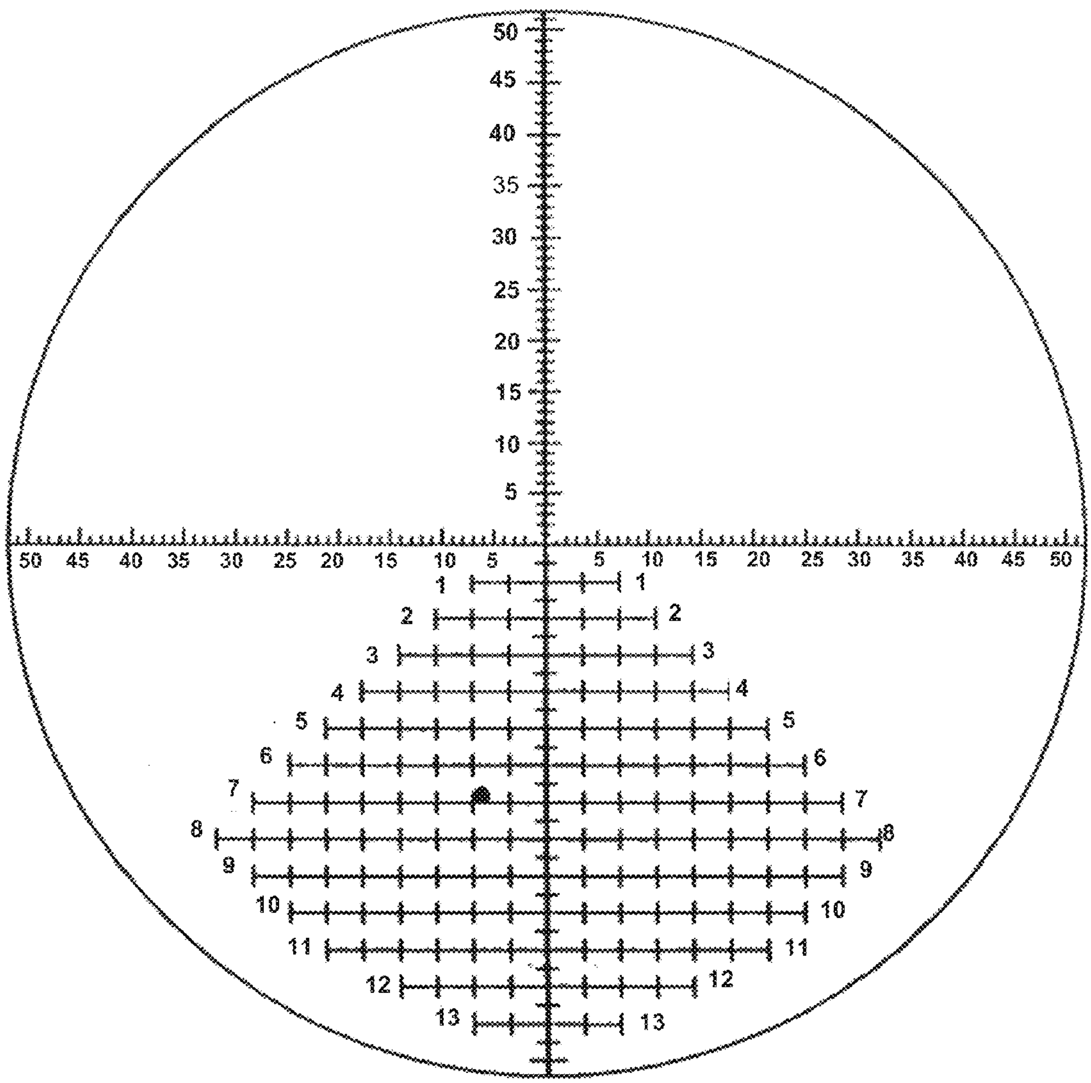

As noted above, for example, once the targeting grid has been created and displayed by the system, the user is again presented with options: (1) print out the targeting grid; (2) enter new atmospheric data; (3) identify a specific aiming point on the reticle for a target at a specific range; or (4) quit. For example, in one embodiment with present software, if the user decides to print out the targeting grid, the only remaining option is to quit. If it is desired to create additional targeting grids, the program can be started again. However, in one embodiment, the user is able to modify the software to allow the user to go back after printing out a targeting grid and exercise any of the other options. If the user enters new atmospheric data based upon a new shooting position, the data regarding the weapon and ammunition is retained in the calculations. If the option to identify the aiming point is selected, for example, the user is queried to input the range to a specific target. Once the range is input, an image of the reticle is displayed by the computer with the suggested aiming point marked (see, e.g., FIGS. 19*a*-19*c*). The user can, for example, then select the option to find another aiming point (for a new target at a different range), or can, for example, quit the program. In one embodiment, the output is in the form of digital words played through a speaker. In a preferred embodiment, multiple shooting solutions are stored in computer readable media, and the solutions presented back to the shooter in the order the shooter chooses. This makes for rapid target engagement without having to reenter various combinations of information inputs between shots.

As can be seen from FIGS. 17*a*, 17*b* and 17*c* for example, the targeting grid software has greatly simplified the process of calibrating a scope containing a reticle of the present invention for specific conditions at the range or field, and for the firearm. The primary disadvantage of this system is that personal computers are not very portable. Many shooters do not wish to lug even small laptops around while shooting, where they can be subjected to harsh conditions of weather, accidents, and dust. Accordingly, the data compiled before the user goes to the range to shoot may change by the time the shooter arrives at the range. If external conditions change during the interim, the predicted ranges correlated to the horizontal cross-hairs may not be as accurate as they would be if external conditions were measured and input at the range just prior to shooting.

Previous efforts to integrate a firearm, a target acquisition device and a ballistics calculator system have met with failure. For example, as described in the article "The Long Range Rifle System That Never Was", published in *Tactical Shooter*, February, 2000, pages 28-33, Jim Schatz describes Heckler & Koch's efforts to construct the Weitreichendes Scharfsschutzengewehr 2000 (WSG2000), a weapon easy to shoot, user friendly, and providing a computerized sighting system that could reduce the potential for aiming errors due to the effects of range and weather, thereby increasing the probability of hitting long range targets with a single round at distances beyond 2000 meters, more than 1¼ miles away. Although full-scale prototypes were assembled at great cost, the project "died on the drawing table." Schatz concludes: "As recently 1990, and even today (i.e., February, 2000), a sighting system does not yet exist that can do all that was required of the WSG-2000 sighting system, in a small, portable and cost effective package for a "man portable" sniper rifle." (*Tactical Shooter*, February, 2000, page 32).

Accordingly, in some embodiments, the present invention provides modified ballistics software to adapt it for use with a Personal Digital Assistant (PDA) type, hand-held computing device, such as, for example, the Palm Pilot (Palm Pilot is a registered trademark of Palm, Inc.), Compaq, Hewlett-Packard, Casio, Sony, Motorola, or Nokia devices. These low cost, simple-to-use devices are particularly useful because, unlike a Windows PC, the device can be turned off while the program is active, and when the device is turned back on, the user is returned to the screen that was active at the time the device was turned off. This enables the user to make inputs and turn the device off while moving to a new location. In addition, PDAs are presently available which incorporate cellular modem technology which enable remote access to email and the internet, and infrared reception and transmission capability to enable the remote exchange of data between similar devices, or between the PDA and another device capable of receiving or sending data to the PDA via an ER beam. PDAs also communicate with each other and other devices using IR and other wireless technology using, for example, radio frequency (RF), Bluetooth™, USB, or Serial. Such devices enable the user to access accurate meteorological and other data from the Internet, or from other devices remotely (e.g., from the range, without the need for cabling). Accordingly, the term "PDA" or "Personal Digital Assistant" as used herein means any small, portable computing device which can be programmed to receive the necessary data inputs and calculate the targeting information described herein, regardless of whether, for example, such devices are viewed commercially as cellular telephones with computing capability, or as hand-held computers with cellular capability.

In one embodiment, the PDAs of the present invention are powered by a rechargeable battery. In other embodiments, the PDAs of the present invention are powered by other sources for generating the necessary power for the device, including photovoltaic panels, commercially available alkaline and similar batteries, manually driven generators, and chemical cells. In a further embodiment, the ballistic calculator systems of the present invention are shielded from electro-magnetic frequency radiation. The PDA targeting program has also been adapted for use in conjunction with a reticle of the present invention as well as for use with conventional reticle/target acquisition device combinations which are conventionally adjusted for a specific shot by turning elevation and windage knobs a specified number of clicks. The PDA targeting program preferably allows the user to select inputs and displayed aiming information to be in English or Metric units, or both with use of the "Delta Feature". In a preferred embodiment, data on standard target sizes to be used as a reference for target range estimation is stored in memory, and used to assist the shooter in determining the range to the target. In further embodiments, data on standard munitions and their specific performance characteristics are stored in memory and made retrievable by the targeting program or by the user.

As before, it is desired to zero the weapon at a predetermined range and to adjust the target acquisition device so that the primary cross-hair is the aiming point for the "sight-in" range. Once this has been done, and the user has verified that the firearm is producing satisfactory groups of shots at selected sight-in range, the PDA targeting program can, for example, be activated.

In one embodiment, the targeting program is selected by tapping the targeting program icon on the "home" screen. The user chooses the type of target acquisition device/measurement system being used (conventional scopes with range/windage adjustments, or a target acquisition device fitted with a reticle of the present invention), or the program can be provided as a dedicated program for use with a particular target acquisition device/measurement system. If a conventional scope is selected, the output will identify the number of "clicks" needed to adjust the elevation and windage knobs on the scope to properly position the cross-hair of the conventional scope to hit the target. If a target acquisition device using a reticle of the present invention is selected, the output will identify the position of the aiming point on the reticle. In one embodiment, the aiming information provided is numerical. In a further embodiment, aiming information is provided as a graphical depiction of the reticle being used with the exact aiming point identified, as is presently possible with the TRAG1S5 version for windows-based PCs. In a preferred embodiment, the screen allows the user to select inputs and displayed information in English or Metric units.

Figure 18A:
FIGS. 18*a*-18*e* illustrate PDA (personal digital assistant) data input screens for using a PDA targeting program of the present invention.

Once the type of target acquisition device has been identified, the PDA targeting program asks for five parameters as shown in FIG. 18*a*: (1) bore height (the distance between the firearm barrel and the target acquisition device, center-to-center in inches); (2) projectile weight (in grains); (3) projectile ballistic coefficient(s); (4) sight-in range (the range at which the target acquisition device and firearm were zoroed, in yards); and (5) projectile muzzle velocity. The program positions the blinking cursor in the field where the first number is to be entered. The numbers, a period, an "enter" key and a "quit" key are displayed below the four queries. The bore height is entered by tapping the appropriate number, and then tapping the "enter" key on the display. The blinking cursor then appears in the second field (or the user taps the second field to position the cursor there), and the number corresponding to the projectile weight is tapped and the "enter" key tapped. The blinking cursor then appears in the third field and then the fourth field (or the user taps the third or fourth field to position the cursor there), and the number corresponding to the ballistic coefficient and sight-in range is tapped and the "enter" key is tapped. Finally, the blinking cursor appears in the fifth field (or the user taps the fourth field to position the cursor there), and the number corresponding to the muzzle velocity is tapped and the "enter" key is tapped. All five parameters are displayed and an "OK" button is displayed. The user can then review the five parameters, and if they are correct, the "OK" button is tapped. If the parameters are not correct, the "QUIT" button is tapped, the user can start over by reentering the correct parameters.

Figure 18B:
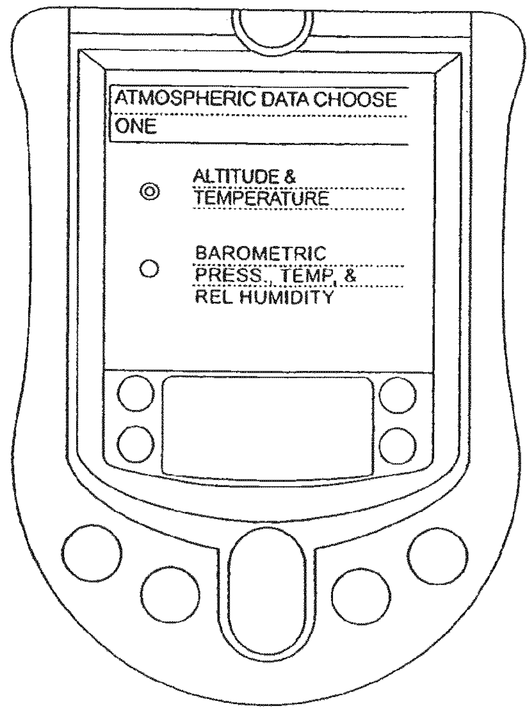
Figure 18C:
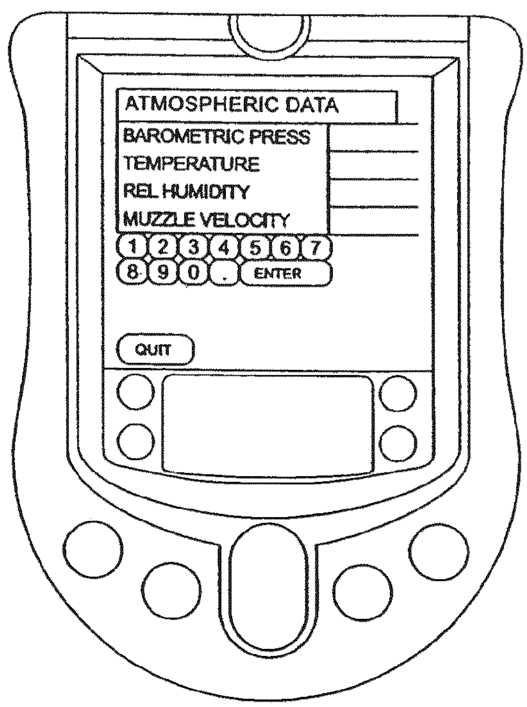

When the "OK" button is tapped, a second screen, shown in FIG. 18*b* is displayed by the PDA which allows the user to select the kind of atmospheric data to be input using four choices: (1) "Army Standard Metro" sea-level atmosphere; (2) "ICAO Standard" sea-level atmosphere; (3) altitude and temperature at the shooting site; or (4) actual barometric pressure, temperature and relative humidity at the shooting site (if known). As described in more detail above, the fourth option produces the most accurate result. While it is clearly possible to provide other choices, such as the standard conditions offered in the PC-based TRAG1S5 program described above, the small size of the PDA screen makes it desirable to keep each screen as compact as possible, consistent with obtaining reasonably accurate results. When the appropriate selection is made, another screen is displayed which allows the user to input the selected atmospheric data. If the user chooses "altitude and temperature," the altitude is entered in feet above sea level, and temperature is entered in degrees Fahrenheit. If the user chooses "barometric pressure, temperature, and relative humidity," the screen shown in FIG. 18*c* appears and the unadjusted barometric pressure is preferably input as inches of mercury, temperature is preferably input in degrees Fahrenheit, and relative humidity is preferably input as a percentage. In a further embodiment, barometric pressure, temperature and relative humidity are entered in metric units. Conventional hand-held weather meters, such as, for example, the KESTREL® Pocket Weather Tracker manufactured by the Nielsen-Kellerman Co., Inc., and similar devices, can measure temperature, humidity, barometric pressure, altitude, density altitude, wind-speed, etc. Such hand-held meters may be modified to allow them to be electronically linked (either by cable or by conventional wireless means, IR or microwave, etc.) to the PDA to allow for automatic measurement and input of these elements as needed. Such devices can, for example, be integrated as well with wristwatches with GPS units and similar devices.

Muzzle velocity found on the cartridge box, or measured in the field by use of a chronograph, or in the manufacturer's manuals, can be adjusted, if desired, based on temperature to produce a more accurate result. Since a projectile typically travels faster than the speed of sound, it creates a shock wave that induces drag on the bullet. Because the air is denser at low temperatures, and less dense at high temperatures, induced drag is higher at low temperatures, and lower at high temperatures. Accordingly, if it feels very cold to the shooter at the range, the published muzzle velocity of some types of cartridges can be reduced significantly, and if it feels very hot to the shooter at the range or in the field, the published muzzle velocity of some types of cartridges can be increased significantly. Muzzle velocity and temperature are entered by tapping MV in the first screen that generates, for example, the display:

| Temp (degrees Fahrenheit) | MV (feet per second) |
|---|---|
| 40 | 2510 |
| 59 | 2610 |
| 106 | 2810 |

Again, the atmospheric inputs are displayed, and the user clicks the "OK" button if all are correct and the user is ready to continue.

Figure 18D:
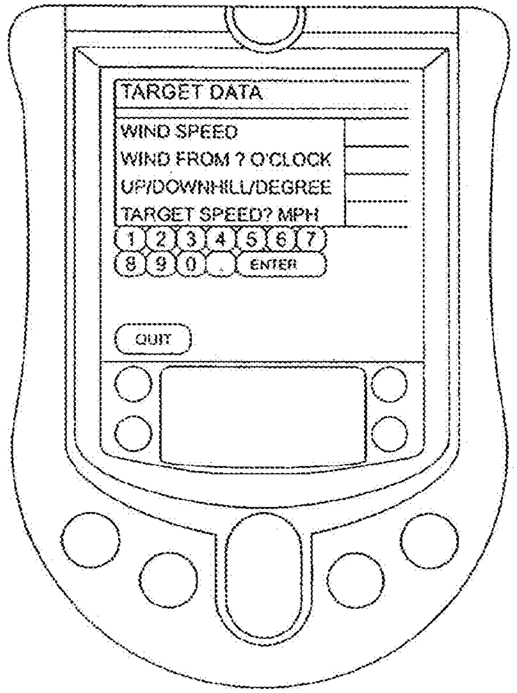

As shown in FIG. 18*d*, the user can then input information on wind speed (in miles, knots or kilometers per hour, or meters per second at the muzzle), the wind direction (in clock position from line of firing or in degrees based on a 360 degree reference circle, for example, 3 o'clock equals 90 degrees), slope the projectile will travel between shooter and target (in degrees), and the target speed (in miles per hour, kilometers per hour, meters per second or feet per second). Once the data is entered, an "OK" button appears which the user can tap once the data is checked and verified for correctness.

Figure 18E:
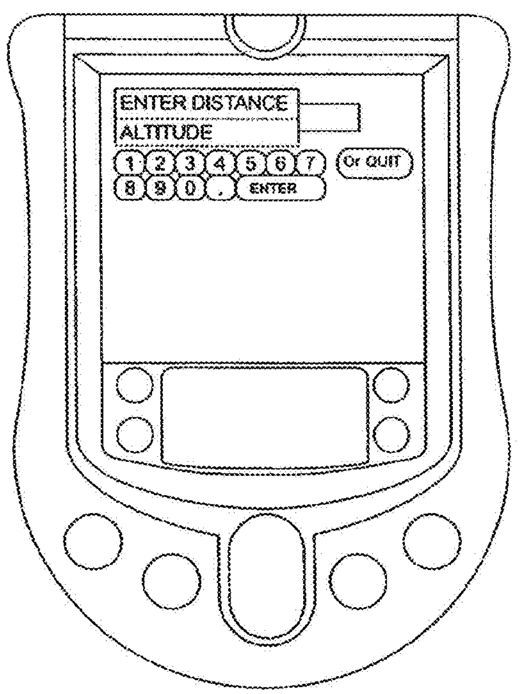

As shown in FIG. 18*e*, the user is now ready to enter the range to any target. At this point, the user can turn off the PDA until a target is acquired. Once the target is acquired, the range can be determined using the rangefinder on the reticle of the target acquisition device or using any other desired method, such as by using an electronic rangefinder or GPS device. The PDA is turned on, and the screen shown in FIG. 18*e* appears. The user simply taps in the distance to the target in either English or metric units, and taps "enter". In a further embodiment, the ballistics program accepts range information automatically from an electronic rangefinder that is either connected to the PDA via cable, IR, or linked using conventional wireless techniques.

Figure 18F:
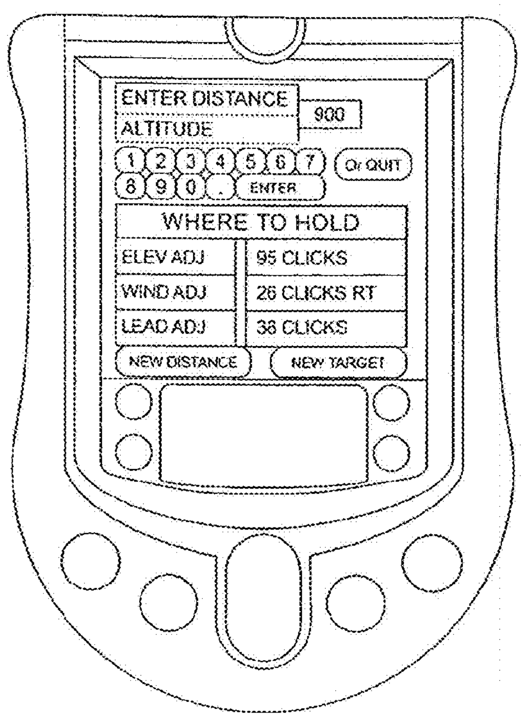
FIGS. 18*f*-18*g* illustrate PDA data output screens produced by the TRAG1S5 PDA targeting program.
Figure 18G:
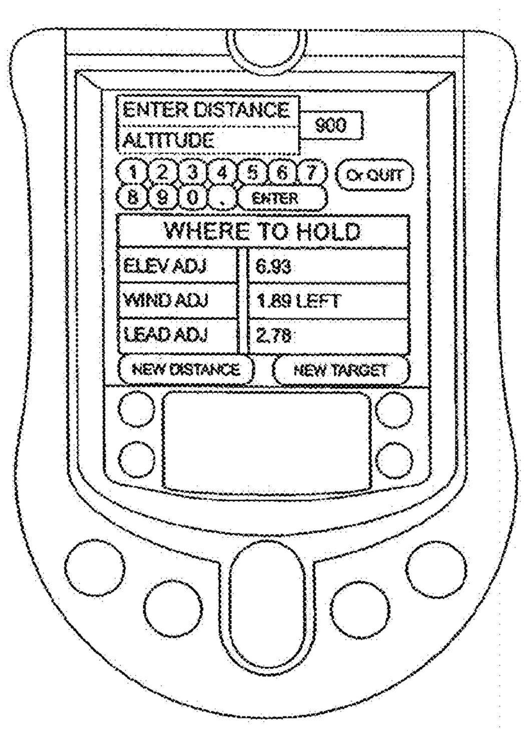
Figure 18H:
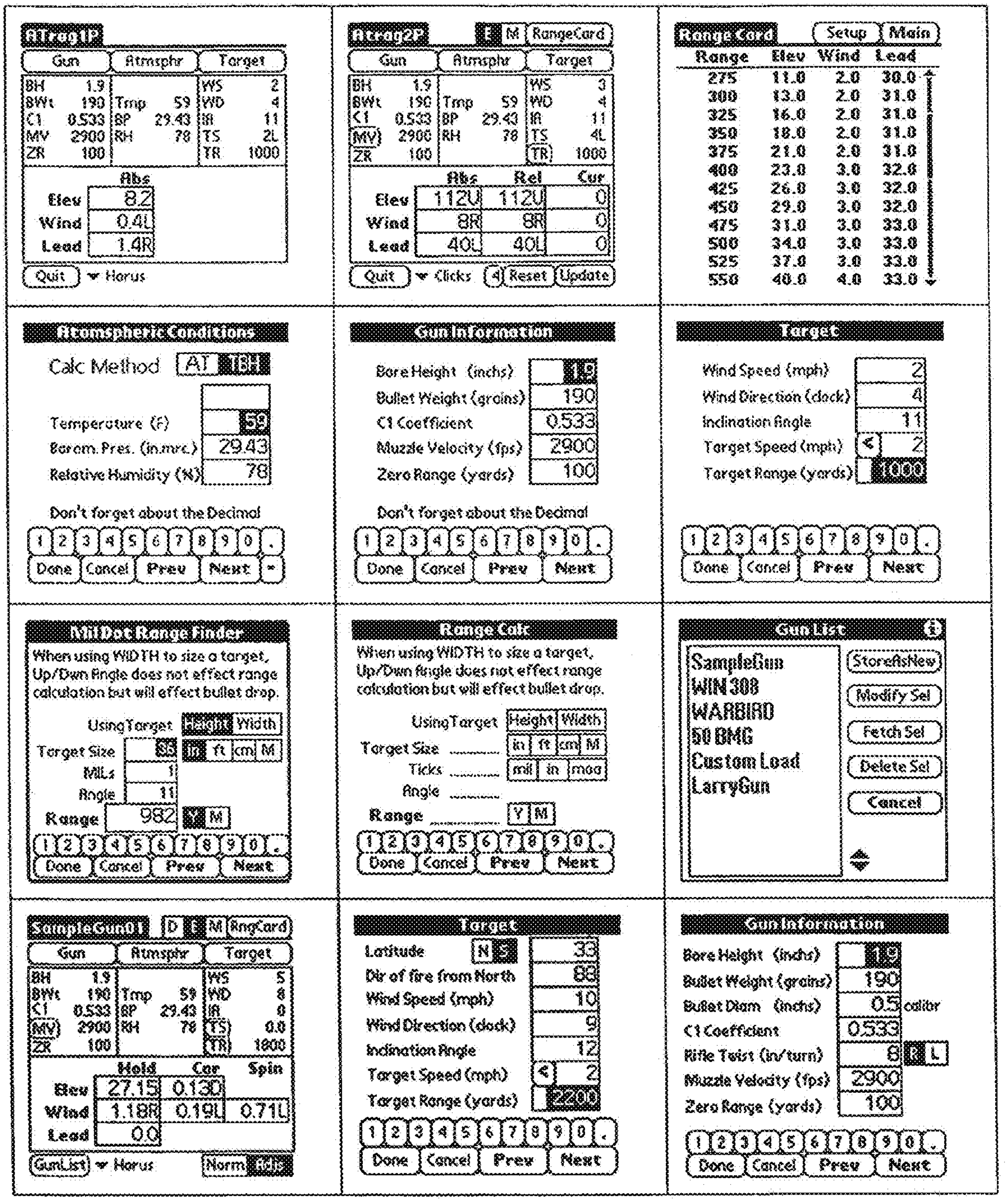
FIG. 18*h* illustrates input and output screens of the ballistics calculator system of the present invention in other embodiments.

As shown in FIG. 18*f*, if a conventional telescopic gunsight was initially selected, the PDA displays the number of clicks the elevation and windage knobs on the scope needed to turned so that the intersection between the vertical and horizontal cross-hairs can be used as the aiming point to hit the target. As shown in FIG. 18*g*, if a target acquisition device employing a reticle of the present invention was initially selected, the exact position of the aiming point for this target on the reticle is identified: horizontal cross-hair is 6.93 (just above the horizontal cross-hair marked "7"); windage adjustment is 1.89 secondary vertical cross-hairs to the left of the primary vertical cross-hair (cross-wind is blowing from 3 o'clock (right to left)) if the target is stationary. If the target is moving from right to left (with the wind), the correct aggregate windage/lead adjustment would be 2.78 right (lead)—1.89 left (wind)=0.89 right (or almost one vertical mark to the right of the primary vertical cross-hair). (See FIG. 19*a*). If the target is moving from left to right (against the wind) the correct aggregate windage/lead adjustment would be 2.78 left+1.89 left=4.67 vertical cross-hairs to the left of the primary vertical cross-hair. (See FIG. 19*b*) See FIG. 19*a* for the reticle showing the correct aiming point when the target is moving to the left with a right to left wind, FIG. 19*b* for the correct aiming point when the target is moving to the right with the same right to left wind, and FIG. 19*c* for the correct aiming point when the target is stationary, again with the same right to left wind.

While the method for inputting data into a PDA is typically done by tapping a touch-screen (or connecting the PDA to a PC and inputting data using various input devices for, a PC such as keyboard, mouse, touch-screen, and the like), data can be transferred into the PDA remotely (i.e., without a hard wire connection) using cellular technology, Bluetooth™, or infrared beam. In one embodiment, the PDAs are equipped with microphones, speakers or earphones, and voice-recognition and voice-generation technology to enable inputs and outputs to be spoken, thus eliminating the need to tap a touch screen, leaving the user's hands free to control the firearm. In another embodiment the PDA is linked to receive positioning information from the Global Positioning Satellite using a GPS device, or to receive information regarding the azimuth to target in degrees clockwise from true north, slope of the angle of the barrel between the shooter and the target, as well as altitude, temperature and barometric pressure, and range to target by data transmission by a cable link or remote means (such as IR Beam or radio transmitter) from a laser range-finding device equipped to measure these factors, Another advantage of using a PDA-based targeting system such as that described above, is the ability to input and save the parameters and targeting output for several targets (for example, sets of data) for instant recall. This will enable the shooter to determine aiming point information for each one of a group of targets, save the information, for example, on a range card constructed for general use, and then use the information to quickly and accurately shoot each target in rapid succession without having to stop and calculate the aiming point information before each shot. This feature can be particularly useful when the shooter is working with a partner, for example a spotter, who can, for example, call out aiming point information for each target and then use a spotting scope to watch the flight of the bullet and determine if the aiming point should be adjusted. In one embodiment, multiple aiming dots are determined and stored in RAM before firing. In an additional embodiment, multiple aiming dots are displayed in the target acquisition device, but the appropriate dot illuminates as directional sensors in the target acquisition device detect that the target acquisition device is pointing to the particular target represented by a specific dot. In yet another embodiment, the target acquisition device and ballistics calculator system of the present invention provide a real-time, mobile aiming dot that automatically adjusts for all known factors for the target at the center of the cross-hairs. In a further embodiment, teams of shooters and spotters are electronically networked through a shared reticle and aiming points.

As noted above, whether the shooter creates a targeting grid or range card manually, or uses the PC-based TRAG1S5 program described above, or uses the PDA-based TRAG1S5, TRAG2P OR TRAGMP targeting programs to calibrate a reticle of the present invention, the targeting information should be verified for accuracy by shooting at a range.

Once the reticle has been calibrated as described above, it can be used in the field to acquire and hit targets of all sizes at long ranges. While the preferred range for the preferred embodiment is at least 500 yards to 2500 yards (assuming the firearm/ammunition combination selected are capable of accurately hitting a target at these ranges), a target acquisition device of the present invention can be used to hit targets very accurately at shorter ranges, for example 25 to 100 yards, as well as longer ranges, limited only by the capacity of the firearm and the eyesight of the shooter.

A rangefinder, such as that shown in FIG. 2, can, for example, be used to accurately determine the range to a target whose size is known or can be estimated. For example, for a 36 inch bull's-eye target placed at an unknown distance from the shooter, the shooter need only align the right edge of the target with the vertical arm 32 of the rangefinder so that the horizontal arm 34 of the rangefinder appears to pass through the center of the bull's-eye target. If, for example, the left edge of the target extends to the cross-hair corresponding to 6 inches of angle, then the observed size of the target is 6 inches of angle, and the range to target is calculated to be:

$$\text{Range (yards)} = \frac{\text{target's actual size (inches)} \times 100}{\text{observed inches of angle on rangefinder}}$$

or, in this example, $$\text{Range (yards)} = \frac{36 \times 100}{6} = \frac{3600}{6} = 600 \text{ yards}$$

As a further example, suppose that the shooter observes a moose in the distance, eating vegetables from a garden near a house. From a comparison with a door in the house, the shooter estimates the size of the moose to be 6 feet at the shoulder. Upon viewing this target in the reticle, the shooter aligns the horizontal arm 34 of the rangefinder with the ground level upon which the moose is standing, and the vertical arm 32 of the rangefinder with the moose's shoulder. The shooter determines that the moose's shoulder touches the cross-hair marked 5. The range can then be calculated as follows:

$$\text{Range} = 72/5 \times 100 = 1440 \text{ yards}$$

Once range has been determined, the shooter can then determine and select the appropriate aiming point on the calibrated reticle, without the need for taking his eye off the target, and without the need of making any adjustments to the target acquisition device.

As windage problems downrange, particularly over long ranges, may not be accurately predicted, even with the help of a PDA-based targeting system such as that described above, the experienced shooter can always use the reticle of the present invention to correct after a shot is observed to drift. As noted above, the secondary vertical cross-hairs may be, for example, evenly spaced at 1 Mil (which equals 3.6" at 100 yards), which provides a scale for adjusting a second shot towards the target. In a further embodiment, the reticle of the present invention uses a grid calibrated at 100 USMC Mils. For example, a 50 cal. bullet is fired at a target 1500 yards away. The intersection between the primary vertical cross-hair and the secondary horizontal cross-hair identified by number 11 is the selected aiming point. The bullet was observed to drift approximately two secondary vertical cross-hairs to the right of center. To correct for this drift, the shooter need only shift the aiming point to the intersection between the second vertical cross-hair to the right of the primary vertical cross-hair and the horizontal cross-hair identified by number 11, effectively moving the barrel of the weapon left the appropriate distance to compensate for windage. Likewise, if the bullet passes the target too high or too low, the shooter can use the secondary horizontal markings to adjust for range. For example, if the bullet is observed to pass two secondary horizontal markings above the selected aiming point when it passes the target, the shooter can quickly adjust by shifting his aiming point up two secondary horizontal cross-hairs, thus depressing the barrel of the firearm.

If it is not possible to visually determine projectile drift, and if the shooter does not have access to the output of either the PC-based TRAG1S5 program or the PDA-based TRAG1S5 Targeting Program, the shooter can use a table that takes into account local conditions, the firearm, and ammunition to determine the amount of deflection over a selected range. See FIG. 8 for an illustrative table. With the conditions as stated in FIG. 8, and for a wind crossing from the left of the shooter to the right, the expected deflection of the bullet at 1000 yards would be 54.1 inches to the right. The aiming point for windage can be easily calculated:

$$\frac{\text{inches of angle on horizontal cross-hair}}{100 \text{ yards}} \times 100 \text{ yards} = 54.1 \text{ inches}$$

$$\text{inches of angle on horizontal cross-hair} = \frac{54.1 \text{ inches} \times 100 \text{ yards}}{1000 \text{ yards}} = 5.41$$

Thus, the shooter can manually correct for windage on a first shot by choosing the intersection between the correct secondary horizontal cross-hair for 1000 yards, and the first secondary vertical cross-hair to the right of the primary vertical cross-hair (which, as indicated above for a preferred embodiment, is spaced 5 inches of angle away from the primary vertical cross-hair).

Figure 10:
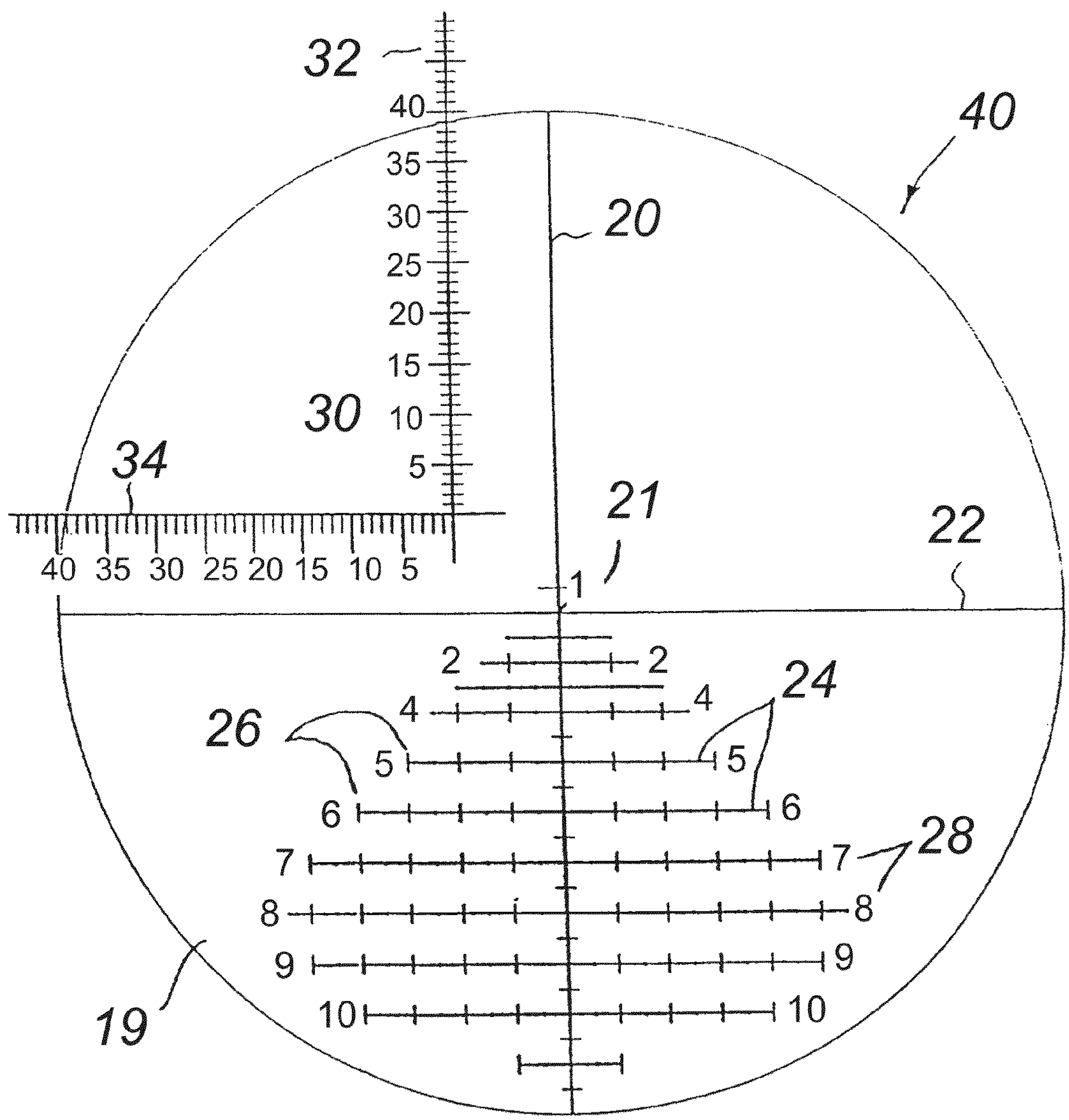
FIG. 10 is a front view of an example of a mid-range reticle of the present invention, the spacing of the markings based upon an "inch of angle" (IOA™) scale.

In addition to a long-range reticle, the present invention can be adapted for use in mid-range application. For the purpose of this application, "mid-range" is defined as about 50 to about 1000 yards from the muzzle of the weapon. A mid-range reticle can, for example, be manufactured, calibrated, and used in a target acquisition device in the same manner as the long-range reticle described above. Although the two reticles are calibrated and used in the same fashion, slight variations can exist in their reticle markings. These slight differences stem from their different range applications. Recall that the primary horizontal cross-hair 22 in the long-range reticle was preferably located above the optical center 21 to allow for additional field of view necessary for long ranges. As shown in FIG. 10, the primary horizontal crosshair 22' of a mid-range reticle 40 does not need to be above the optical center 21. Since the mid-range reticle is used for shorter distances, less of the lower field of view is needed. Accordingly, for a mid-range reticle, the primary horizontal cross-hair 22' is preferably centered to intersect the primary vertical cross-hair 20 at the optical center 21. Since this provides more room in the top sectors of the reticle, the rangefinder 30 of the mid-range reticle is preferably located in the upper left sector rather than the lower left sector.

The mid-range embodiment 40 of the present invention is used in the same manner as the long-range version. The target acquisition device and reticle can, for example, be calibrated to work with almost any type of firearm. To calibrate the target acquisition device and reticle, the shooter can follow the same procedure detailed above for a long-range reticle with the reticle preferably zeroed for mid-range yardage.

Once the target acquisition device has been calibrated for the firearm and specified ammunition, the shooter can test the calculated values against actual performance at a range. It is preferred that the final range value assigned to each secondary horizontal cross-hair should be based on an actual line firing test of the selected firearm and ammunition at various ranges. At least three shots are preferably used for the final confirmation of the estimated values.

Once the reticle has been calibrated, it can be used in the field to acquire and hit targets of all sizes at mid-range distances. The rangefinder can be used to determine the range to the target as explained above with respect to the long-range reticle. Also, compensation for windage can likewise be determined as detailed above. A target acquisition device of the present invention could be used to hit targets at shorter ranges, as well as longer ranges, limited only by the capacity of the firearm and the skills of the shooter.

Figure 11:
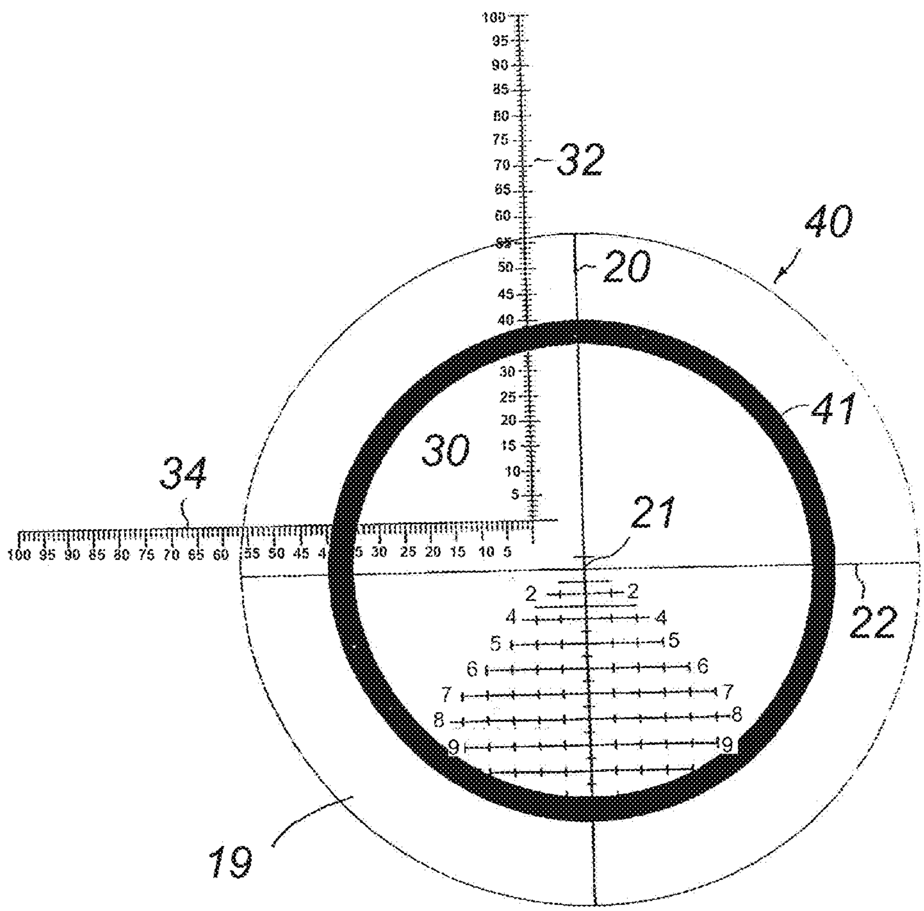
FIG. 11 is a front view of a reticle of the present invention including a circumscribing ring, the spacing of the markings based upon an "inch of angle" (IOA™) scale.
Figure 12:
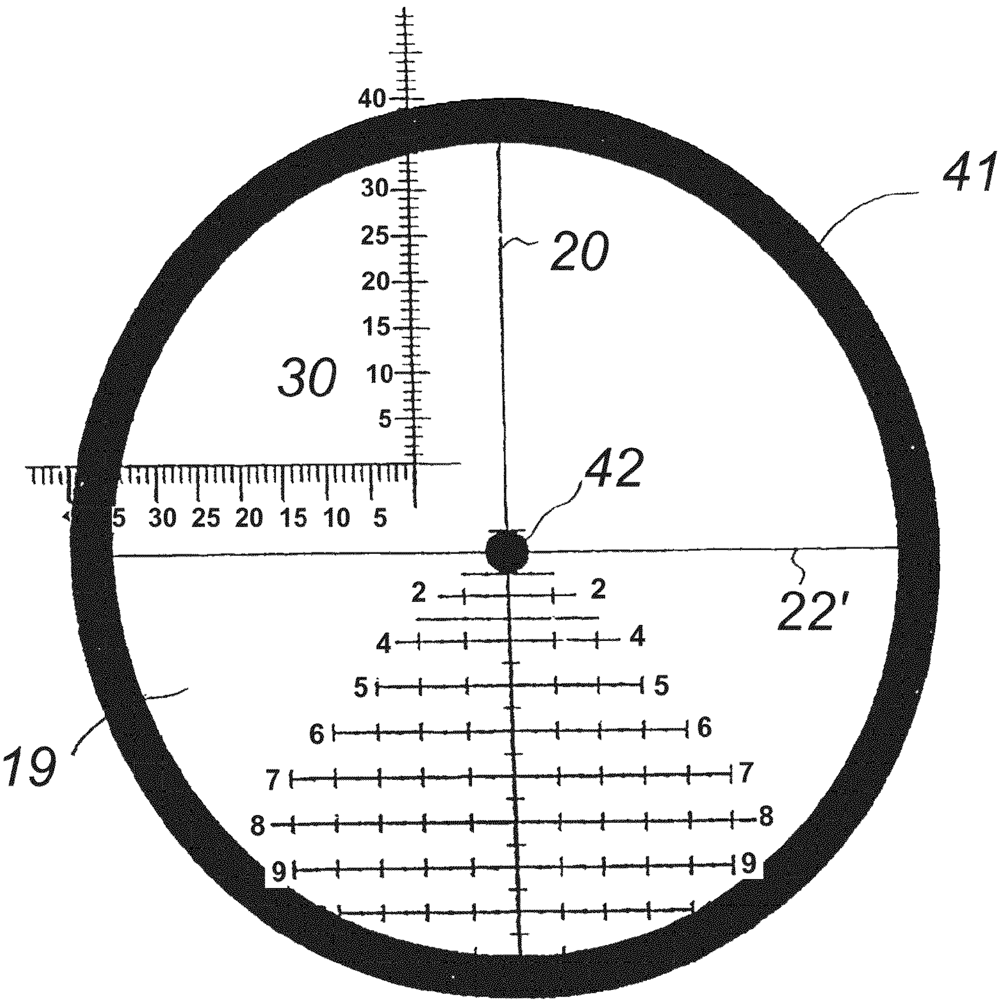
FIG. 12 is a front view of a reticle of the present invention including a circumscribing ring and an aiming dot located at the optical center, the spacing and the markings based upon an "inch of angle" (IOA™) scale.

More accurate results can be achieved if a shooter centers the reticle while looking through the target acquisition device. However, aligning the user's eye with the optical center of the target acquisition device is not always easy. The present invention can also be provided with a "ghost ring" 41 as depicted in FIG. 11. The ghost ring 41 is a visible ring which has as its center the optical center 21 of the scope, and which circumscribes that markings on the reticle. Ghost ring 41 aids shooters by helping them align their sight with respect to the target acquisition device and reticle. By insuring that the ghost ring 41 is centered within the field of view of the target acquisition device, the reticle will likewise be centered. As shown in FIG. 12, an aiming dot 42 can, for example, be included as an aid for rapid acquisition of moving targets, and for centering the shooter's eye in the field of view of the scope. Dot 42 can be any diameter, but is most preferably about 5 inches of angle in diameter, and is superimposed over the optical center of the reticle. Dot 42 shown is most preferably circular, but it may also be other shapes such as square, rectangular, oval, and the like. The aiming dot 42 can be a predetermined size that covers a predetermined area of the target at a given range according to a scaling of the reticle, such as inches of angle, centimeters of angle, or conventional scaling means as mentioned previously. The preferred arrangement of ghost ring 41 in combination with aiming dot 42 enhances the eye's natural tendency to center the ring 41 in the center of the field of view of the target acquisition device. By looking directly along the target acquisition device, the shooter is more likely to have accurate and repeatable shooting. The ghost ring 41 and dot 42 can be part of the reticle. Preferably ring 41 and dot 42 are etched onto one side of the disc 19. However, ring 41 and dot 42 can, for example, also be provided using other conventional methods such as, for example, printing, etching, or applying hairs or wires to disc 19, or to other optical components of the target acquisition device. In one embodiment, the etched rings and dots are filled with luminescent material such that the rings and dots may be illuminated if desired. Preferably aiming marking 42 is etched onto one side of the disc 19, but it can also be provided using other conventional methods such as, for example, printing or applying hairs or wires to disc 19 or to other optical components of the scope. In a further embodiment, the ghost ring is projected and mobile on the reticle, thereby preserving rapid aiming properties while not fixed only to the center of the reticle.

Figure 44A:
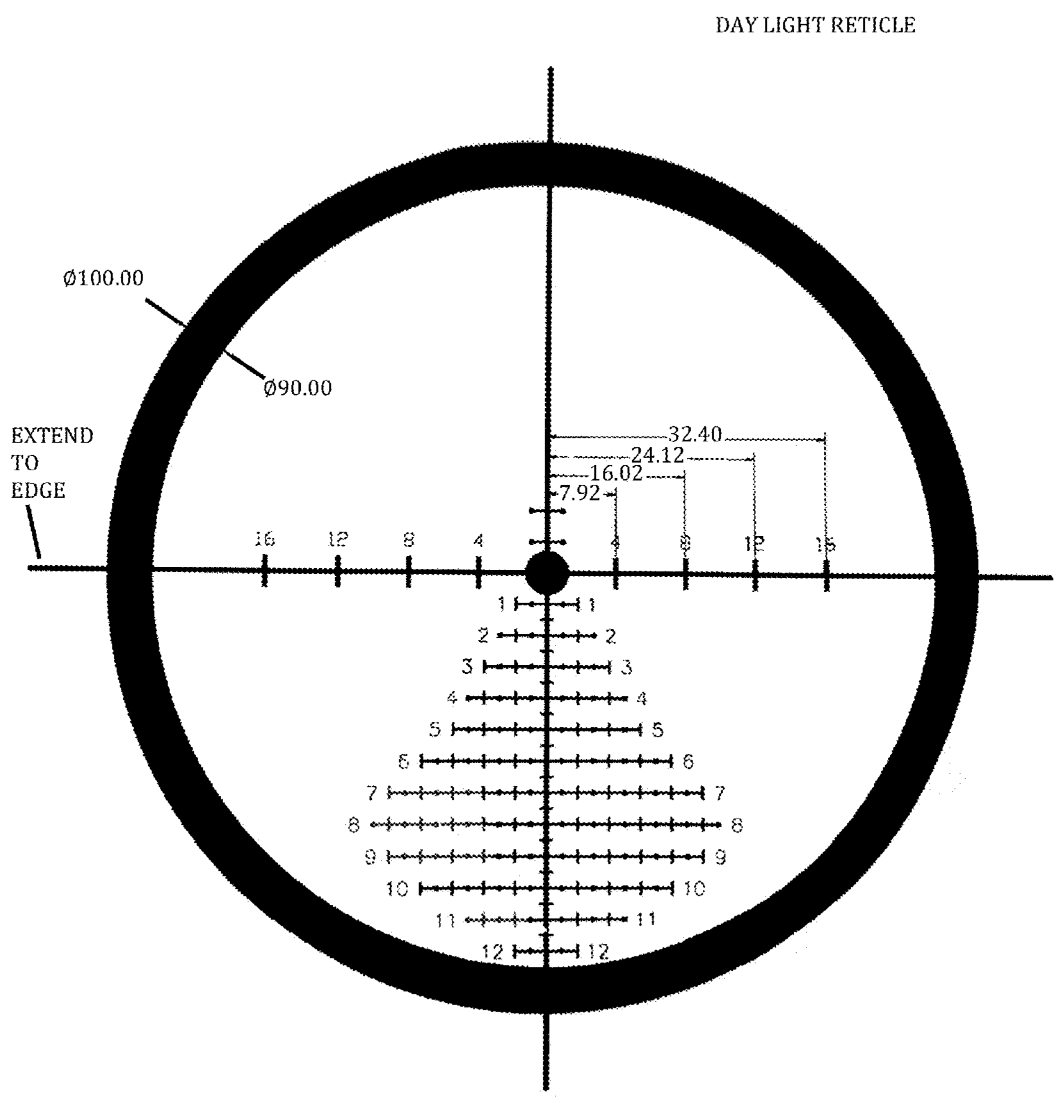
FIG. 44*a* is a front view of a reticle of the present invention, showing the markings as viewed through a zoom telescopic gunsight at high power in day light, with lead markers along the primary horizontal cross-hair suitable for use, for example, in tactical, military, and police applications.

As exemplified in FIG. 44*a*, one embodiment of the present invention comprises a reticle, for example, for rapid target acquisition and threat elimination comprised of a ring that is centered in the riflescope's optical or electronics field of view. FIG. 44*a* is a front view of a reticle of the present invention, showing the markings as viewed through a zoom telescopic gunsight at high power in day light, with lead markers along the primary. horizontal cross-hair suitable for use, for example, in tactical, military, and police applications on stationary and moving targets. In one embodiment, the reticle of the present invention further comprises a substantially transparent disc having an optical center and an edge for mounting said disc, and a ring positioned optically between said optical center and said edge, said ring spaced from said edge and circumscribing said optical center and one or more aiming points, whereby said ring can be visually centered in a field of view for aiding users in aligning their line of sight through said target acquisition device. In some embodiments, the ring-equipped reticle allows the shooter to rapidly discriminate the ring in the target acquisition device's field of view. The shooter thereby naturally and subconsciously focuses on the center of the ring. In further embodiments, a central dot is used for finer or more precise targeting as time allows. As used herein, a "central dot" refers to any geometric shape, for example, a circle, a square, a cross, or a diamond. In some embodiments, the central dot is solid. In other embodiments, the central dot is hollow. In further embodiments, the central dot is indicated by interrupted lines.

In additional embodiments, the ring-equipped reticle gives the shooter the ability to rapidly acquire and engage targets at very close distances to plus or minus 300 yards. When a target is spotted, and time is of the essence, the central ring that encases all or part of the reticle gives the shooter the ability to quickly discriminate the object to be targeted. When speed is an essential factor, the reticle of the present invention gives the shooter a safety factor equated in time. Whether beast or man, she who sees first wins. The ring-equipped reticle of the present invention allows the shooter to strike the target first, thereby dramatically increasing her or his odds of survival. In some embodiments, for extended range targets up to 1000 yards and beyond, the shooter uses the targeting grid of the present invention contained wholly or partially within all or part of the ring.

In some embodiments the ring is designed with a thick line, for example a line that subtends, or covers, 5 MOA at 100 yards. In other embodiments, a thinner line is employed compatible with, for example, specific target acquisition devices, preferred magnification powers, weapons of choice, or assigned missions. In some embodiments, the area subtended by the ring is selected depending on targeting and weapon requirements. In preferred embodiments, the area of the ring on an electronic reticle is selected by programming the ballistics calculator system.

In some embodiments, the ring is partitioned into 4 equal quadrants by horizontal and vertical cross-hairs. In other embodiments, the quadrants bounded by horizontal and vertical cross-hairs are unequal in area. In another embodiment, the ring is a geometric shape, for example an oval or diamond, positioned at the center of the optical field of view. In other embodiments, the ring is a geometric shape, for example an oval or a diamond, located at the point that the horizontal and vertical crosshairs physically intersect. In still other embodiments, the ring is a geometric shape, for example an oval or a diamond, located at the point that interrupted horizontal and vertical crosshairs intersect if linearly projected. In some embodiments, the geometric shape of the ring subtends 5 MOA at exactly 100 yards. In one embodiment, the geometric shape of the ring is continuous. In another embodiment, the geometric shape of the ring is interrupted. In yet further embodiments, the size and shape of the ring is selected depending on the mission, weapon and type of ammunition.

Figure 44B:
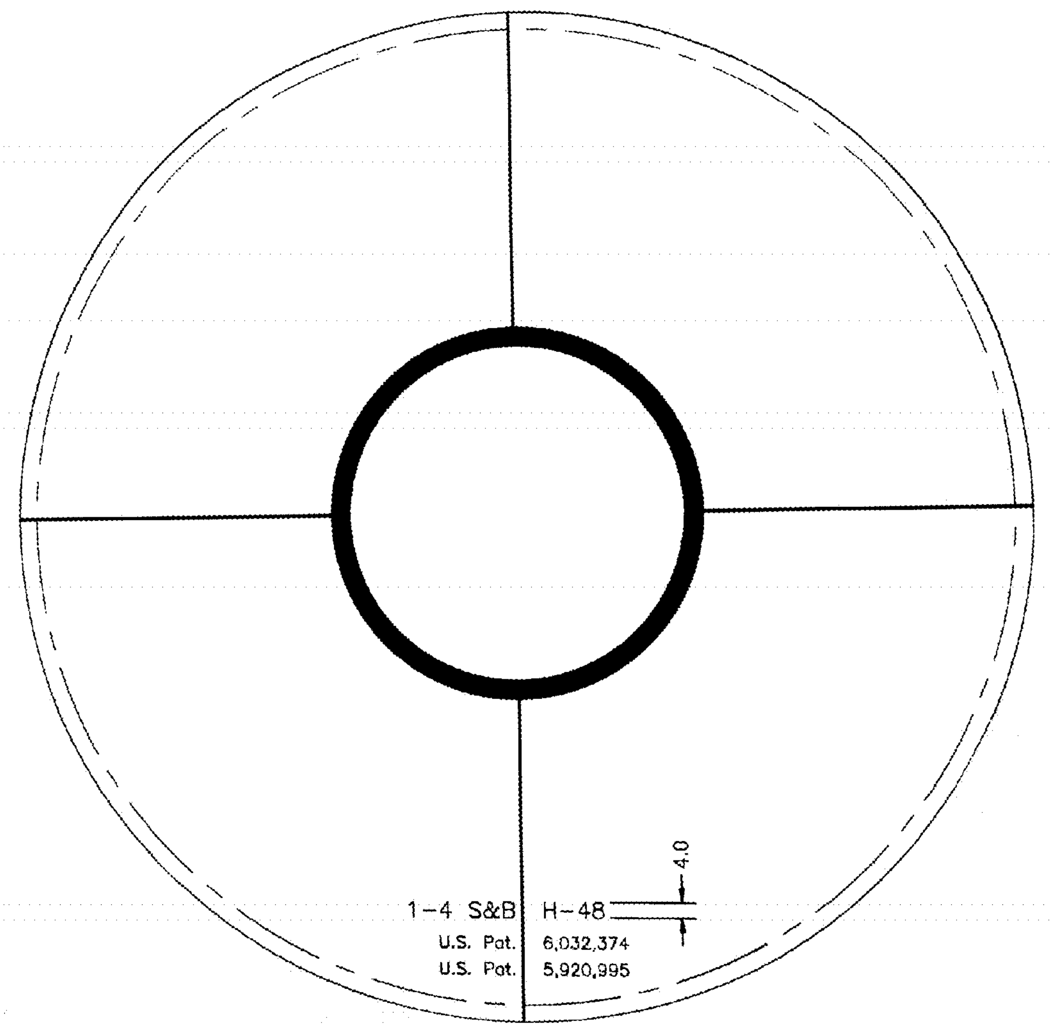
FIG. 44*b* shows a lower power view with the details inside the central ring that are shown in FIG. 44*a* not shown as they do not reproduce well at this scale.
Figure 44C:
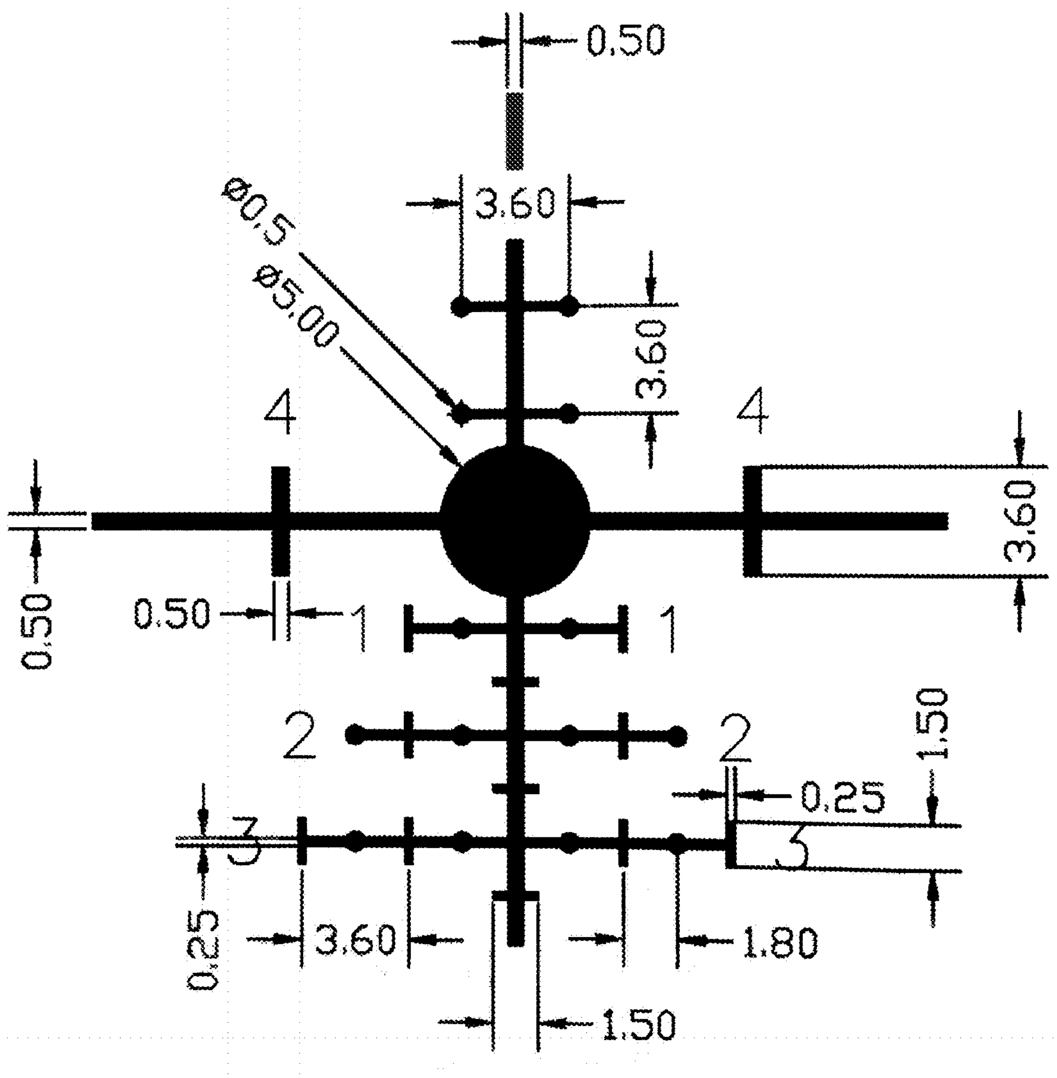
FIG. 44*c* shows a magnified portion of the reticle pattern of FIG. 44*a* providing relative dimensions of the pattern components.
Figure 44D:
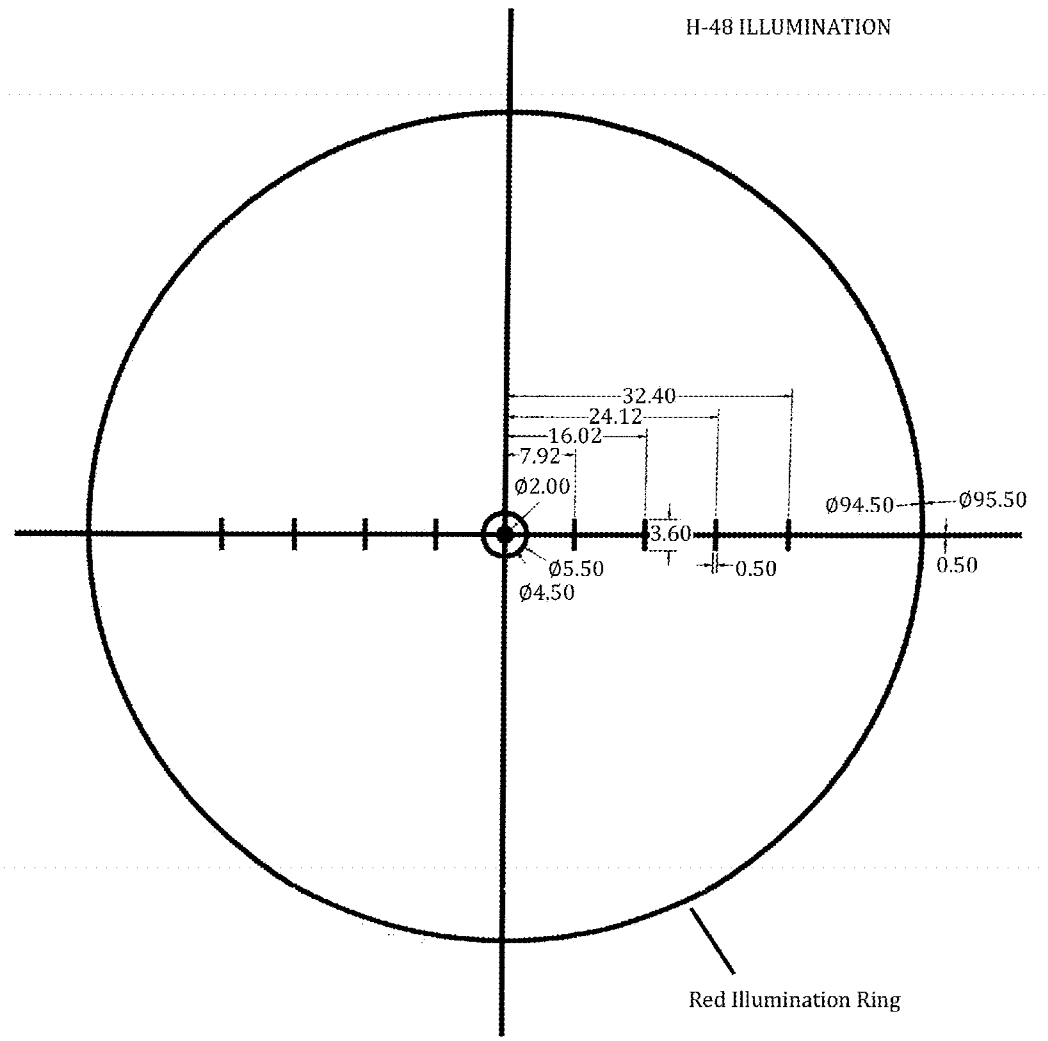
FIG. 44*d* is a front view of a reticle of FIG. 44*a*, showing the markings as viewed through an electronic reticle at high power illuminated for use under low light conditions.
Figure 44E:
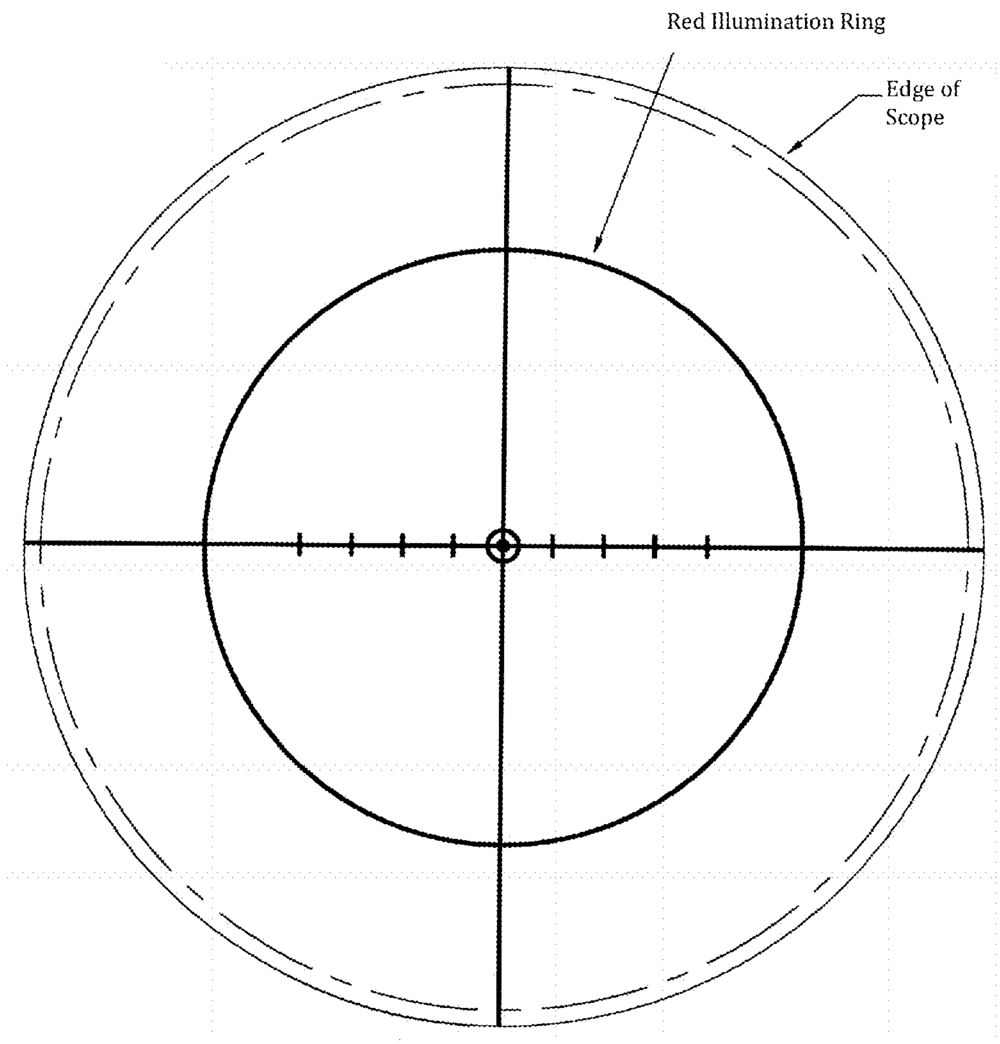
FIG. 44*e* provides a lower power view of the reticle shown in FIG. 44*d.*

As shown in FIG. 44*a*, in one embodiment, the reticle is configured for use in day light illumination. As shown in FIG. 44*b*, in another embodiment, the reticle is configured for use under low light conditions. FIG. 44*b* is a front view of a reticle of FIG. 44*a*, showing the markings as viewed through an electronic reticle at high power illuminated for use under low light conditions. In some embodiments, all or parts of the reticle may be illuminated to aid the rifleman in twilight viewing, or in high contrast situations. In preferred embodiments, the intensity of reticle illumination may be increased or decreased by an electronic target acquisition device.

As shown in FIG. 44*a*, in some embodiments markings along a horizontal cross-hair are used to indicate the hold points for the shooter to use when leading or engaging moving targets. In further embodiments, the markings are, for example hackmarks, dots, ovals, triangles, circles, or numbers.

In additional embodiments, the reticle of the present invention comprises lead markings. As exemplified in FIG. 45, in some embodiments, lead markings on the reticle are used to aid the shooter in determining the direction and rate of movement of the target in relation to the shooter in order to target a moving object. As used herein, "rate of movement" refer to a unit of distance traveled per unit time. Any unit of distance and any unit of time are suitable for indicating rate of movement. In some embodiments, units of distance include, for example, inches, feet, yards, miles, centimeters, meters, or kilometers. In some embodiments, units of time include, for example, milliseconds, seconds, minutes, hours, days, weeks, months or years. Lead markings may occupy any position in relation to primary and secondary vertical or horizontal cross-hairs. In some embodiments, lead markings occupy positions, for example, above a cross-hair, below a cross-hair, upon a cross-hair, between cross-hairs, or at the end of a cross-hair.

In one embodiment, lead markings are evenly spaced. In other embodiments, lead markings are unevenly spaced. In further embodiments, lead markings are spaced according to average rates of movement. In preferred embodiments, lead markings are projected on the reticle by a ballistics calculator system. In particularly preferred embodiments, projected lead markings are spaced on the reticle by a ballistics calculator system to account, for example, for the target's distance from the shooter, the target's direction of movement, the target's velocity of movement, the target's rate of acceleration, the reaction time of the shooter, or the lock time of the firearm.

Figure 45A:
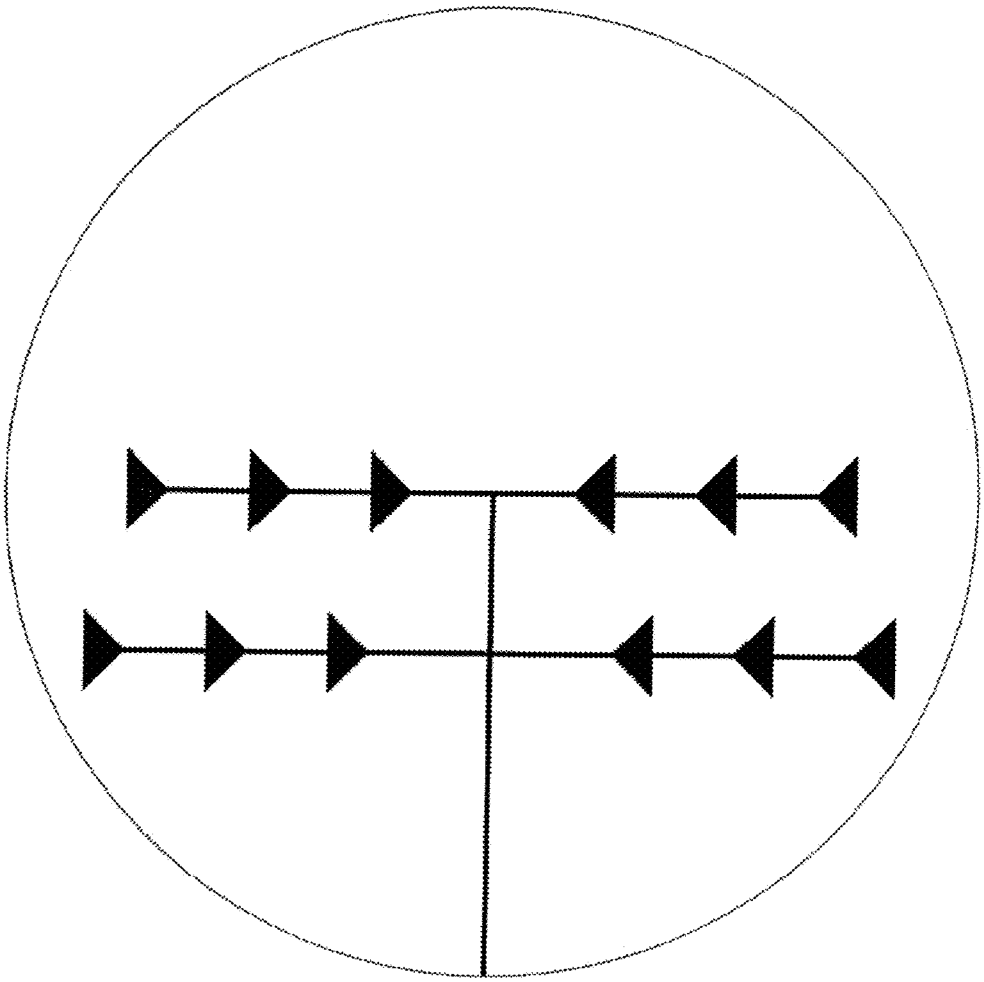
FIG. 45*a* is a front view of a reticle of the present invention, showing markings as viewed through a zoom telescopic gunsight at high power, with secondary vertical cross-hairs as lead markings on a primary and secondary horizontal cross-hair
Figure 45B:
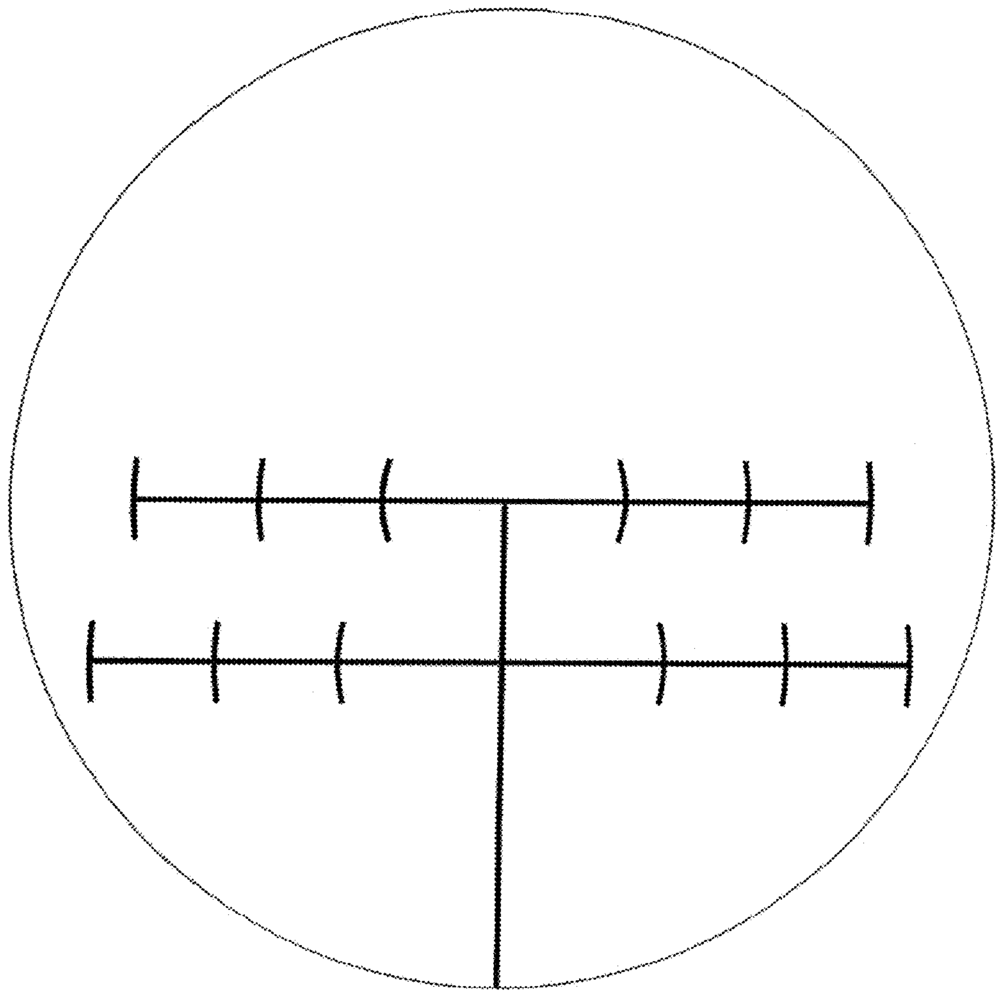
FIG. 45*b* is a front view of a reticle of the present invention, showing markings as viewed through a zoom telescopic gunsight at high power, with arcs as lead markings along a primary and secondary horizontal cross-hair.
Figure 45C:
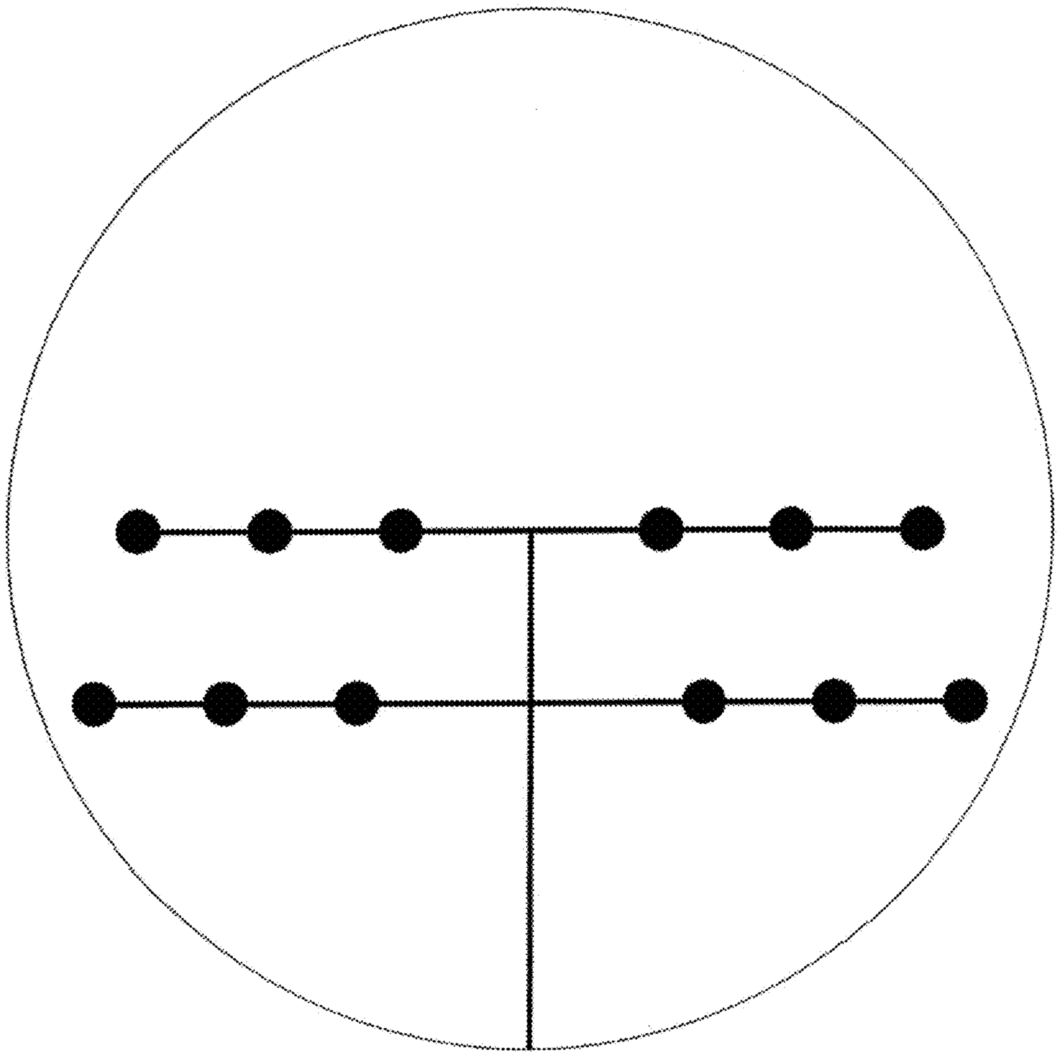
FIG. 45*c* is a front view of a reticle of the present invention, showing markings as viewed through a zoom telescopic gunsight at high power, with solid circles as lead markings along a primary and secondary horizontal cross-hair.
Figure 45D:
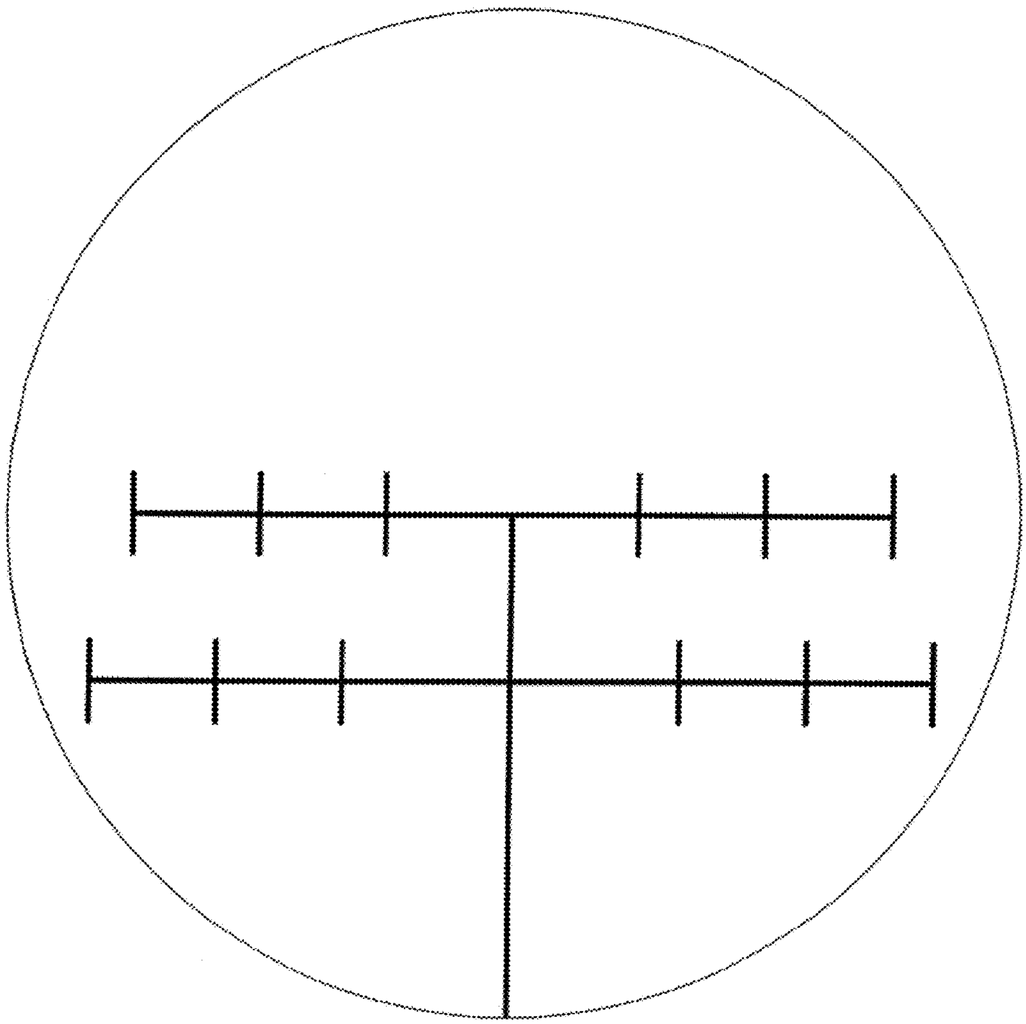
FIG. 45*d* is a front view of a reticle of the present invention, showing markings as viewed through a zoom telescopic gunsight at high power, with solid triangles as lead markings along a primary and secondary horizontal cross-hair.
Figure 45E:
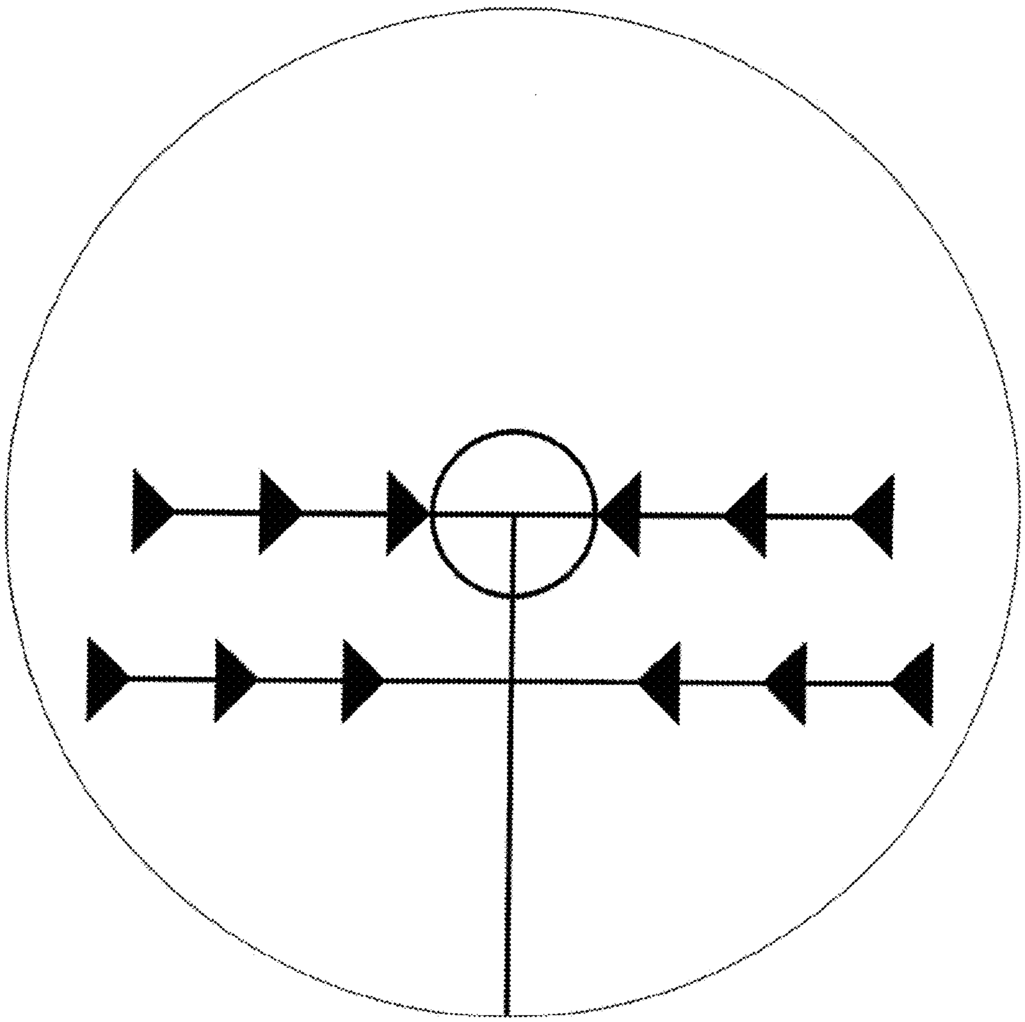
FIG. 45*e* is a front view of a reticle of the present invention, showing markings as viewed through a zoom telescopic gunsight at high power, with solid triangles as lead markings along a primary and secondary horizontal cross-hair, with a circle as a ring for aiding users in aligning their line of sight.
Figure 45F:
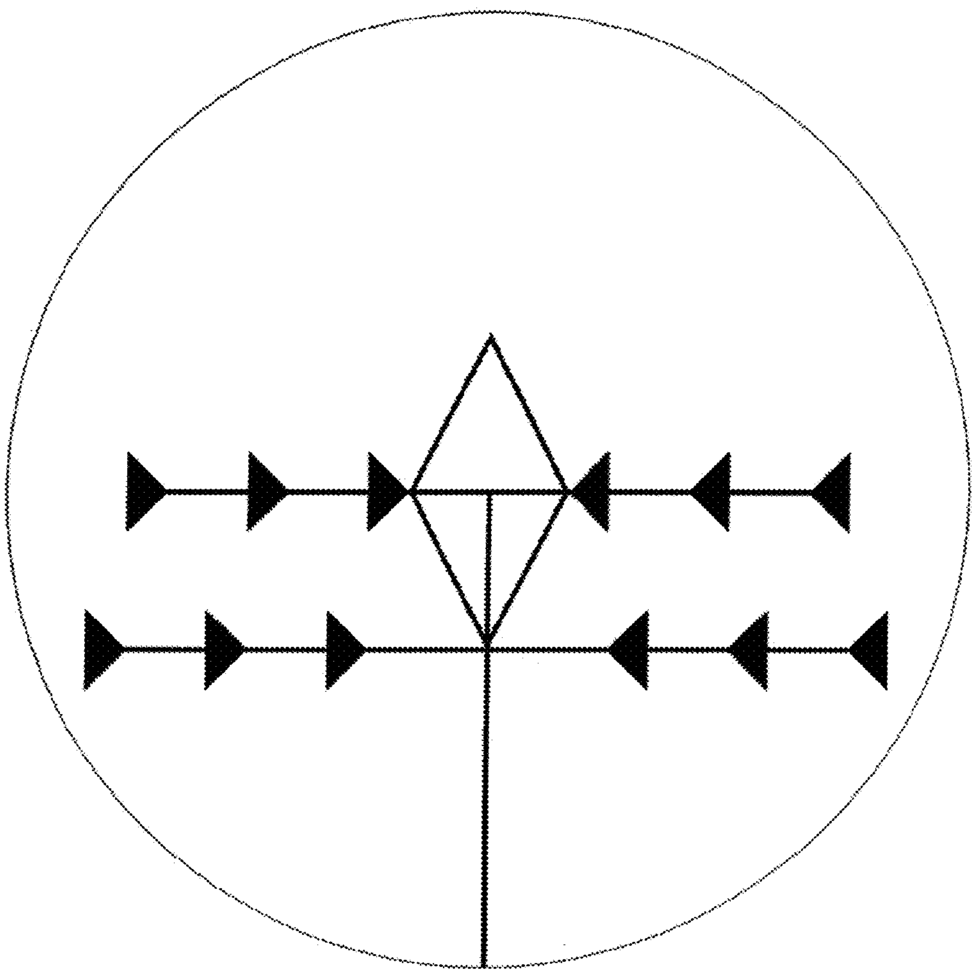
FIG. 45*f* is a front view of a reticle of the present invention, showing markings as viewed through a zoom telescopic gunsight at high power, with solid triangles as lead markings along a primary and secondary horizontal cross-hair, with a rhombus as a ring for aiding users in aligning their line of sight.

As used herein, "lead markings" may take any shape or configuration. In some embodiments, lead markings may be, for example, triangles, circles, squares, straight lines, curved lines, arcs, dots, numbers, solid shapes, or shapes in silhouette. Lead markings may be any color, in some embodiments, for example, black, white, red or blue in color. In other embodiments lead markings serve more than one purpose serving, for example, as identification markings or rangefinding markings as well as lead markings. In one embodiment, the lead markings are along at least one of the primary cross-hairs. In another embodiment, the lead markings are along at least one of the secondary cross-hairs. In yet another embodiment, the lead markings are along at least one primary cross-hair, and at least one secondary cross-hair. In a preferred embodiment, the plurality of lead markings comprises at least three lead markings. As shown in FIG. 45*a*, in a particularly preferred embodiment, the lead markings are secondary vertical cross-hairs on a primary and secondary horizontal cross-hair. As shown in FIG. 45*b*, in one embodiment, lead markings are arcs along a primary and secondary horizontal cross-hair. As shown in FIG. 45*c*, in another embodiment, lead markings are solid circles along a primary and secondary horizontal cross-hair. As shown in FIG. 45*d*, in still another embodiment, lead markings are solid triangles along a primary and secondary horizontal cross-hair. In yet another embodiment, as shown in FIG. 45*e*, lead markings are located along a primary and secondary horizontal cross-hair in a reticle equipped with a circle as a ring for aiding users in aligning line of sight. In a further embodiment, as shown in FIG. 45*f*, lead markings are located along a primary and secondary horizontal cross-hair in a reticle equipped with a diamond as a ring for aiding users in aligning line of sight.

FIG. 46 exemplifies a reticle of the present invention that excels when engaging moving targets. As shown in FIG. 46*a*, in one embodiment, the reticle of the present invention comprises a plurality of primary cross-hairs separated by predetermined distances, a plurality of secondary cross-hairs at predetermined distances along said plurality of primary cross-hairs, and a plurality of lead markings indicating rate of movement of the target along at least one said cross-hair. In one embodiment, the plurality of primary-cross-hairs comprises vertical cross-hairs. In another embodiment, the plurality of primary cross-hairs comprises horizontal cross-hairs. In yet another embodiment, the plurality of primary cross-hairs comprises both vertical and horizontal cross-hairs. In a further embodiment, the plurality of secondary cross-hairs comprises vertical cross-hairs. In still further embodiment, the plurality of secondary cross-hairs comprises horizontal cross-hairs. In a preferred embodiment, the plurality of secondary cross-hairs comprises both vertical and horizontal cross-hairs. In one embodiment, secondary vertical cross-hairs are positioned along a primary horizontal cross-hair. In another embodiment, secondary vertical cross-hairs are positioned off a primary horizontal cross-hair. In a particularly preferred embodiment, the plurality of secondary cross-hairs comprises at least three secondary cross-hairs.

Figure 46A:
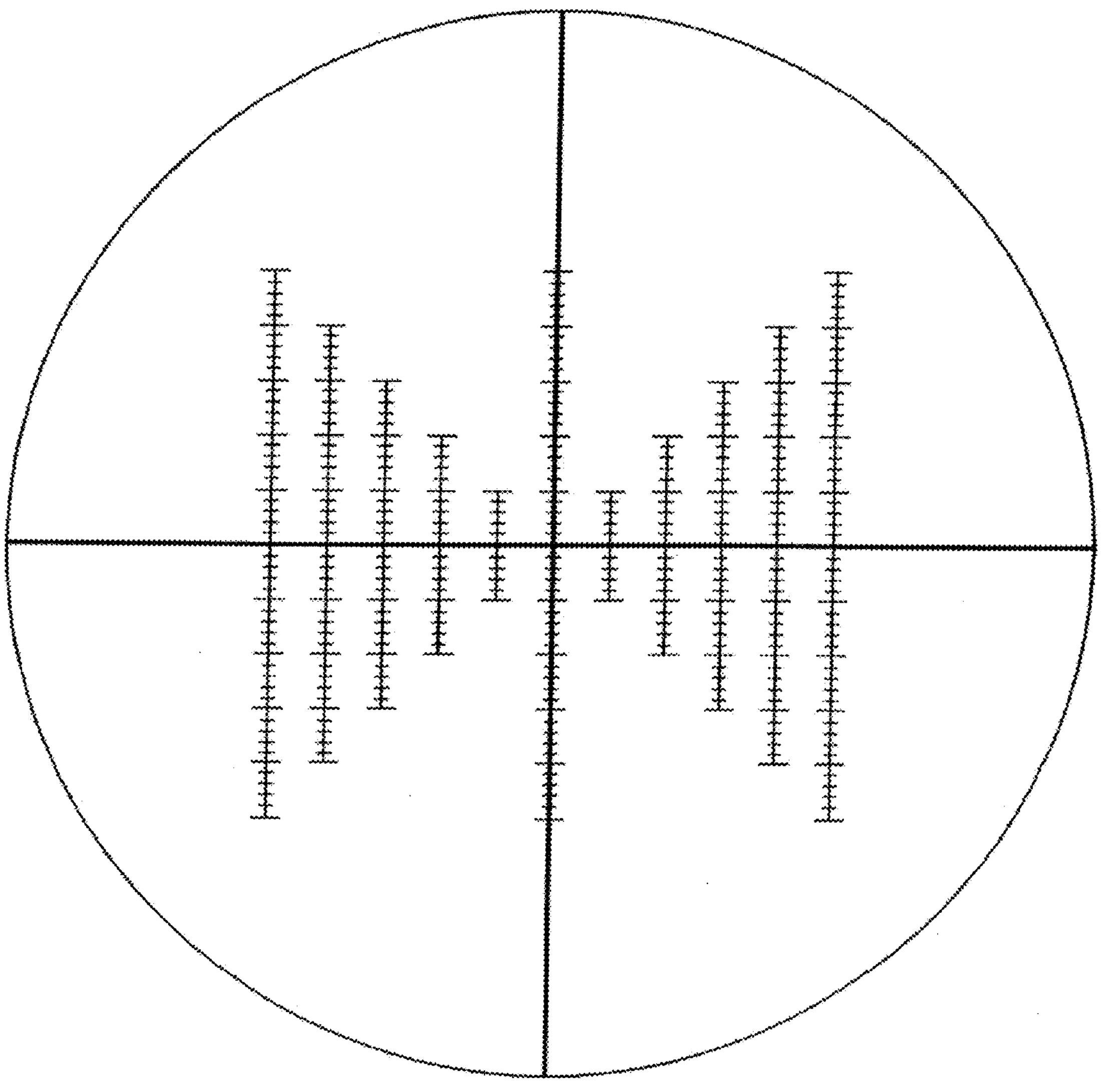
FIG. 46*a* is a front view of a reticle of the present invention, showing markings as viewed through a zoom telescopic gunsight at high power, with secondary vertical cross-hairs as lead markings on a primary horizontal cross-hair, and secondary horizontal cross-hairs as lead markings along the secondary vertical cross-hairs of unequal length, of use, for example, in targeting a moving object.
Figure 46B:
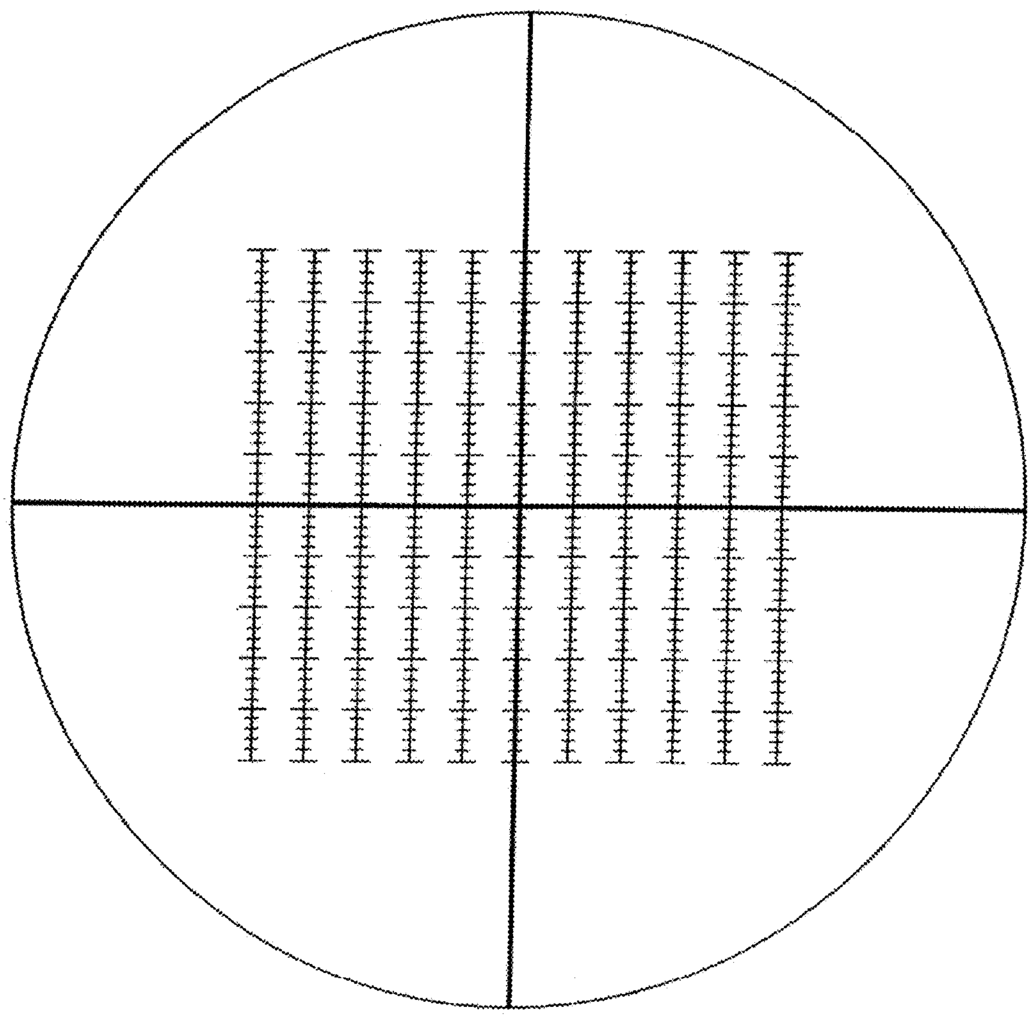
FIG. 46*b* is a front view of a reticle of the present invention, showing markings as viewed through a zoom telescopic gunsight at high power, with secondary vertical cross-hairs as lead markings on a primary horizontal cross-hair, and secondary horizontal cross-hairs as lead markings along the secondary vertical cross-hairs of equal length, of use, for example, in targeting a moving object.
Figure 46C:
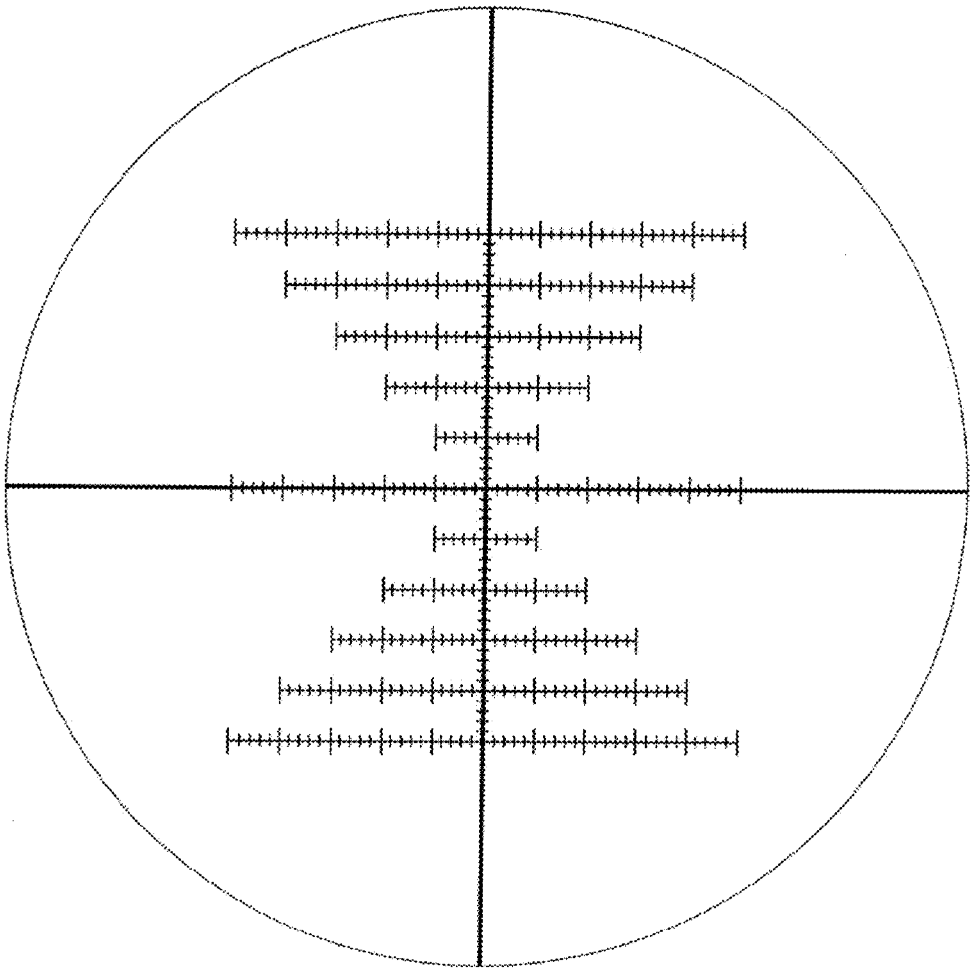
FIG. 46*c* is a front view of a reticle of the present invention, showing markings as viewed through a zoom telescopic gunsight at high power, with secondary horizontal cross-hairs as lead markings on a primary vertical cross-hair, and secondary vertical cross-hairs as lead markings along the secondary horizontal cross-hairs of unequal length, of use, for example, in targeting a moving object.
Figure 46D:
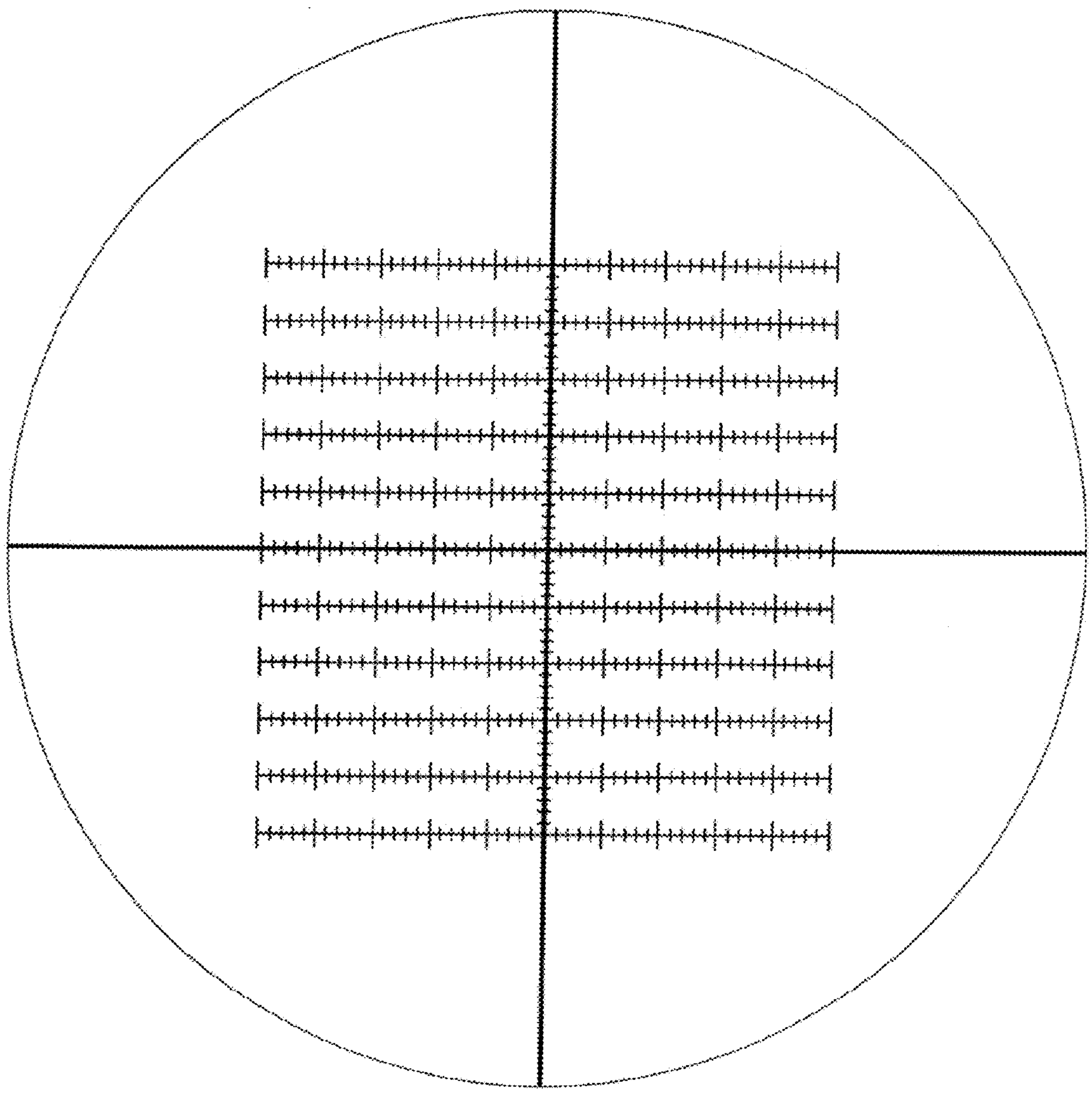
FIG. 46*d* is a front view of a reticle of the present invention, showing markings as viewed through a zoom telescopic gunsight at high power, with secondary horizontal cross-hairs as lead markings on a primary vertical cross-hair, and secondary vertical cross-hairs as lead markings along the secondary horizontal cross-hairs of equal length, of use, for example, in targeting a moving object.

FIG. 46*a* is a front view of a reticle of the present invention, showing markings as viewed through a zoom telescopic gunsight at high power, with secondary vertical cross-hairs as lead markings on a primary horizontal cross-hair, and secondary horizontal cross-hairs as lead markings along the secondary vertical cross-hairs of unequal length, of use, for example, in targeting a moving object. In one embodiment, the primary horizontal crosshair on both sides of the primary vertical crosshair is physically, or by linear projection, intersected by secondary vertical cross-hairs located at predetermined distances from the primary vertical crosshair. In some embodiments, spacing of the secondary vertical cross-hairs represents hold points for leading a horizontally moving target. In other embodiments, at least one secondary vertical cross-hair is subdivided by at least one hackmark used for elevation holdover. In still other embodiments, at least one secondary vertical cross-hair is subdivided by a hackmark used for leading a vertically moving target. In yet other embodiments, at least one secondary vertical cross-hair is subdivided by at least one hackmark used for leading a target moving both horizontally and vertically. The spacing of the secondary vertical and secondary horizontal cross-hairs may be calibrated, for example, in MOA, Mil Radian, COA or other calibration system. As shown in FIG. 46*b*, in a further embodiment, the reticle of the present invention comprises secondary vertical cross-hairs as lead markings on a primary horizontal cross-hair, and secondary horizontal cross-hairs as lead markings along the secondary vertical cross-hairs of equal length, of use, for example, in targeting a moving object.

Figure 47:
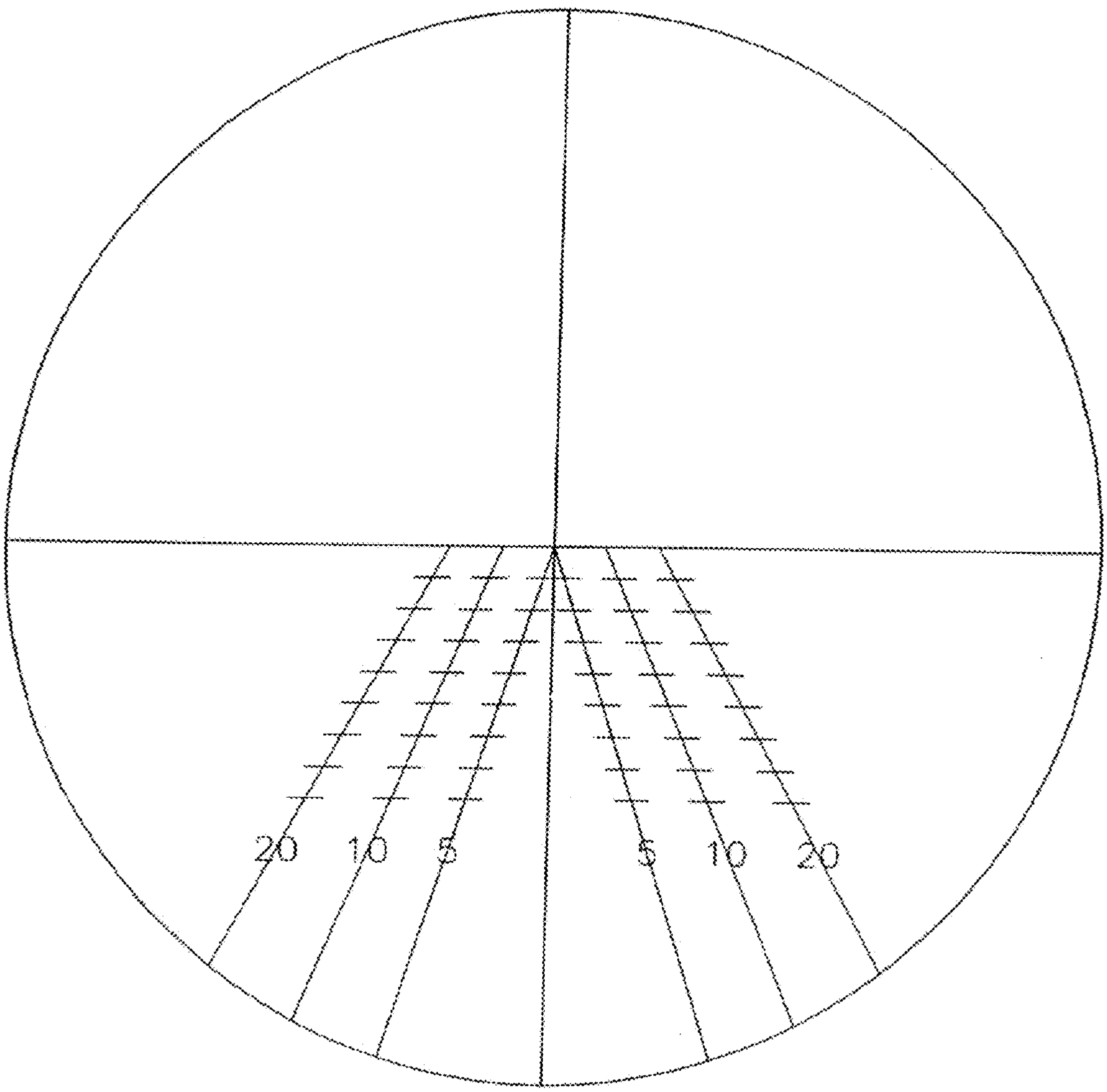
FIG. 47 is a front view of a reticle of the present invention, showing markings as viewed through a zoom telescopic gunsight at high power, with secondary horizontal cross-hairs along secondary vertical cross-hairs, with markings for identification purposes, of use, for example, in targeting a moving object.

As shown in FIG. 47, in one embodiment, reticles of the present invention comprise secondary horizontal cross-hairs along secondary vertical cross-hairs, with markings for identification purposes, of use, for example, in targeting a moving object. In a preferred embodiment, the secondary horizontal cross-hairs are evenly spaced. In a particularly preferred embodiment, the secondary vertical cross-hairs are angled from the primary vertical cross-hair. In some embodiments, the angled secondary vertical cross-hairs are evenly spaced. In further embodiments, the angled secondary vertical cross-hairs are unevenly spaced. In still further embodiments, spacing between secondary vertical cross-hairs varies along the length of the secondary vertical cross-hairs.

Figure 48A:
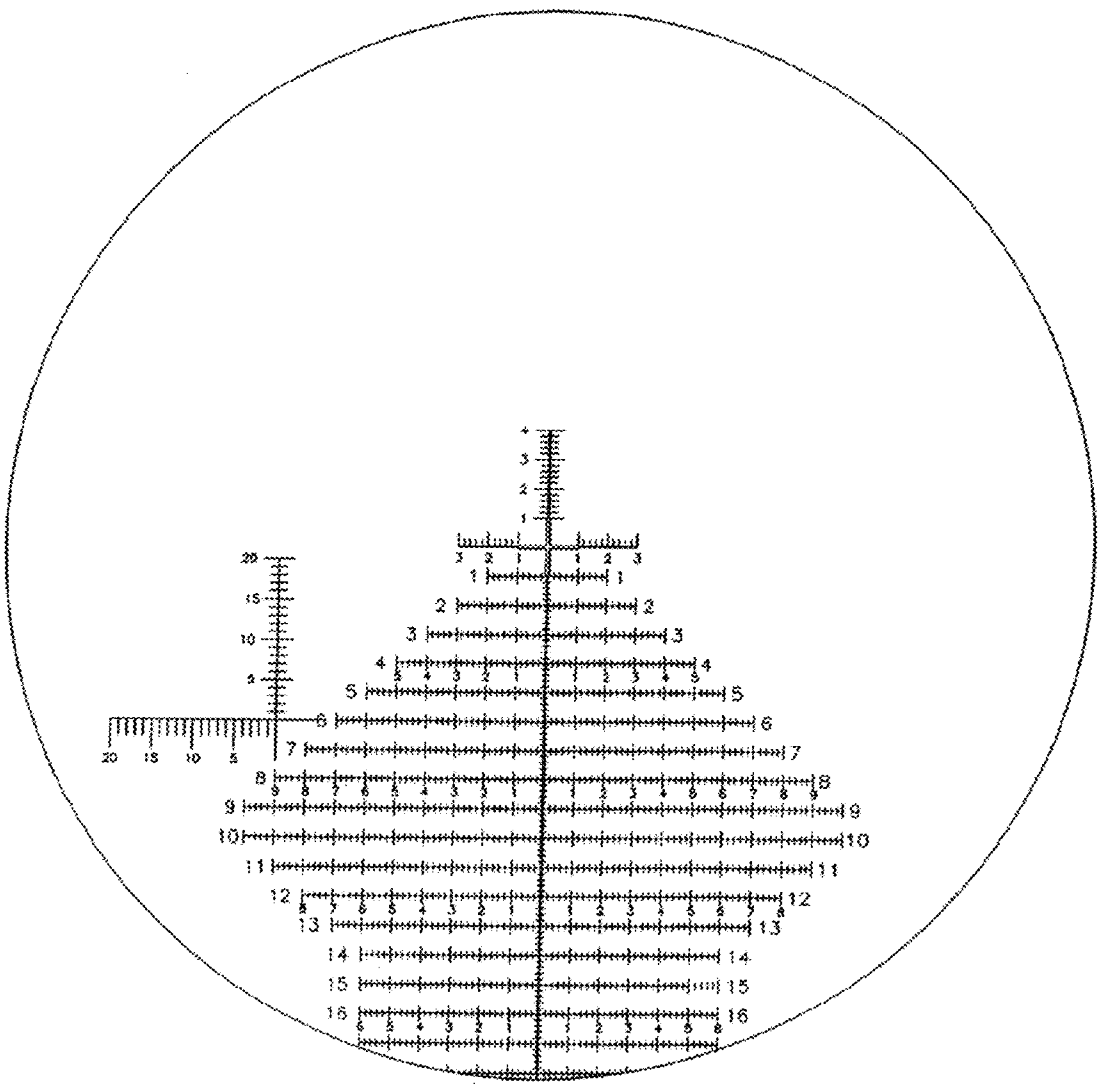
FIG. 48*a* is a front view of a reticle of the present invention, showing the markings as viewed through a zoom telescopic gunsight at high power, with lead markers along horizontal cross-hairs suitable for use, for example, in tactical, military, and police applications in targeting a moving object.
Figure 48B:
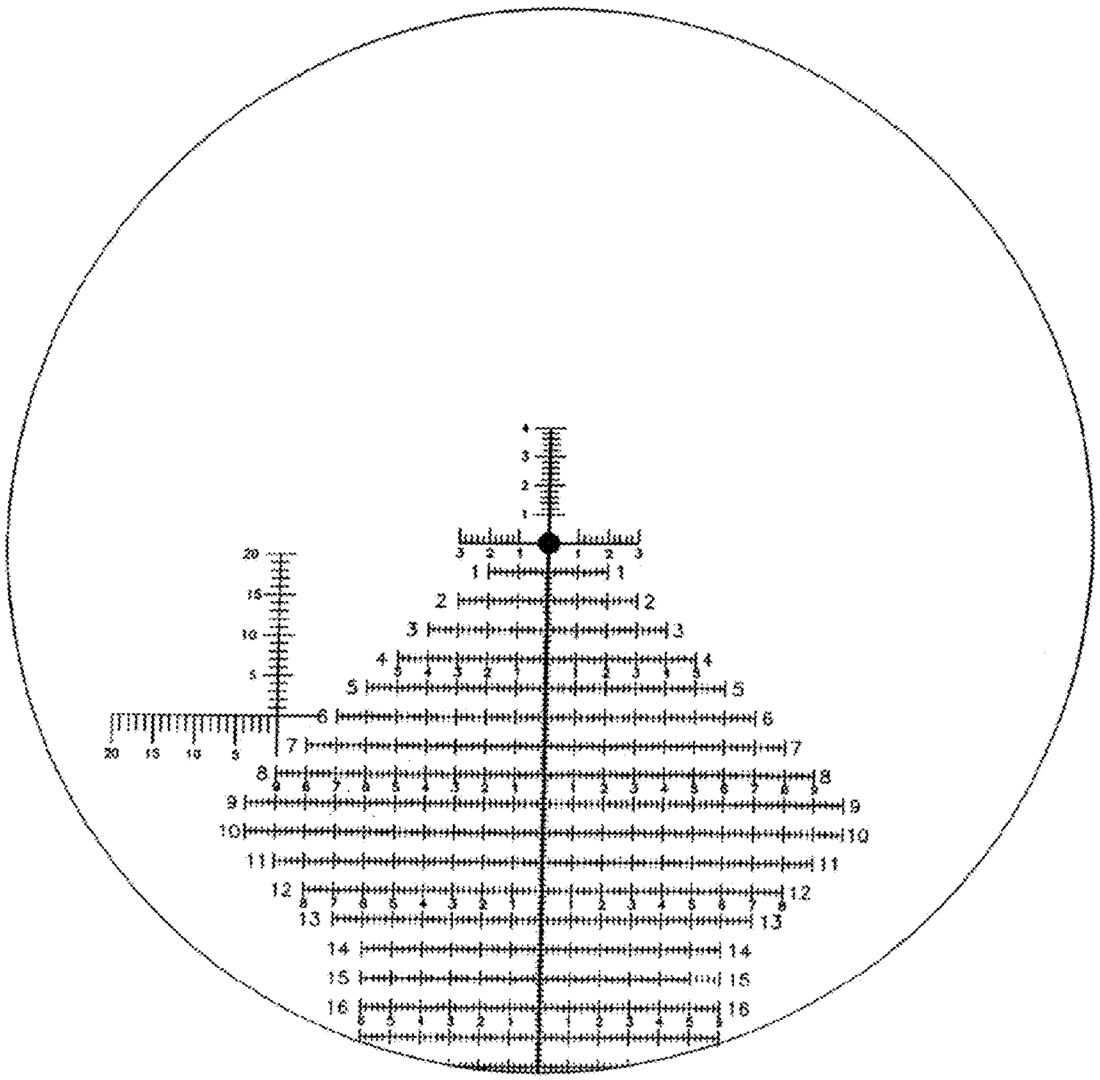
FIG. 48*b* is a front view of a reticle of the present invention, showing the markings as viewed through a zoom telescopic gunsight at high power, with lead markers along horizontal cross-hairs suitable for use, for example, in tactical, military, and police applications in targeting a moving object.
Figure 49:
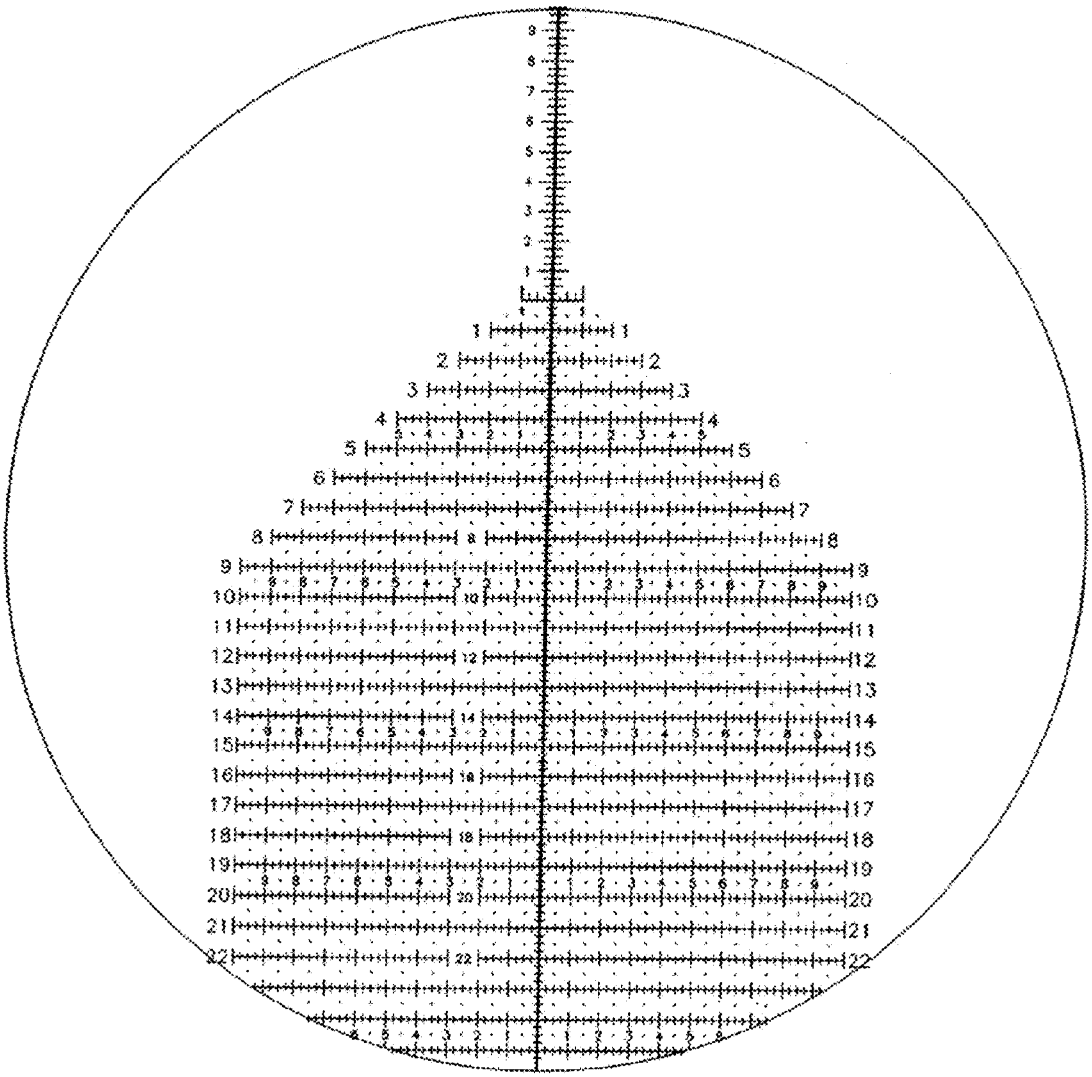
FIG. 49 is a front view of a reticle of the present invention, showing the markings as viewed through a zoom telescopic gunsight at high power, with lead markers along horizontal cross-hairs suitable for use, for example, in tactical, military, and police applications in targeting a moving object
Figure 50A:
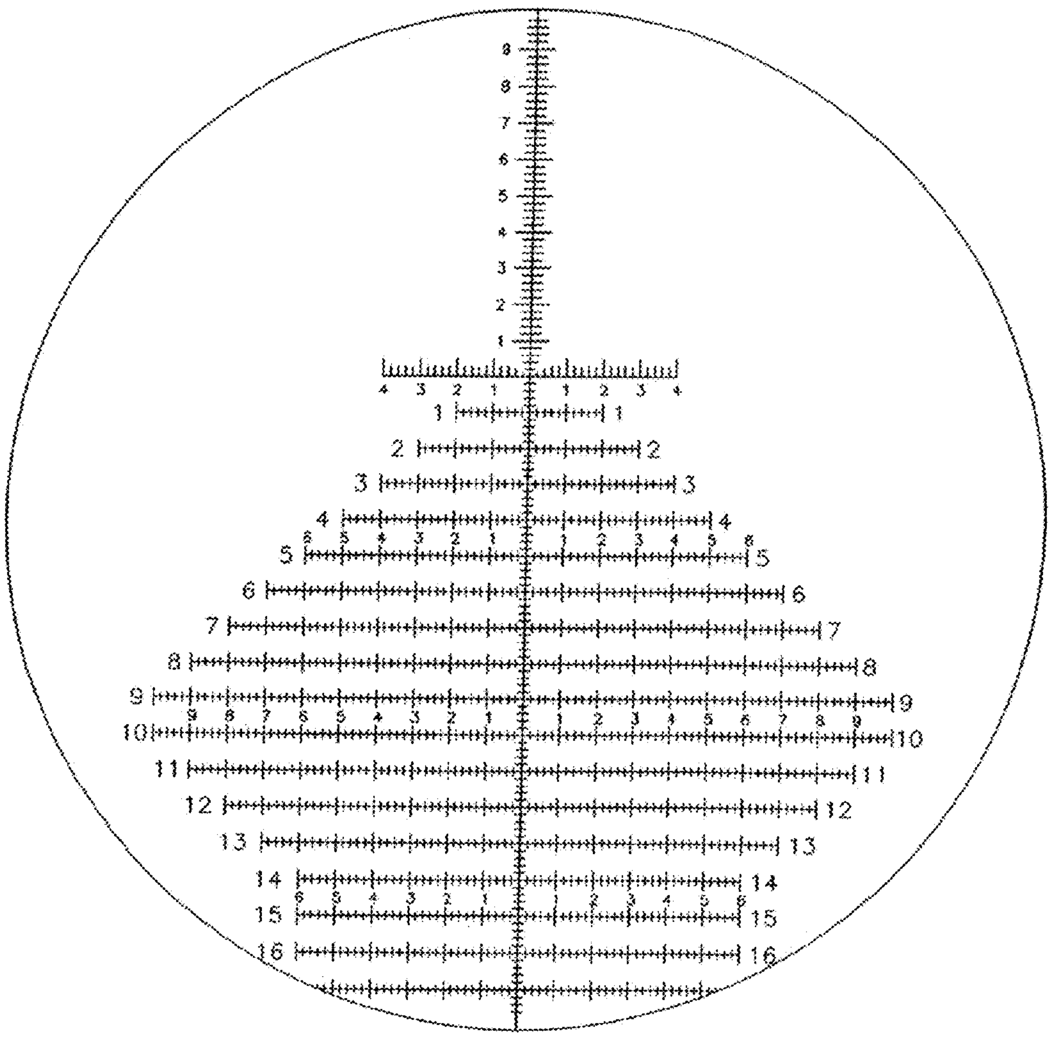
FIG. 50*a* is a front view of a reticle of the present invention, showing the markings as viewed through a zoom telescopic gunsight at high power, with lead markers along horizontal cross-hairs suitable for use, for example, in tactical, military, and police applications.
Figure 50B:
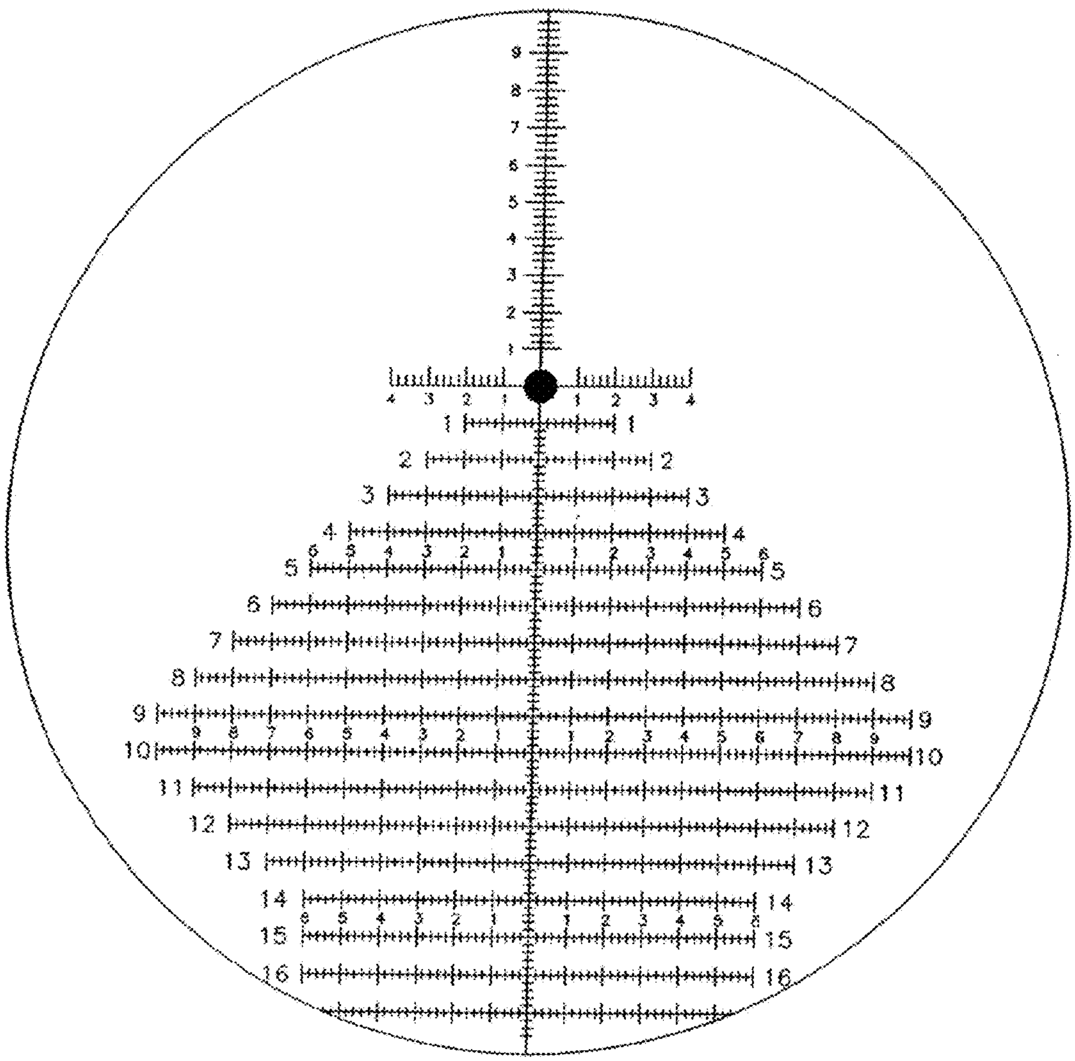
FIG. 50*b* is a front view of a reticle of the present invention, showing the markings as viewed through a zoom telescopic gunsight at high power, with lead markers along horizontal cross-hairs suitable for use, for example, in tactical, military, and police applications.

As exemplified in FIG. 48, in one embodiment, the reticle of the present invention comprises primary and secondary horizontal cross-hairs of unequal length. In some embodiments, as shown in reticle 45*a*, reticles of the present invention comprises a central aiming point marked, for example, by a cross or solid aiming dot suitable for use, for example, in tactical, military, and police applications in targeting a moving object. As exemplified in FIG. 49, in one embodiment, the reticle of the present invention comprises secondary horizontal cross-hairs of equal length of use, for example, in tactical, military, and police applications in targeting a moving object. As shown in FIG. 49, in some embodiments, no central aiming point is marked. In further embodiments, as shown in FIG. 48 and FIG. 49, reticles of the present invention comprise markings for identification of cross-hairs comprising numbers located, for example, at the end of at least one horizontal cross-hair, between at least two horizontal cross-hairs, along at least one horizontal cross-hair, or numbers alternating with geometric figures, for example, dots. As exemplified in FIG. 50*a*, in one embodiment, a reticle of the present invention comprises horizontal cross-hairs of unequal length, identification markings of unequal size along, between and at the end of horizontal and vertical cross-hairs, and no aiming dot. As shown in FIG. 50*b*, in another embodiment, a reticle of the present invention comprises horizontal cross-hairs of unequal length, identification markings of unequal size along, between and at the end of horizontal and vertical cross-hairs, and an aiming dot.

Figure 51A:
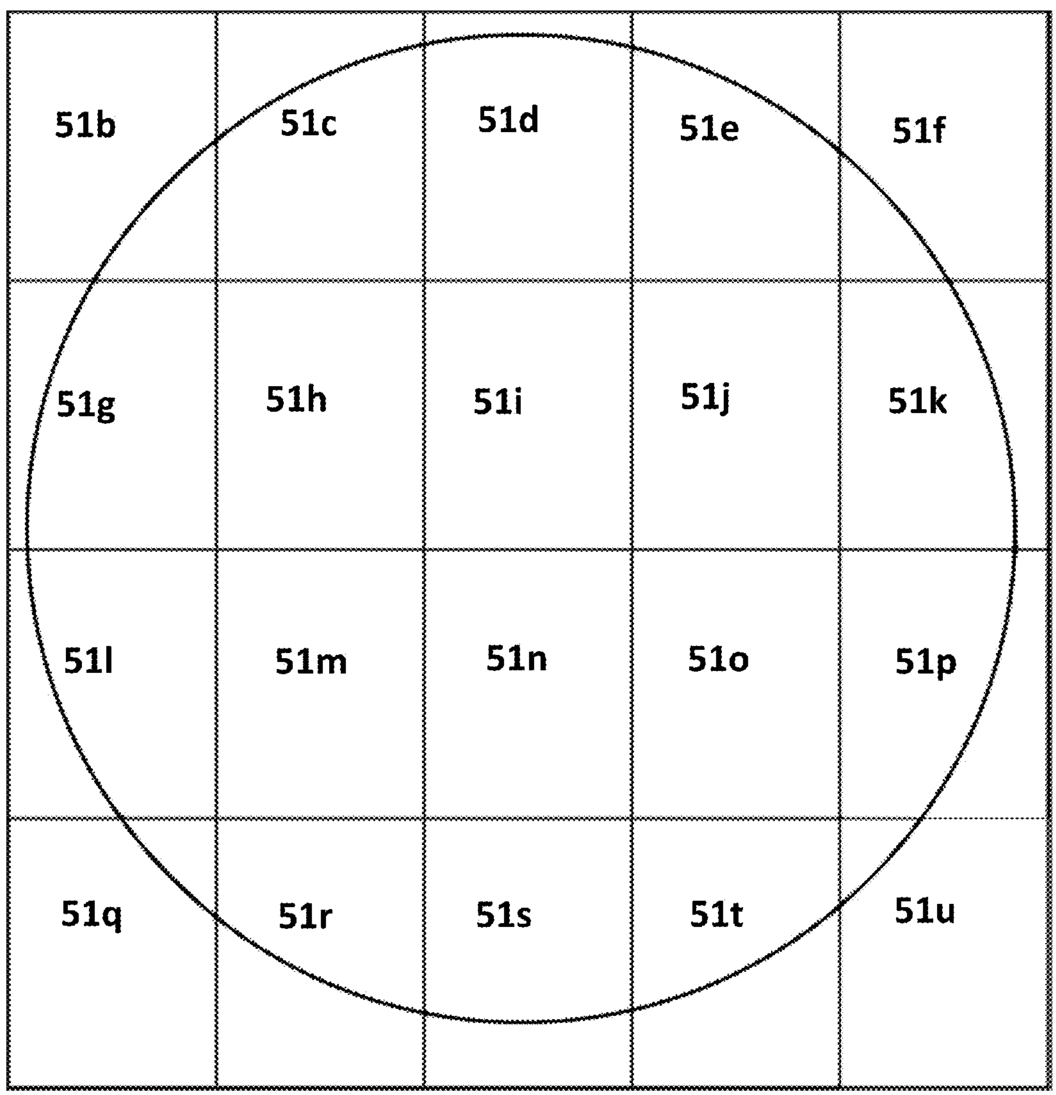
FIGS. 51*a-u* are a front view of reticle markings of the present invention, showing the markings as viewed through a zoom telescopic gunsight at high power.
Figure 51B:
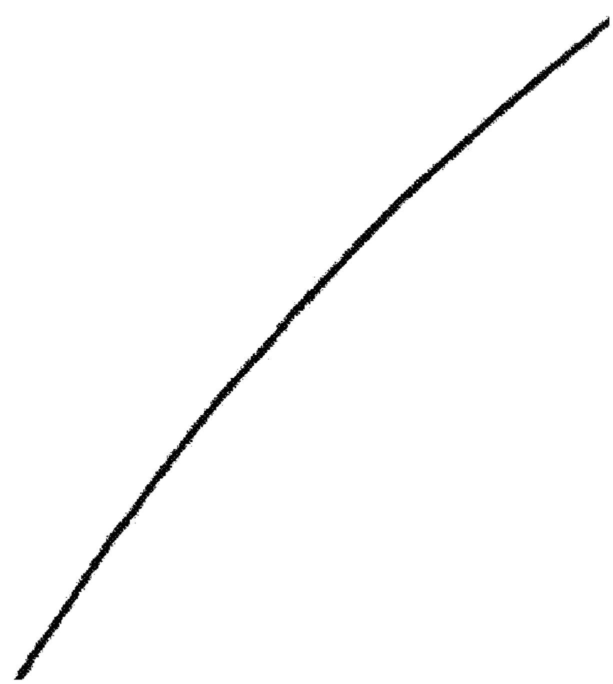

Reticles of the present invention, whether etched on glass, projected, or generated by computer over time in response to learned behavior by the shooter, or selected preferences of the shooter, may have a diversity of markings and features. FIGS. 51*a*, 51*b* demonstrate some exemplary features, any one or more of which can be applied to a given reticle. As exemplified in FIG. 51*a*, in one embodiment, reticles of the present invention comprise cross-hairs that are, for example, lines, straight lines, uninterrupted lines and interrupted lines. In other embodiments, cross-hairs that are interrupted lines are interrupted, for example, by spaces of equal length, by spaces of unequal length, or by lines of shorter length. The present invention is not limited by the nature of the cross-hairs. Numerous cross-hairs are known in the art, for example, U.S. Pat. No. 3,948,587 to Rubbert, U.S. Pat. No. 1,190,121 to Critchett, U.S. Pat. No. 3,492,733 to Leatherwood, U.S. Pat. No. 4,403,421 to Shepherd, U.S. Pat. No. 4,263,719 to Murdoch, herein incorporated by reference. In some embodiments, cross-hairs are interrupted at least once. In further embodiments, interrupted cross-hairs would intersect if segments of the interrupted cross-hairs were linearly connected along their lengths. In still further embodiments, the intersection is located, for example, at the optical center of the reticle, above the optical center of the reticle, below the optical center of the retitcle, at the optical periphery of the reticle, or both the optical center and the optical periphery of the reticle.

As exemplified in FIG. 51*a*, in some embodiments, reticles of the present invention comprise cross-hairs that are of a predetermined thickness, for example a single thickness, a thickness increasing along the length of the cross-hair, or a thickness decreasing along the length of the cross-hair. As shown in FIG. 51*b*, in some embodiments, a reticle of the present invention comprises cross-hairs of single unequal thicknesses. In other embodiments, as shown in FIG. 51 *b*, a reticle of the present invention comprises cross-hairs that vary in thickness along their length in steps. As shown in FIG. 51*a* and FIG. 51*b*, in still other embodiments, reticles of the present invention comprise solid cross-hairs of varying thickness. In further embodiments, as shown in FIG. 51*c*, in some embodiments reticles of the present invention comprise hollow cross-hairs of varying thickness.

Figure 51C:
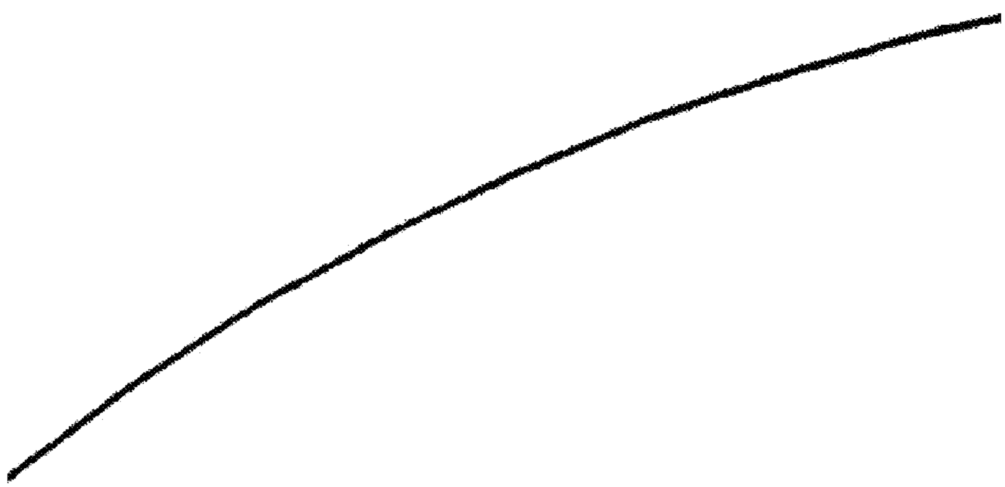
Figure 51D:
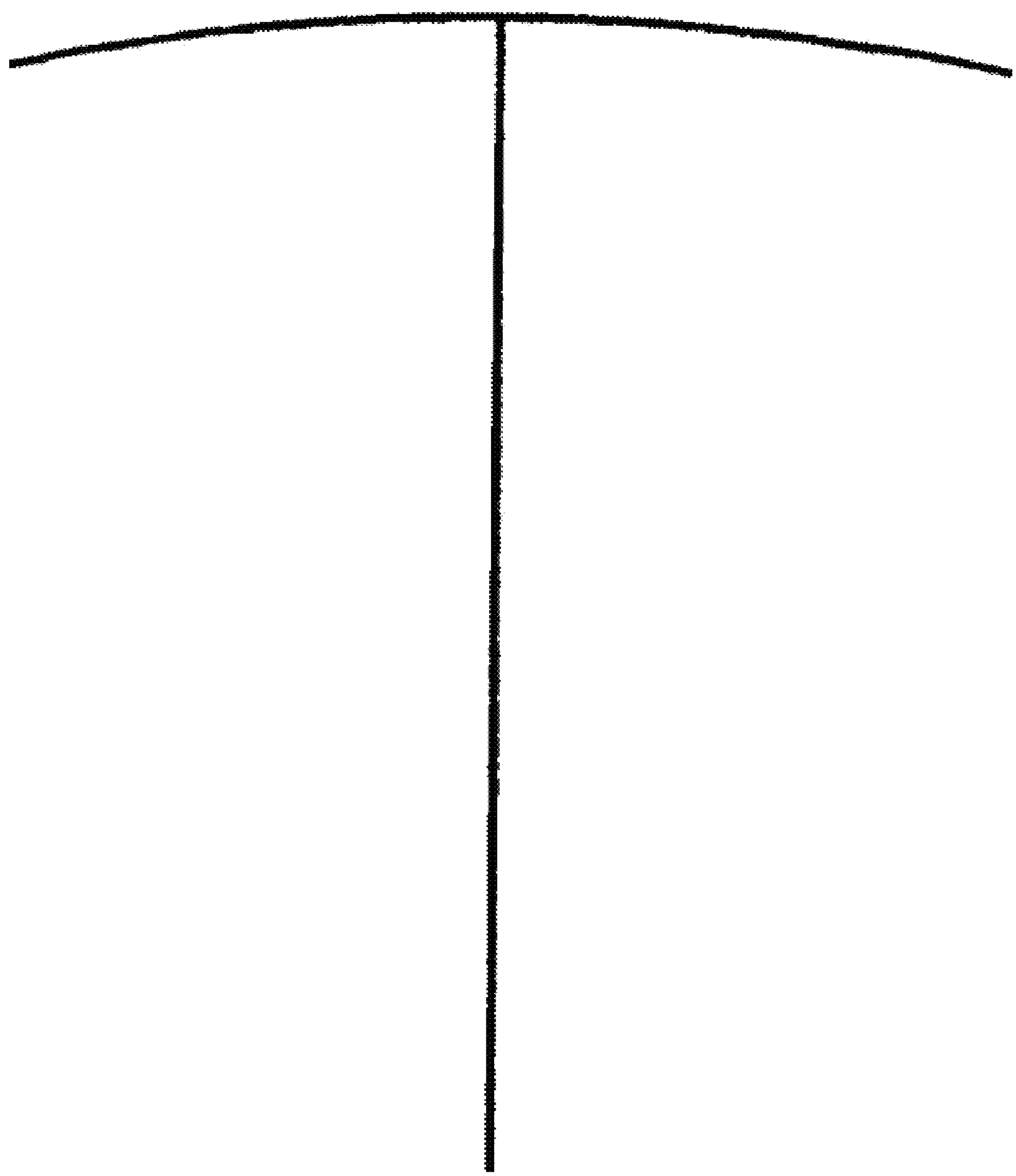
Figure 51E:
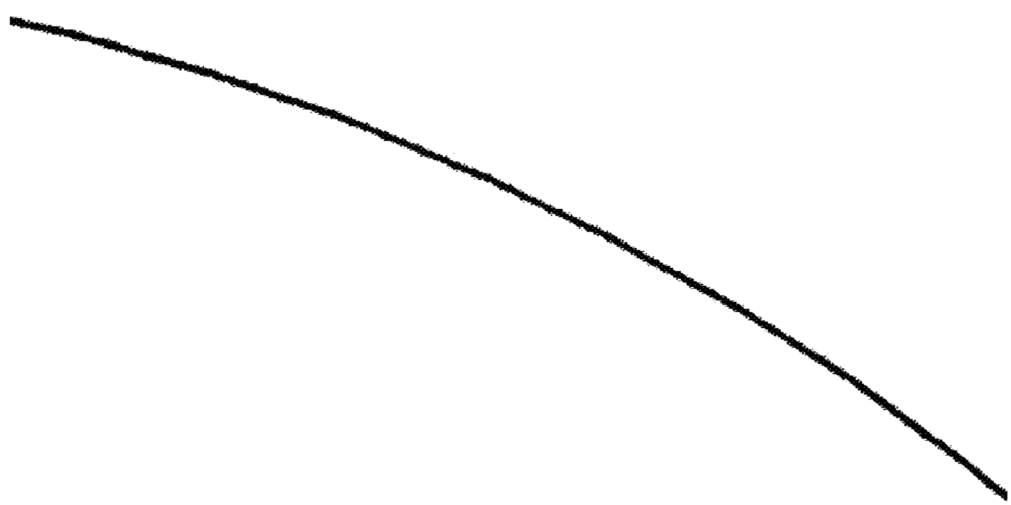
Figure 51F:
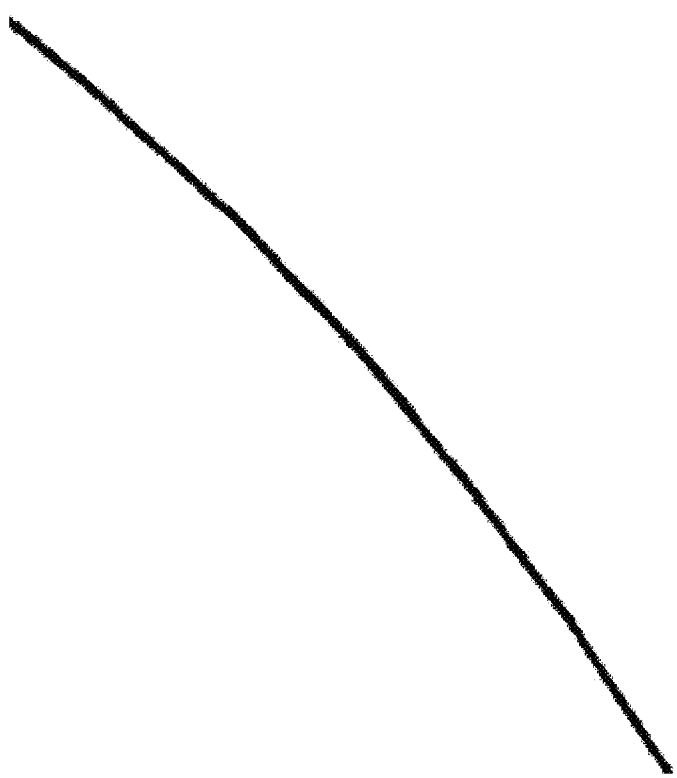
Figure 51G:
Figure 51H:
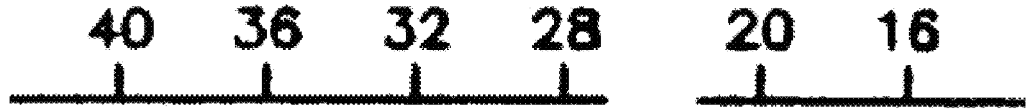
Figure 51I:
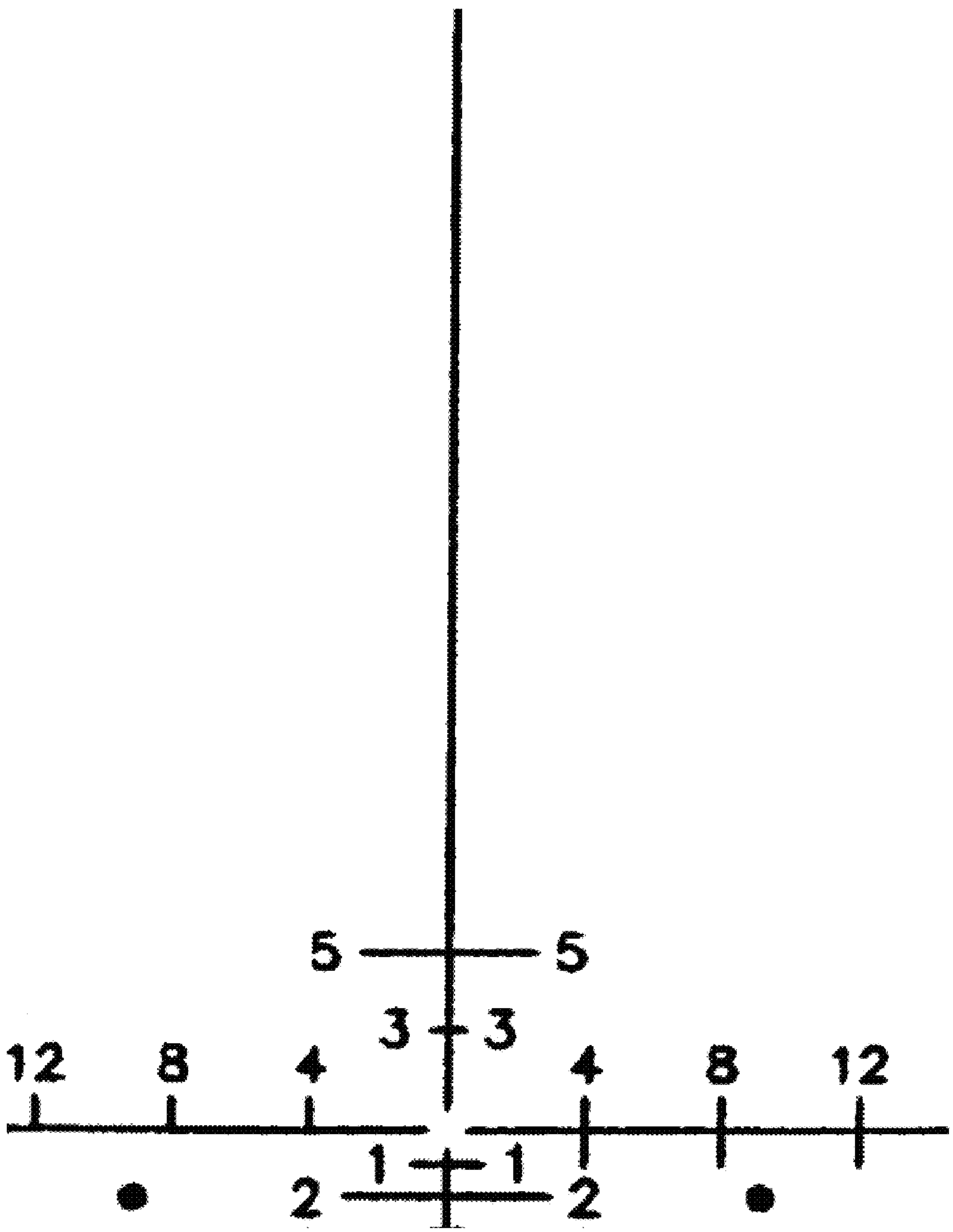
Figure 51J:
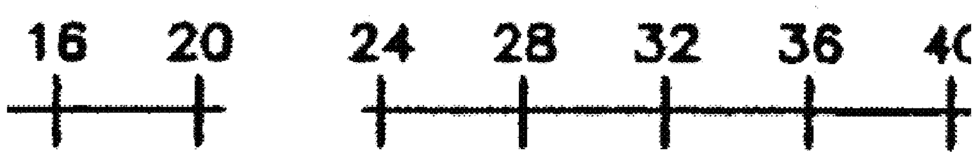
Figure 51K:
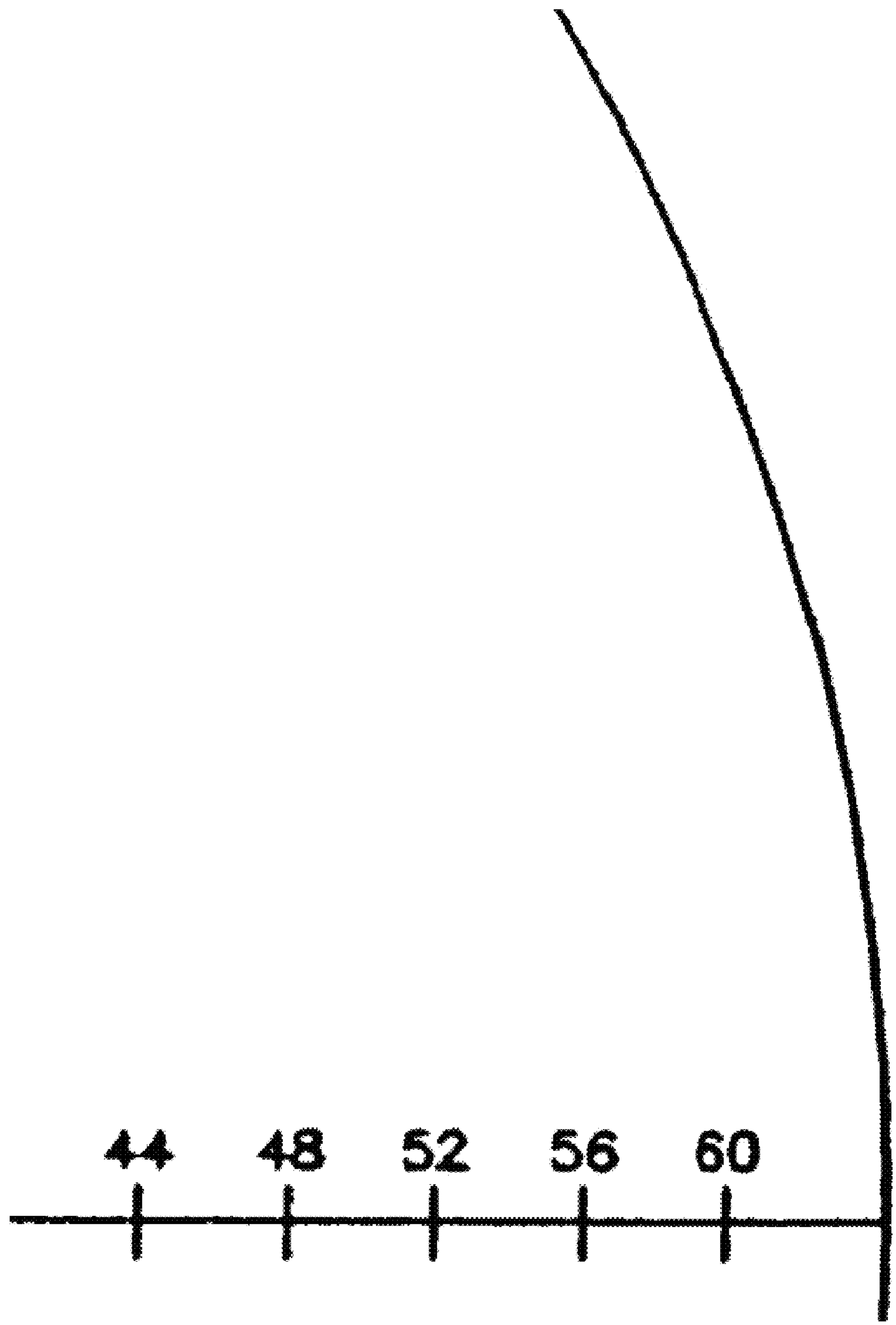
Figure 51I:
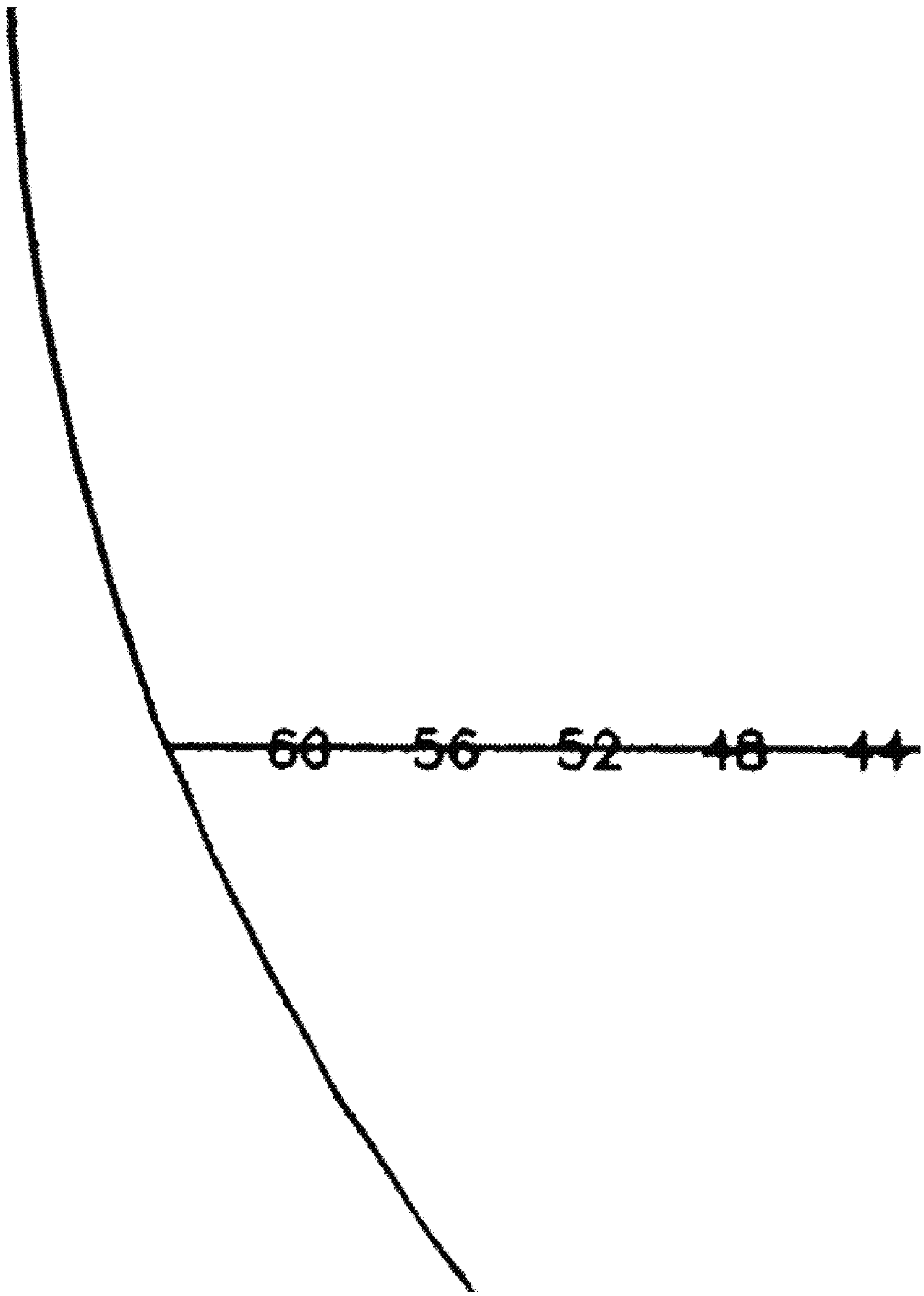
Figure 51M:
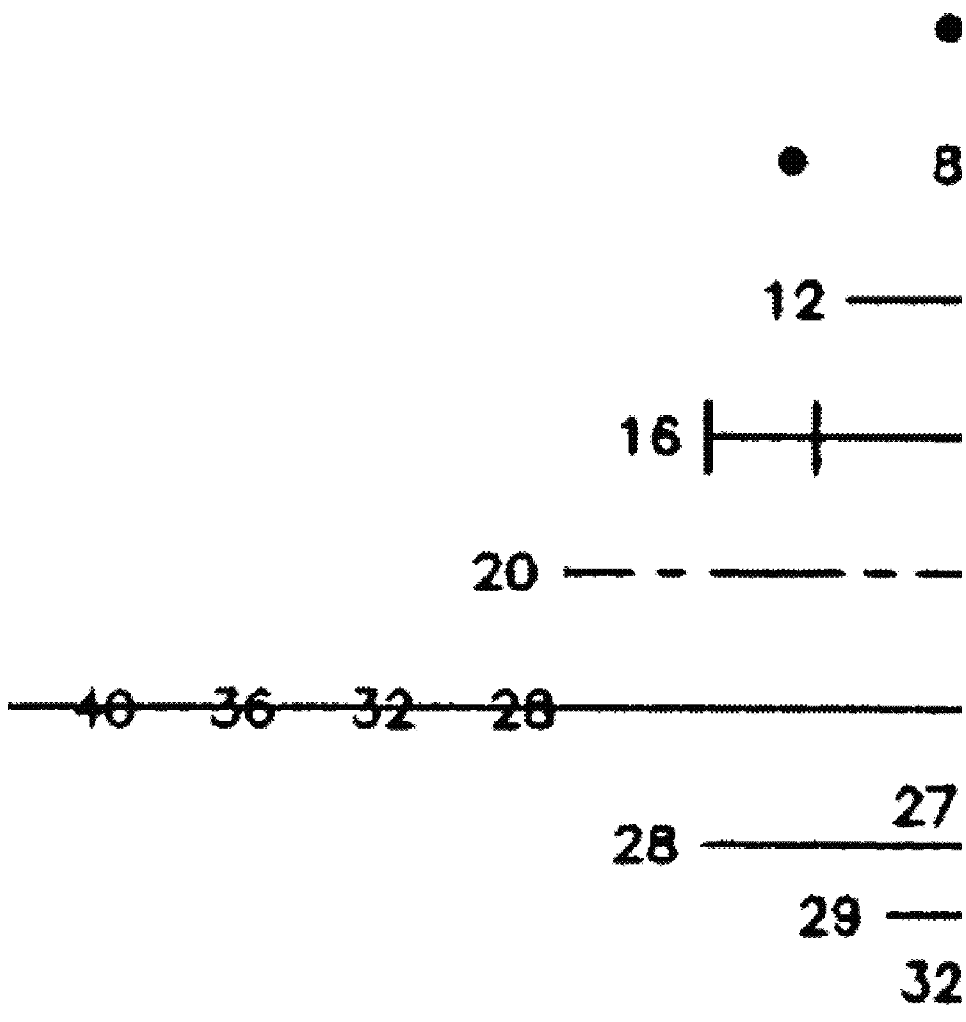
Figure 51N:
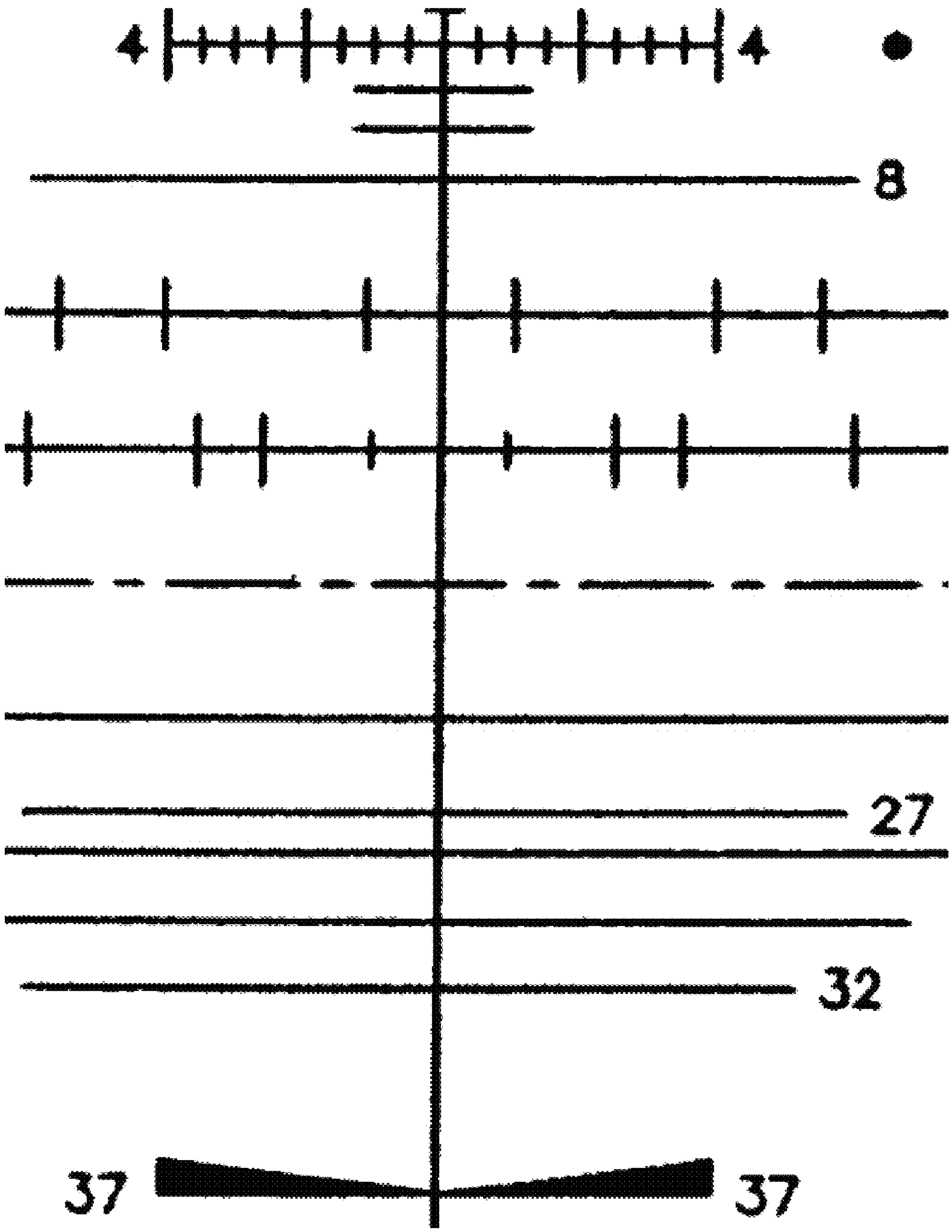
Figure 51O:
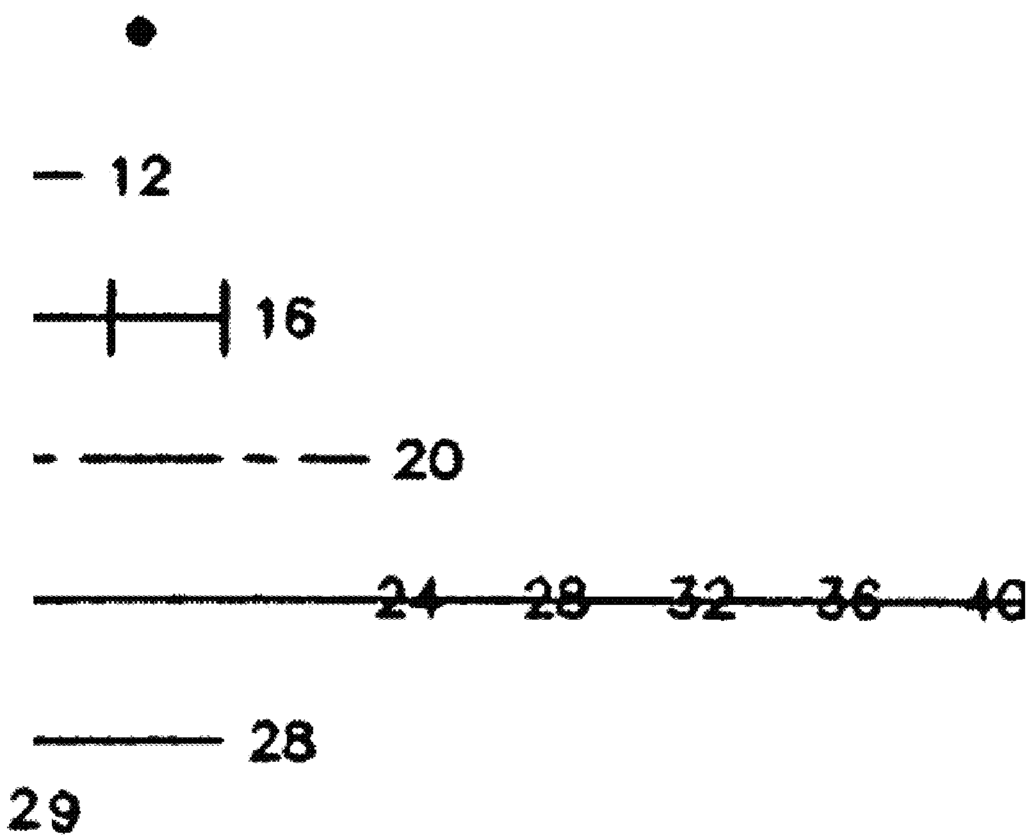
Figure 51P:
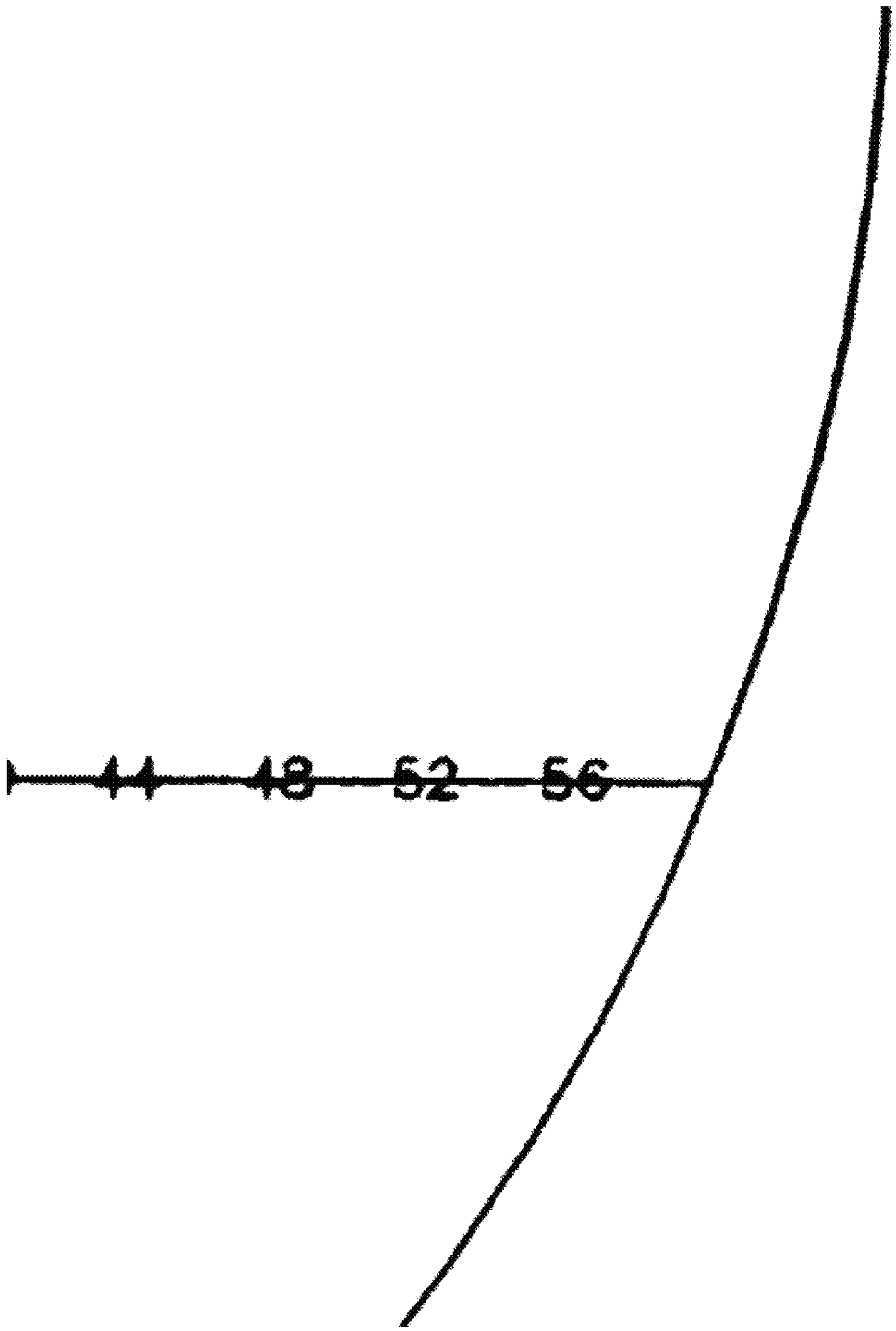
Figure 51Q:
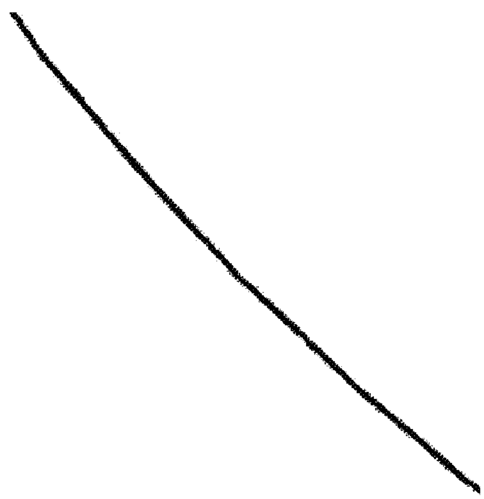
Figure 51R:
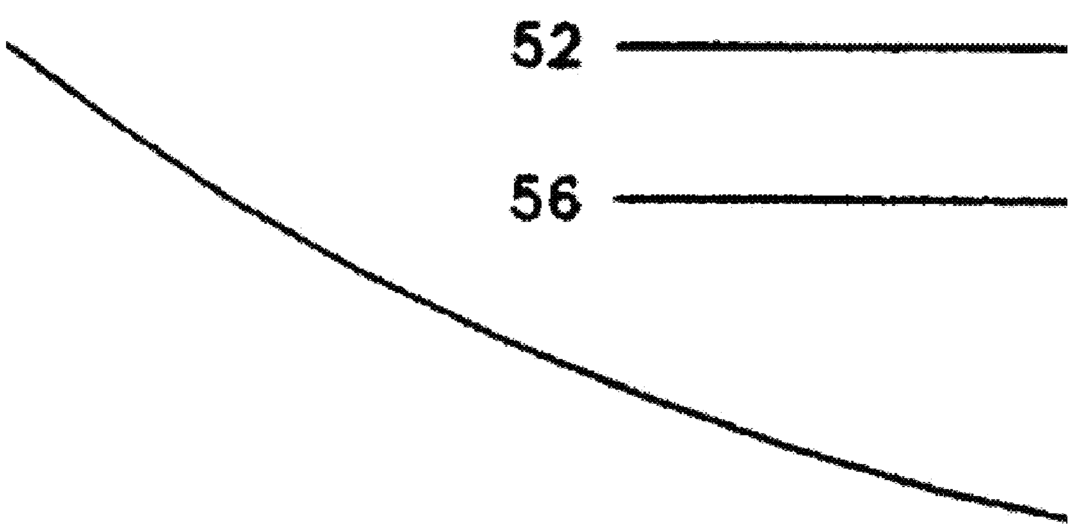
Figure 51S:
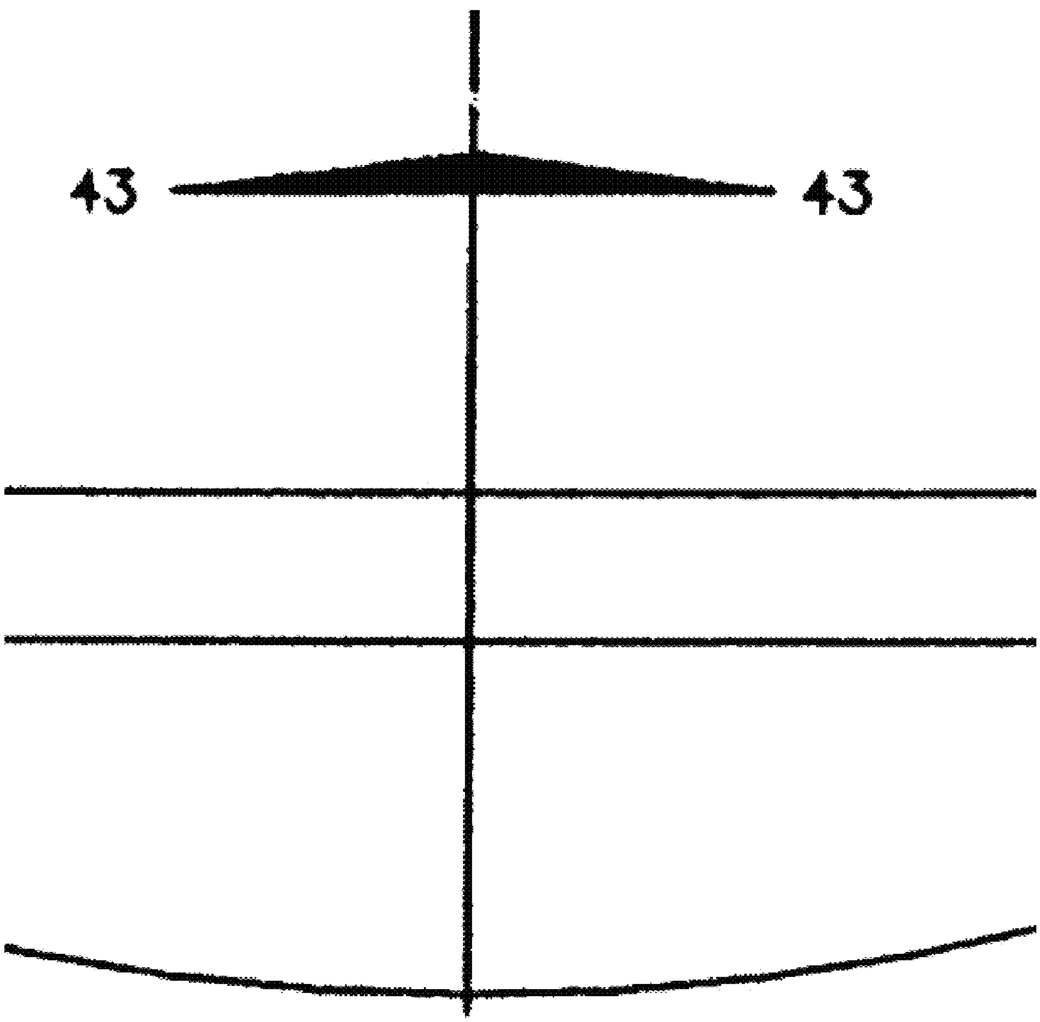
Figure 51T:
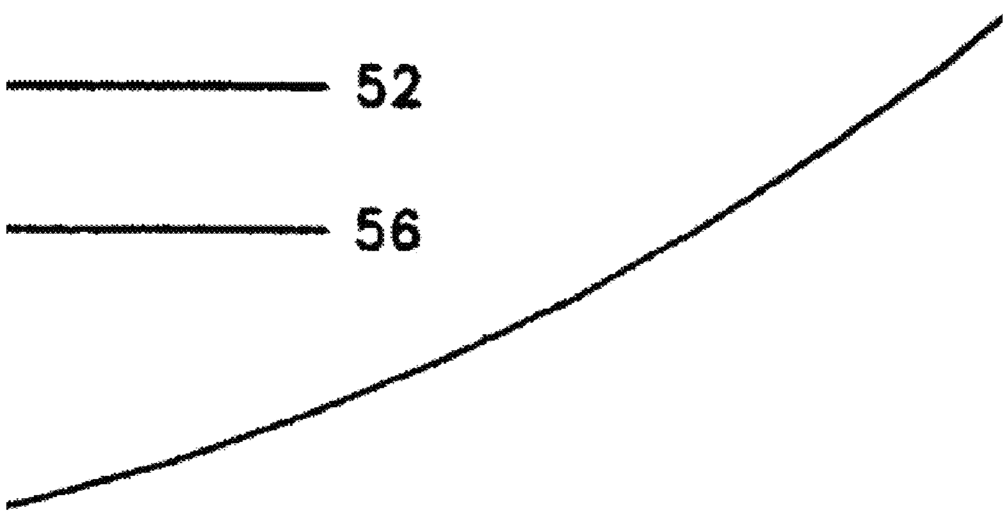
Figure 51U:
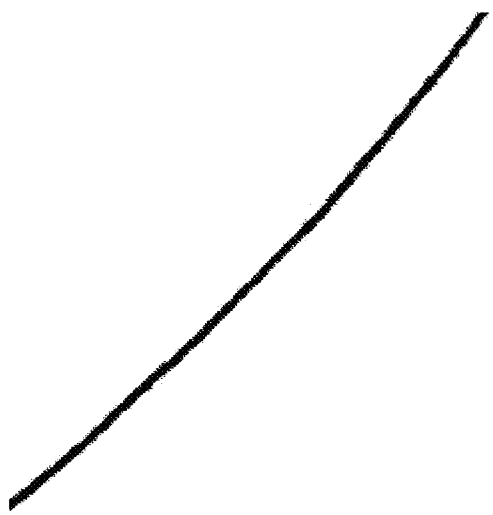
Figure 51V:
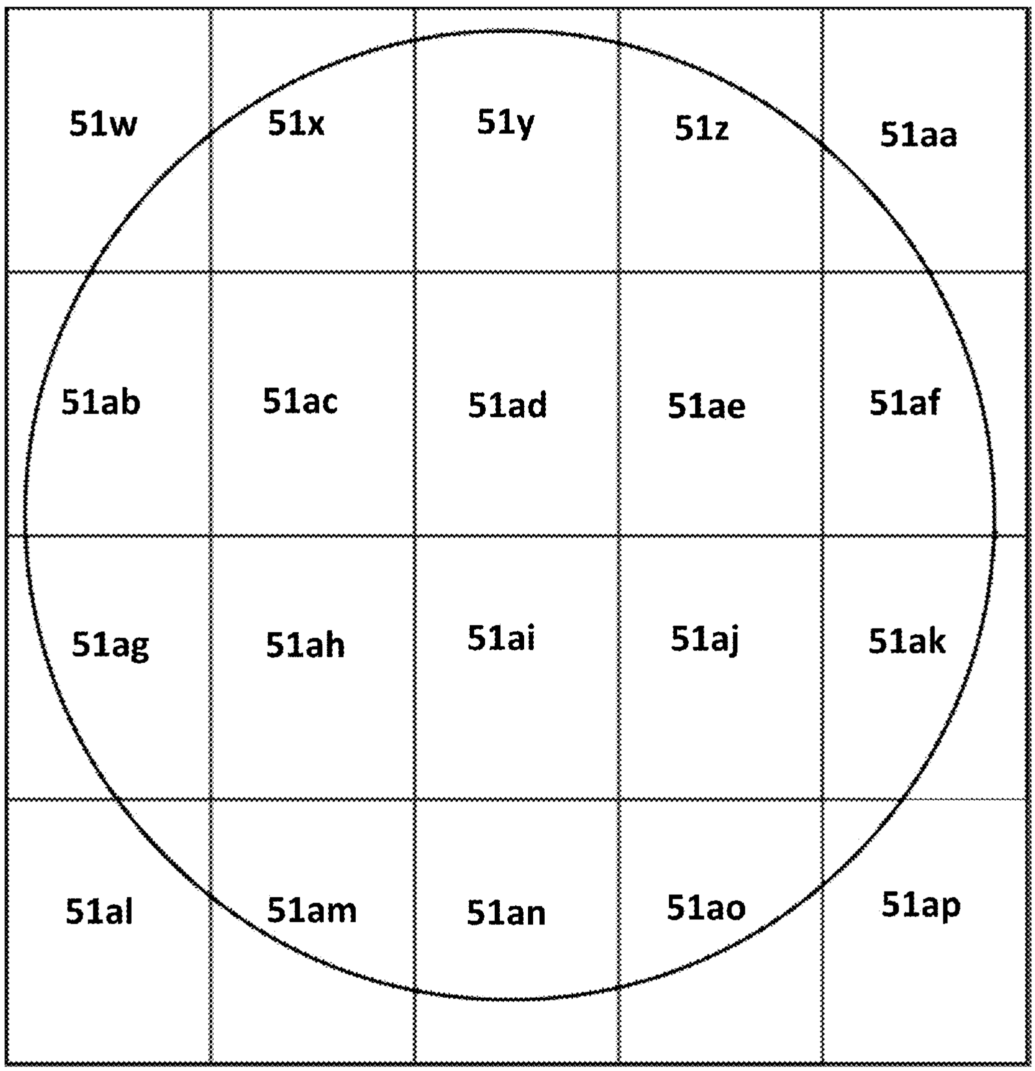
FIGS. 51*v-ap* are a front view of reticle markings of the present invention, showing the markings as viewed through a zoom telescopic gunsight at high power.
Figure 51W:
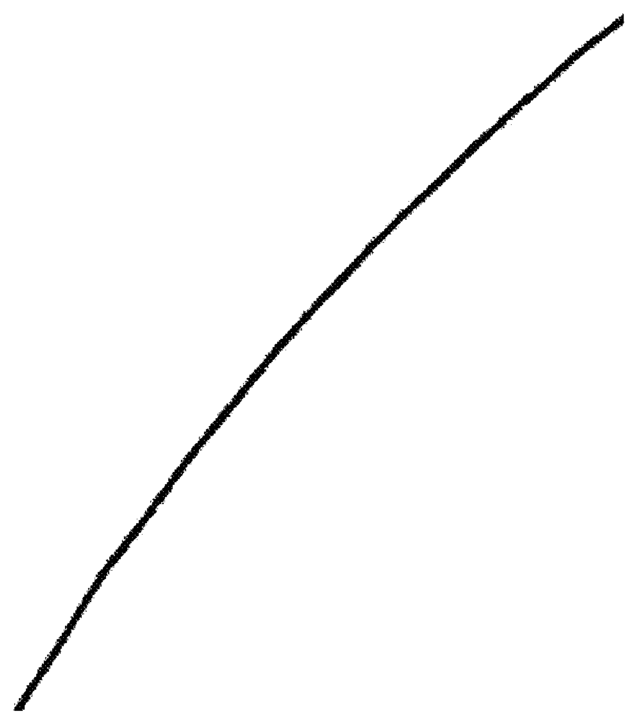
FIGS. 51*w-ap* provide magnified views of subregions of the reticle.
Figure 51X:
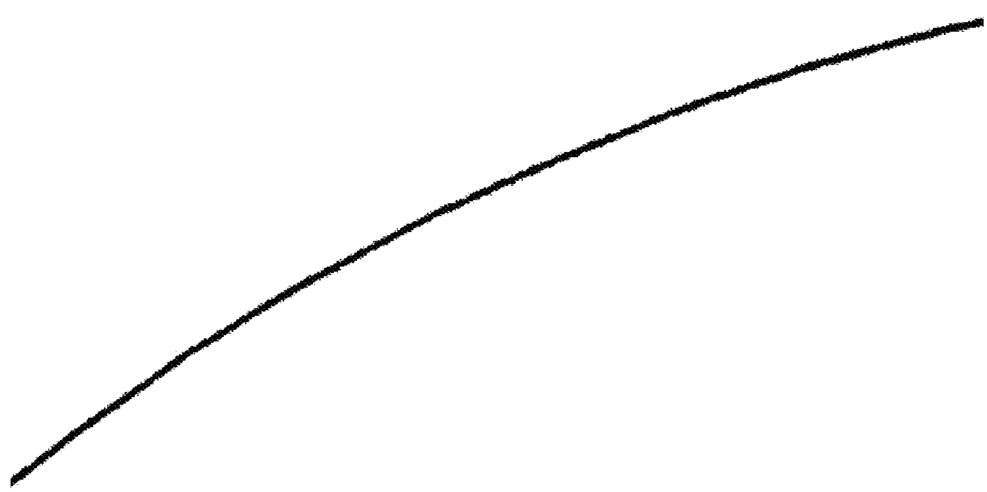
Figure 51Y:
Figure 51Z:
Figure 51A:
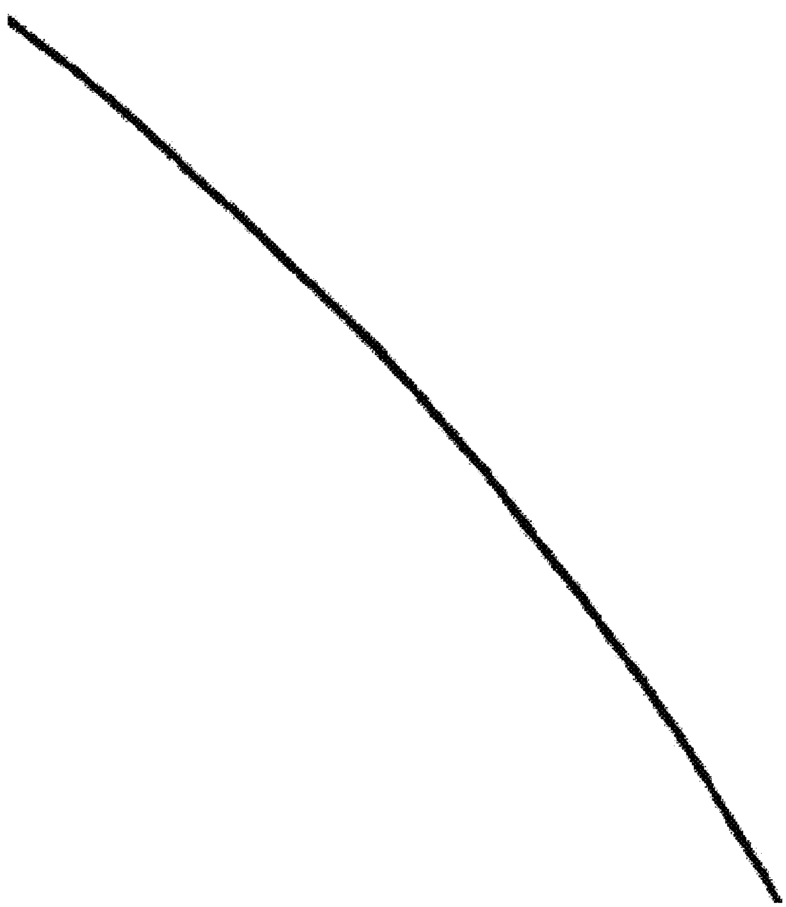
Figure 51A:
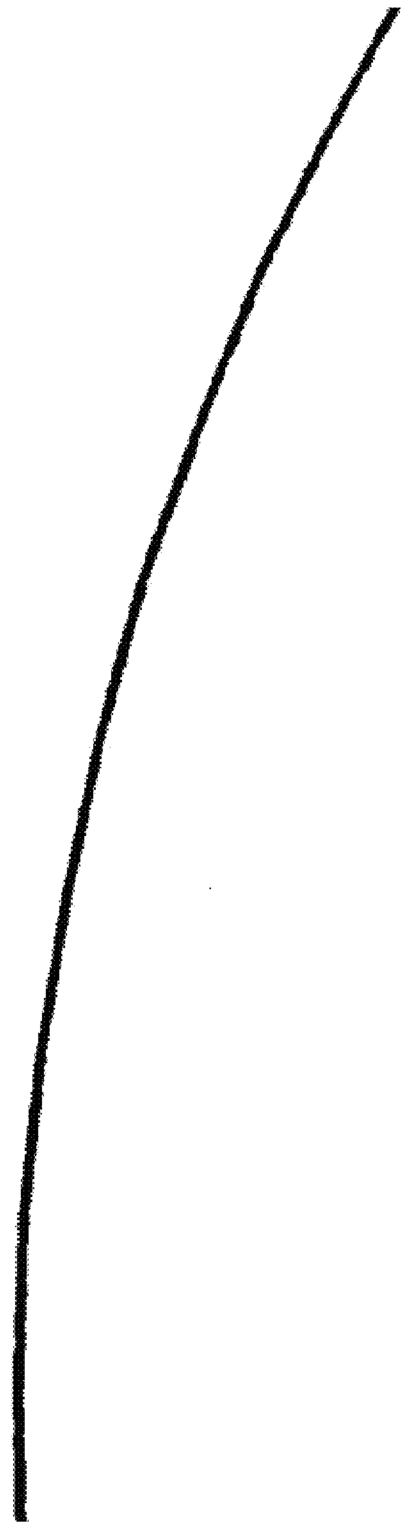
Figure 51A:
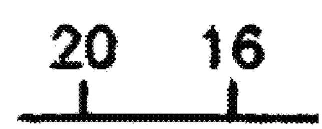
Figure 51A:
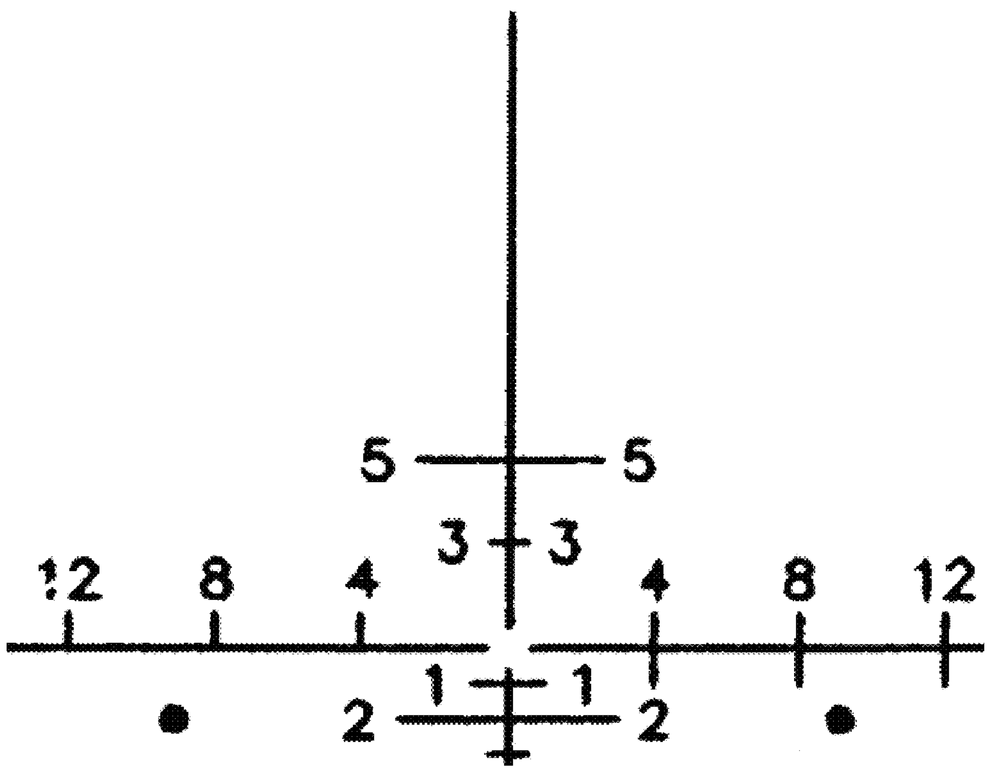
Figure 51A:
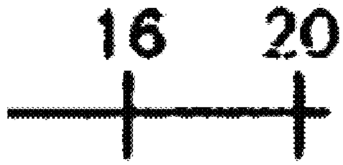
Figure 51A:
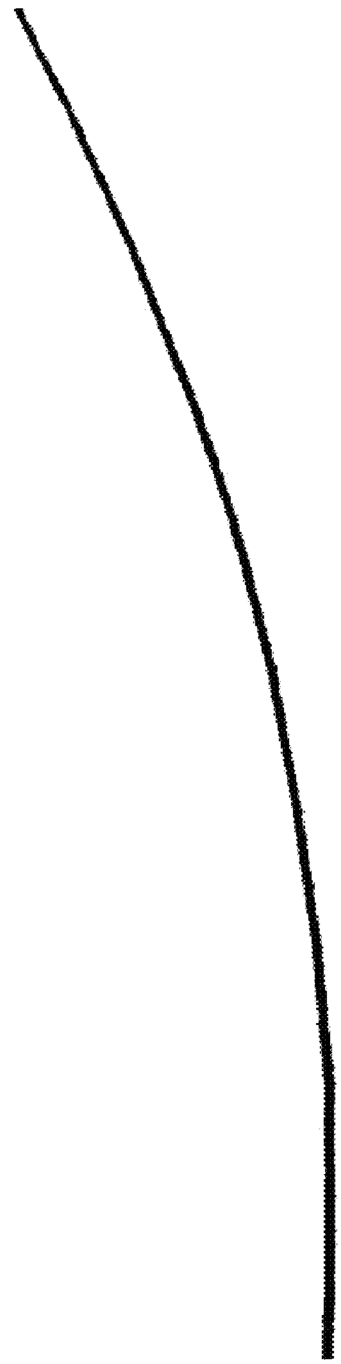
Figure 51A:
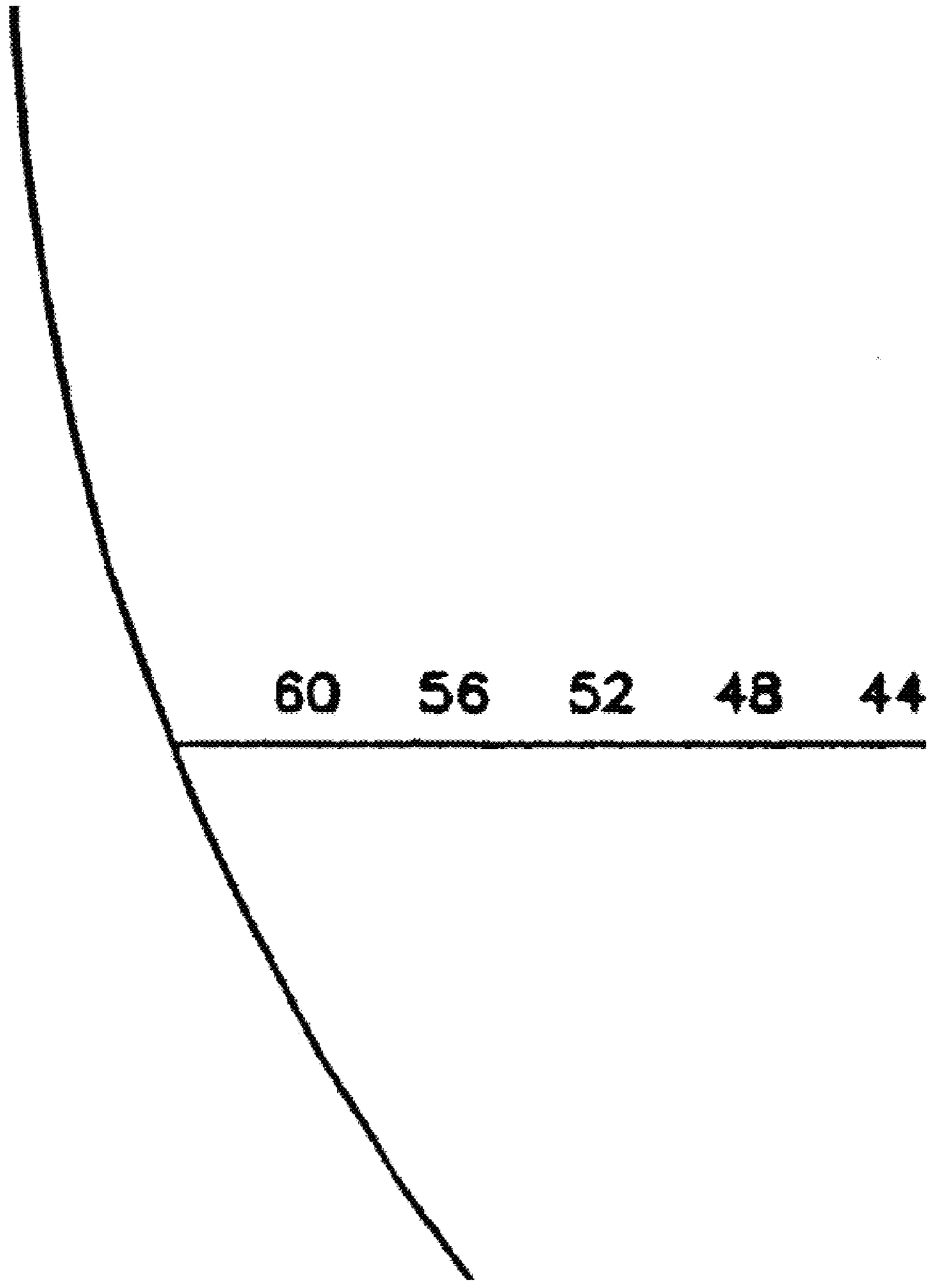
Figure 51A:
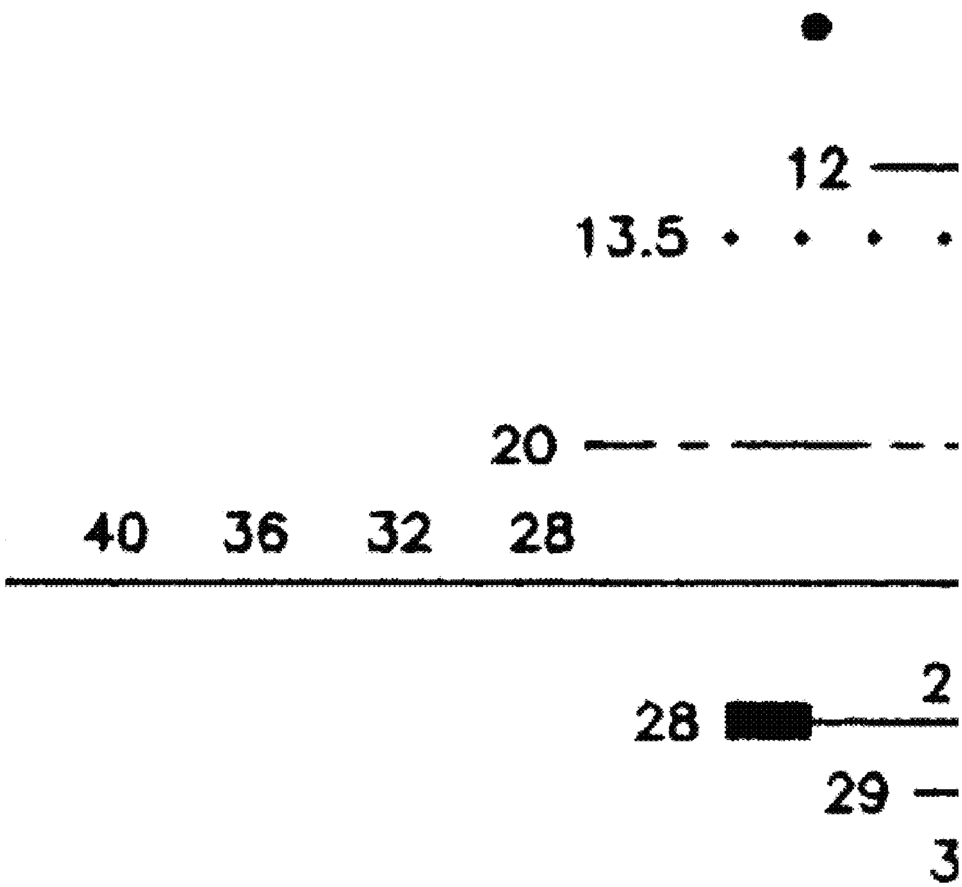
Figure 51A:
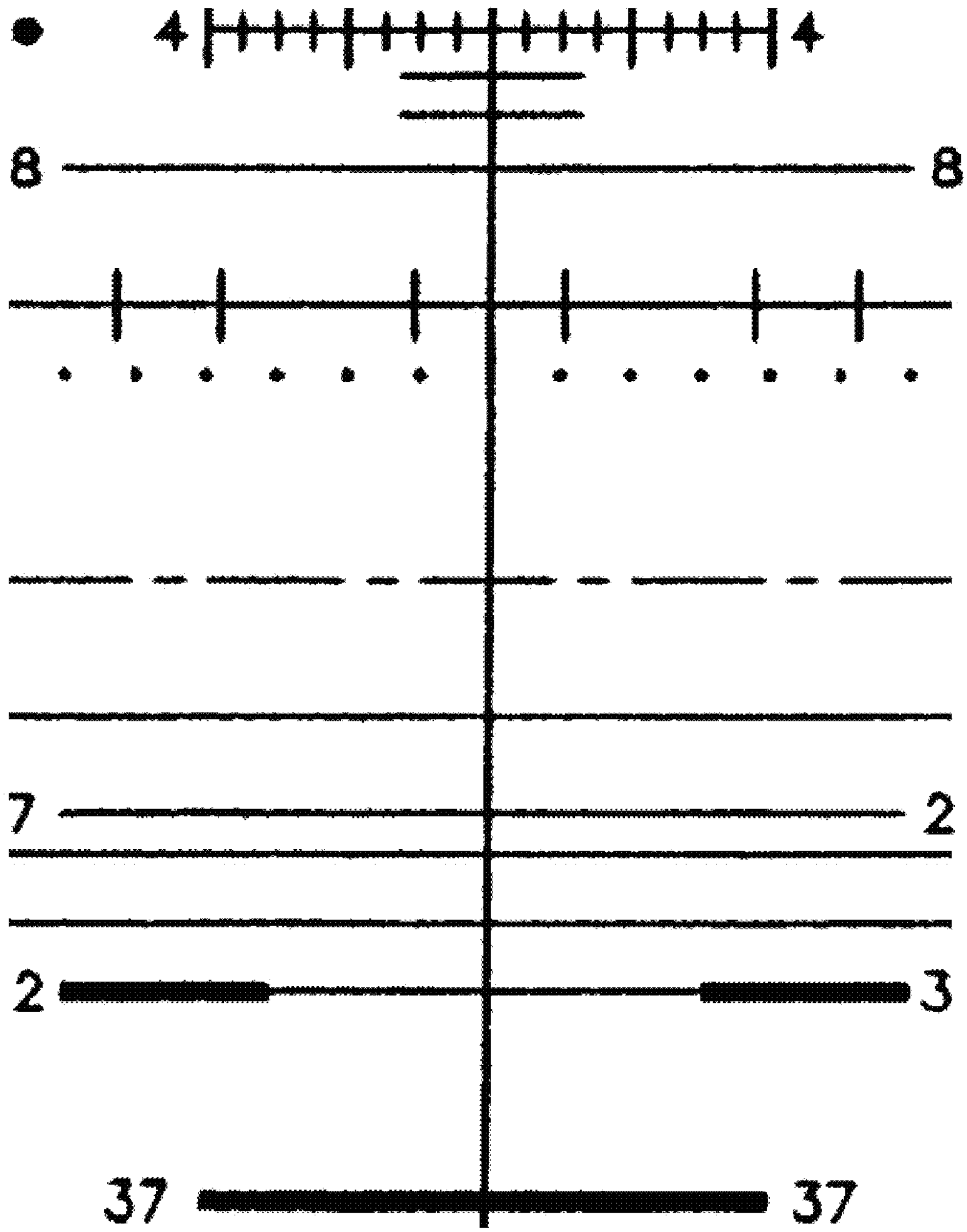
Figure 51A:
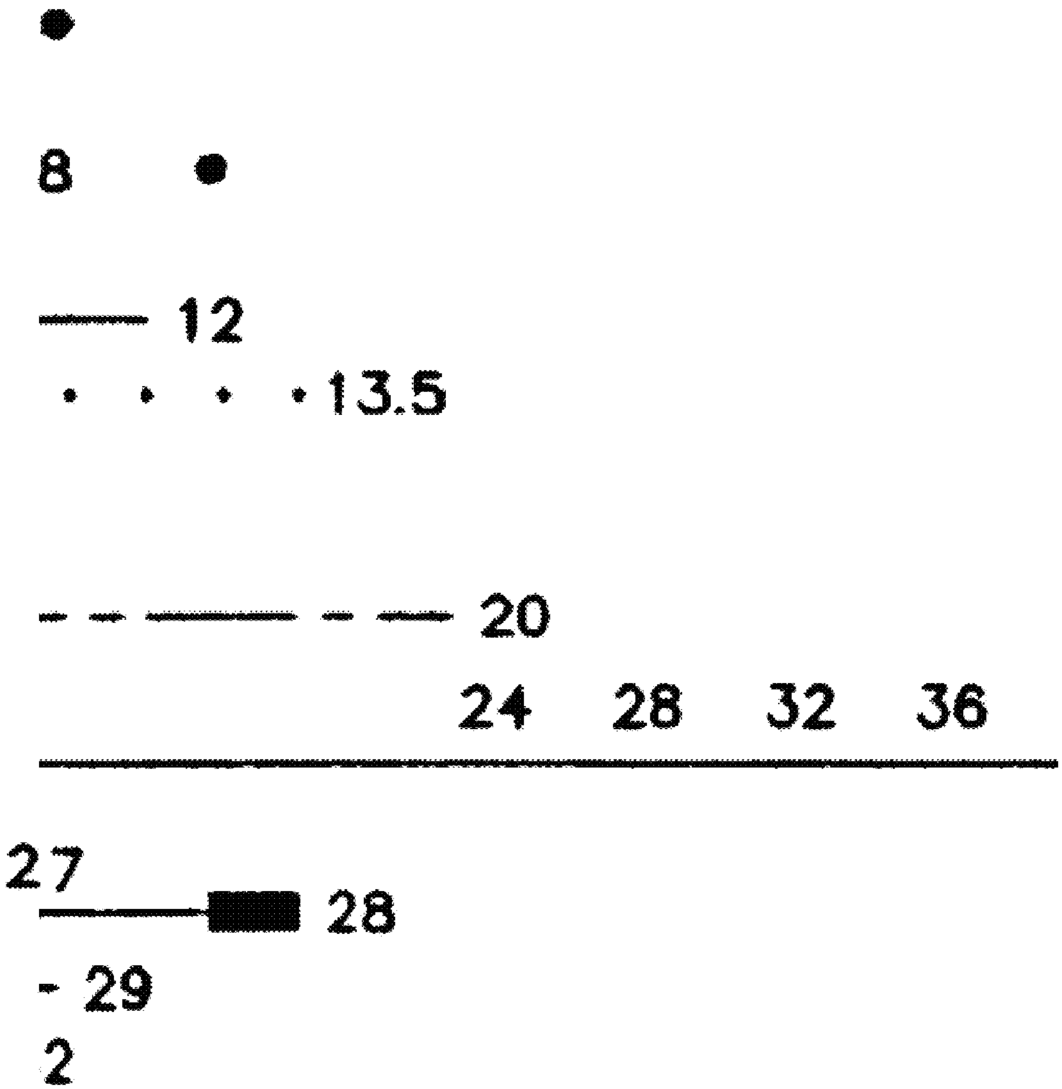
Figure 51A:
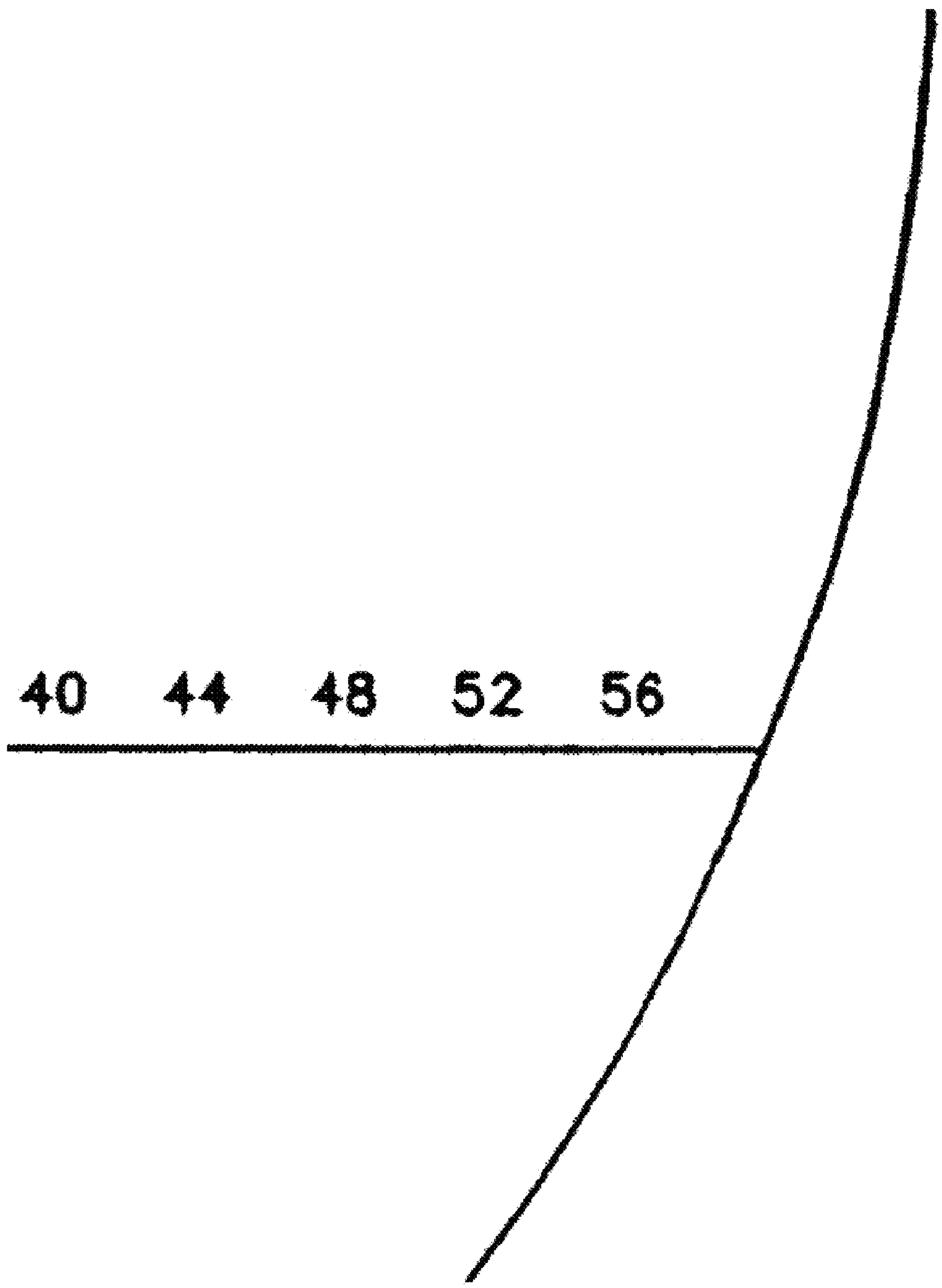
Figure 51A:
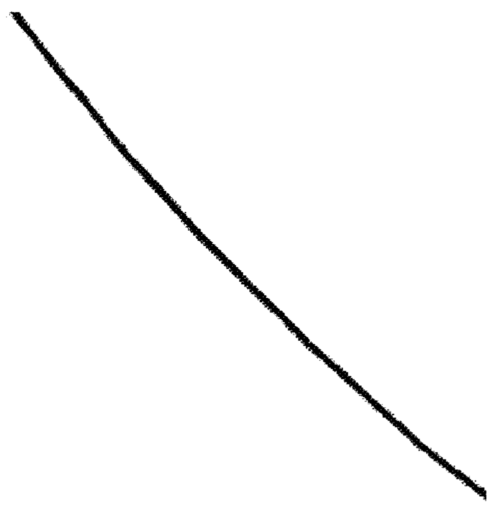
Figure 51A:
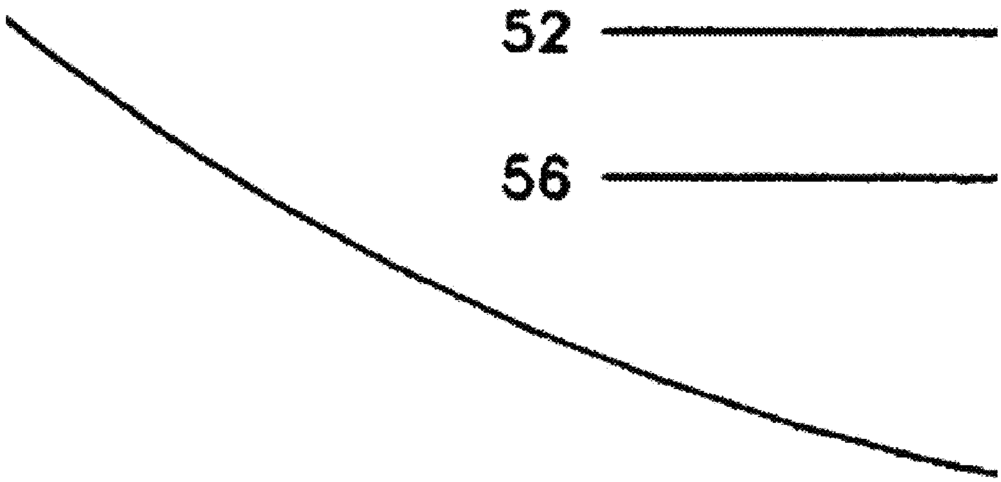
Figure 51A:
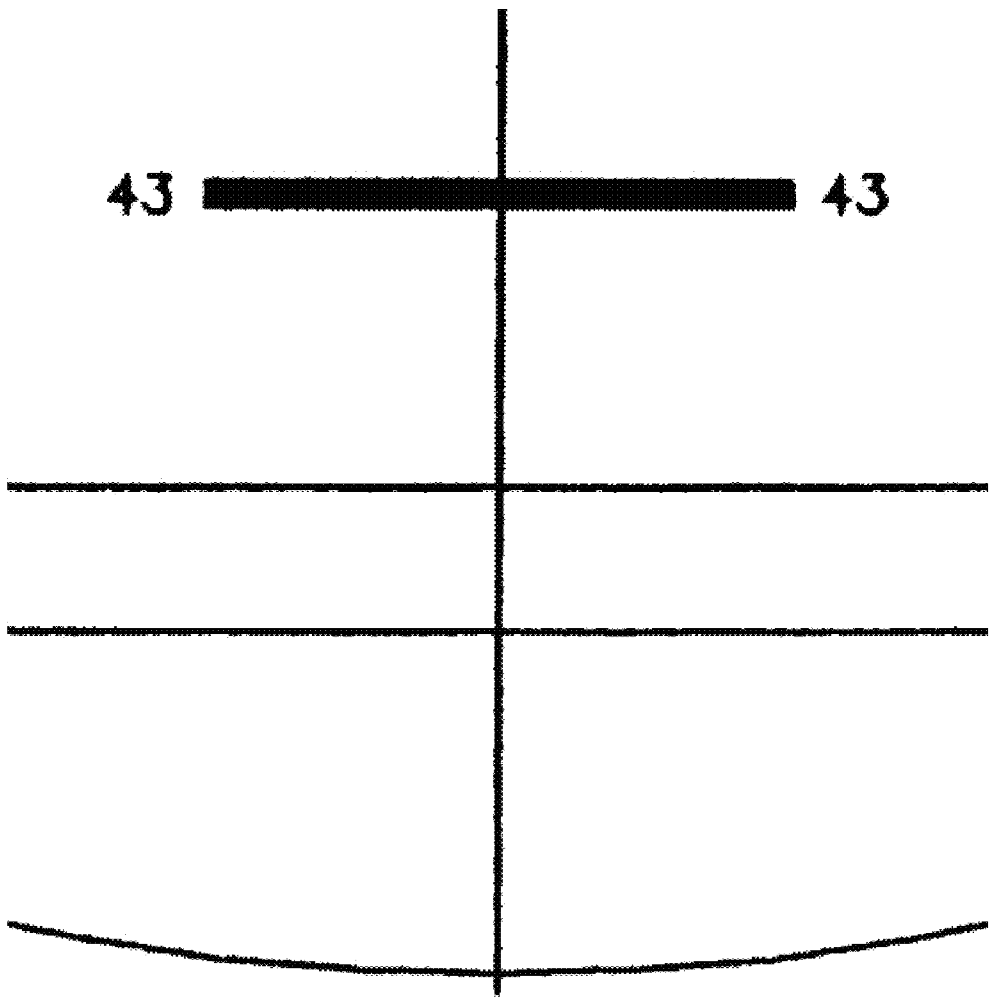
Figure 51A:
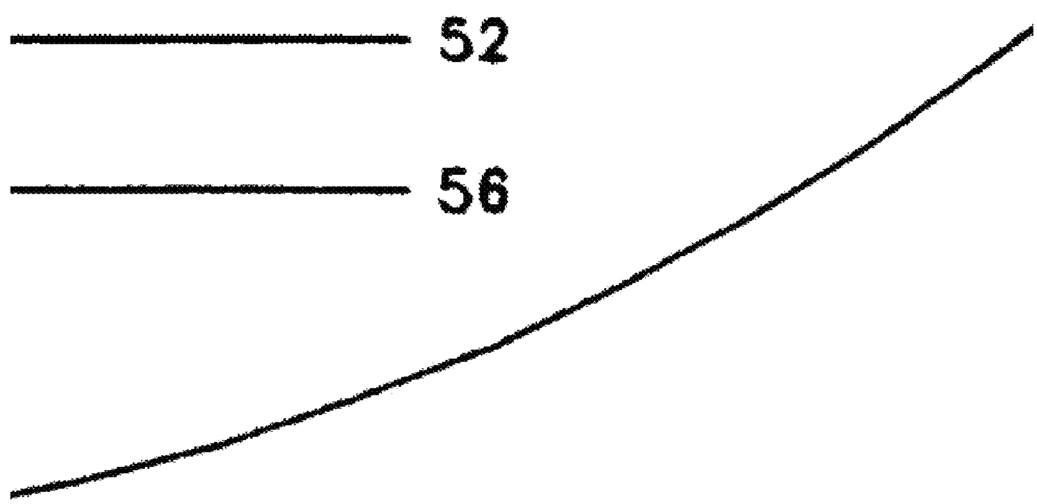
Figure 51A:
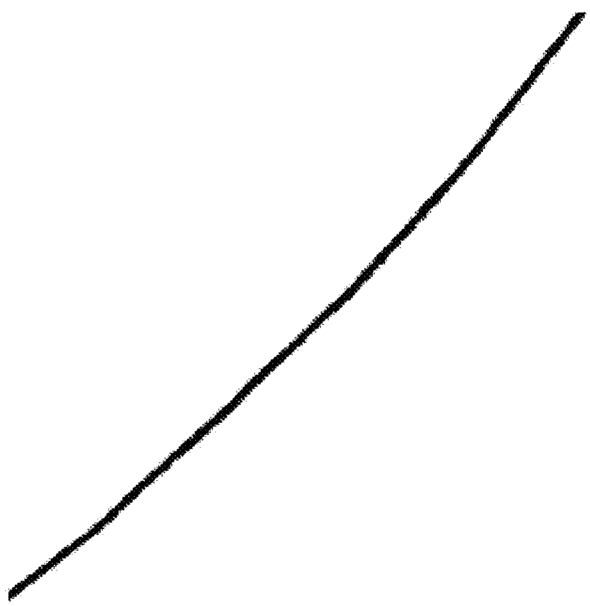
Figure 51A:
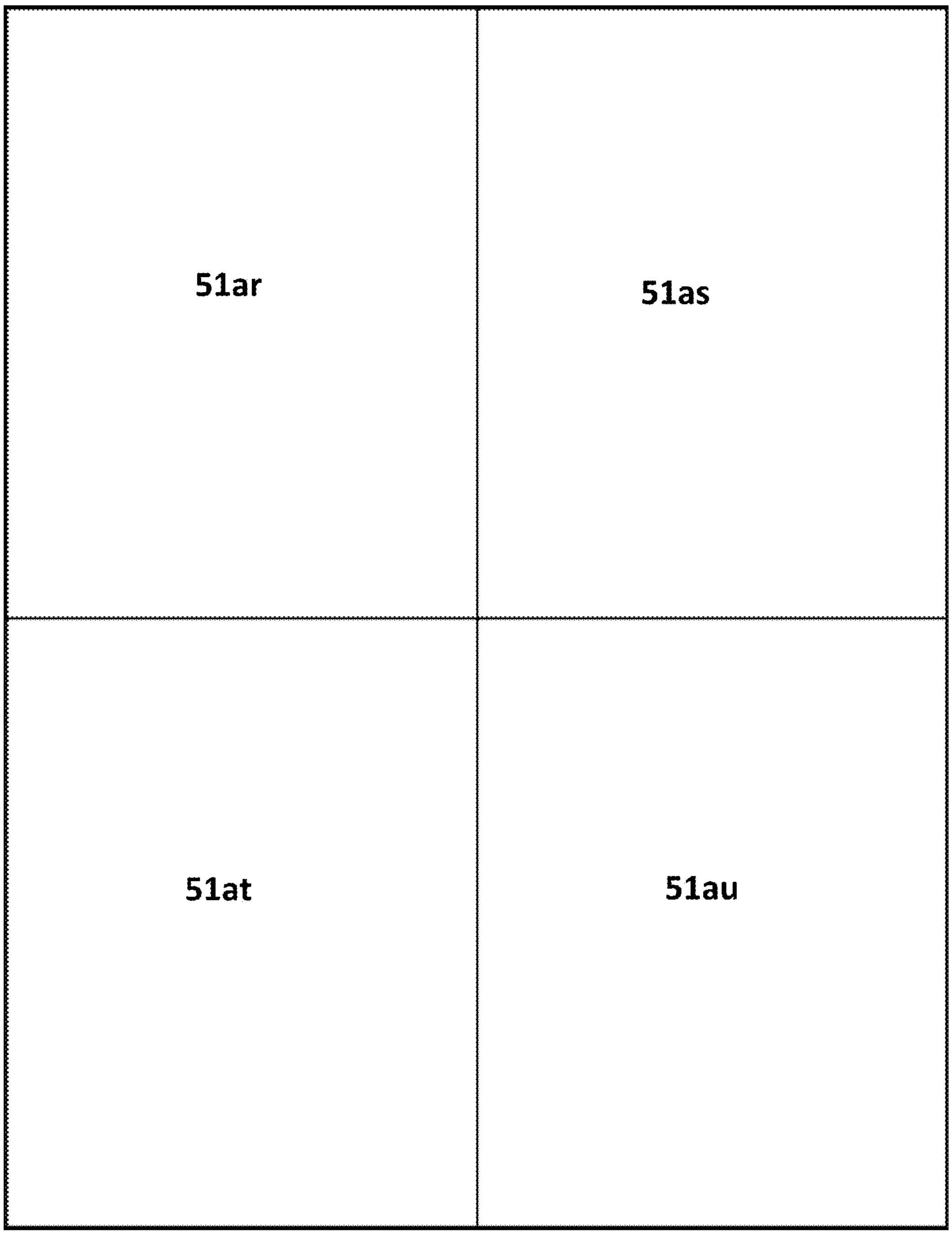
Figure 51A:
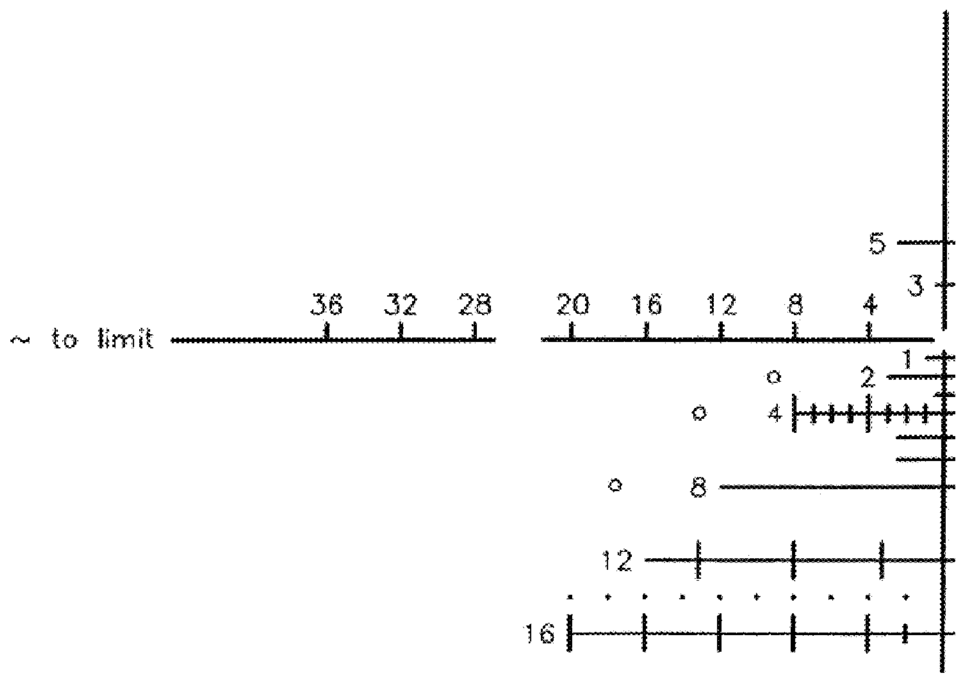
Figure 51A:
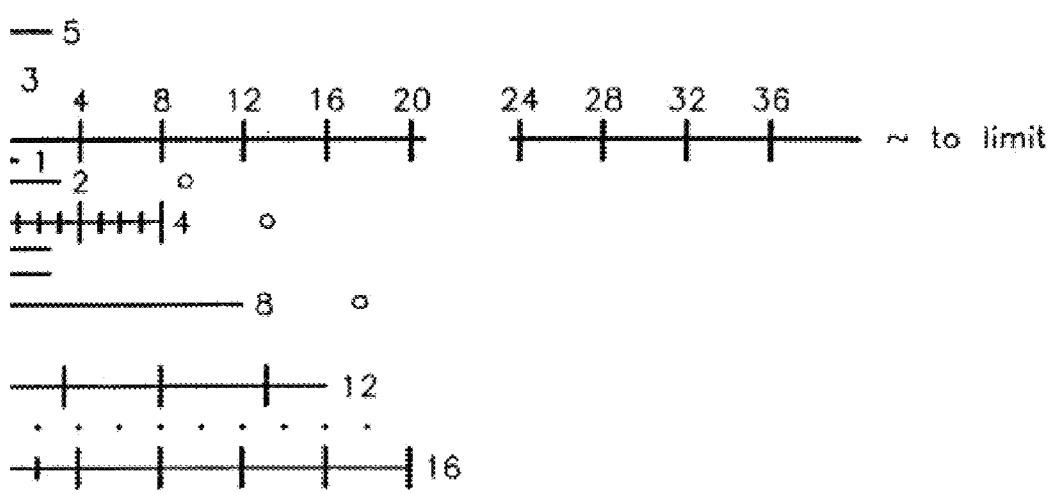
Figure 51A:
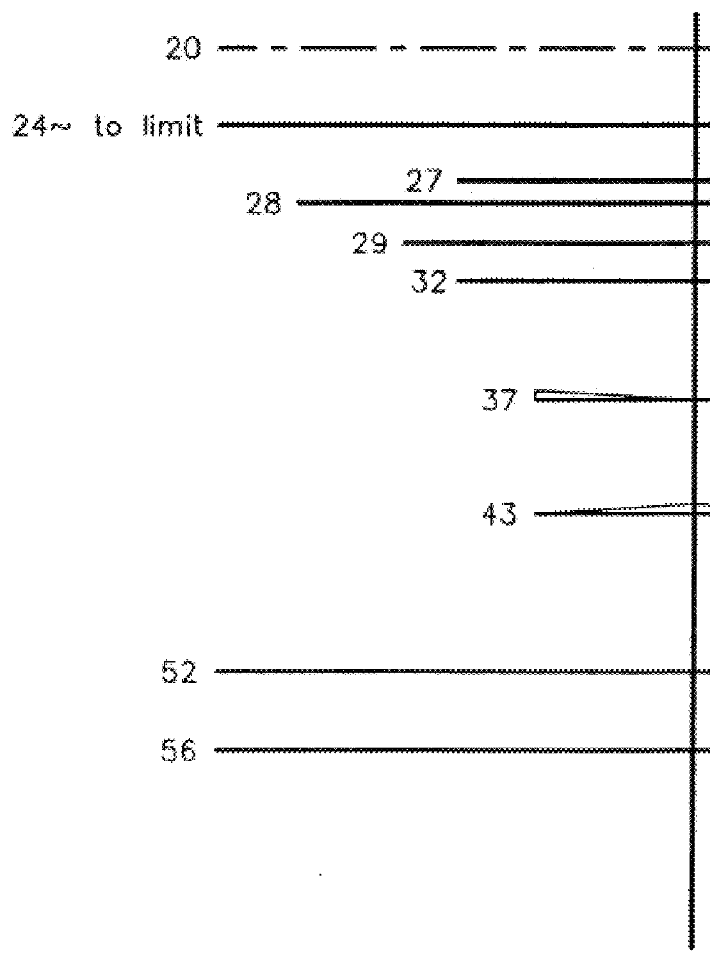
Figure 51A:
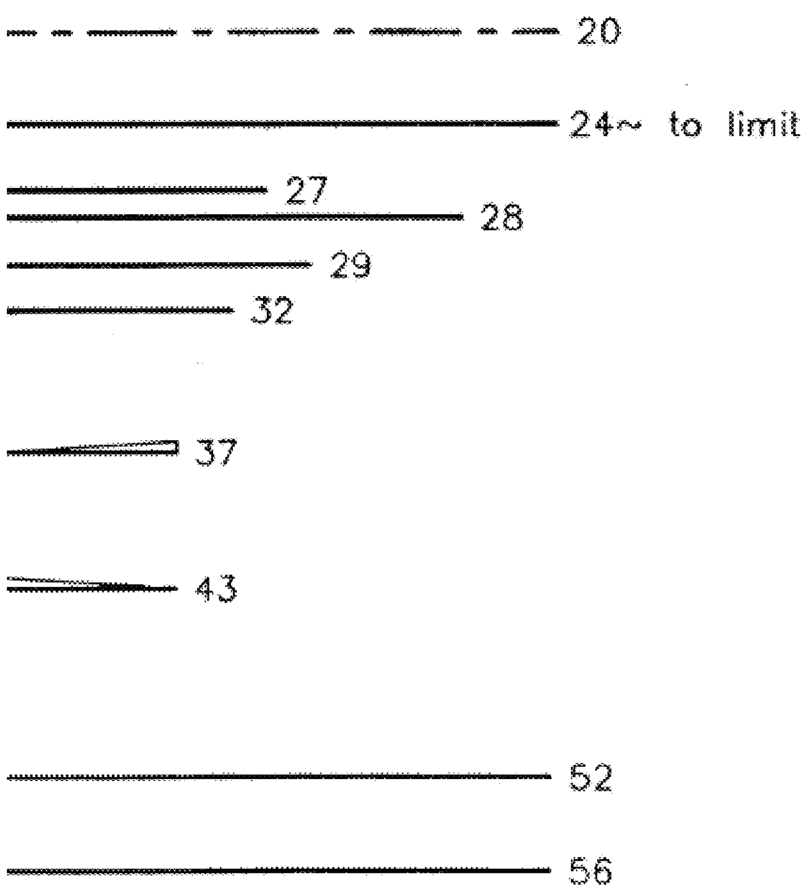
Figure 52A:
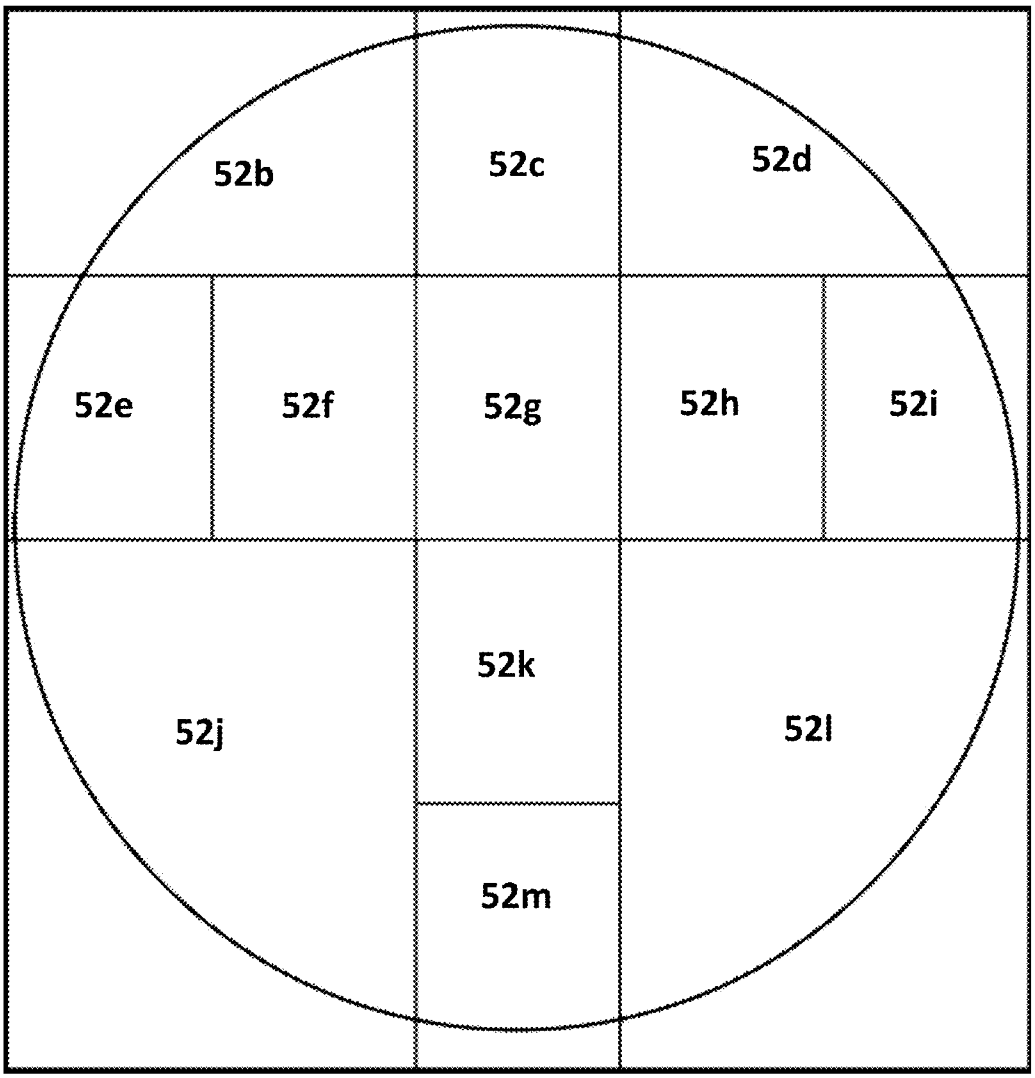
Figure 52B:
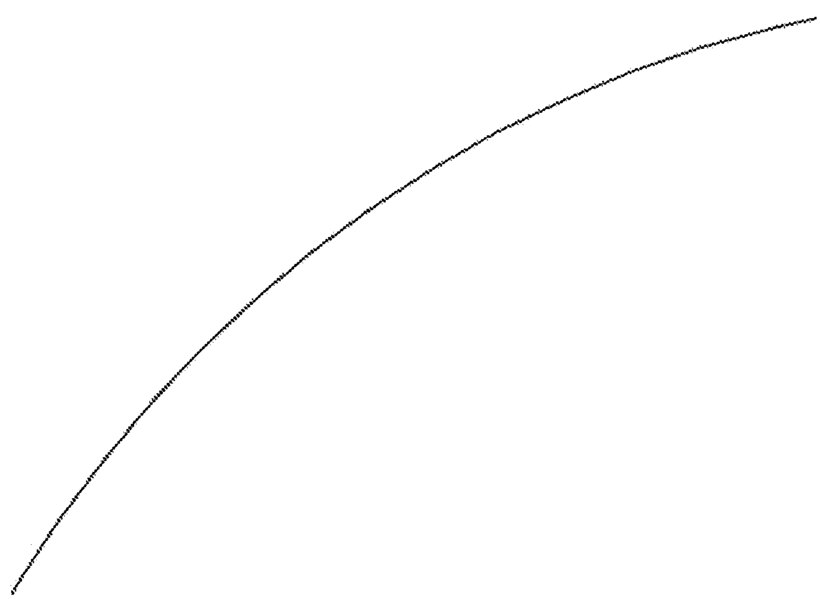
Figure 52C:
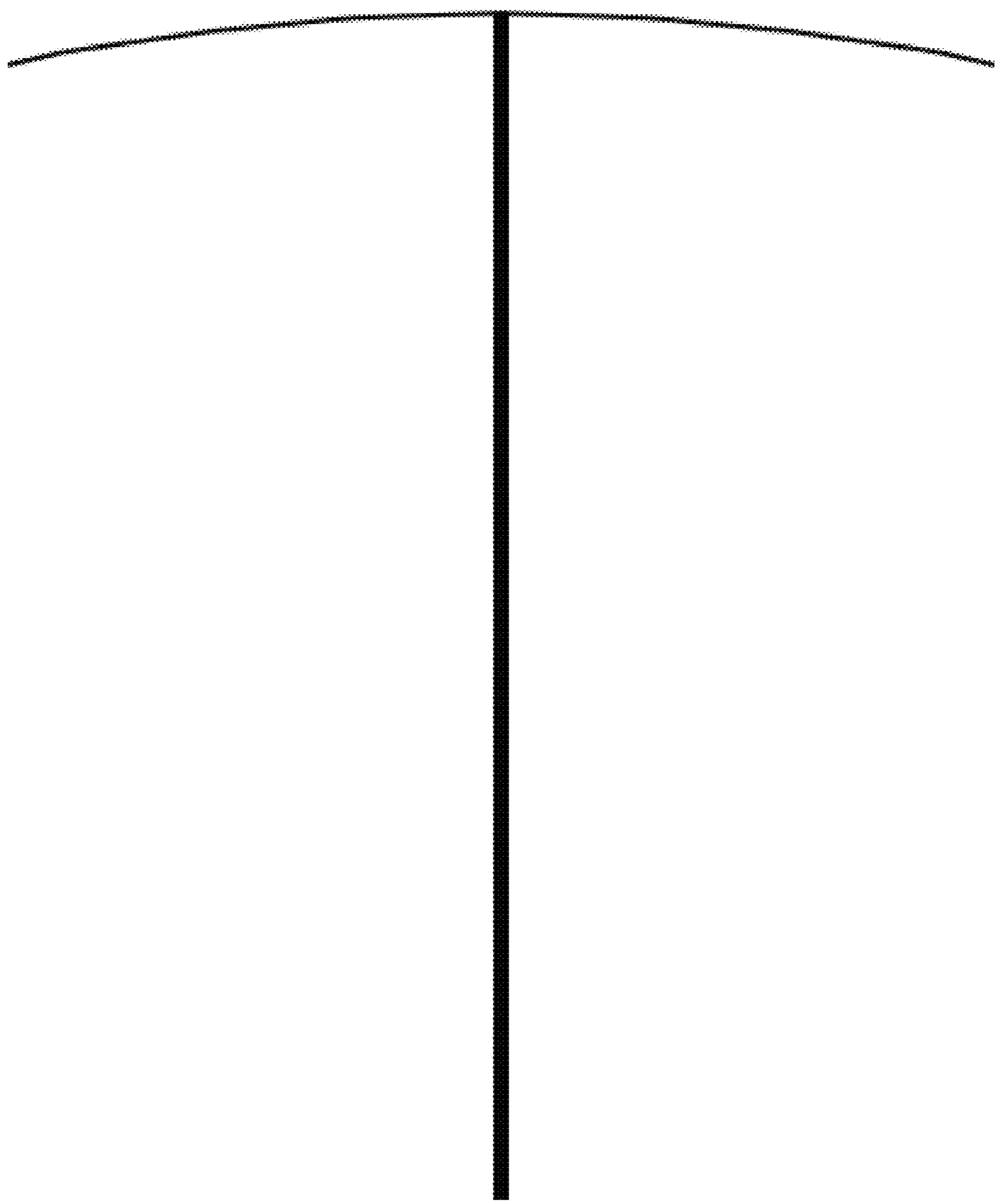
Figure 52D:
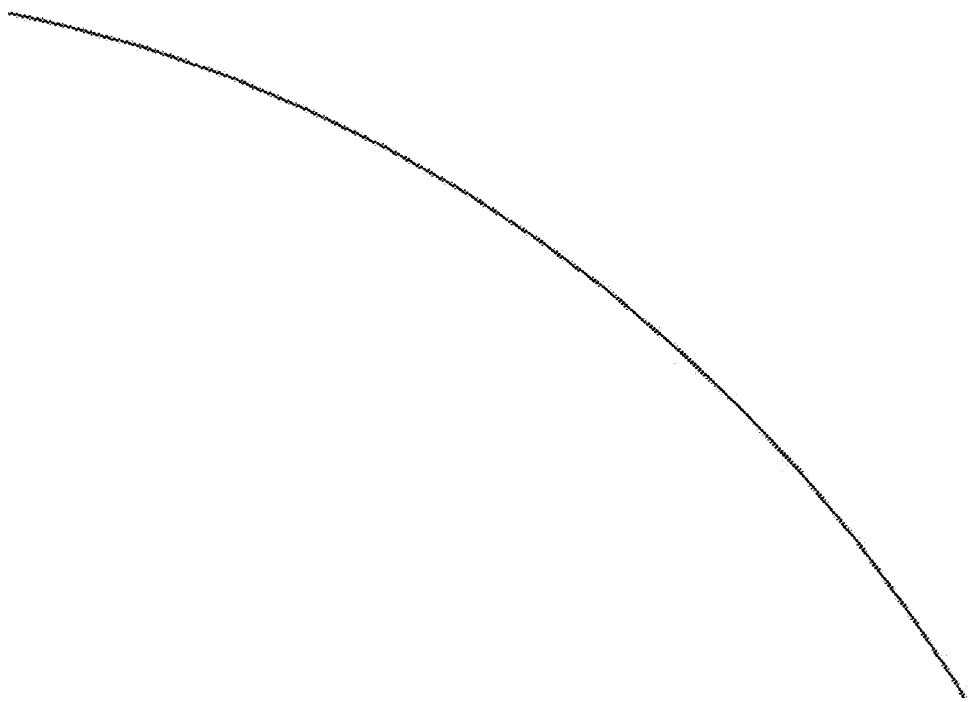
Figure 52E:
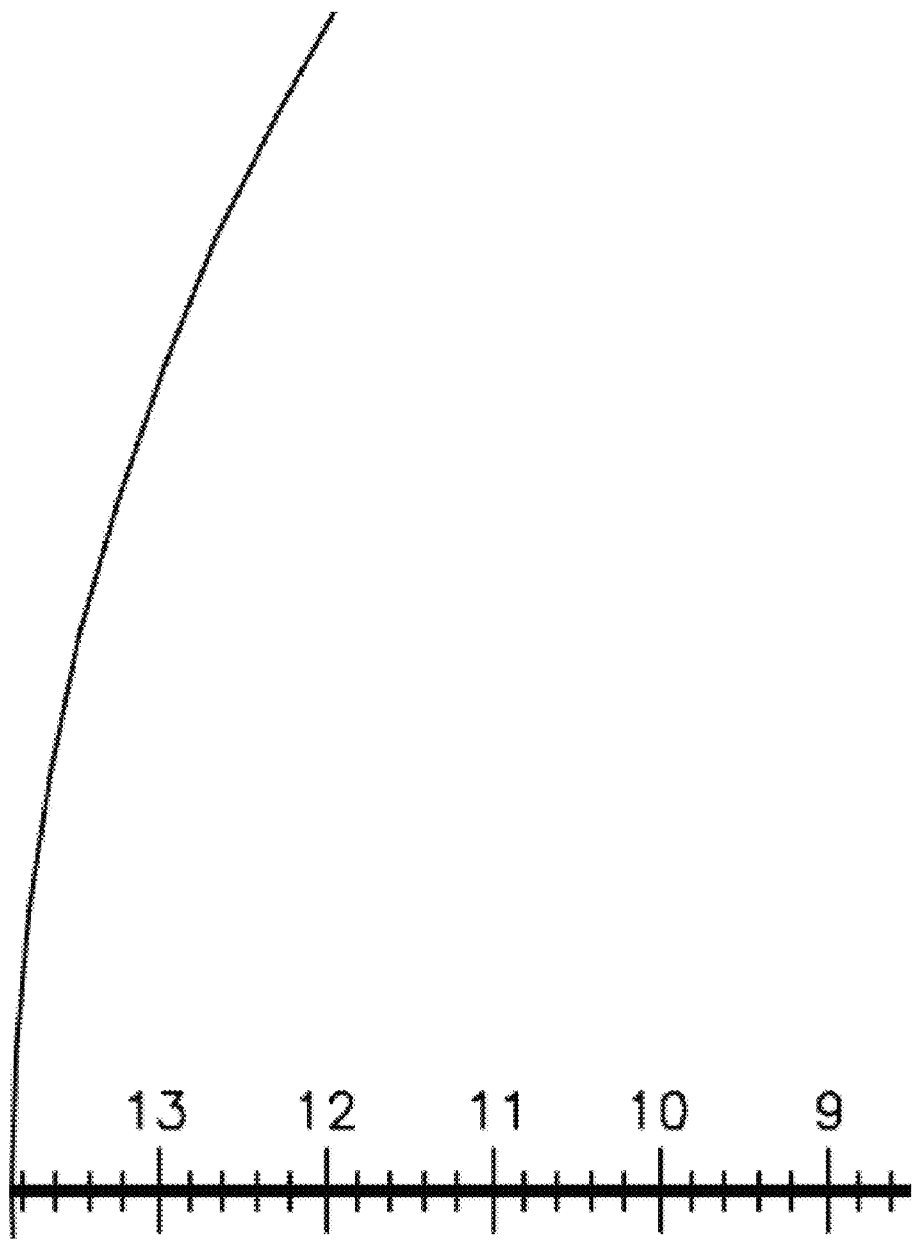
Figure 52F:
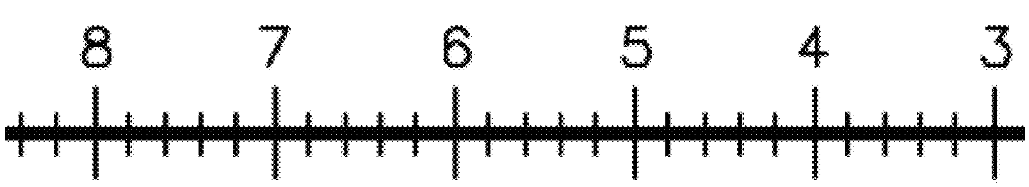
Figure 52G:
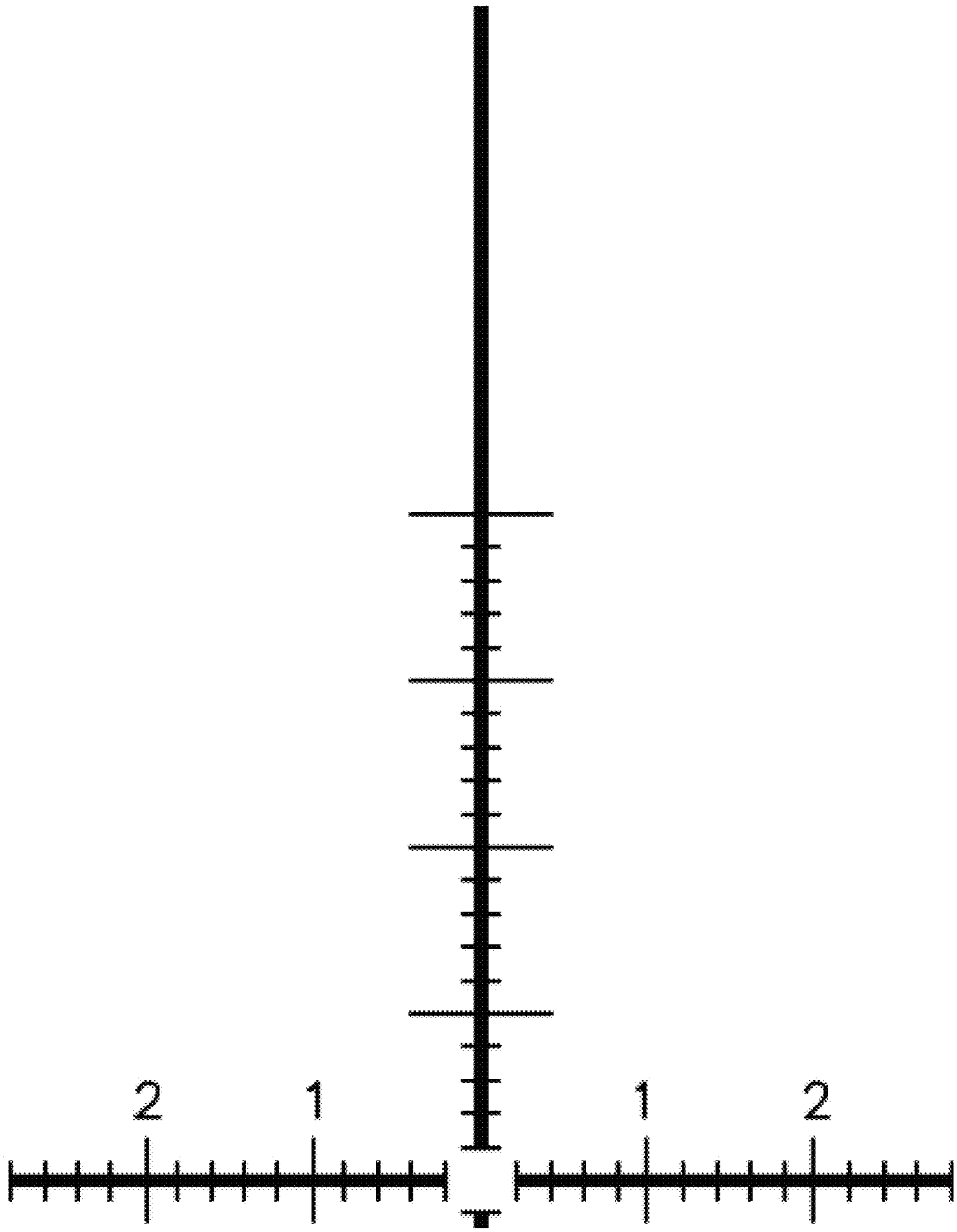
Figure 52H:
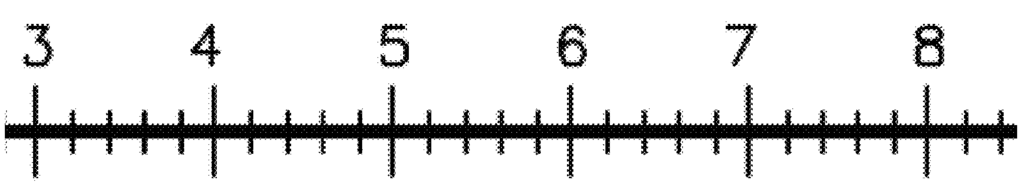
Figure 52I:
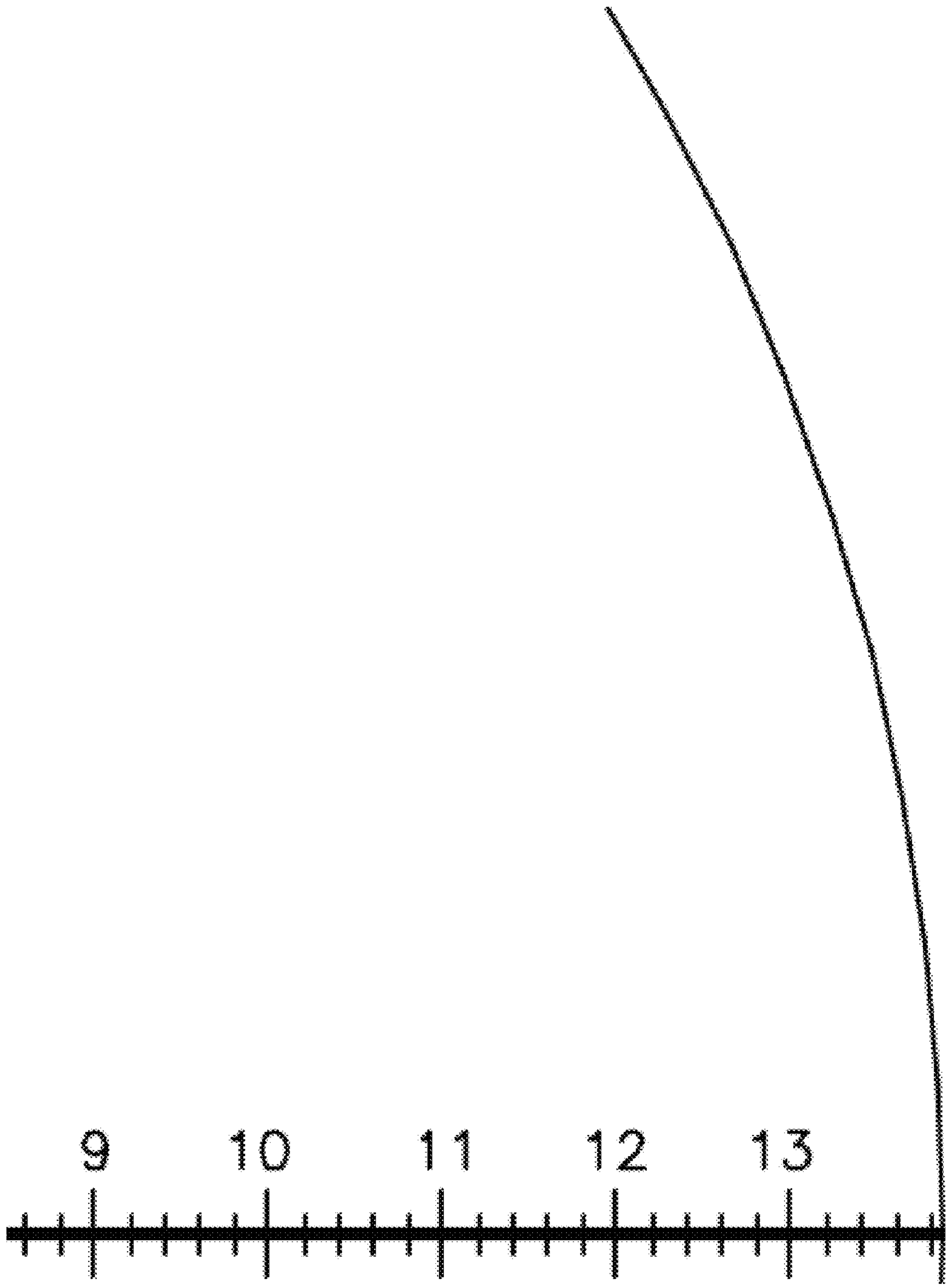
Figure 52J:
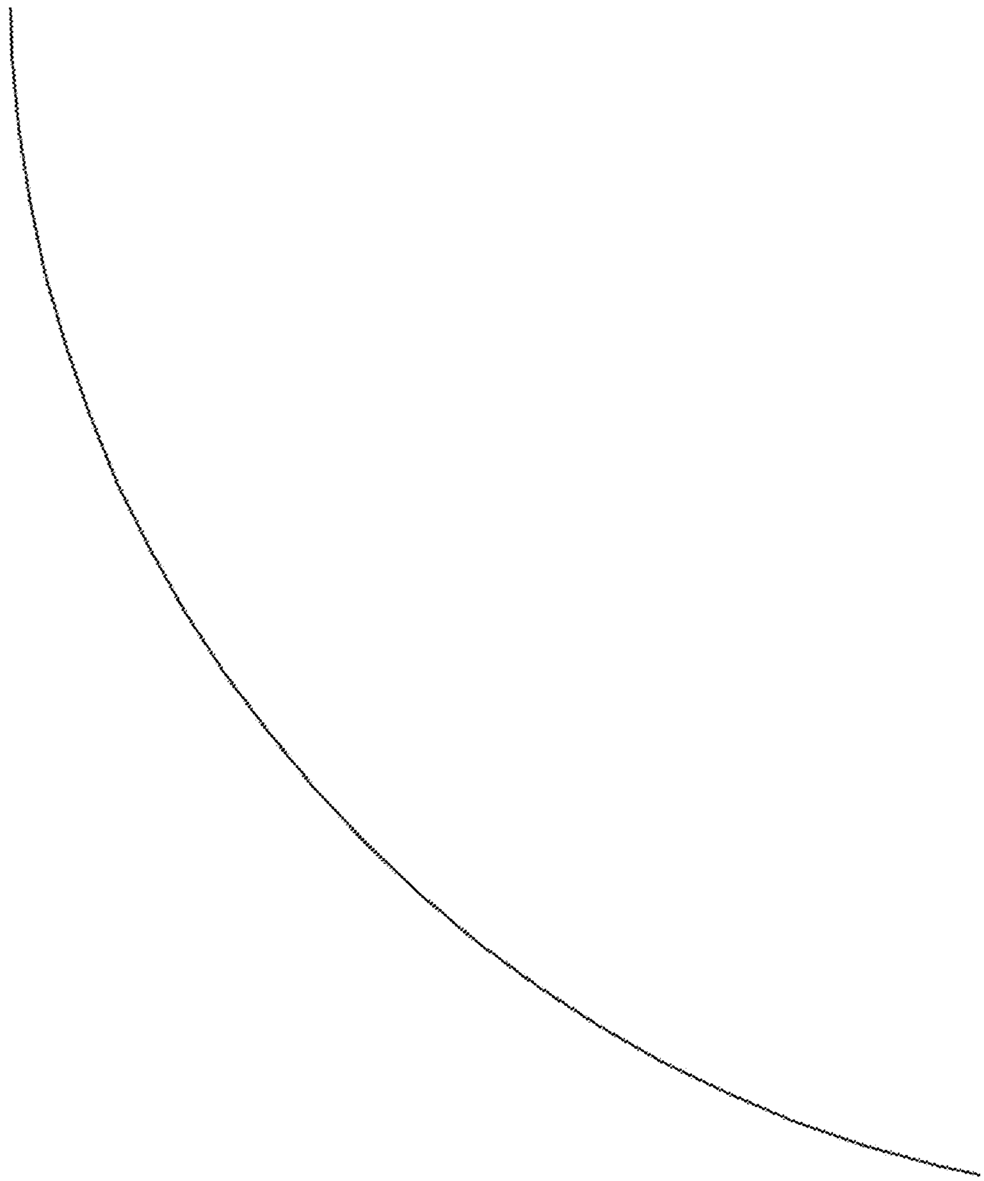
Figure 52K:
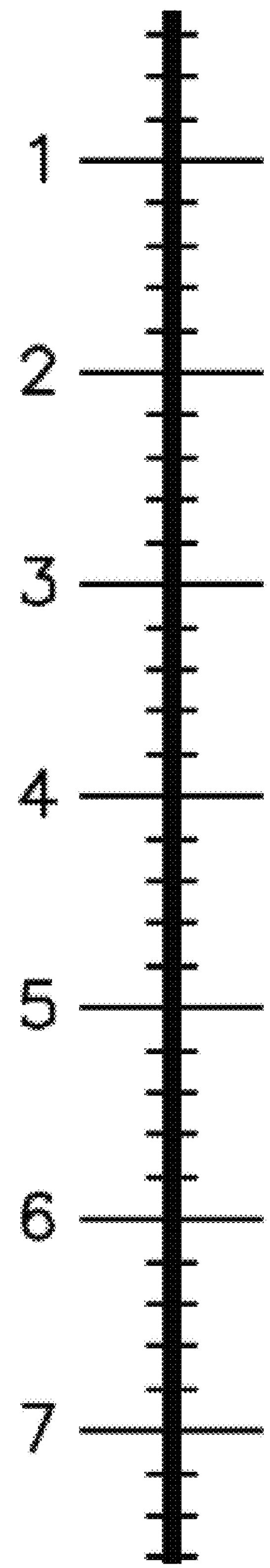
Figure 52I:
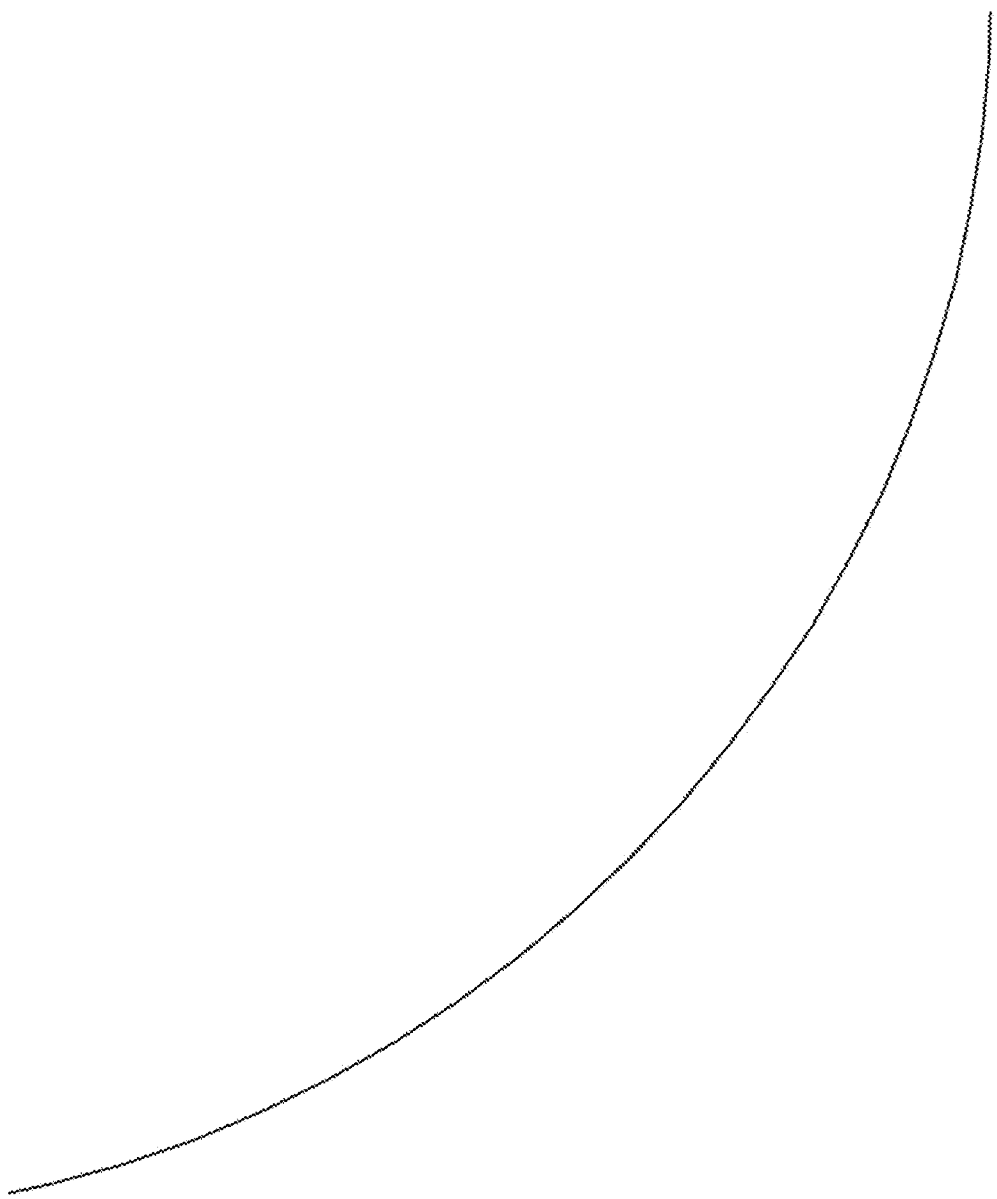
Figure 52M:
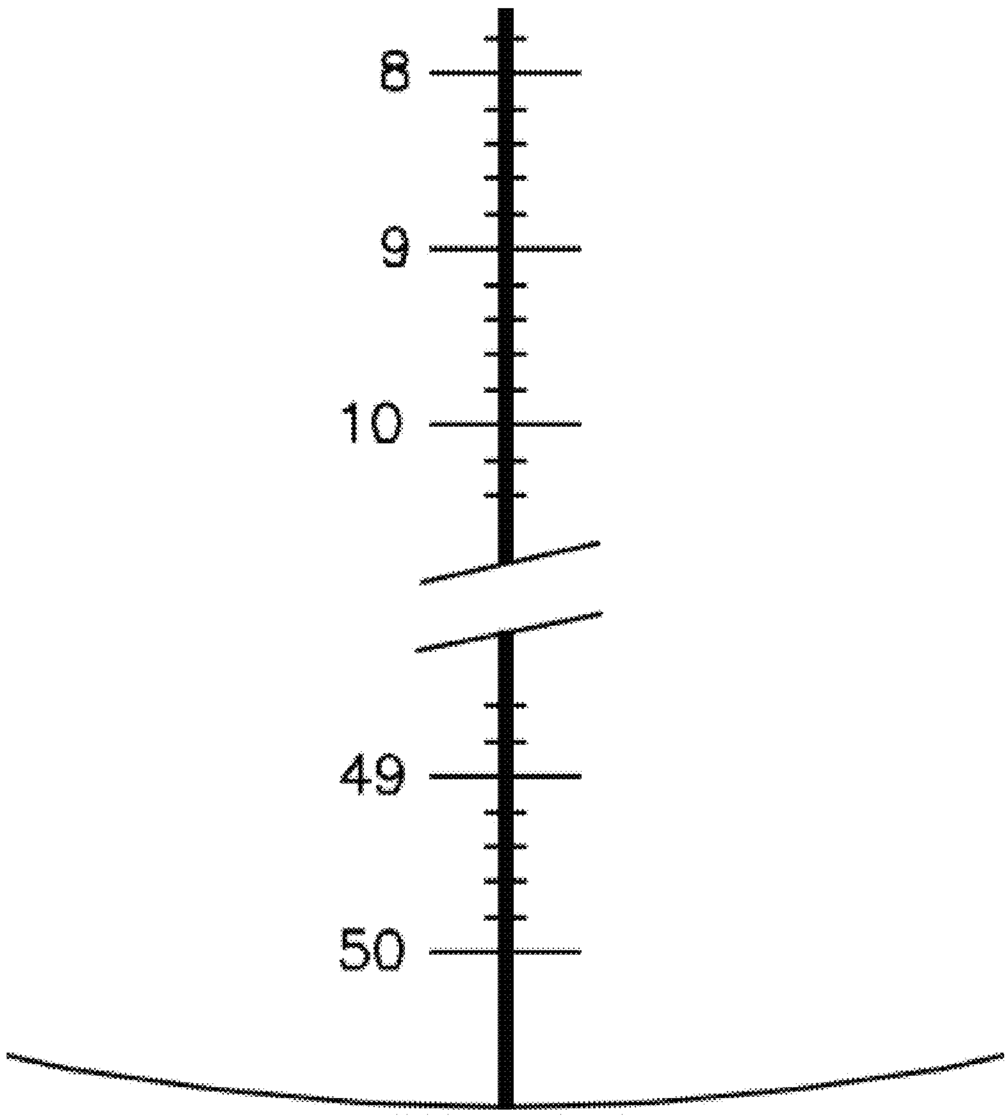
Figure 52N:
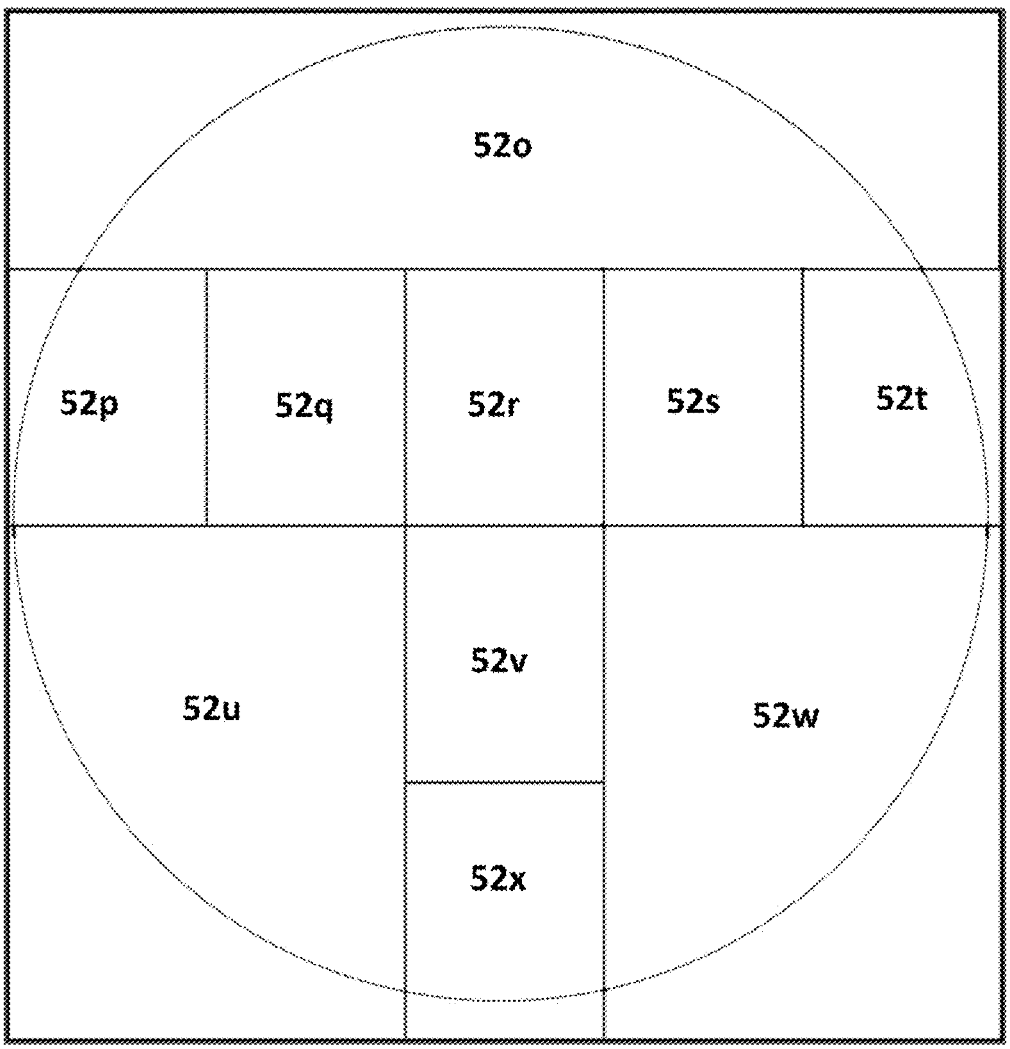
FIGS. 52*n-x* are a front view of a reticle of the present invention, showing the markings as viewed through a zoom telescopic gunsight at high power, with lead markers along a primary horizontal cross-hair suitable for use, for example, in tactical, military, and police applications.
Figure 52O:
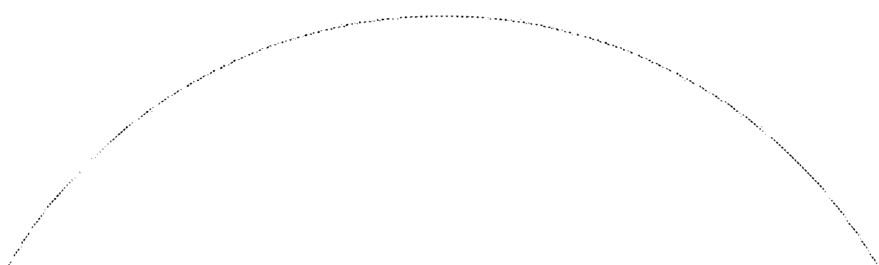
Figure 52P:
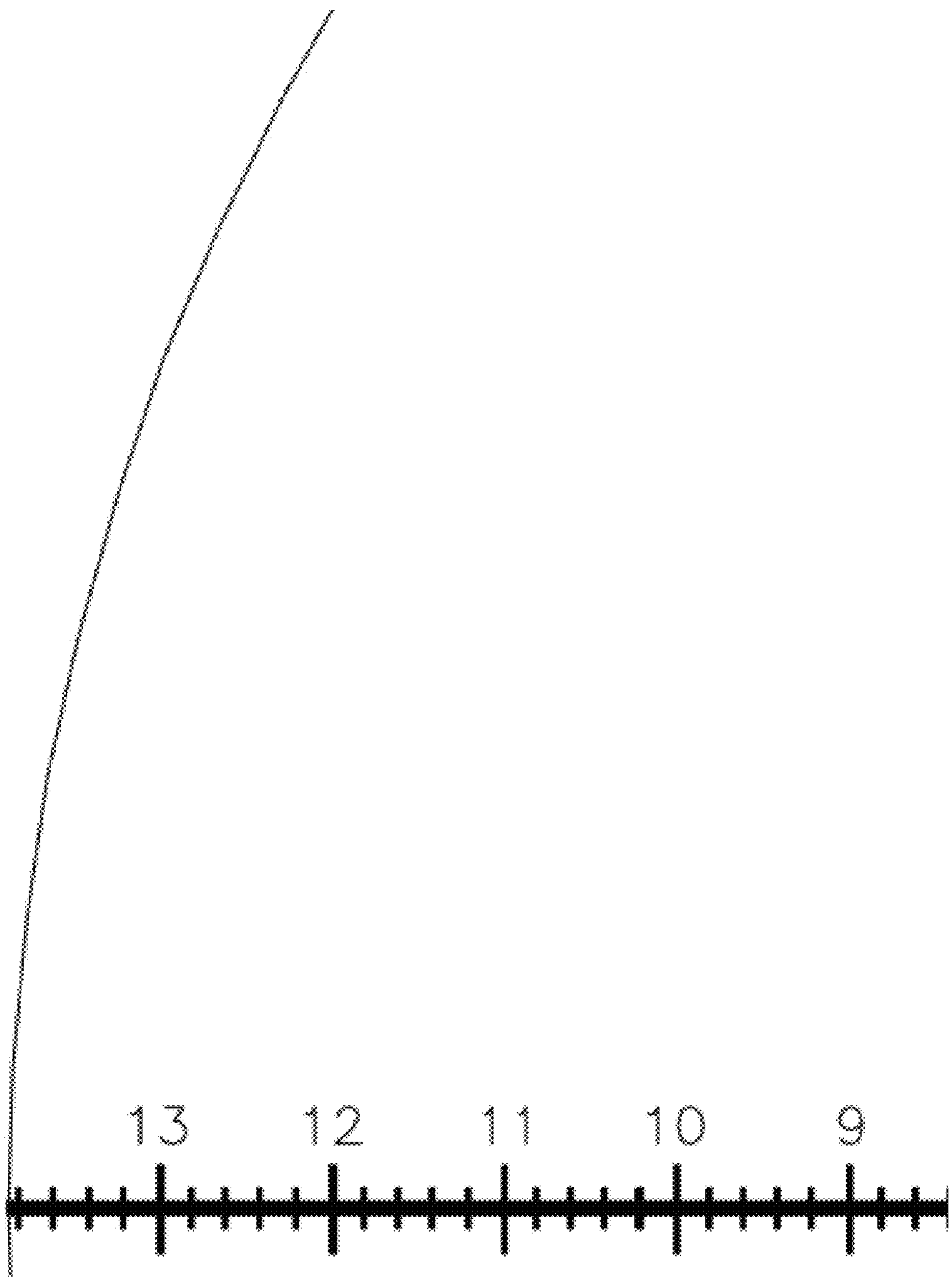
Figure 52Q:
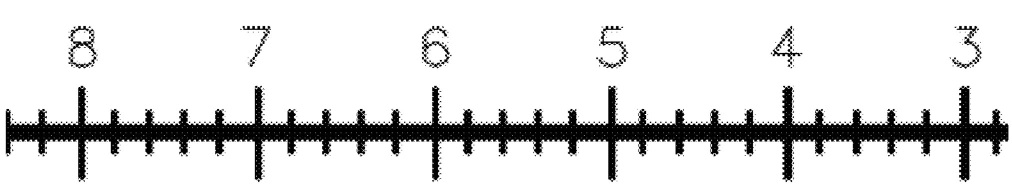
Figure 52R:
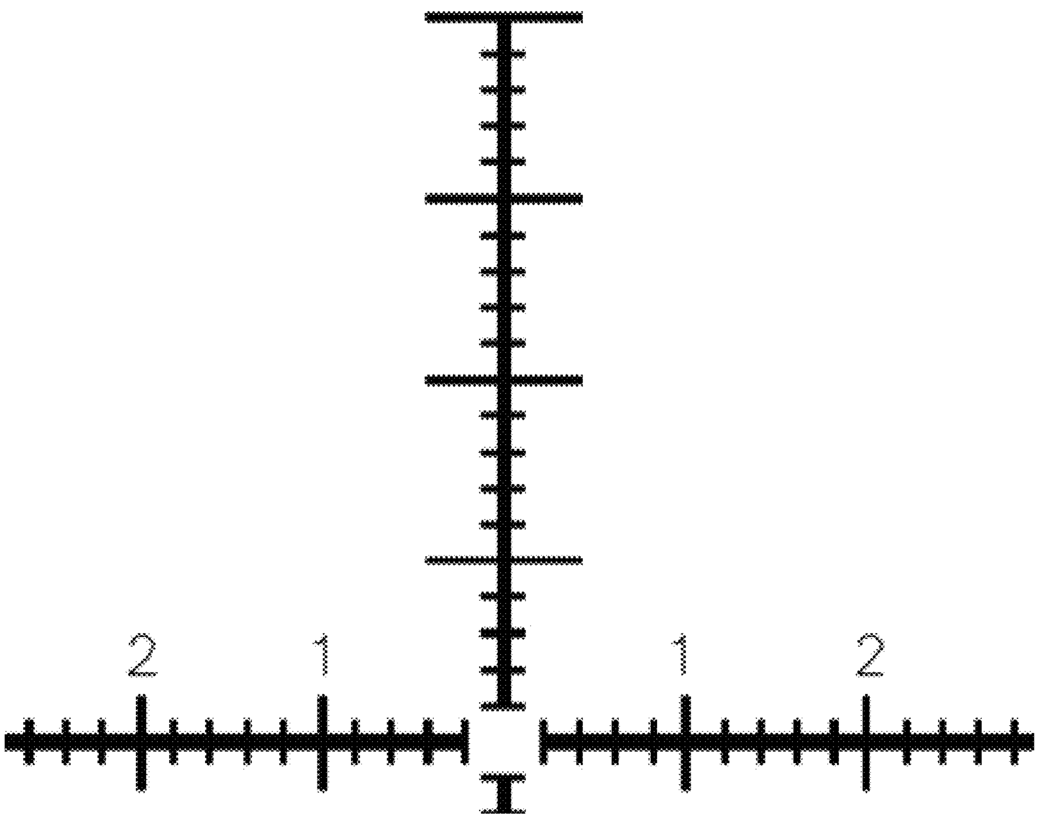
Figure 52S:
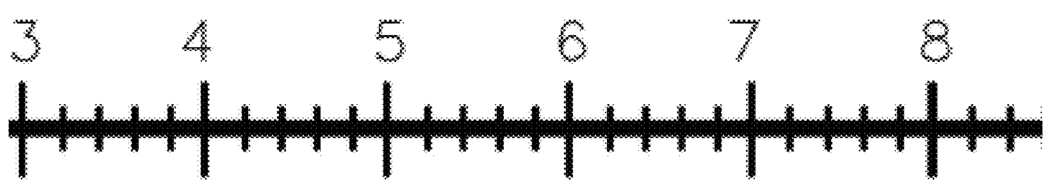
Figure 52T:
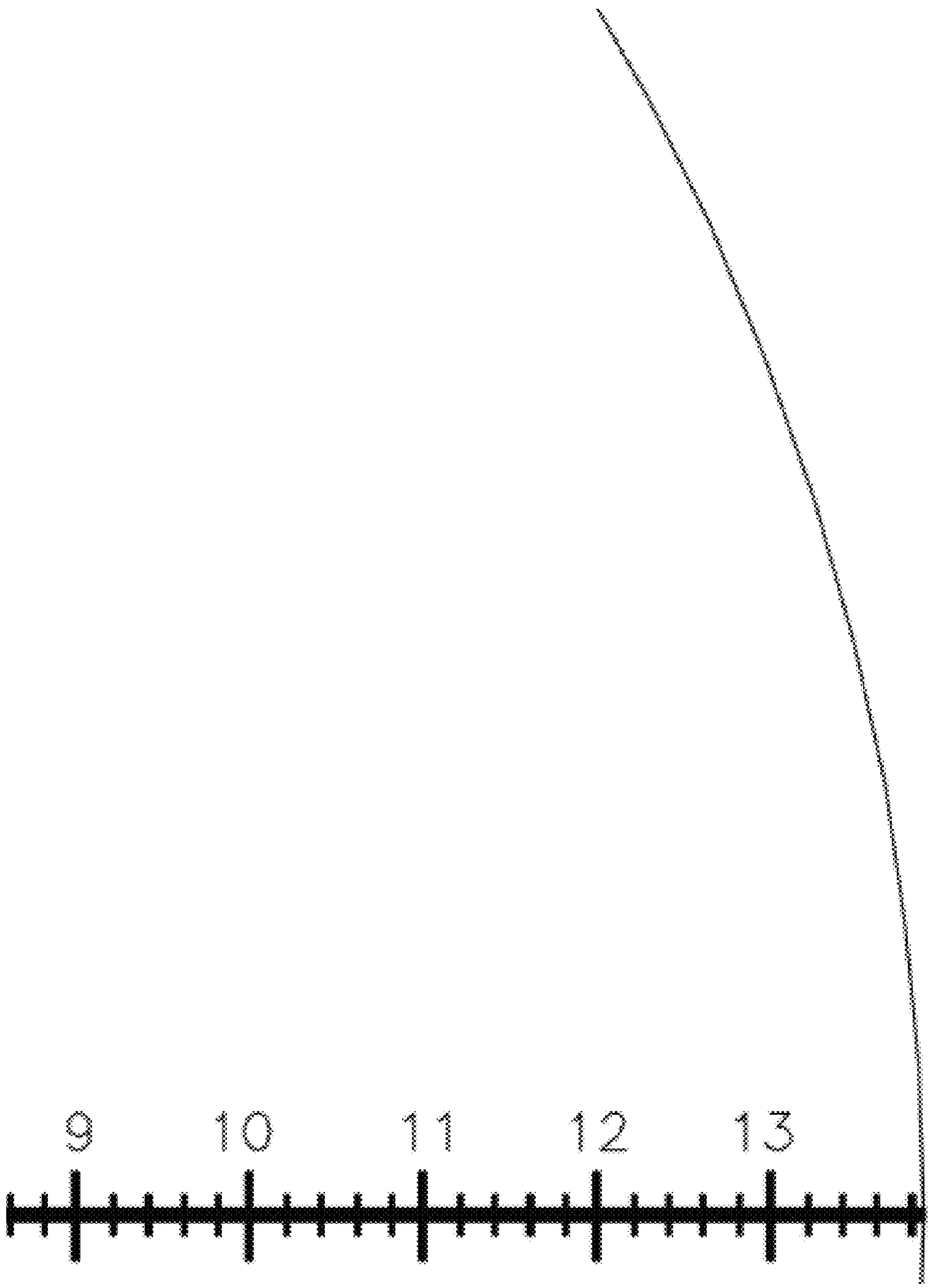
Figure 52U:
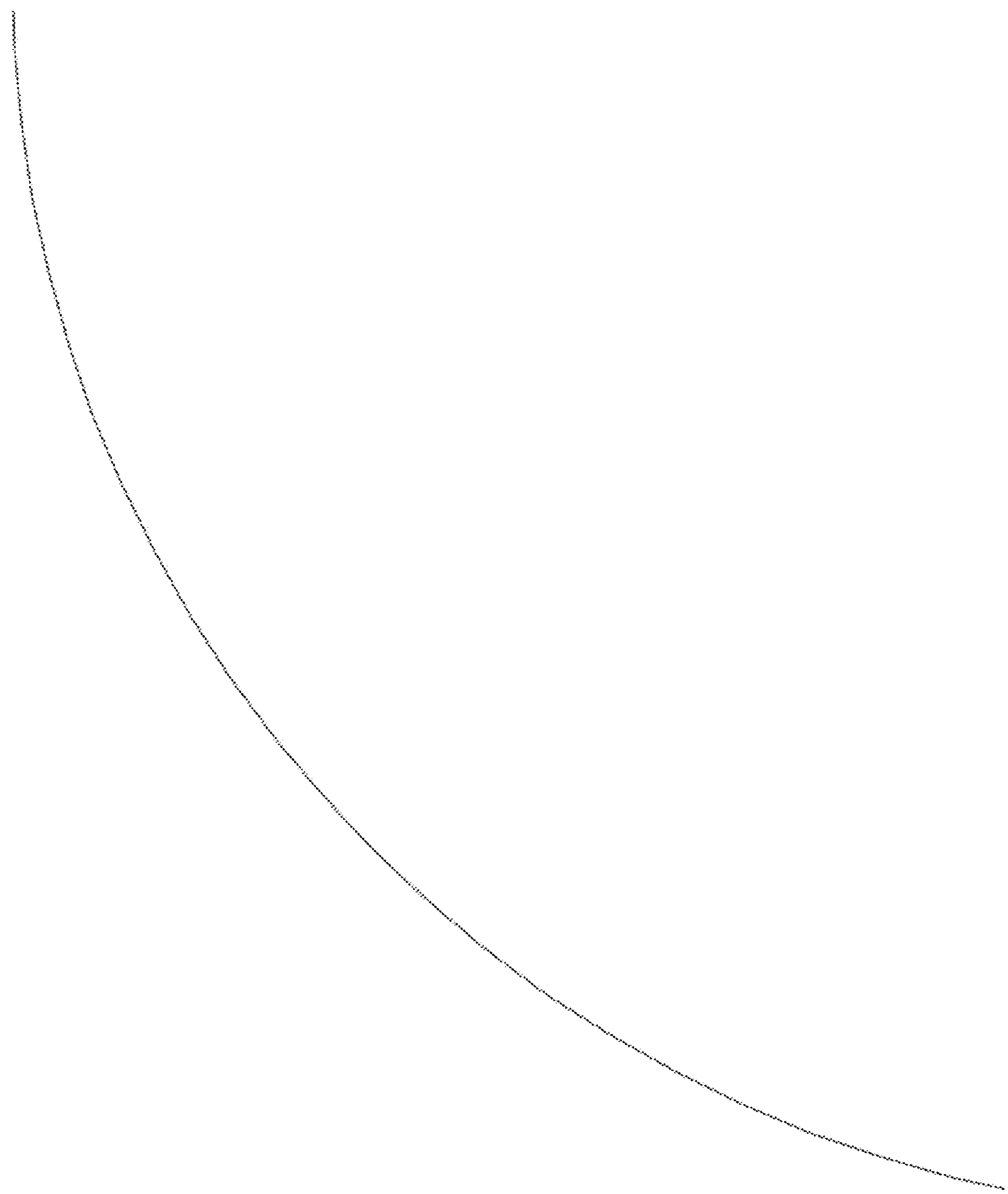
Figure 52V:
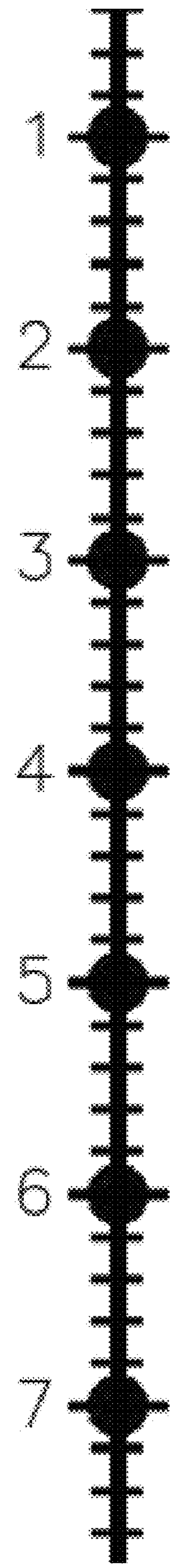
Figure 52W:
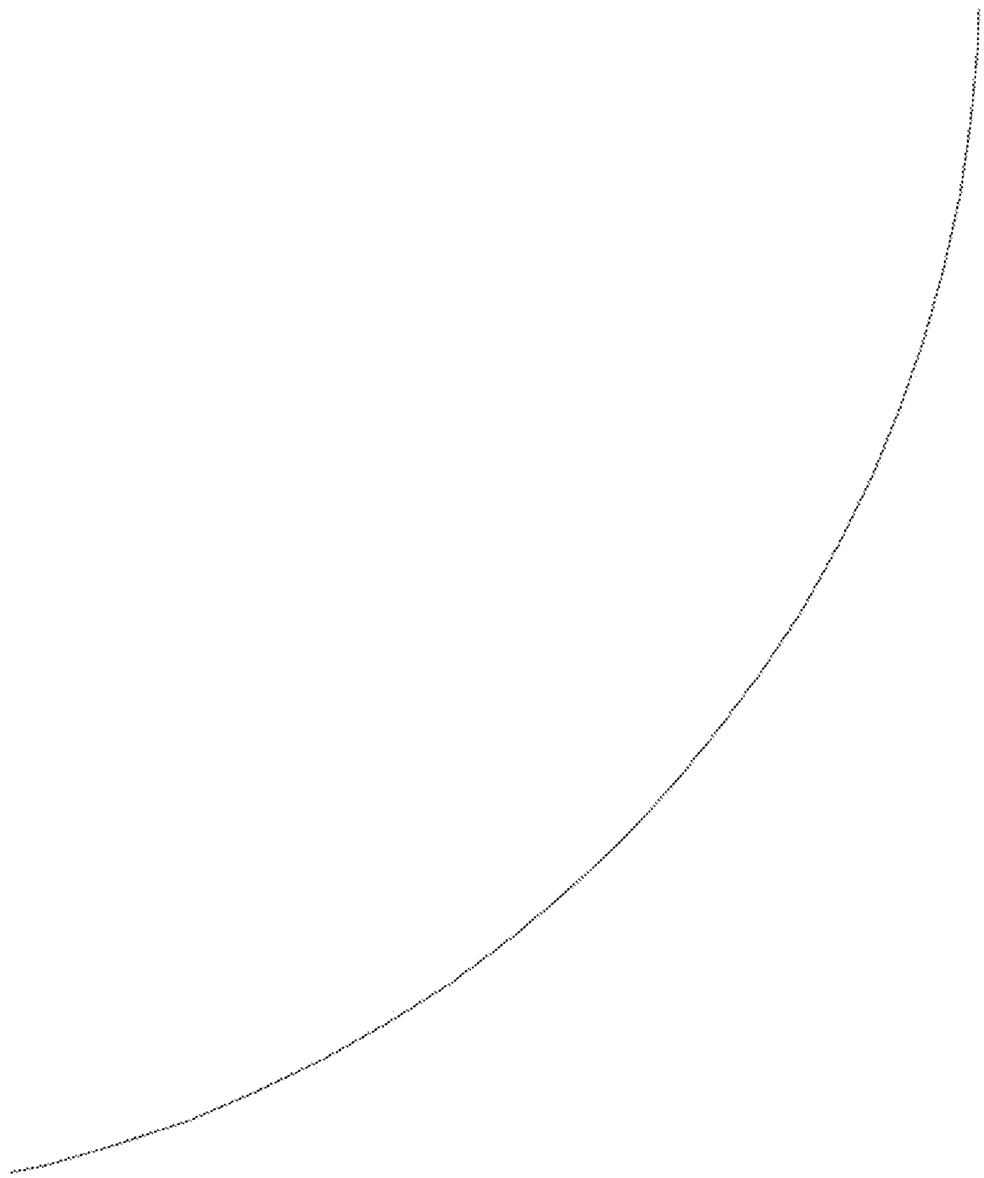
Figure 52X:
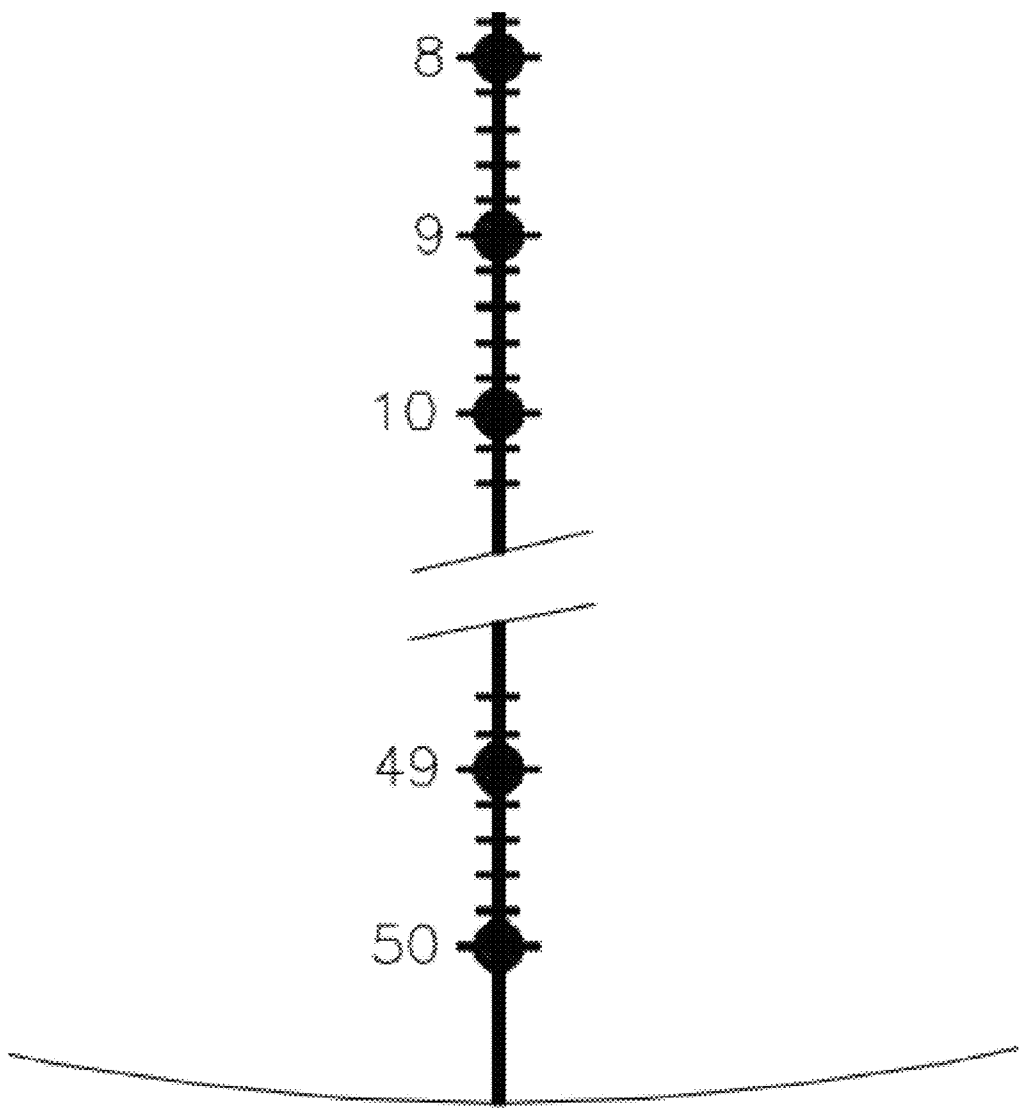
Figure 52Y:
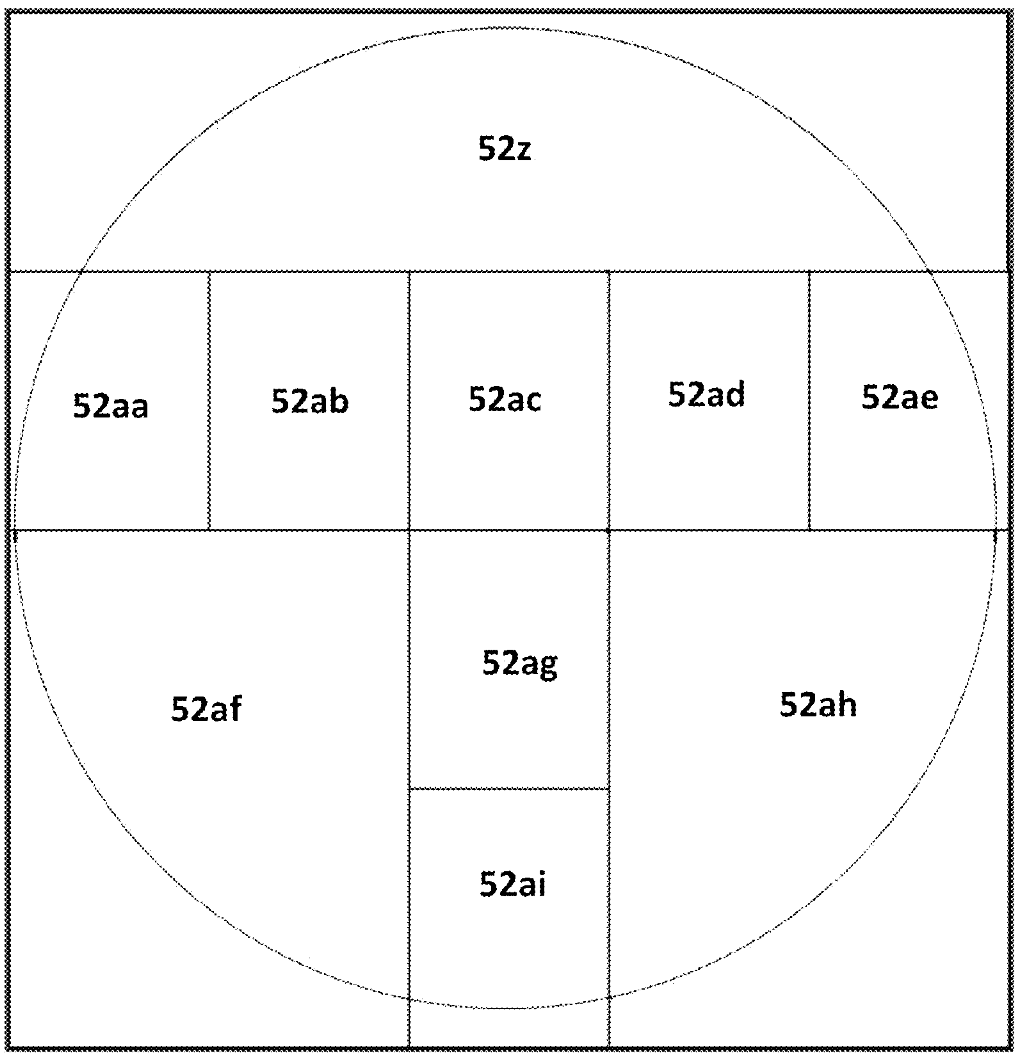
FIGS. 52*y-ai* are a front view of a reticle of the present invention, showing the markings as viewed through a zoom telescopic gunsight at high power, with lead markers along a primary horizontal cross-hair suitable for use, for example, in tactical, military, and police applications.
Figure 52Z:
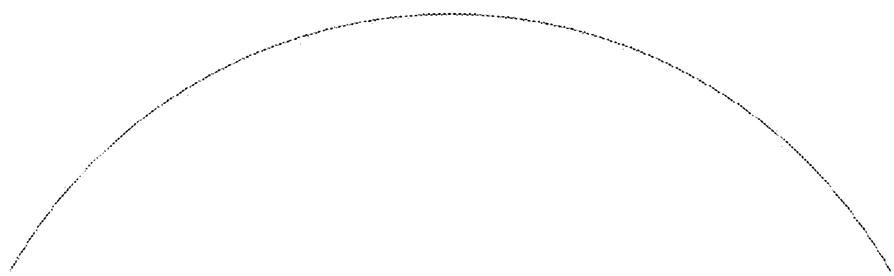
FIGS. 52*z-ai* provide magnified views of subregions of the reticle.
Figure 52A:
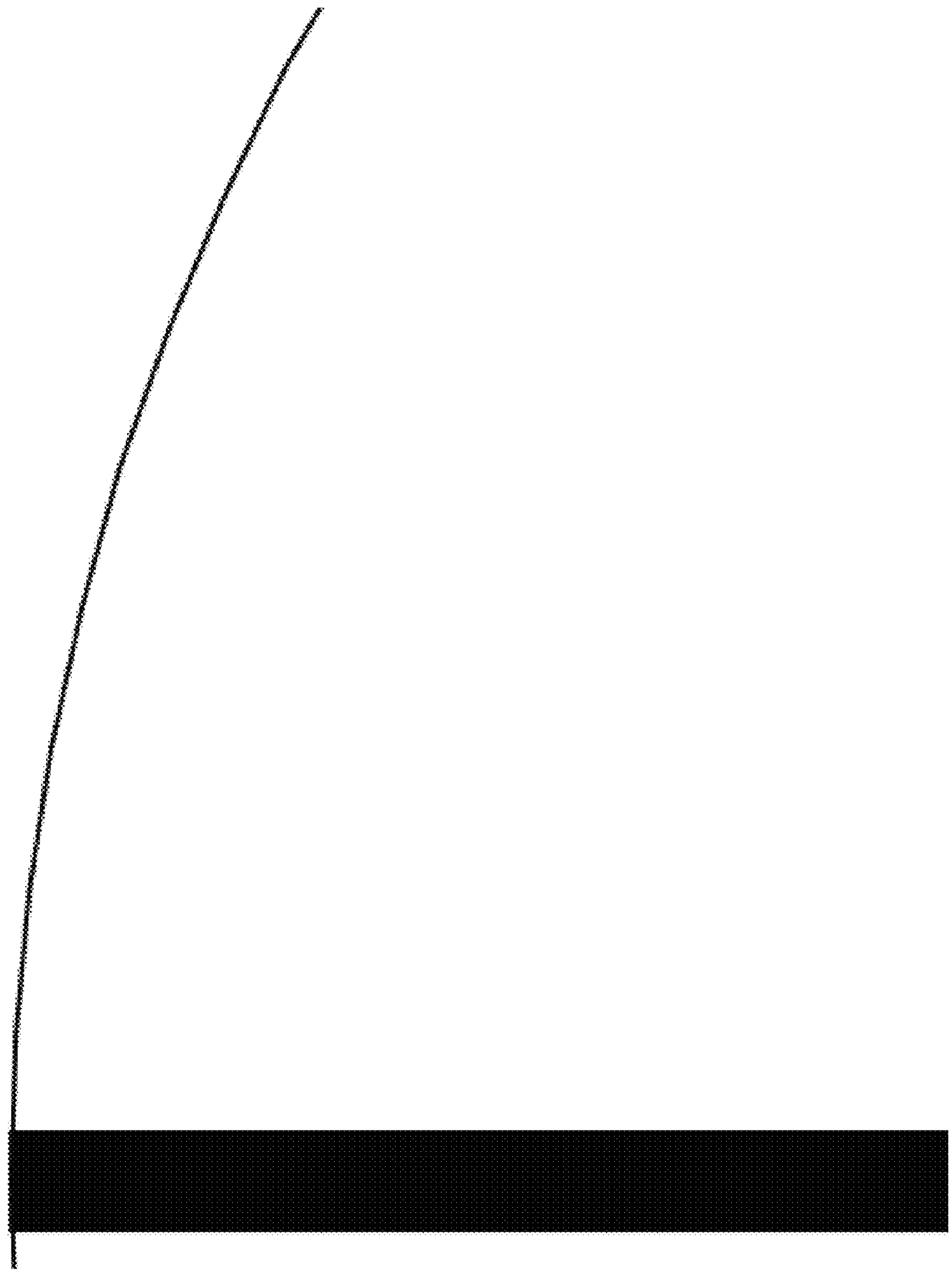
Figure 52A:
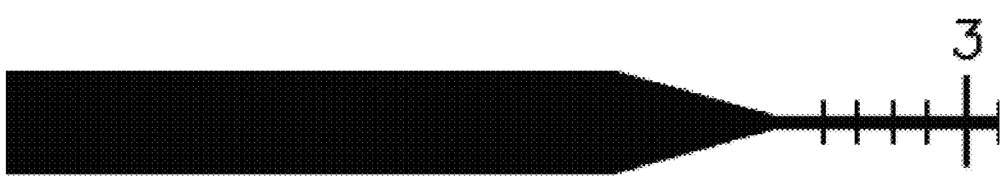
Figure 52A:
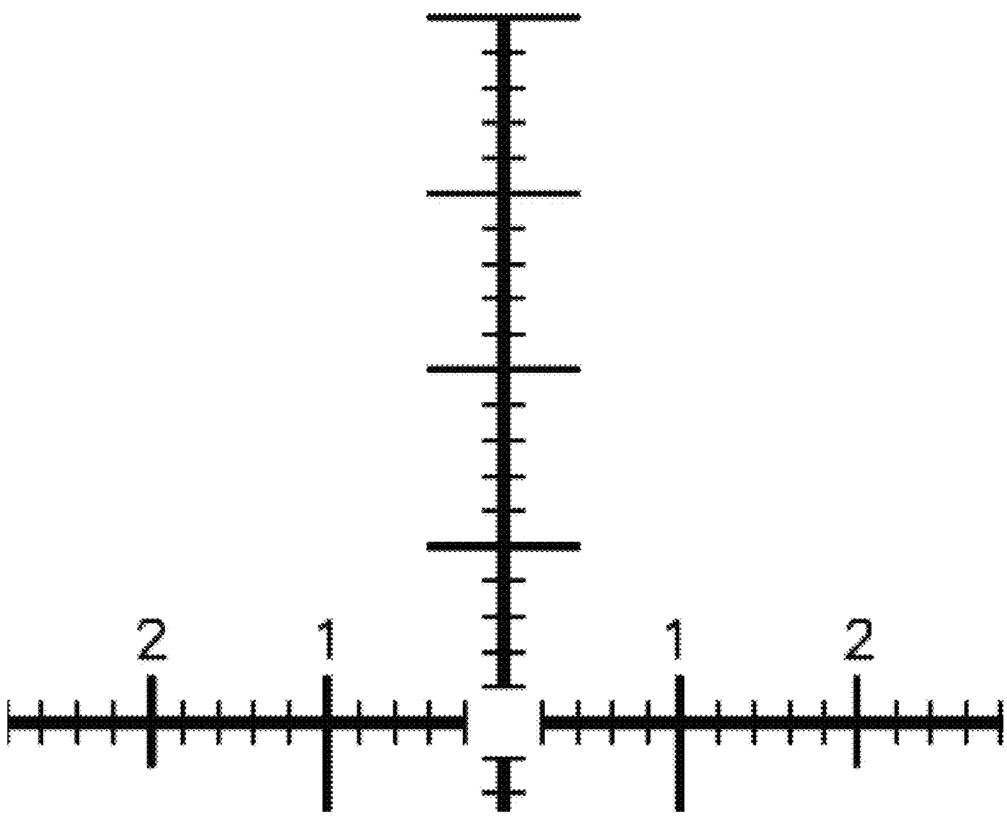
Figure 52A:
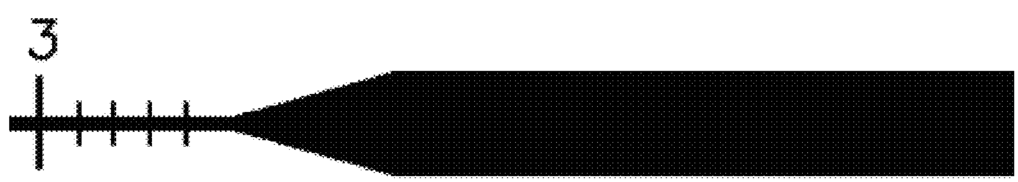
Figure 52A:
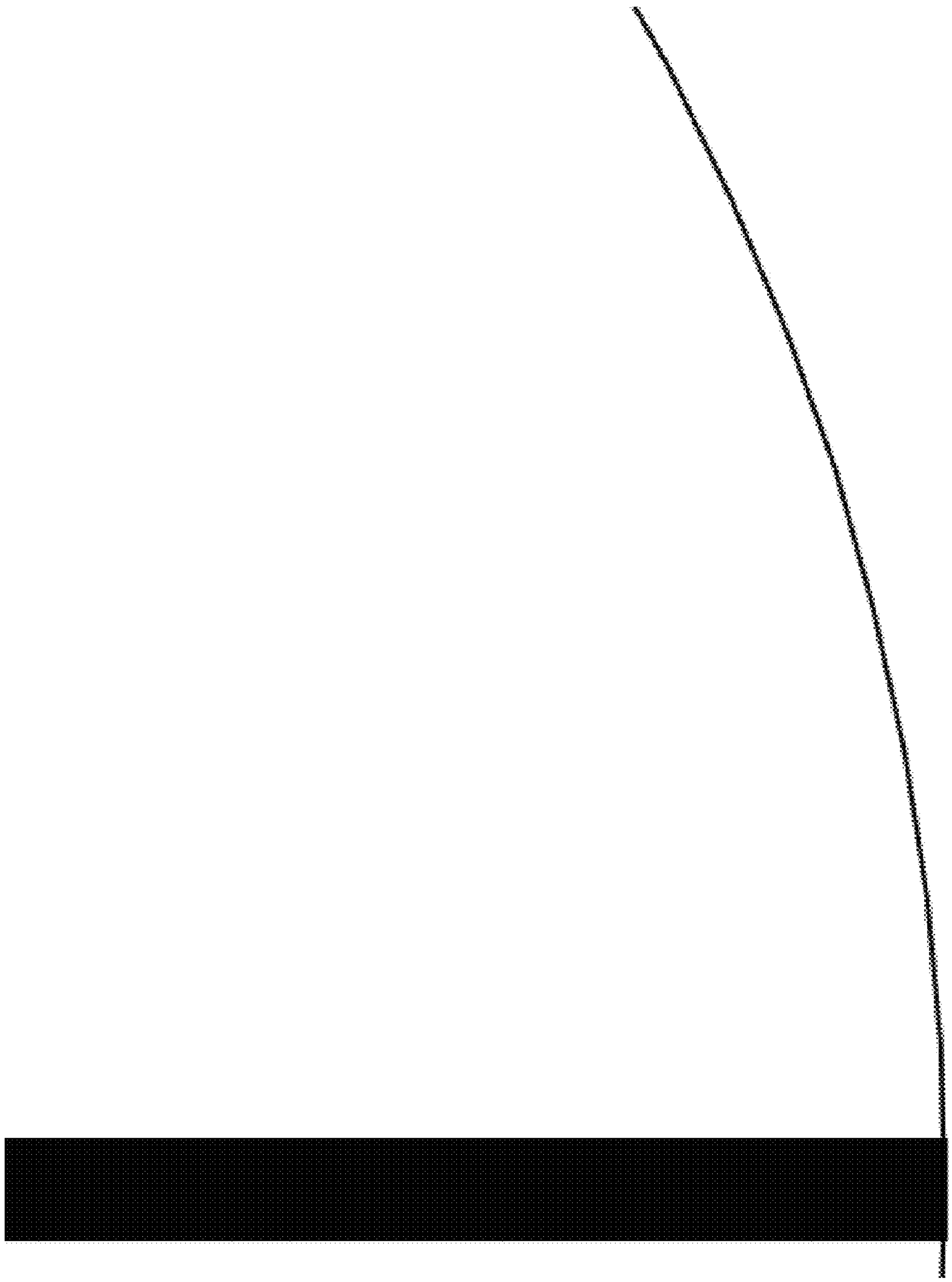
Figure 52A:
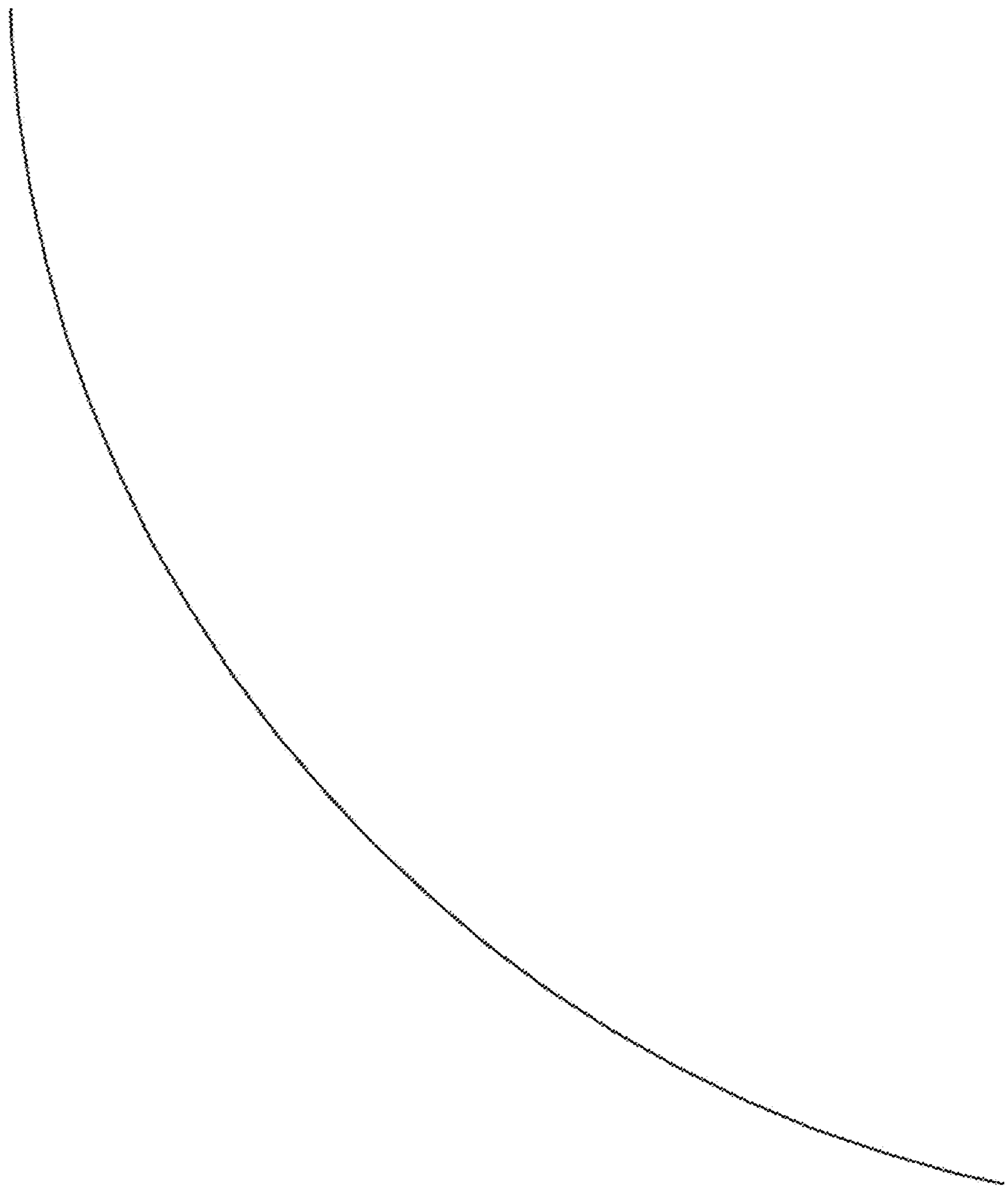
Figure 52A:
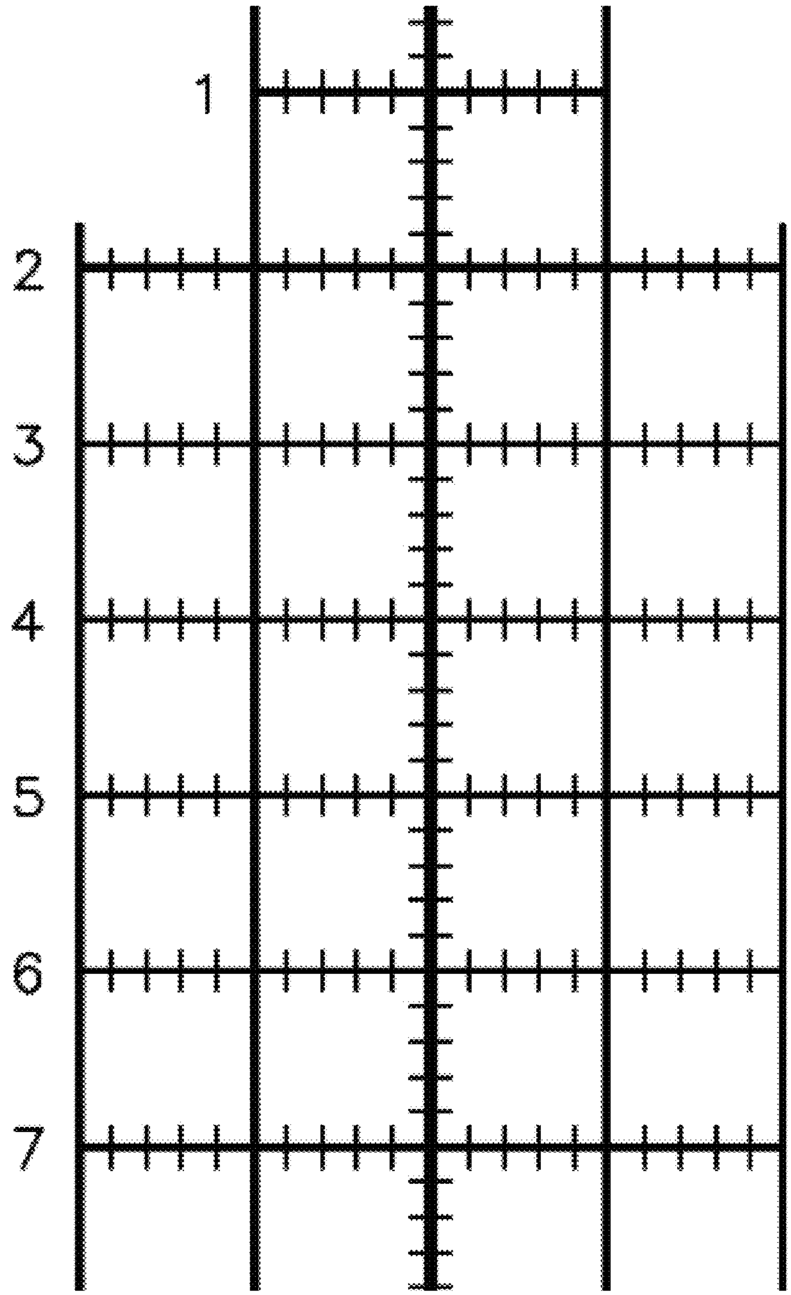
Figure 52A:
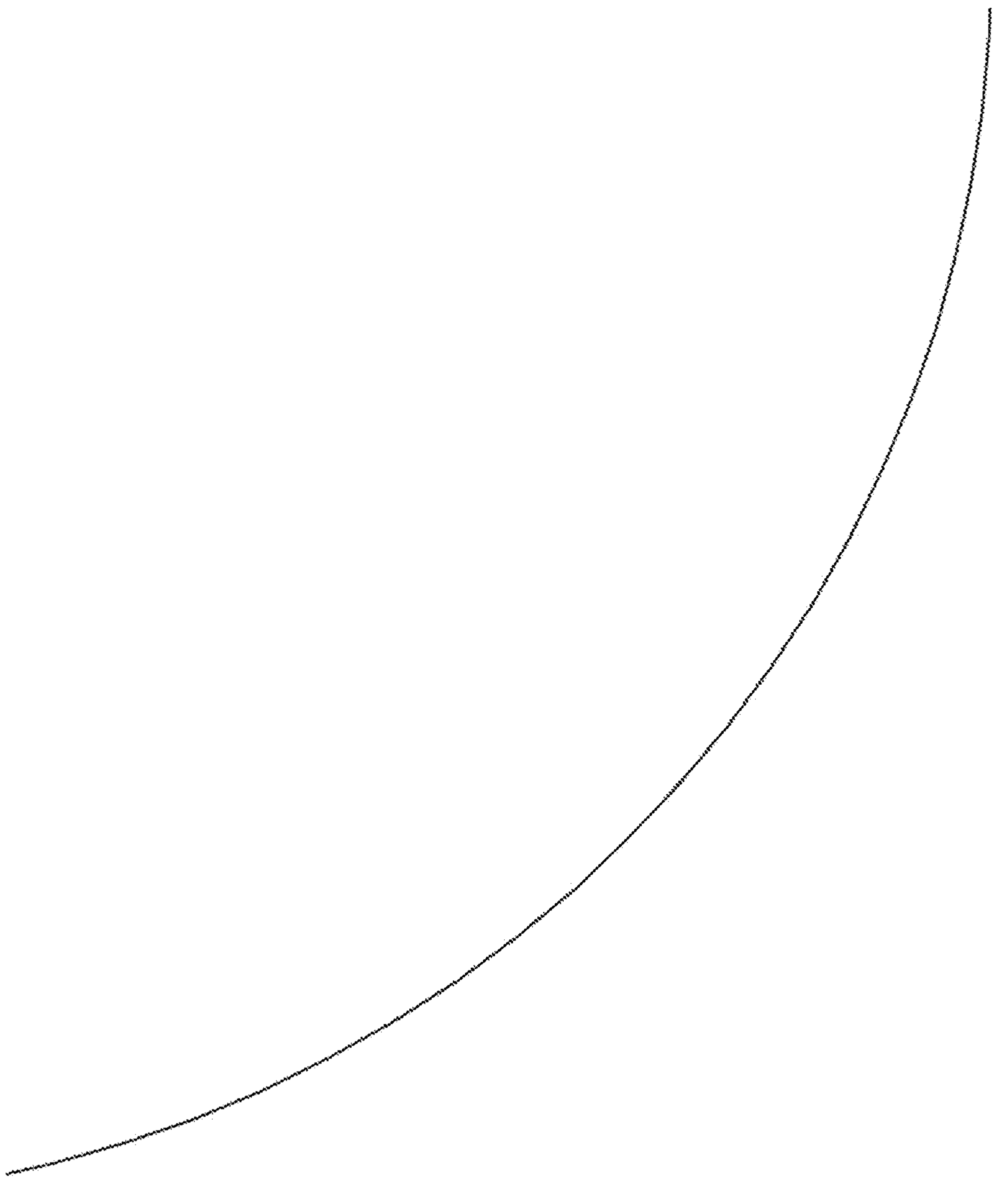
Figure 52A:
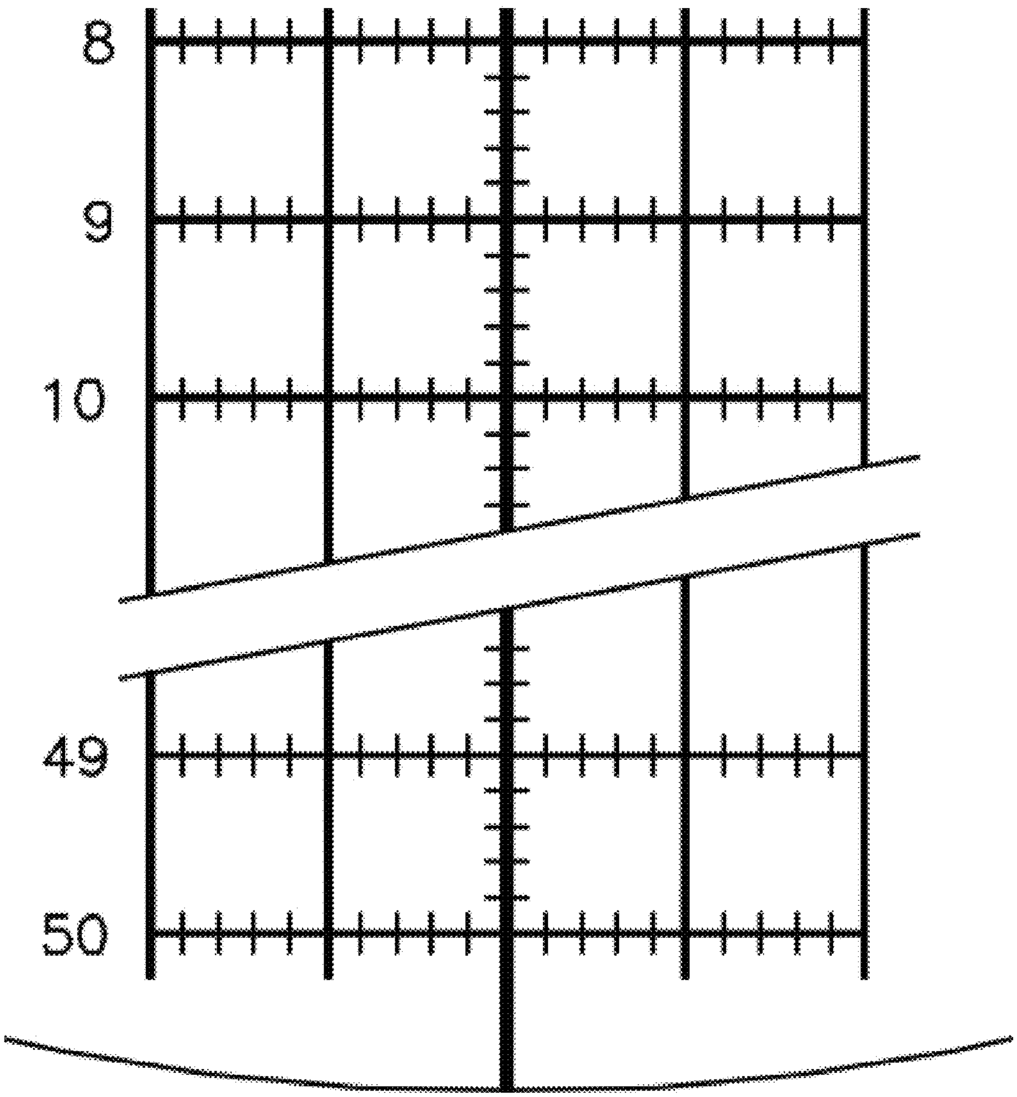
Figure 52A:
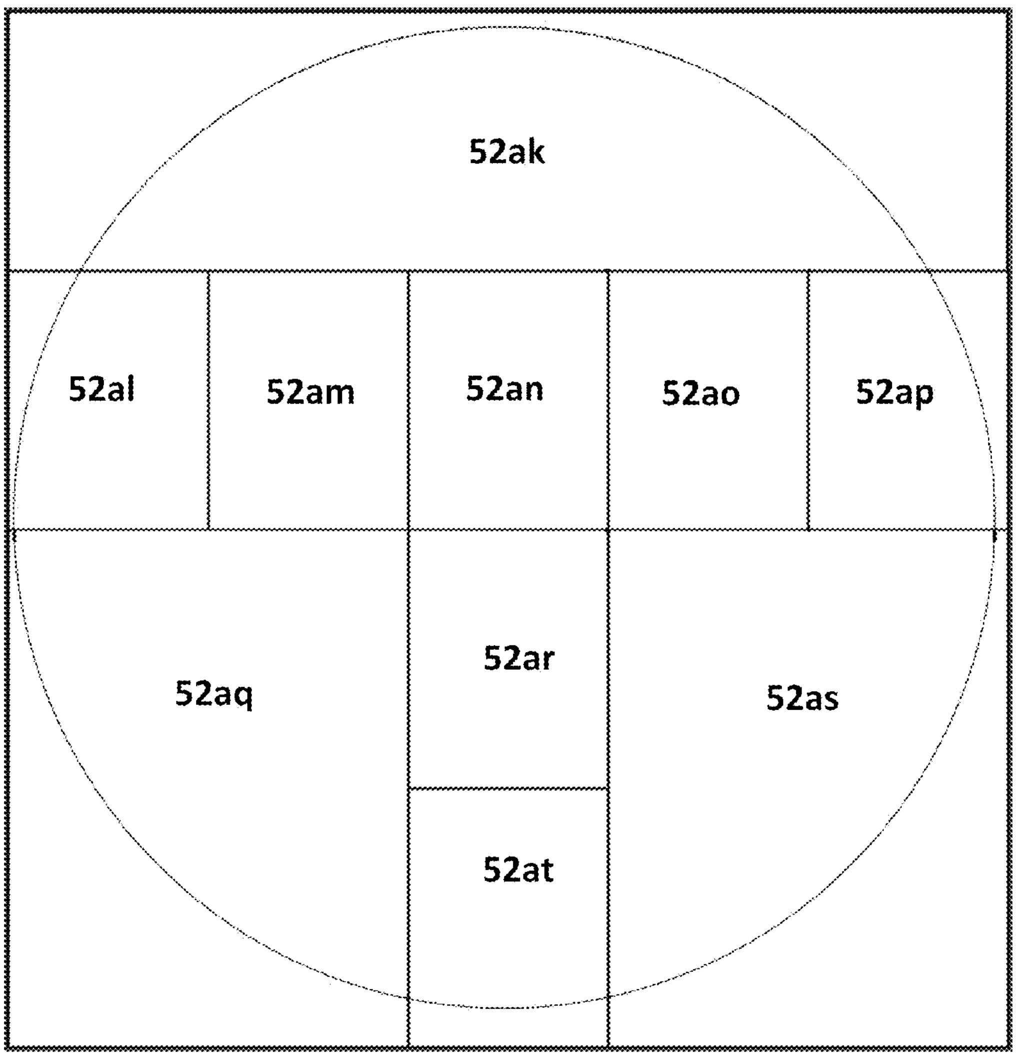
Figure 52A:
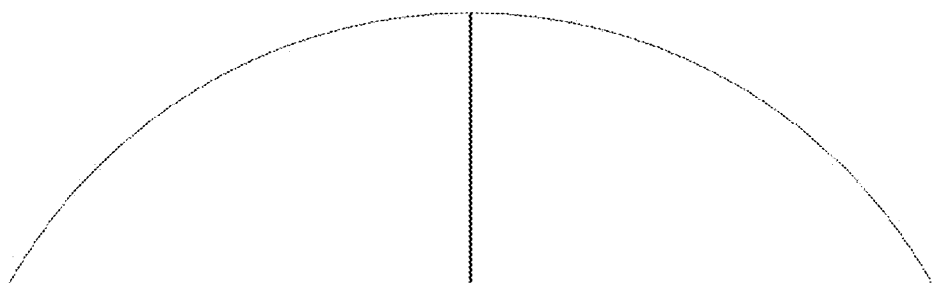
Figure 52A:
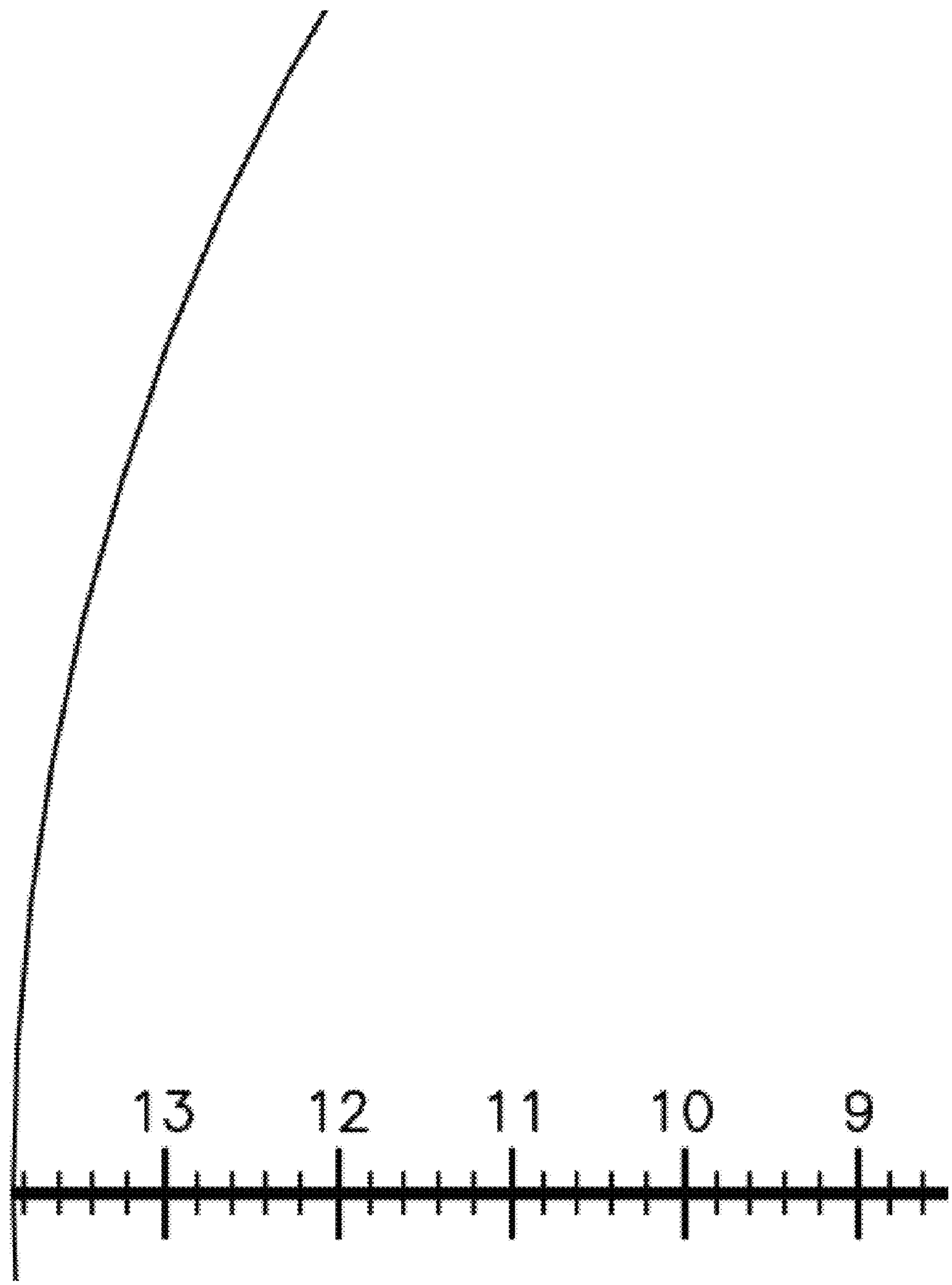
Figure 52A:
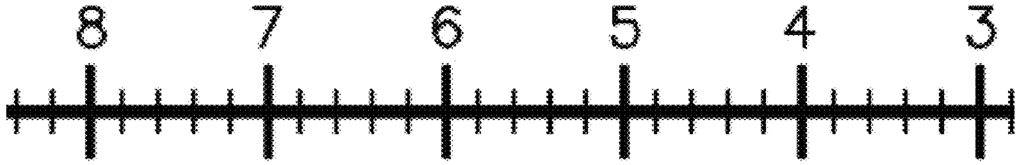
Figure 52A:
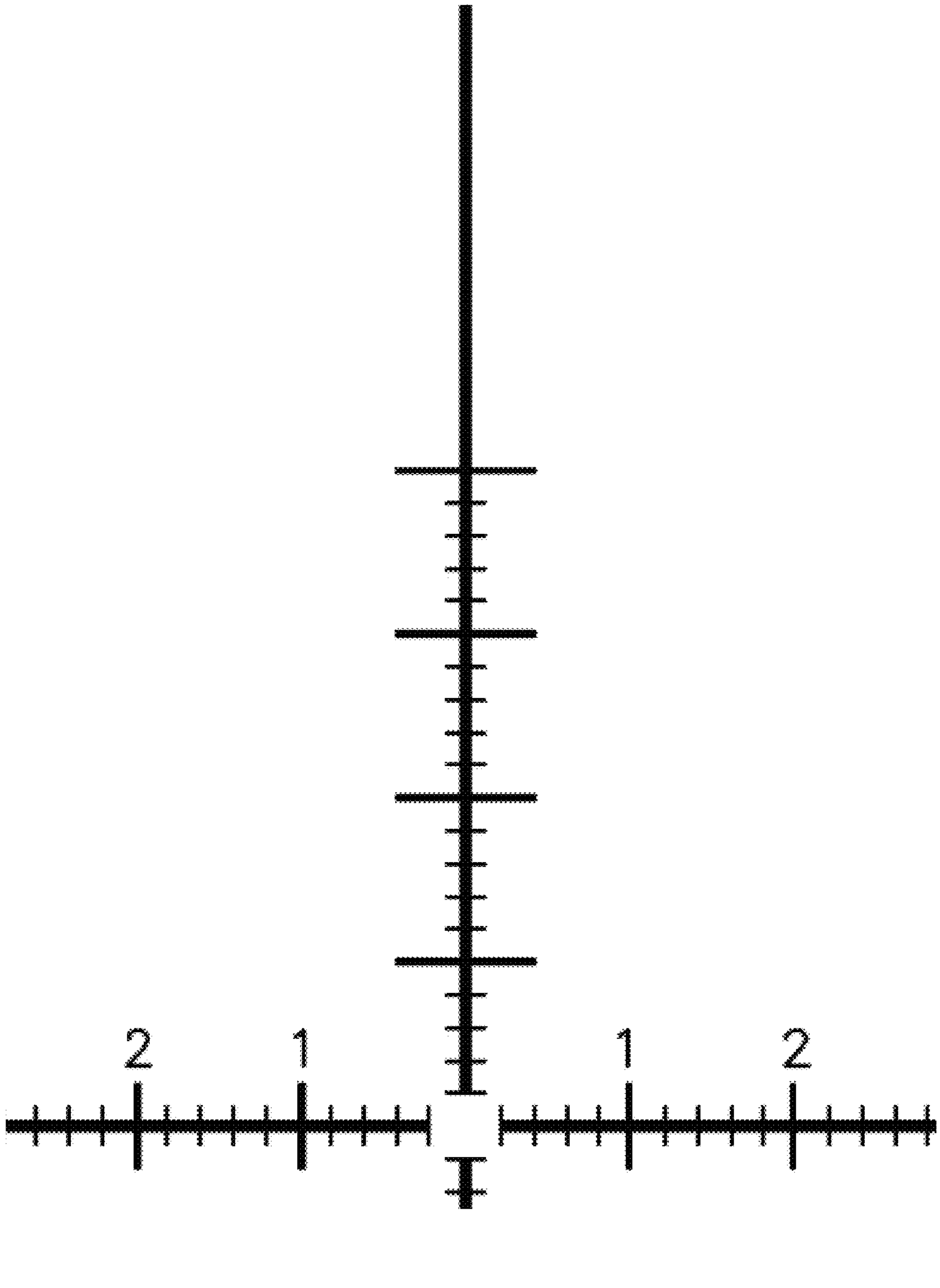
Figure 52A:
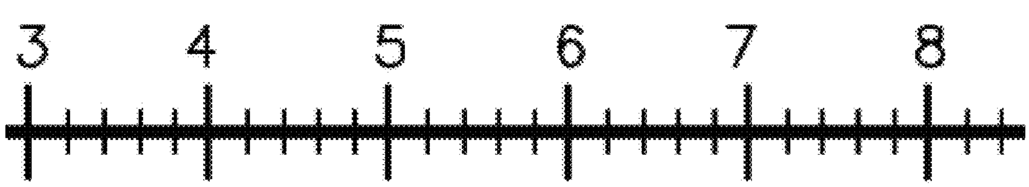
Figure 52A:
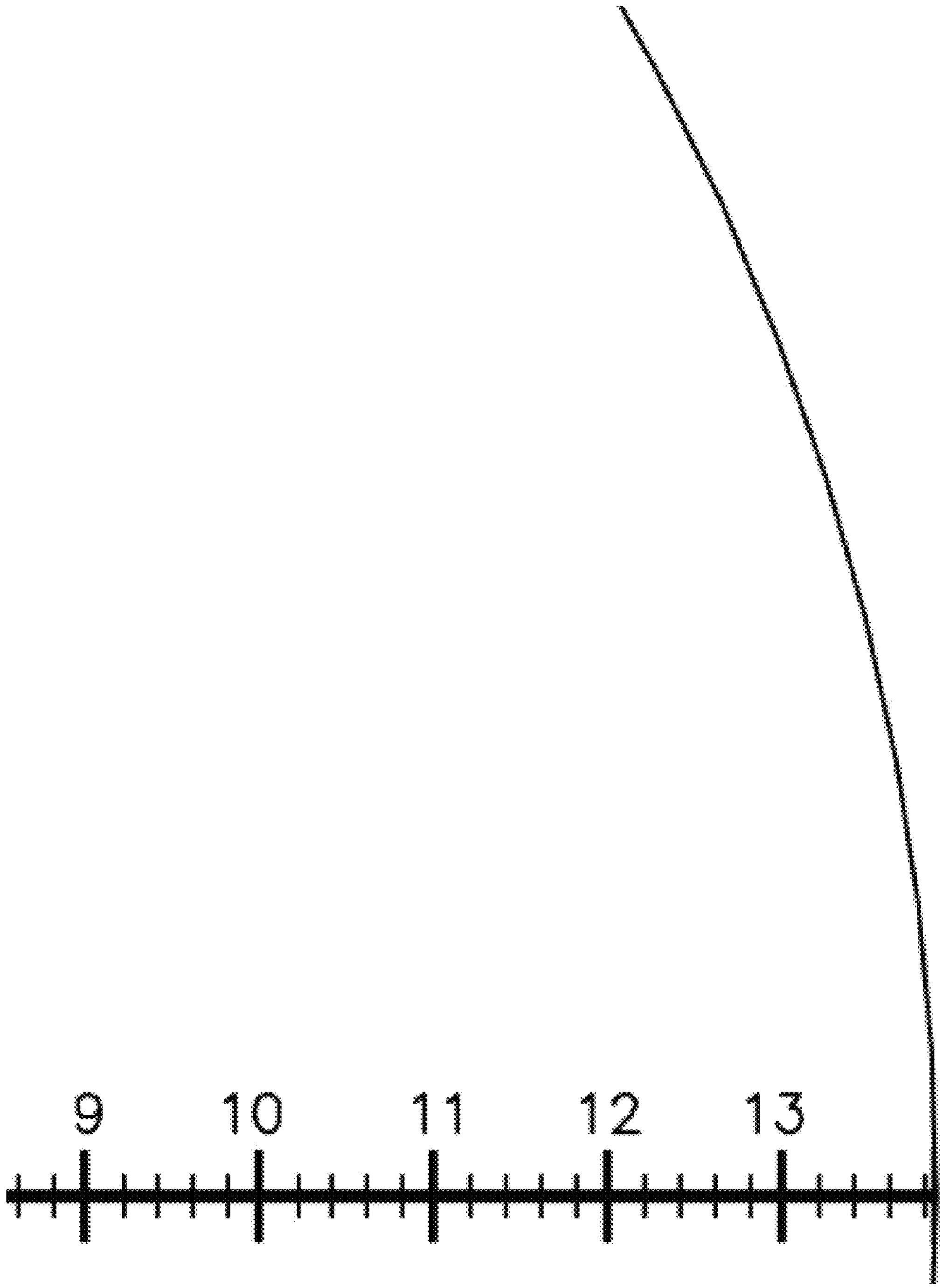
Figure 52A:
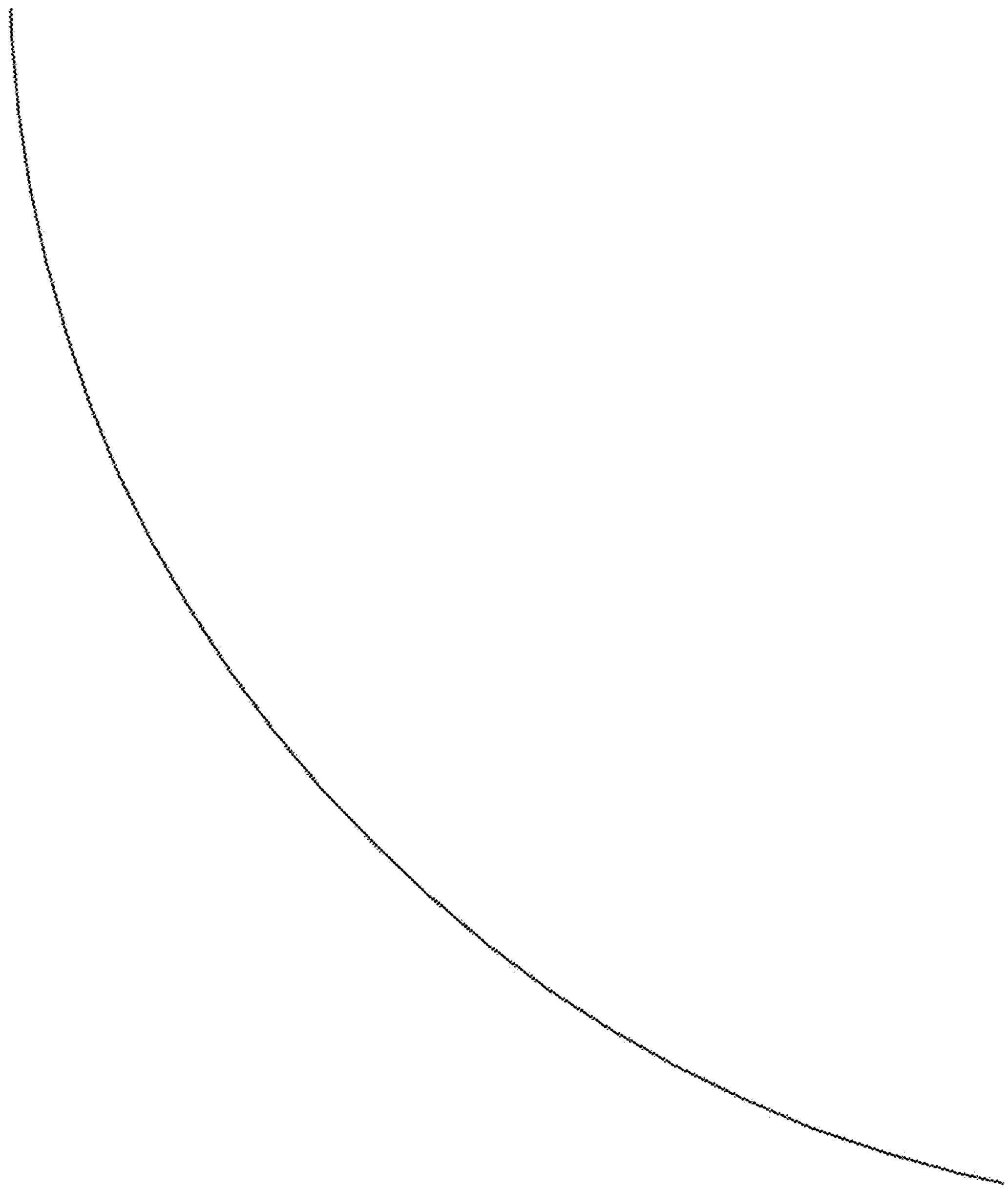
Figure 52A:
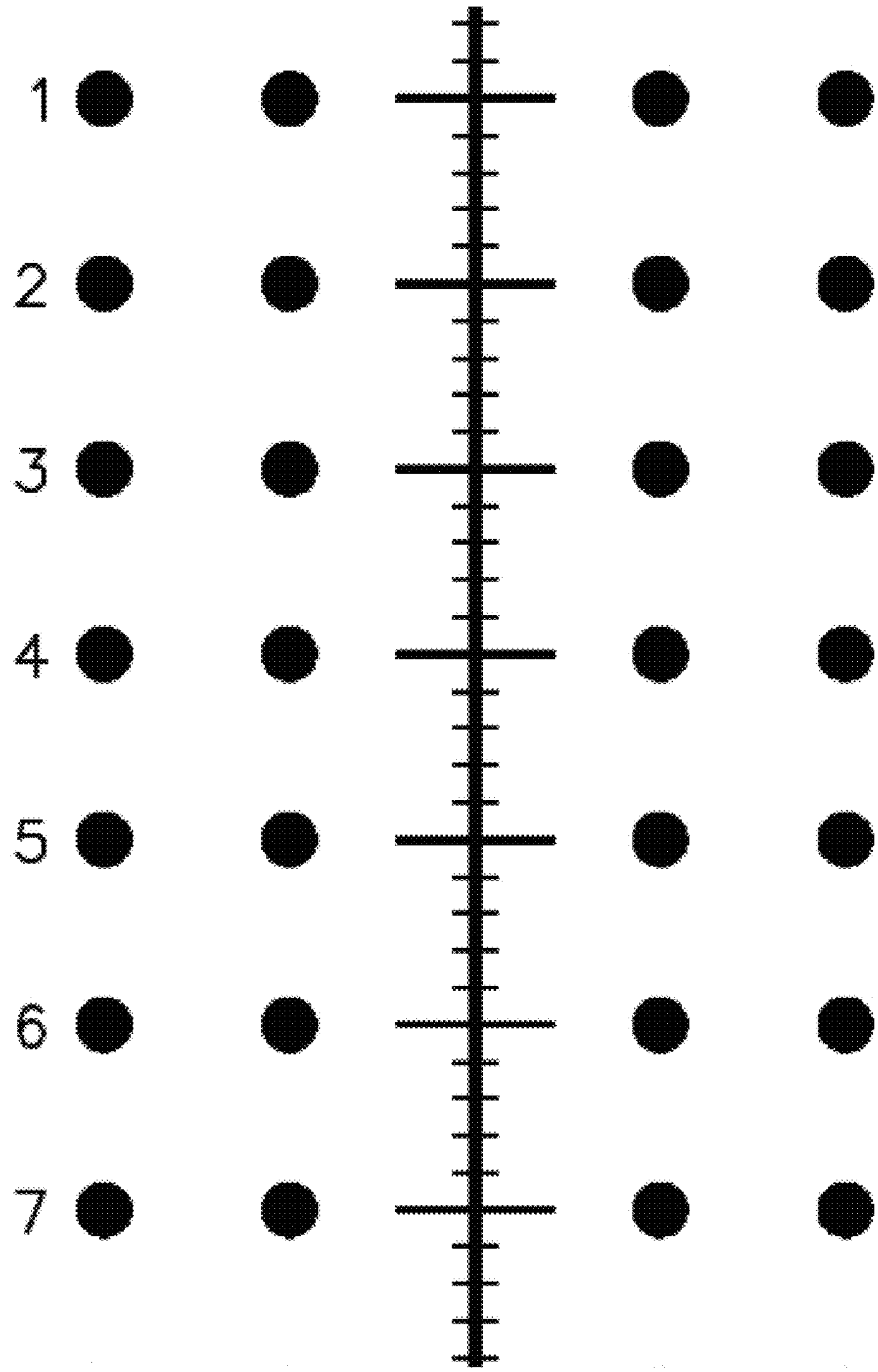
Figure 52A:
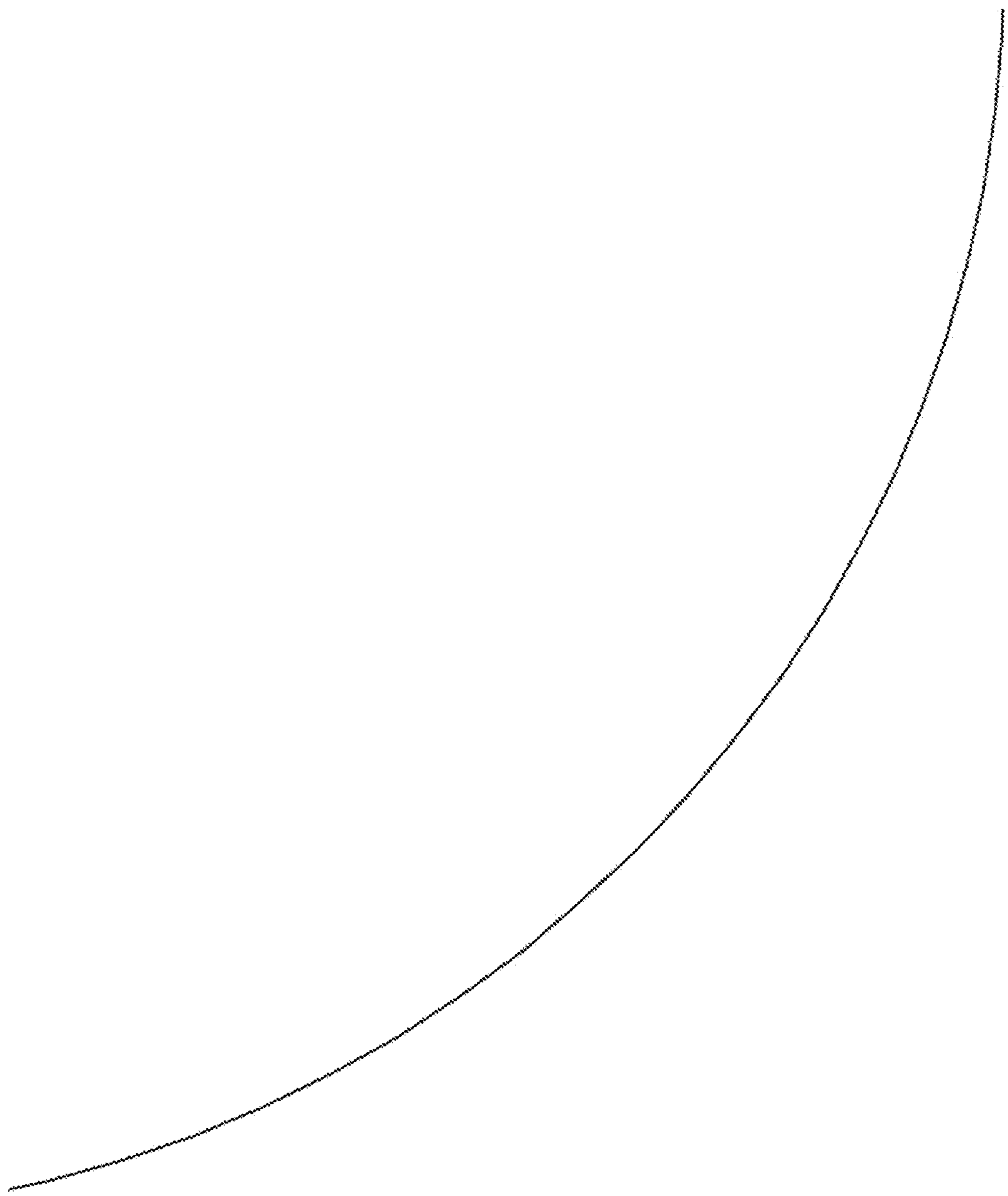
Figure 52A:
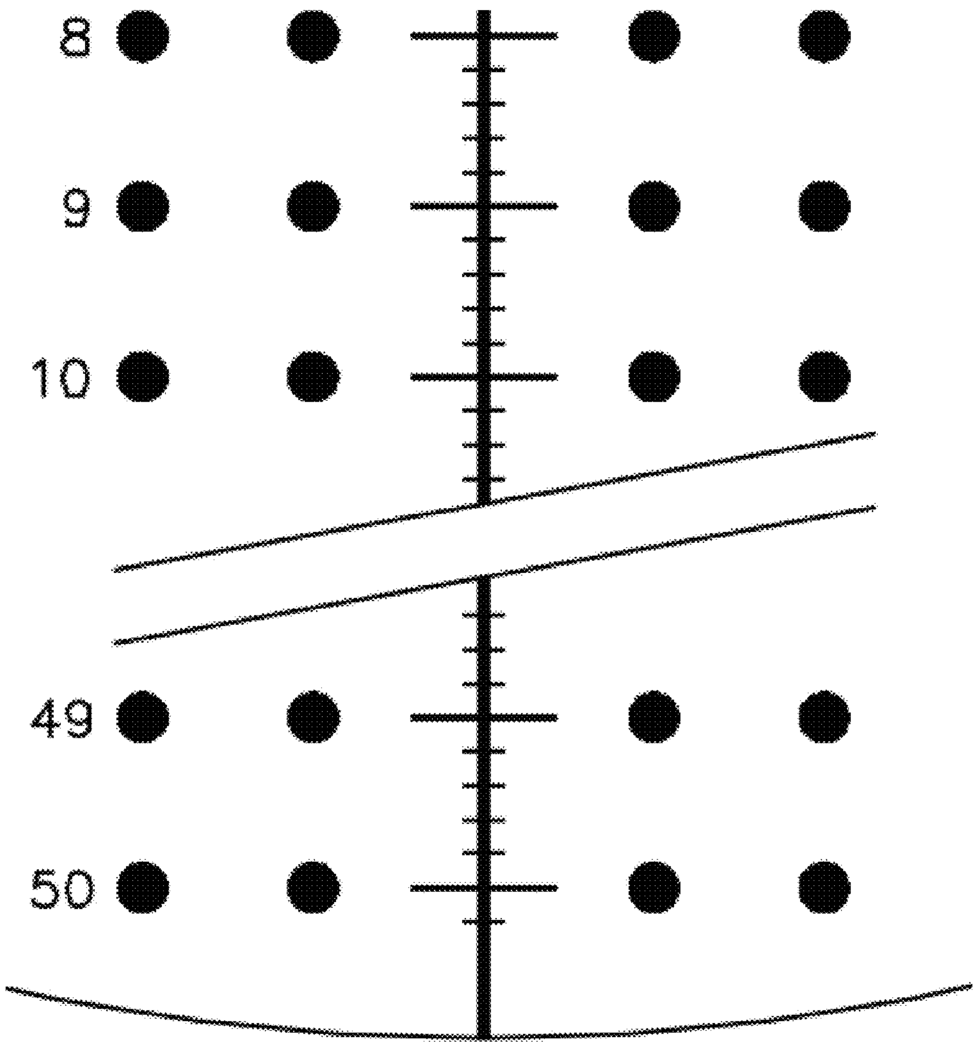
Figure 53A:
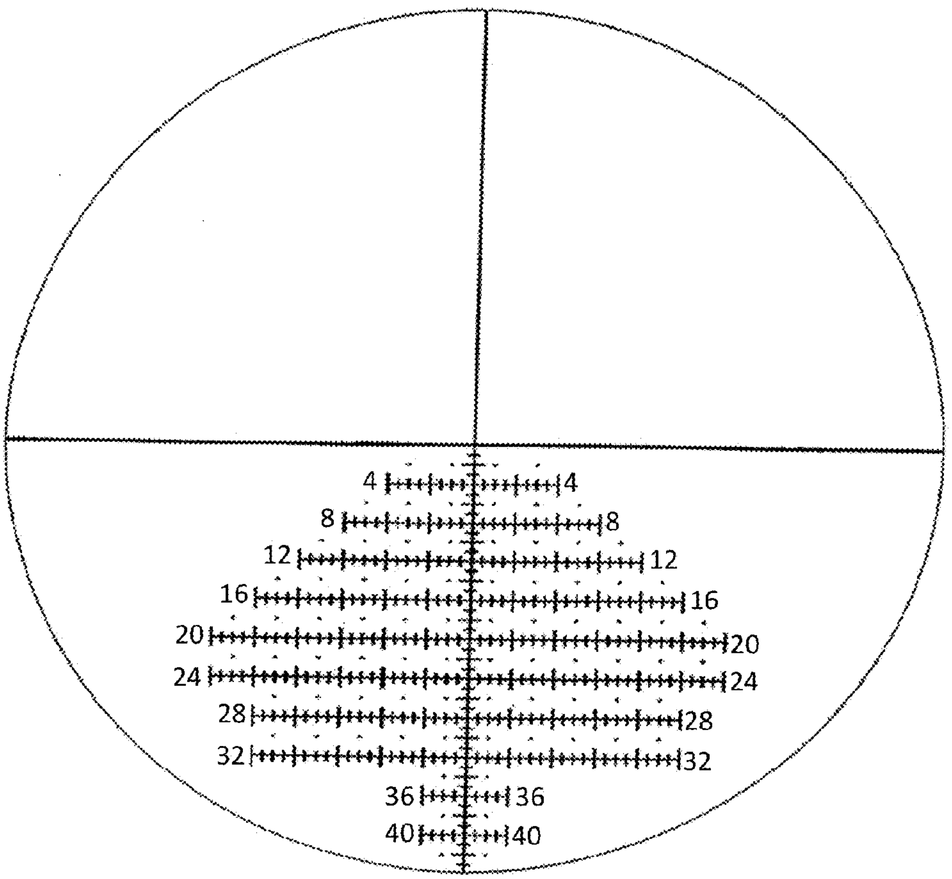
FIG. 53*a* is a front view of a reticle of the present invention, showing the markings as viewed through a zoom telescopic gunsight at high power, with lead markers along horizontal cross-hairs with the intersection of a primary vertical and horizontal cross-hair at the center of the reticle, suitable for use, for example, in tactical, military, and police applications.
Figure 53B:
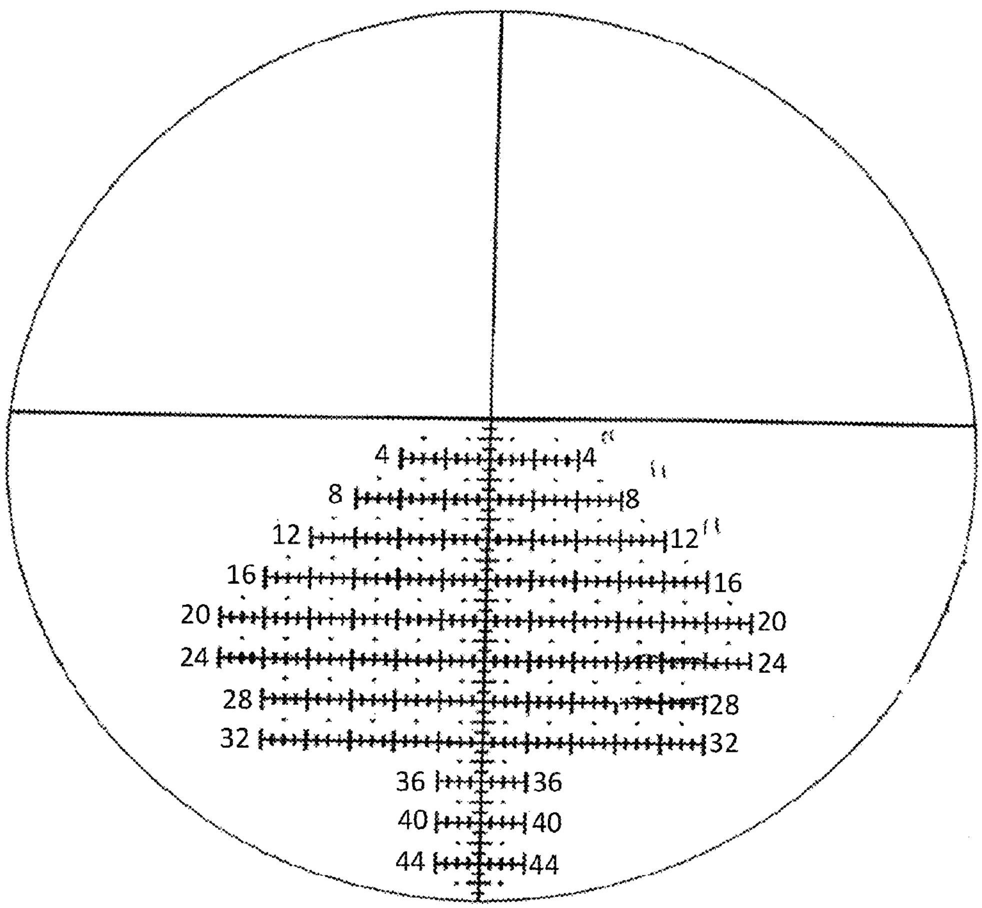
FIG. 53*b* is a front view of a reticle of the present invention, showing the markings as viewed through a zoom telescopic gunsight at high power, with lead markers along horizontal cross-hairs with the intersection of a primary vertical and horizontal cross-hair above the center of the reticle, suitable for use, for example, in tactical, military, and police applications.
Figure 53C:
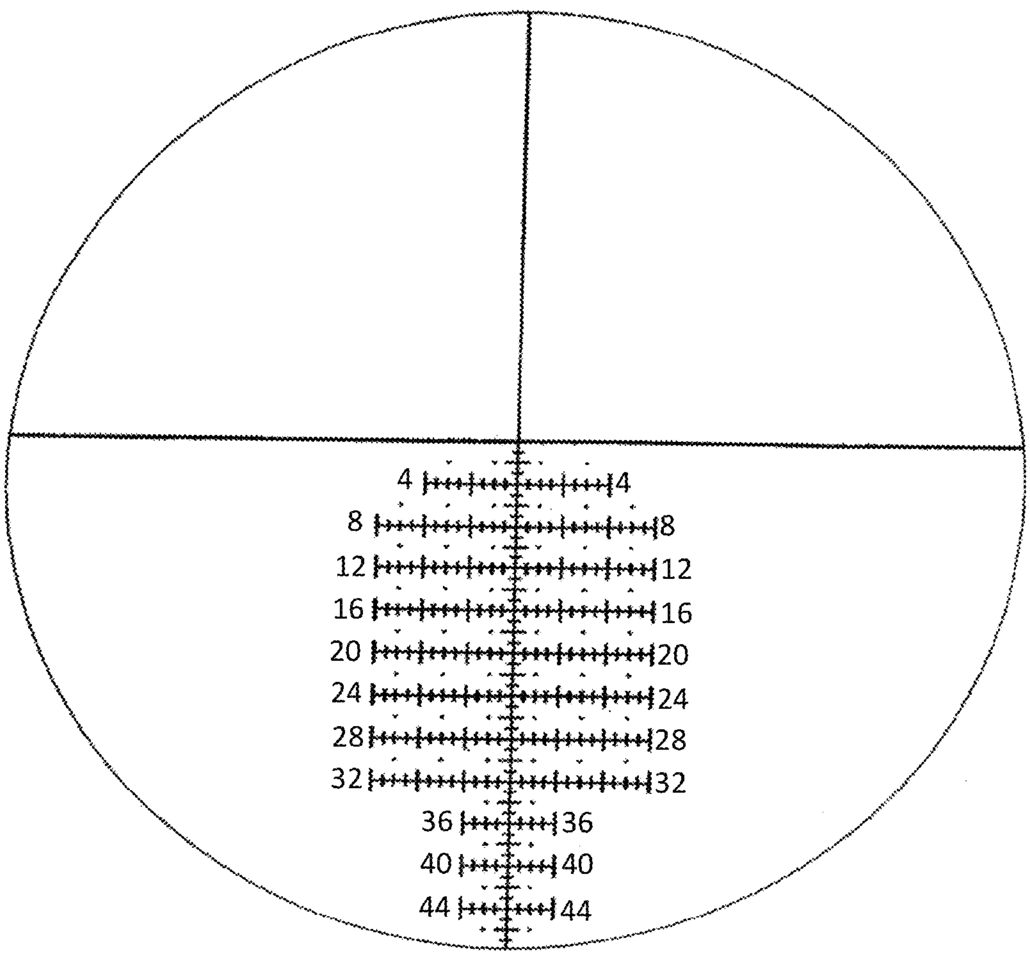
FIG. 53*c* is a front view of a reticle of the present invention, showing the markings as viewed through a zoom telescopic gunsight at high power, with lead markers along horizontal cross-hairs with the intersection of a primary vertical and horizontal cross-hair above the center of the reticle, suitable for use, for example, in tactical, military, and police applications.

As exemplified in FIGS. 51*a*, 51*b* and 51*c*, in some embodiments, reticles of the present invention comprise cross-hairs that are evenly spaced. In other embodiments, reticles of the present invention comprise cross-hairs that are unevenly spaced.

In one embodiment, the reticle of the present invention comprises rangefinder markings. In another embodiment, the reticle comprises markings for identification of one or more of the cross-hairs. As used herein, "markings for identification" refers to, for example, numbers, letters, symbols, words, geometric shapes, hollow shapes, or solid shapes, located, for example on a cross-hair, above a cross-hair, below a cross-hair, at end of a cross-hair, or upon a cross-hair. In some embodiments, markings for identification vary along the same cross-hair. As shown in FIG. 51*a*, in some embodiments, identification markings are, for example, above a cross-hair, at the end of a cross-hair or superimposed upon a cross-hair. In other embodiments, as shown in FIG. 51*b*, reticles of the present invention comprise identification markings between cross-hairs. In one embodiment, as shown in FIG. 51*a*, identification markings are numbers. In other embodiments, as exemplified by FIG. 51*c*, identification markings are, for example, a letter, a word or a symbol. As shown in FIG. 51*a*, identification markings in some embodiments comprise solid dots. As shown in FIG. 51*b*, identification markings in other embodiments comprising solid dots vary in size. In other embodiments as shown in FIG. 51*c*, identification markings comprise hollow dots located, for example, at the end of at least one cross-hair.

In one embodiment, the present invention comprises a method for shooting a target comprising a target acquisition device comprising a housing, a means for mounting the housing in a fixed, predetermined position relative to a firearm, an objective lens mounted in one end of said housing, and an ocular lens mounted in the opposite end of said housing; a reticle comprising a plurality of primary cross-hairs separated by predetermined distances, a plurality of secondary cross-hairs at predetermined distances along said plurality of primary cross-hairs, and a plurality of lead markings indicating rate of movement of the target along at least one said cross-hair; a ballistics calculator system for computing targeting information to hit a target comprising a processor comprising a ballistics computer program for analyzing information needed to accurately aim a firearm at a target using a target acquisition device with a reticle, with the program using information regarding one or more of external conditions, the firearm being used, the projectile being used, the target acquisition device and reticle being used, the shooter, the relation of the shooter and the target, wherein the target can be greater than 1000 yards from the shooter, the ballistics drag model and retardation coefficient being used (for example, G1, G2, G5, G6, G7, G8, GS (Round ball), GL, RA, Ingalls, and custom drag models based upon the actual bullet being used), and selecting an aiming point on the target acquisition device that accounts for the relation of the shooter to the target, and using the targeting information displayed by the ballistics calculator system to aim the firearm so as to hit the target. In some embodiments of the present invention, the ballistics calculator enables the user to match projectile shape to standard or custom drag models. In some embodiments, the user selects an exterior ballistic calculation method from a menu, including, for example, the Siacci analytical method of solution, numerical integration solutions using the drag models developed by Maievski, Ingalls, the Gavrês Commission, and the British 1909 Commission, point-mass numerical integration using standard reference projectiles, point-mass numerical integration using Robert L. McCoy's McDrag algorithm, modified point-mass models, the drag models developed by the United States Army Ballistics Research Laboratory (USABRL), and 6-Degrees-Of-Freedom (6DOF) models. In other embodiments, the ballistics calculator of the present invention calculates the ballistics coefficient for a projectile that may or may not be different from the standard sea-level ballistics coefficient. The ballistics calculator of the present invention is able, as an option, to convert the ballistic coefficient to custom drag models and ballistics coefficients for any drag model using velocity or bullet dimension. In further embodiments, the ballistics calculator of the present invention calculates vertical and horizontal cant error at zero range for the entire projectile path. In some embodiments, for high elevation firing, the user selects, for example, one coefficient of drag for a range of less than or equal to, for example, 1000 yards, a second coefficient of drag/ballistic coefficient for 1000 to 1500 yards, a third for greater than 1500 yards, and an optional fourth coefficient of drag for use at very high altitudes. In a preferred embodiment, the target is hit by holding the aiming point on the target.

In a particularly preferred embodiment, the ballistics calculator system of the present invention takes account the reaction time of the shooter in targeting a moving object. As used herein, "reaction time of the shooter" refers to the time elapsed between the decision to shoot is made and an indication of the decision is provided to the firearm or ballistics calculator system. In some embodiments, the indication of the decision is transduced by, for example, shooter movement or voice. In other embodiments, the indication of the decision to shoot is transduced by a physiologic variable of the shooter, for example, electroencephalogram, electromyogram, or evoked surface potential. In further embodiments the reaction time of the shooter is measured and entered into the ballistics calculator system. In other embodiments, the reaction time of the shooter is estimated, for example, to be rapid, intermediate, or slow and entered into the ballistics calculator system.

In other embodiments, the ballistics calculator system of the present invention takes into account the lock time of the firearm in targeting a moving object. As used herein, "lock time of the firearm" refers to the time elapsed between receipt of the signal indicating the decision to fire, and discharge of the firearm. In some embodiments, the lock time of the firearm incorporates transduction by, for example, mechanical, chemical, electronic or optical means. In other embodiments, the lock time of the firearm is measured and entered into the ballistics calculator system. In other embodiments, the lock time of the firearm is estimated, for example, to be rapid, intermediate, or slow, and entered into the ballistics calculator system. In preferred embodiments, the ballistics calculator system takes into account the reaction time of the shooter, the lock time of the firearm and the time of flight of the projectile in targeting a moving object. In one embodiment, the reticle and ballistics calculator system of the present invention is used to target an object moving in 3 dimensions. For example, in one embodiment, the reticle and ballistics calculator system acquires (for example, visual, IR, or radar) images, stores and digitally compares moving images on the reticle at distinct points in time, using the change in image dimensions to calculate the rate of travel in three axes. This data is then used to calculate the directional vector, velocity and acceleration of the target, and provide an aiming solution. In a further embodiment, calculation of rate of travel in three axes is integrated with continuous laser or other tracking.

In one embodiment of the present invention, a method for shooting a target is provided in which the shooter superimposes an aiming dot projected on the reticle over the moving target as the ballistics calculator system of the present invention aligns the barrel so that the target is hit. In this embodiment, the shooter strikes the target by tracking the target in alignment with the aiming dot projected on the reticle as compensatory aiming adjustments are made to the alignment of the firearm so as to strike the target. In a further embodiment of the present invention, a method is provided for shooting a target in which the shooter aligns a fixed point on the reticle to an aiming point projected by the ballistics calculator system (which may not be superimposed on the target image) so that the target is hit. In this embodiment the shooter does not track the target with an aiming dot, but rather the shooter aligns a fixed point on the reticle with an aiming point projected by the ballistics calculator which accounts for the position of the target in relation to the shooter at the moment of impact and calculates an aiming solution.

In one embodiment of the present invention, a method of shooting a target is provided in which serial range data is used by the ballistics calculator system to customize a projected reticle specific for the combination of one or more of the firearm, the projectile, the target acquisition device and reticle in use, the shooter, the relation of the shooter to the the target, and the ballistics drag model and ballistic coefficient being used. In this fashion, the ballistics calculator system of the present invention is used to create a projected reticle that is customized for the specific internal, external and terminal ballistics of the firearm, target acquisition device, and projectile being used, as well as the shooter and target. In some embodiments, the shooter begins with a generic projected reticle before modification with automated entry of actual range data using the specific system. In these embodiments the generic projected reticle incorporates incremental range data after each shot is fired, and its point of impact is correlated with the aiming point. In further embodiments, the user may optionally delete or edit actual range firing data. In still further embodiments, the user may select features of the projected reticle (for example, line spacing, width, and secondary markings) as detailed elsewhere in this Specification.

All publications and patents mentioned in the above specification are herein incorporated by reference. Various modifications and variations of the described compositions and methods of the invention will be apparent to those skilled in the art without departing from the scope and spirit of the invention. One skilled in the art will recognize at once that it would be possible to construct the present invention from a variety of materials and in a variety of different ways. Although the invention has been described in connection with specific preferred embodiments, it should be understood that the invention should not be unduly limited to such specific embodiments. While the preferred embodiments have been described in detail, and shown in the accompanying drawings, it will be evident that various further modification are possible without departing from the scope of the invention as set forth in the appended claims. Indeed, various modifications of the described modes for carrying out the invention which are obvious to those skilled in marksmanship, computers or related fields are intended to be within the scope of the following claims.

I claim:

1. A method for using a computer running a ballistics program, comprising:

a) inputting cartridge, altitude, temperature and atmospheric pressure data into said computer running said ballistics computer program;

b) calculating points of impact based on said data by said computer using said ballistics program;

c) selecting an aiming point on a reticle in a gunsight using said points of impact wherein said reticle comprises:

1) a primary vertical cross-hair;

2) a primary horizontal cross-hair intersecting said primary vertical cross-hair;

3) a plurality of secondary horizontal cross-hairs evenly spaced along said primary vertical cross-hair; and 4) a plurality of secondary vertical cross-hairs evenly spaced along at least some of said secondary horizontal cross-hair wherein said secondary vertical cross-hairs intersect one and only one secondary horizontal cross-hair.

2. The method of claim 1, wherein said gunsight comprises a housing.

3. The method of claim 2, wherein said gunsight comprises an objective lens mounted in one end of said housing.

4. The method of claim 3, wherein said gunsight comprises an ocular lens mounted in an opposite end of said housing from said objective lens, wherein said reticle is mounted in said housing between said objective lens and said ocular lens.

5. The method of claim 1, wherein said reticle is constructed from an optically transparent wafer or disc.

6. The method of claim 1, wherein said primary vertical cross-hair, said primary horizontal cross-hair, said plurality of secondary horizontal cross-hairs, and said plurality of secondary vertical cross-hairs are provided by etching.

7. The method of claim 1, wherein said primary vertical cross-hair, said primary horizontal cross-hair, said plurality of secondary horizontal cross-hairs, and said plurality of secondary vertical cross-hairs are provided by printing.

8. The method of claim 1, wherein said primary vertical cross-hair, said primary horizontal cross-hair, said plurality of secondary horizontal cross-hairs, and said plurality of secondary vertical cross-hairs are provided by applying hairs or wires of known diameter.

9. The method of claim 1, further comprising the step of firing said cartridge at a target.

10. The method of claim 9, wherein said target is at a range greater than 500 yards.

11. The method of claim 10, wherein said target is at a range of 1000 yards to 2500 yards.

* * * * *